United States Patent
Oh et al.

(10) Patent No.: US 8,023,529 B2
(45) Date of Patent: Sep. 20, 2011

(54) SYSTEM AND METHOD FOR USING RESOURCES IN A COMMUNICATION SYSTEM

(75) Inventors: Seong-Keun Oh, Gyeonggi-do (KR); Min Lee, Seoul (KR)

(73) Assignee: Ajou University Industry-Academic Cooperation Foundation, Wonchon-Dong, Yeongtong-Gu, Suwon, Gyeonggi-Do (KR)

( * ) Notice: Subject to any disclaimer, the term of this patent is extended or adjusted under 35 U.S.C. 154(b) by 27 days.

(21) Appl. No.: 12/449,836

(22) PCT Filed: Feb. 27, 2008

(86) PCT No.: PCT/KR2008/001131
§ 371 (c)(1),
(2), (4) Date: Aug. 27, 2009

(87) PCT Pub. No.: WO2008/105629
PCT Pub. Date: Sep. 4, 2008

(65) Prior Publication Data
US 2010/0002725 A1    Jan. 7, 2010

(30) Foreign Application Priority Data
Feb. 27, 2007 (KR) .......................... 10-2007-0019747
Jul. 25, 2007 (KR) .......................... 10-2007-0074514

(51) Int. Cl.
    *H04J 3/22* (2006.01)
(52) U.S. Cl. .......................................... 370/468; 370/328
(58) Field of Classification Search .................. 370/503, 370/520, 395, 340, 342, 354, 236–237, 280–281, 370/294–297, 395.41–395.7, 468–473
See application file for complete search history.

(56) References Cited

U.S. PATENT DOCUMENTS

| | | | | |
|---|---|---|---|---|
| 5,526,357 A | * | 6/1996 | Jandrell | 370/346 |
| 6,952,586 B2 | | 10/2005 | Kim et al. | 455/452.1 |
| 7,522,640 B2 | * | 4/2009 | Date et al. | 370/507 |
| 2001/0007552 A1 | * | 7/2001 | Schiff et al. | 370/331 |
| 2004/0127223 A1 | | 7/2004 | Li et al. | |
| 2006/0084438 A1 | * | 4/2006 | Kwon | 455/436 |
| 2007/0087756 A1 | * | 4/2007 | Hoffberg | 455/450 |

* cited by examiner

*Primary Examiner* — Ricky Ngo
*Assistant Examiner* — Iqbal Zaidi
(74) *Attorney, Agent, or Firm* — Cha & Reiter, LLC

(57) ABSTRACT

In a method for using resources in a communication system, a communication region is divided into inter-sector boundary regions, sector central regions, and a sector common region, and predetermined resources are allocated to the divided regions.

8 Claims, 120 Drawing Sheets

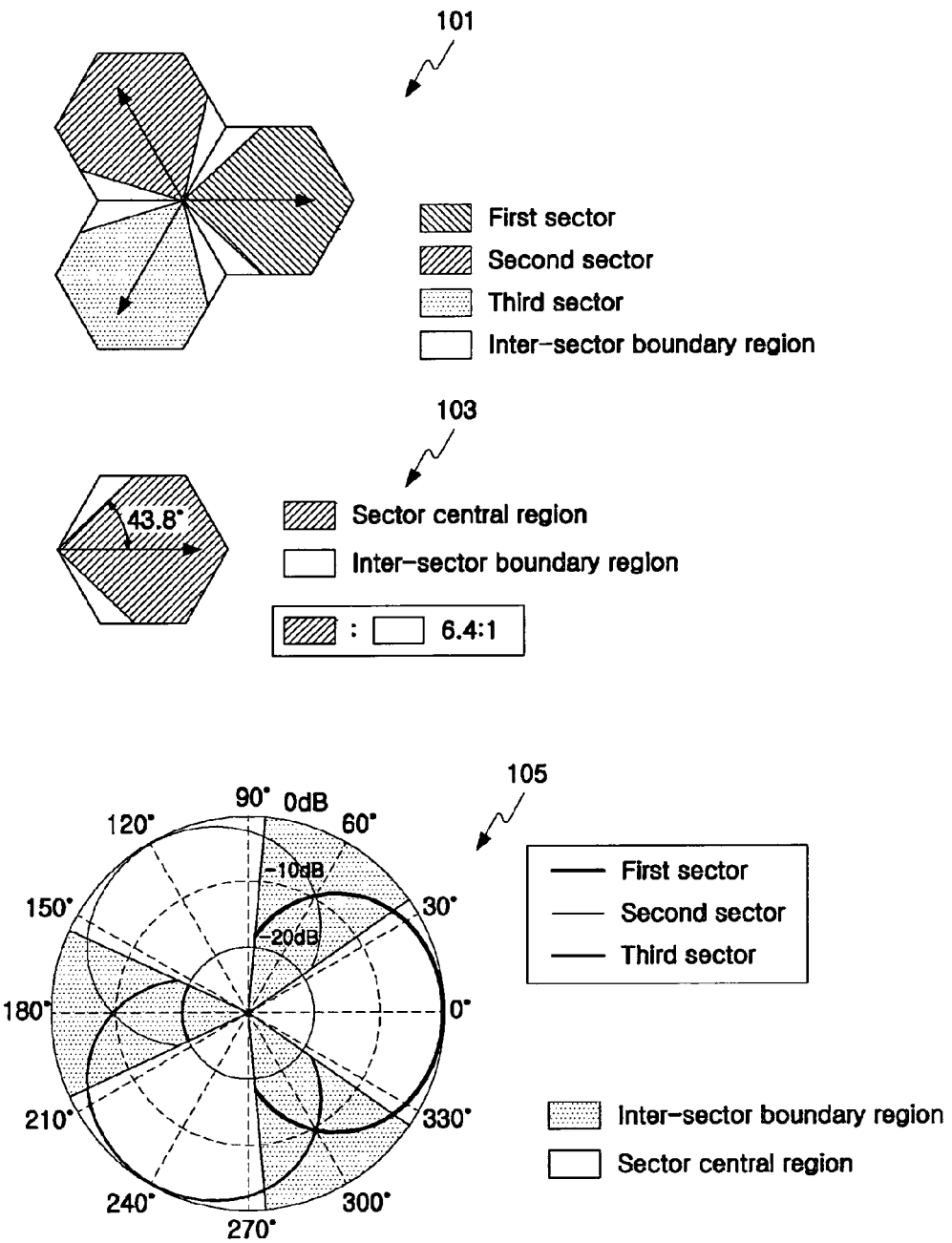

[FIG. 2]
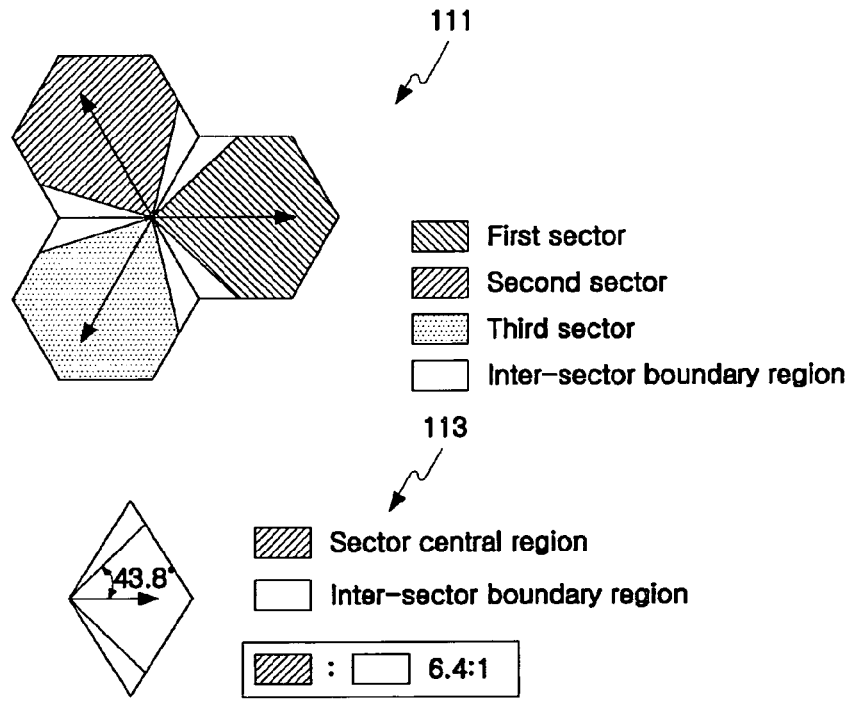
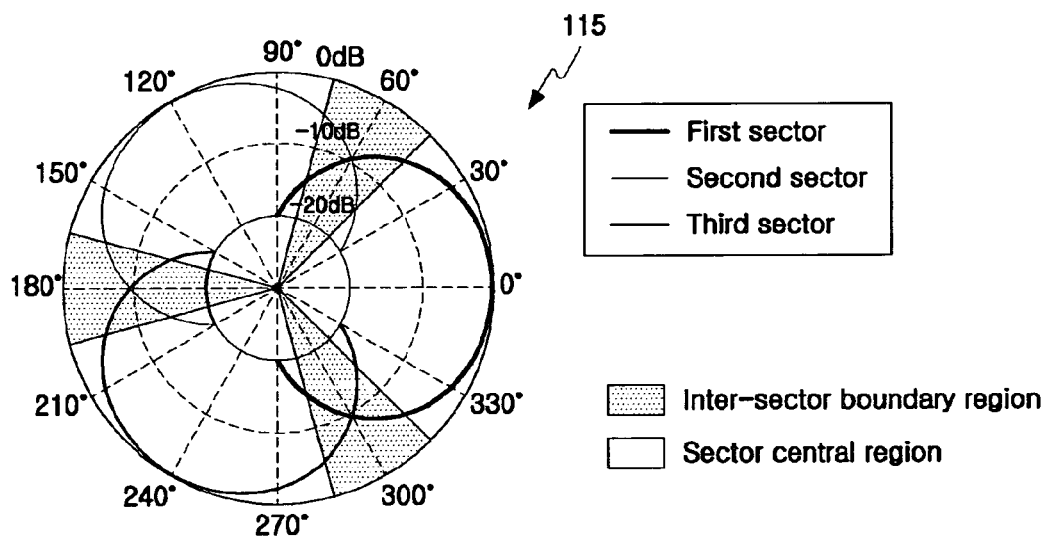

[FIG. 3]
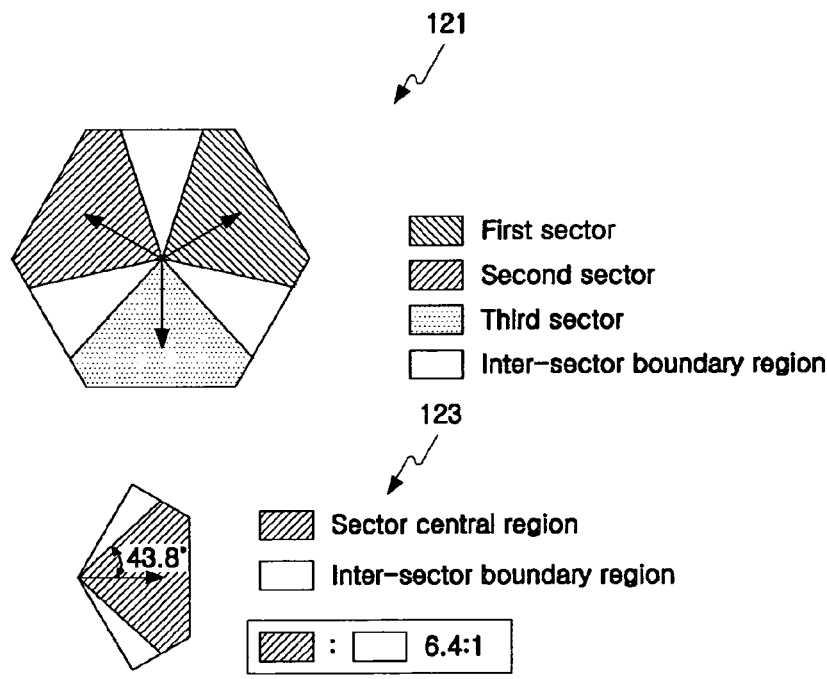
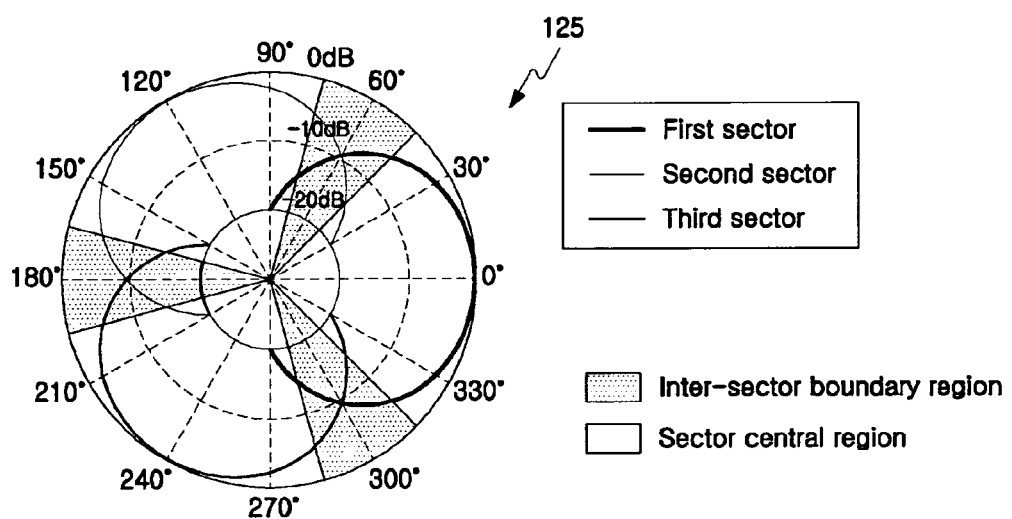

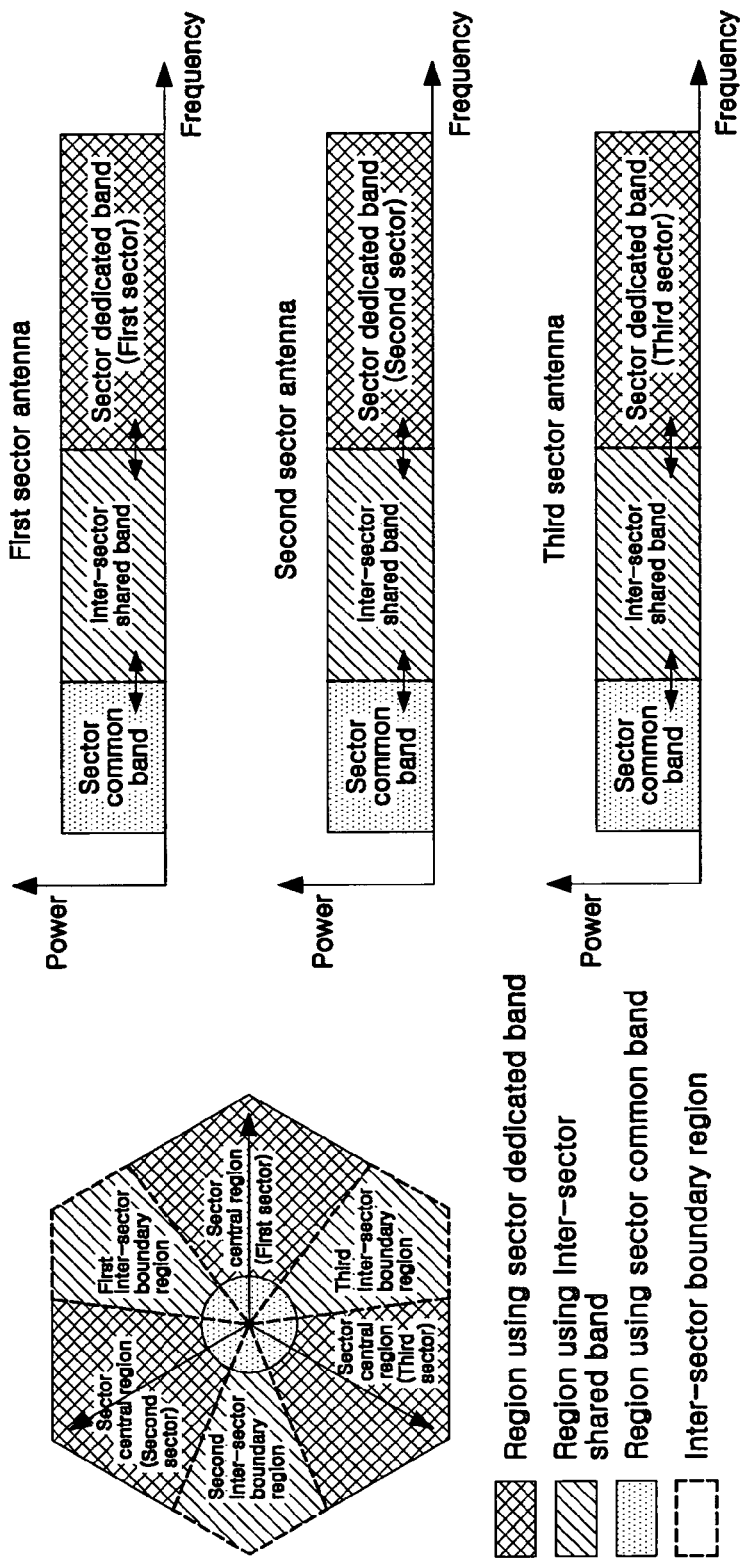
[FIG. 4]

[FIG. 5]
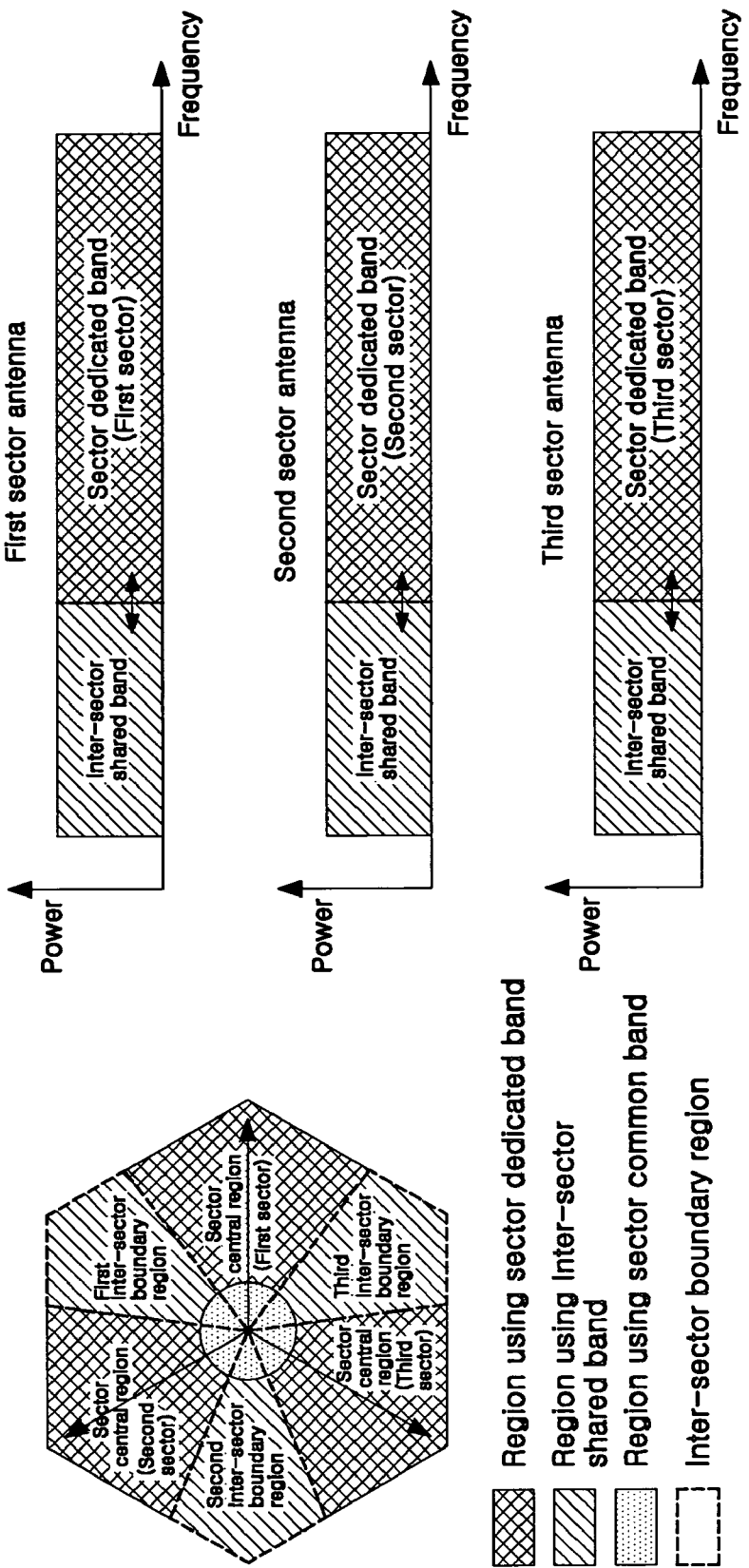

[FIG. 6]
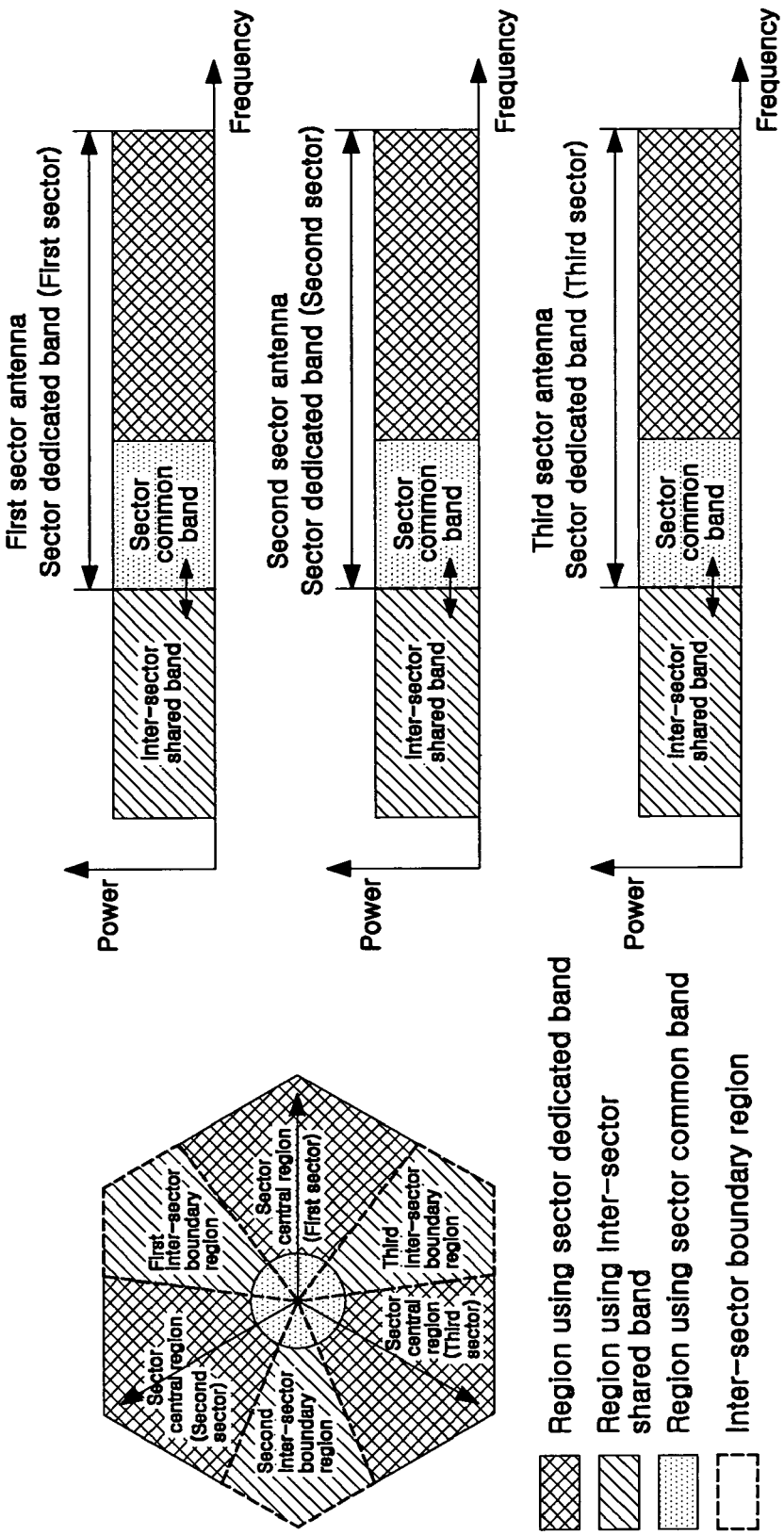

[FIG. 7]
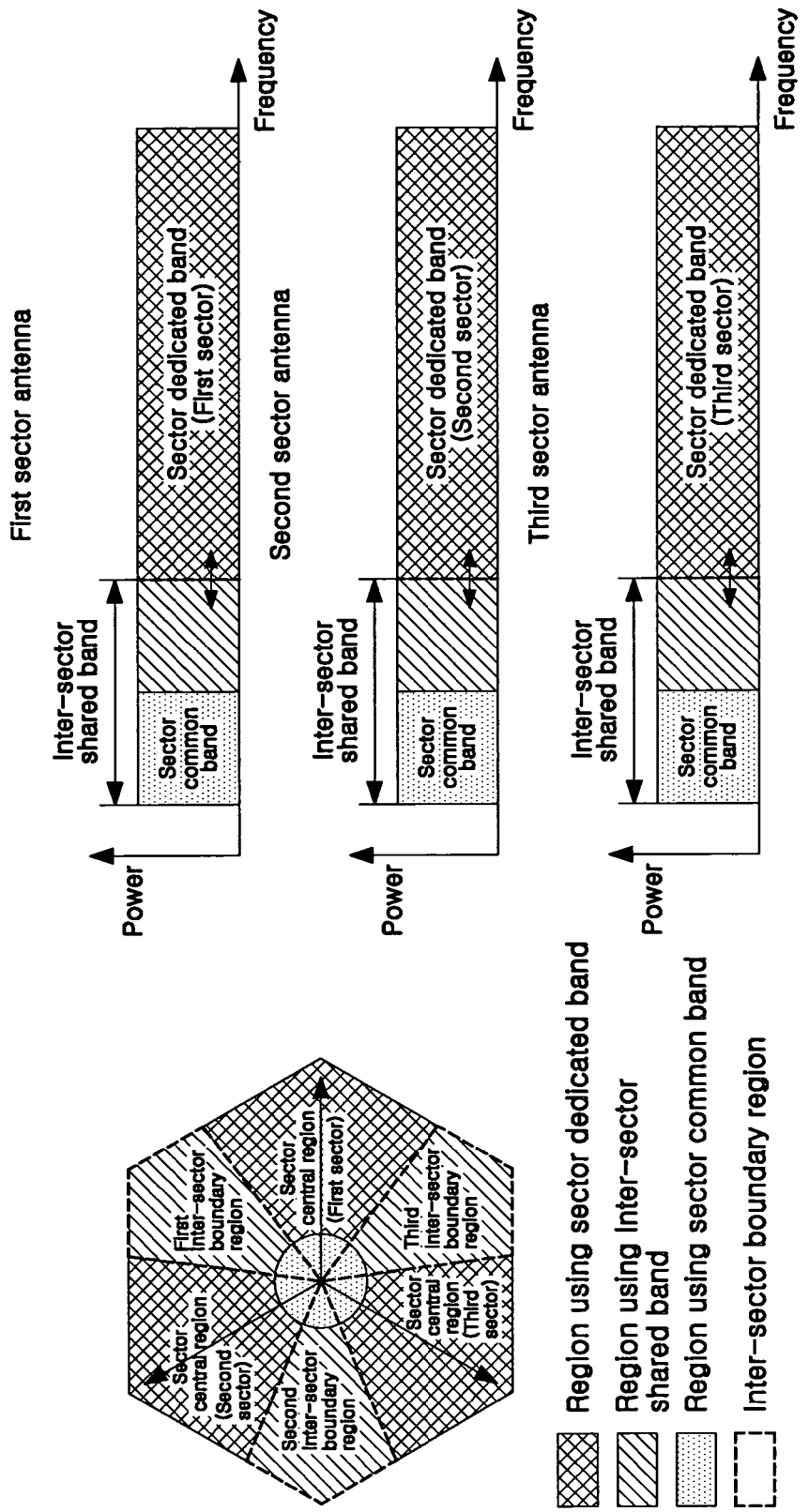

[FIG. 8]
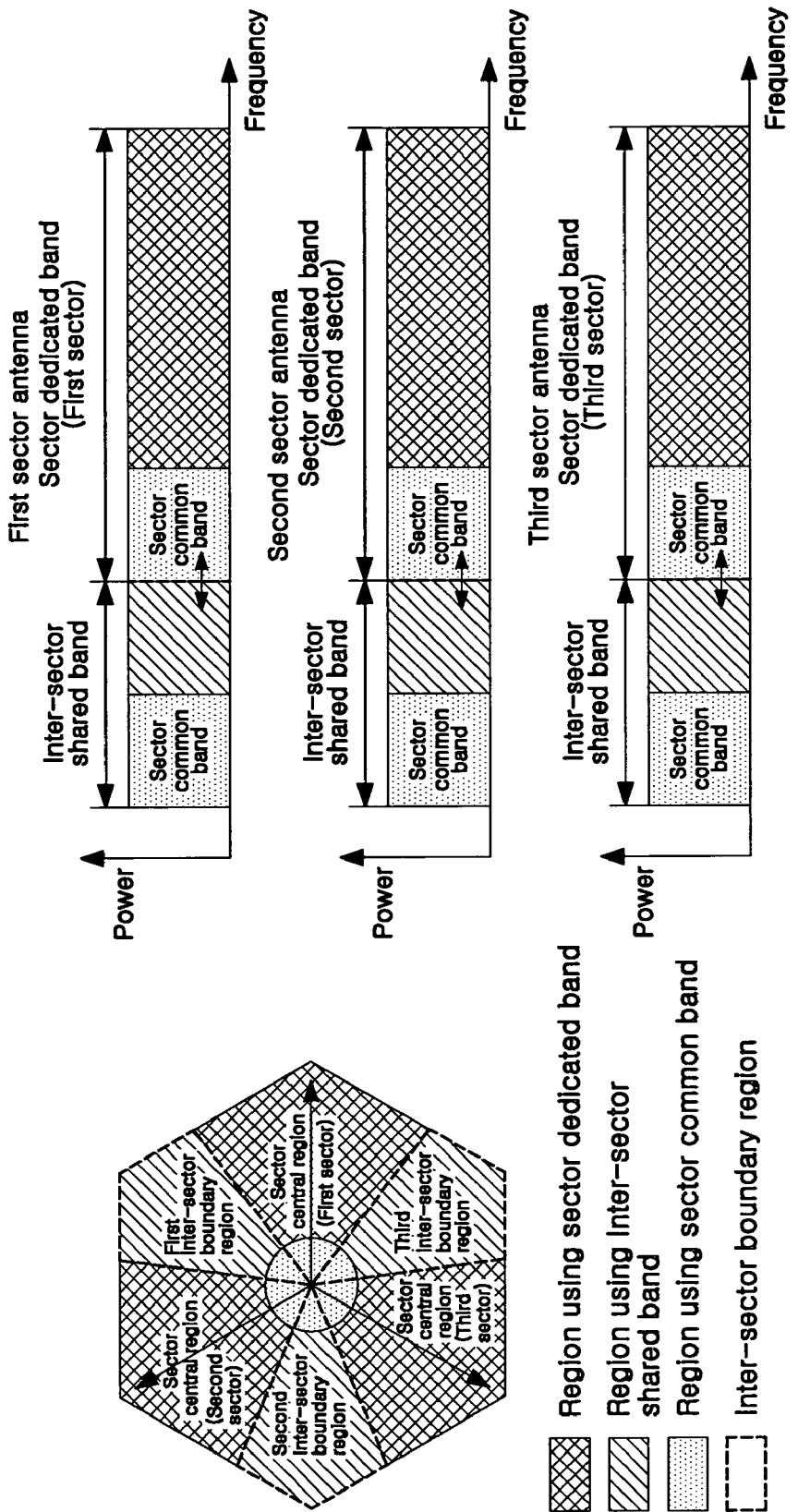

[FIG. 9]
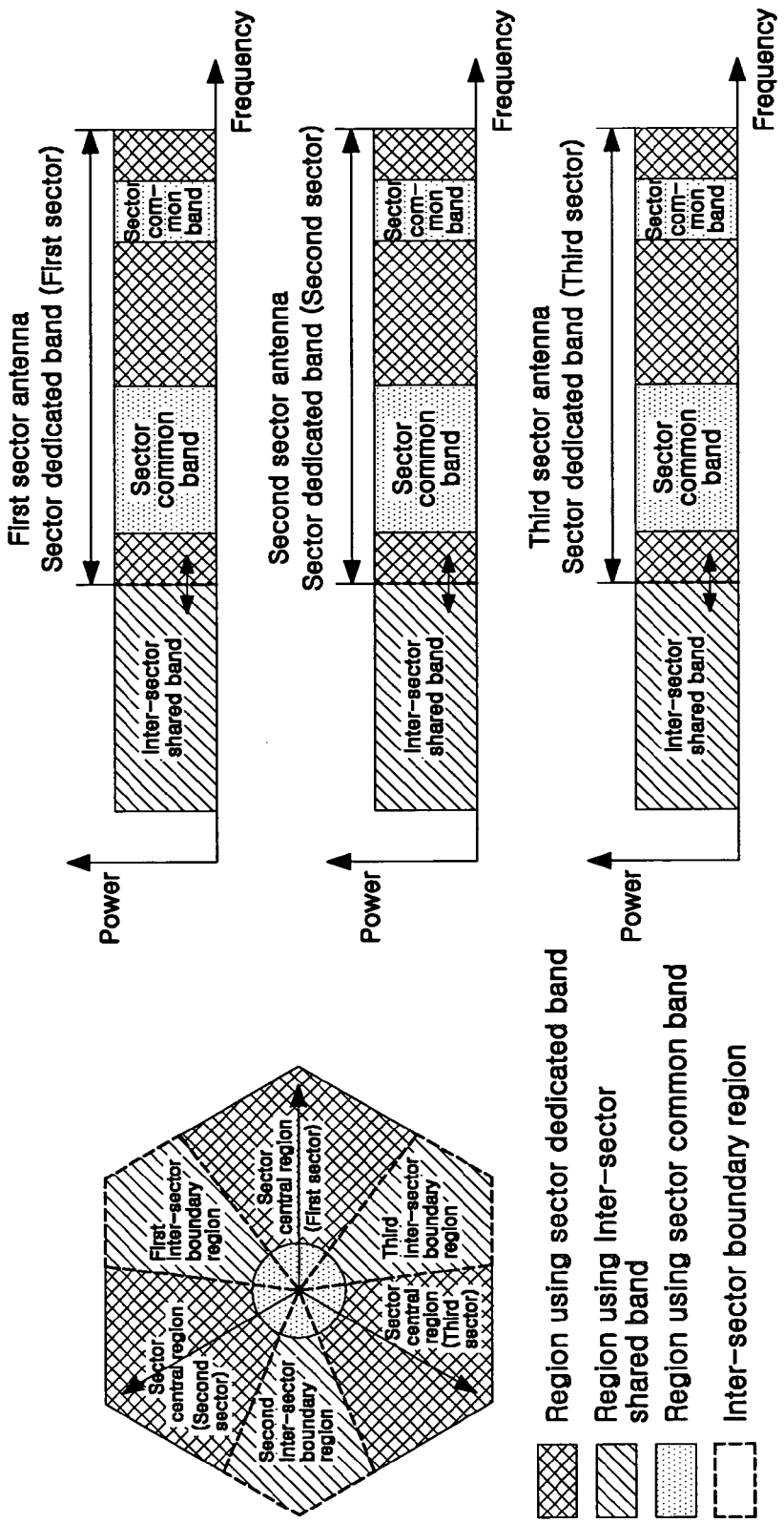

[FIG. 10]
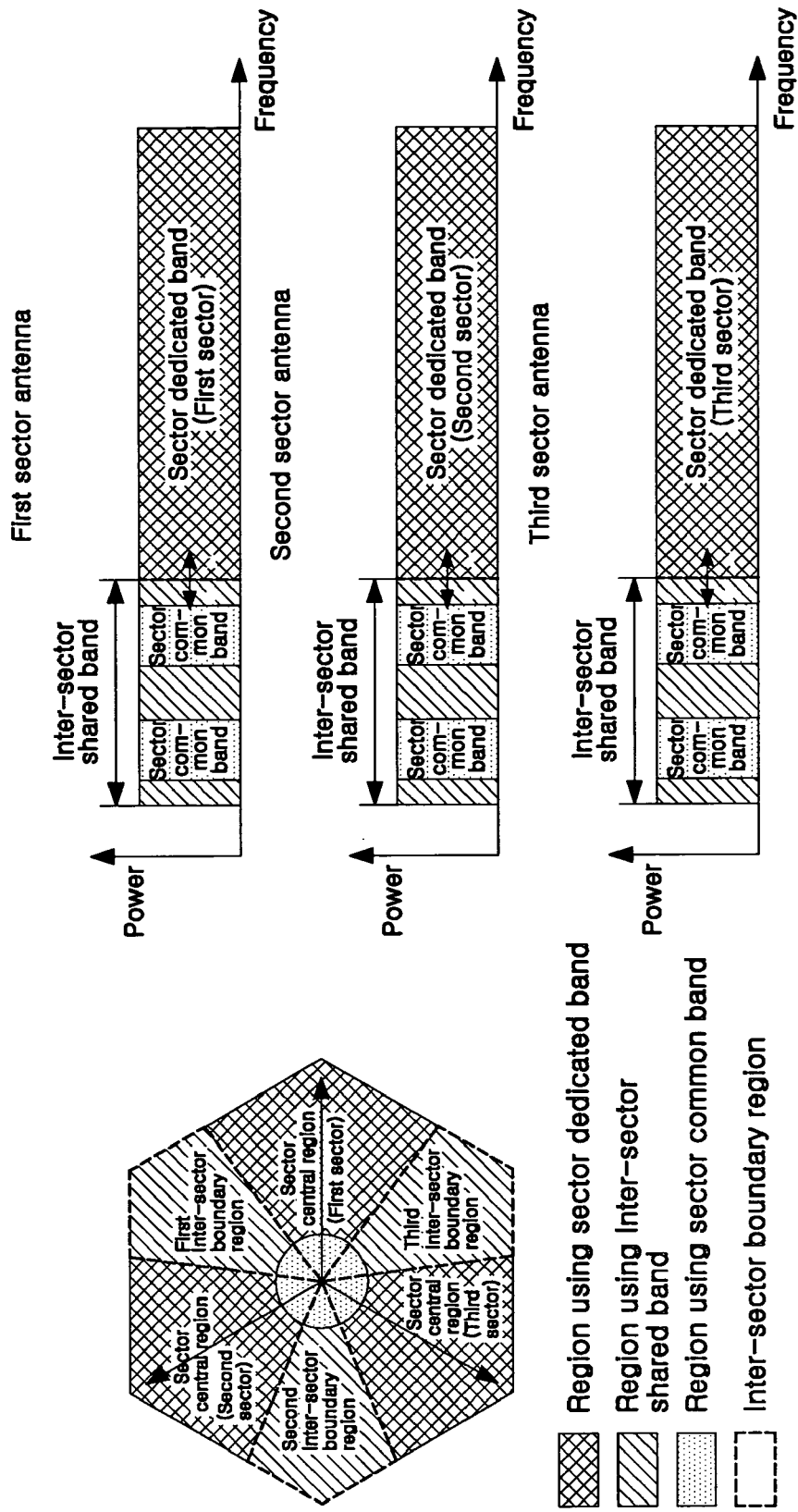

[FIG. 11]
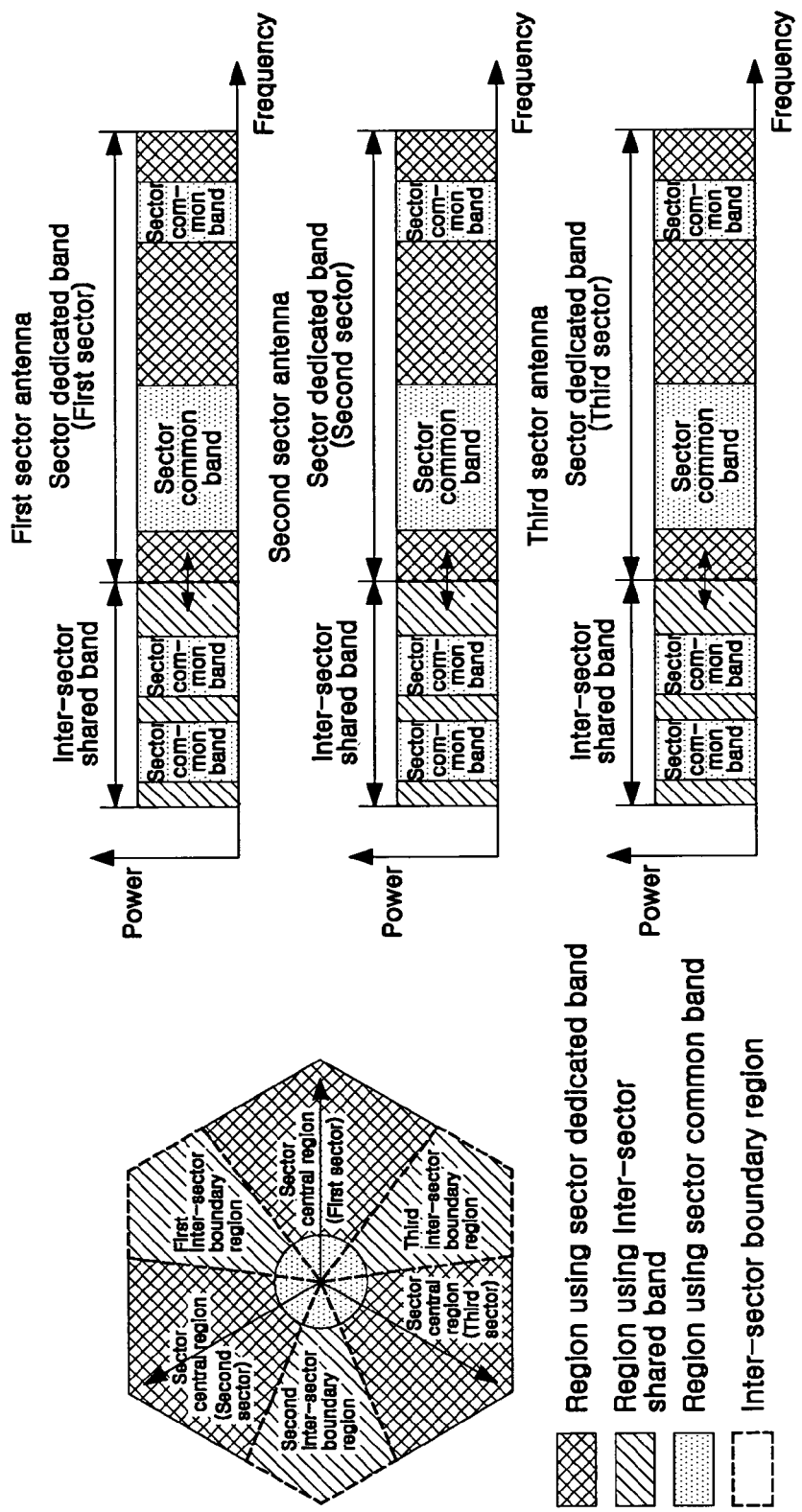

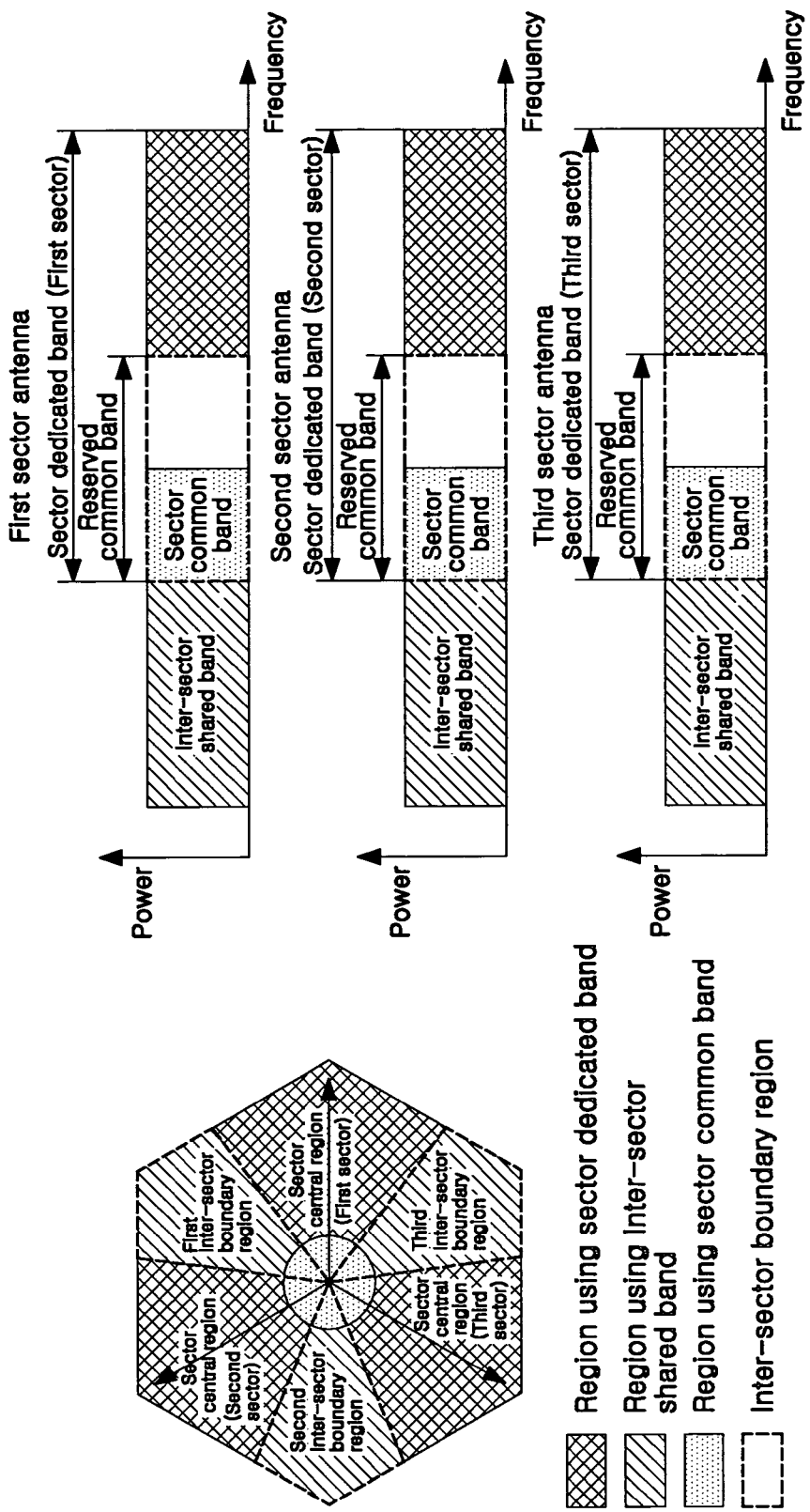
[FIG. 12]

[FIG. 13]
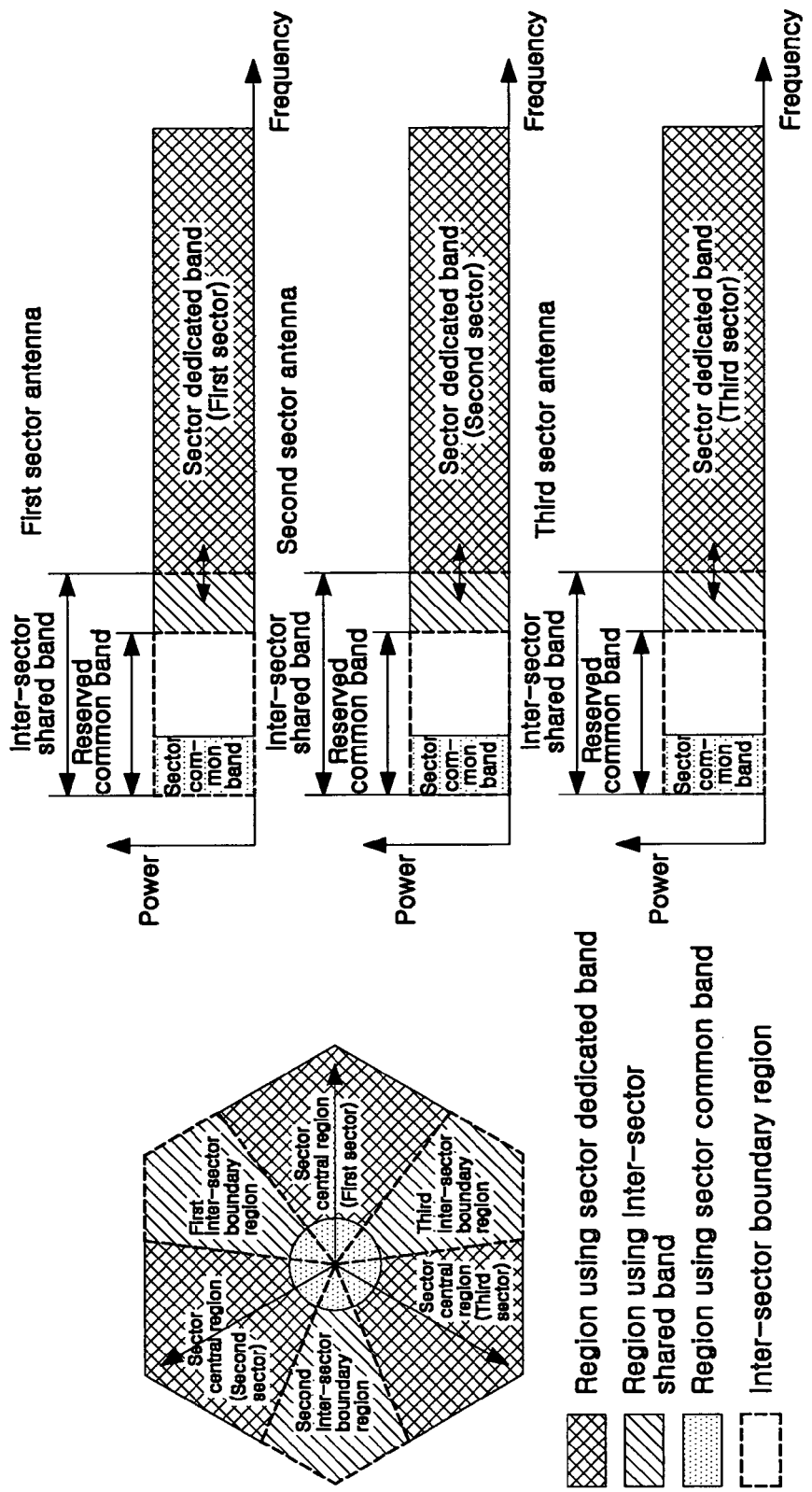

[FIG. 14]
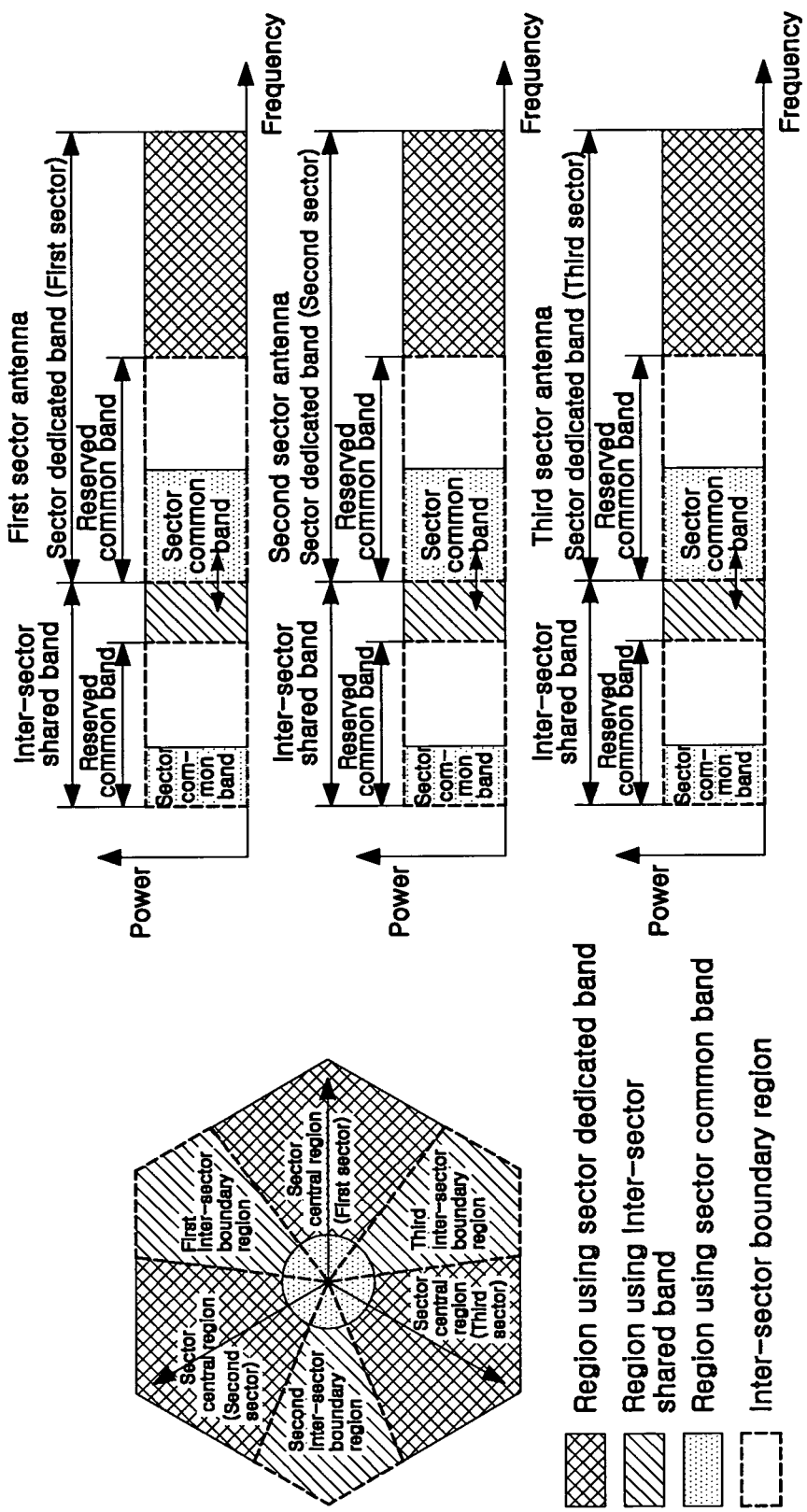

[FIG. 15]
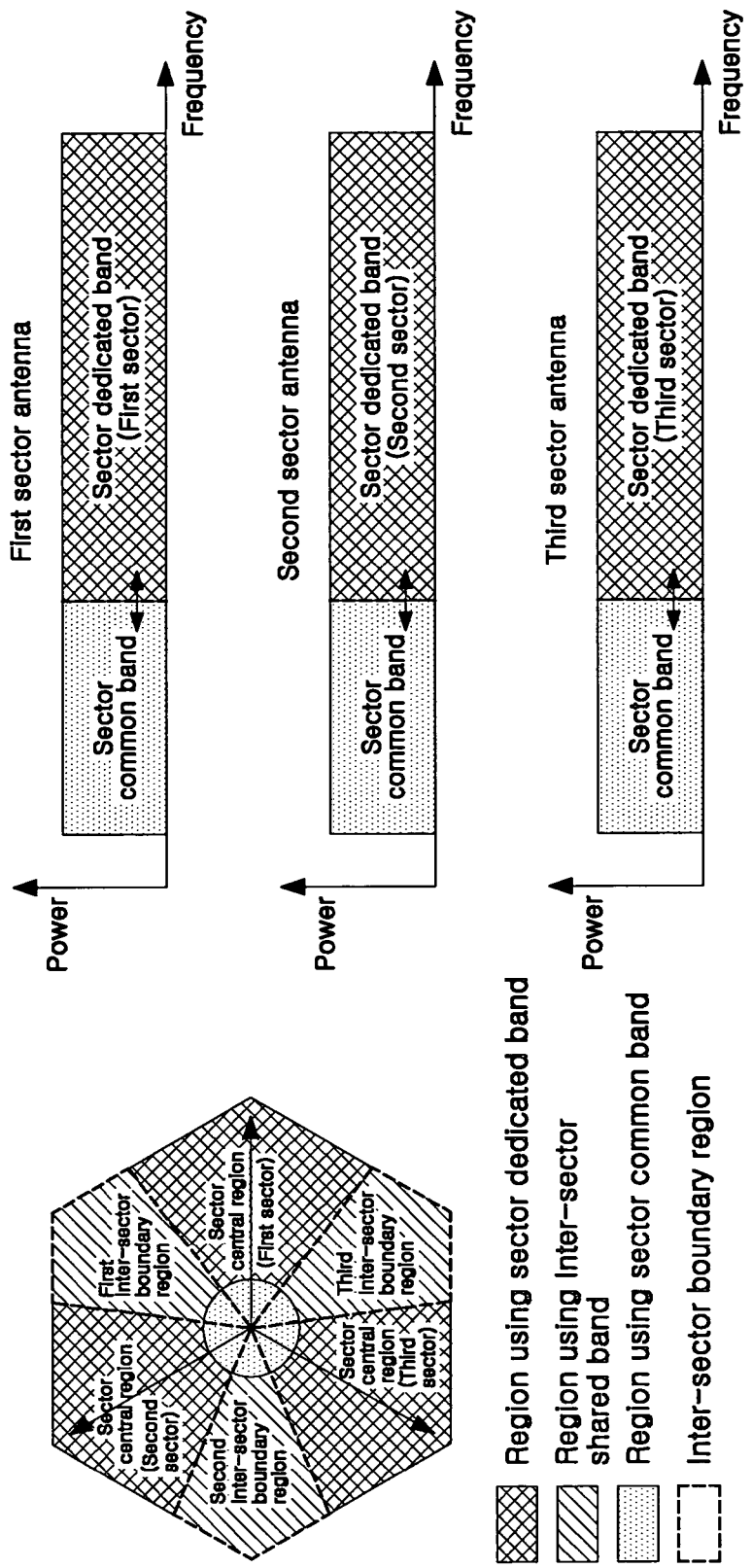

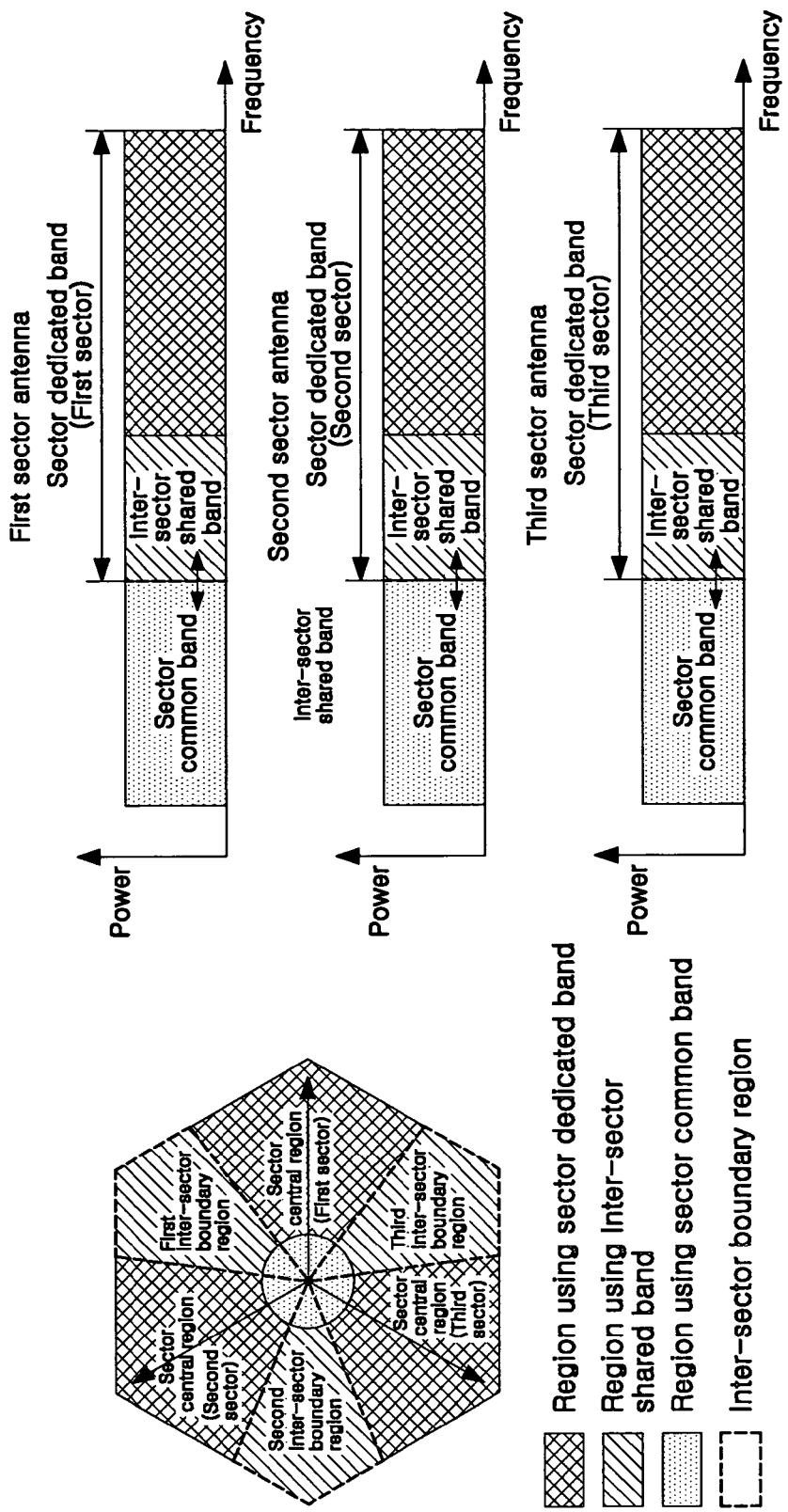
[FIG. 16]

[FIG. 17]
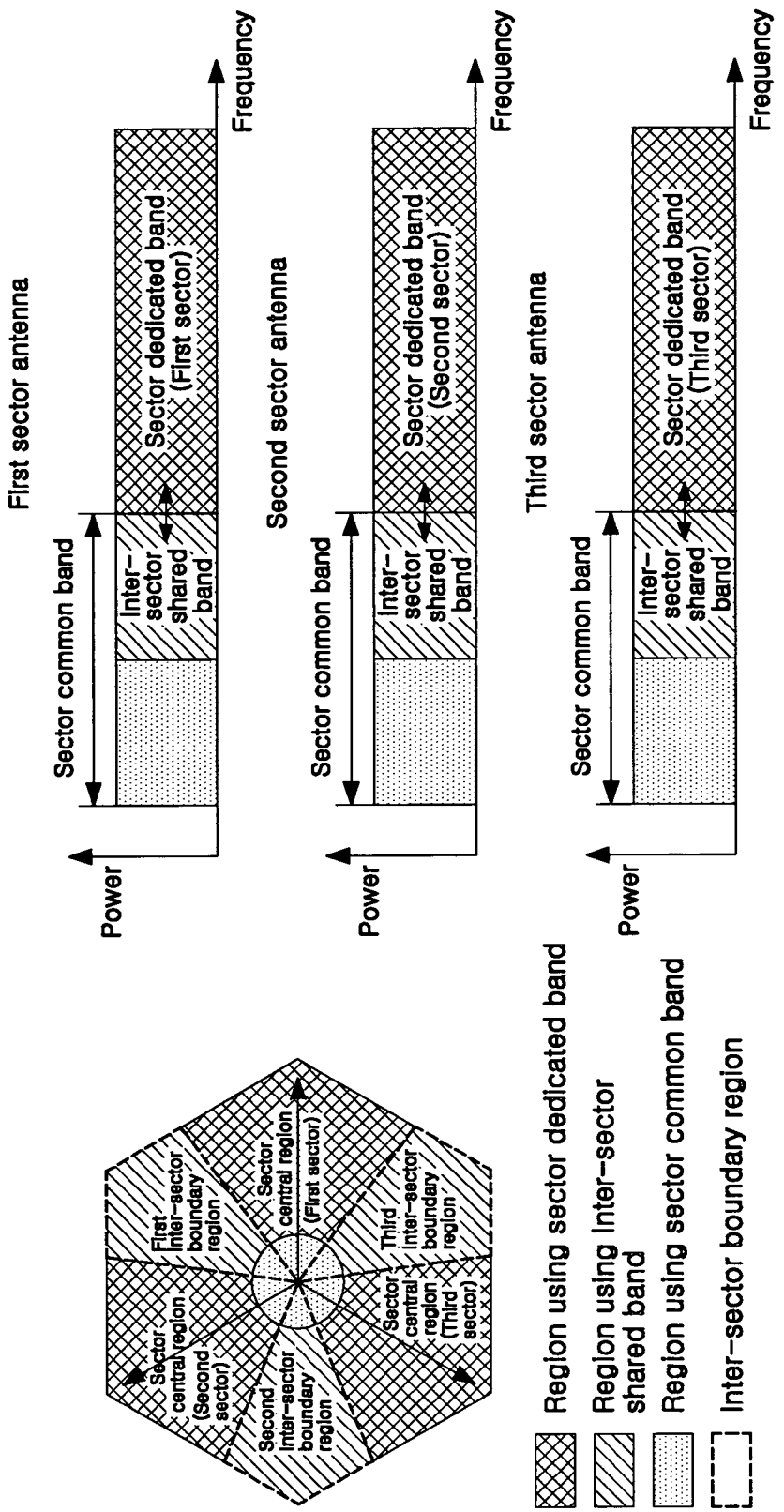

[FIG. 18]
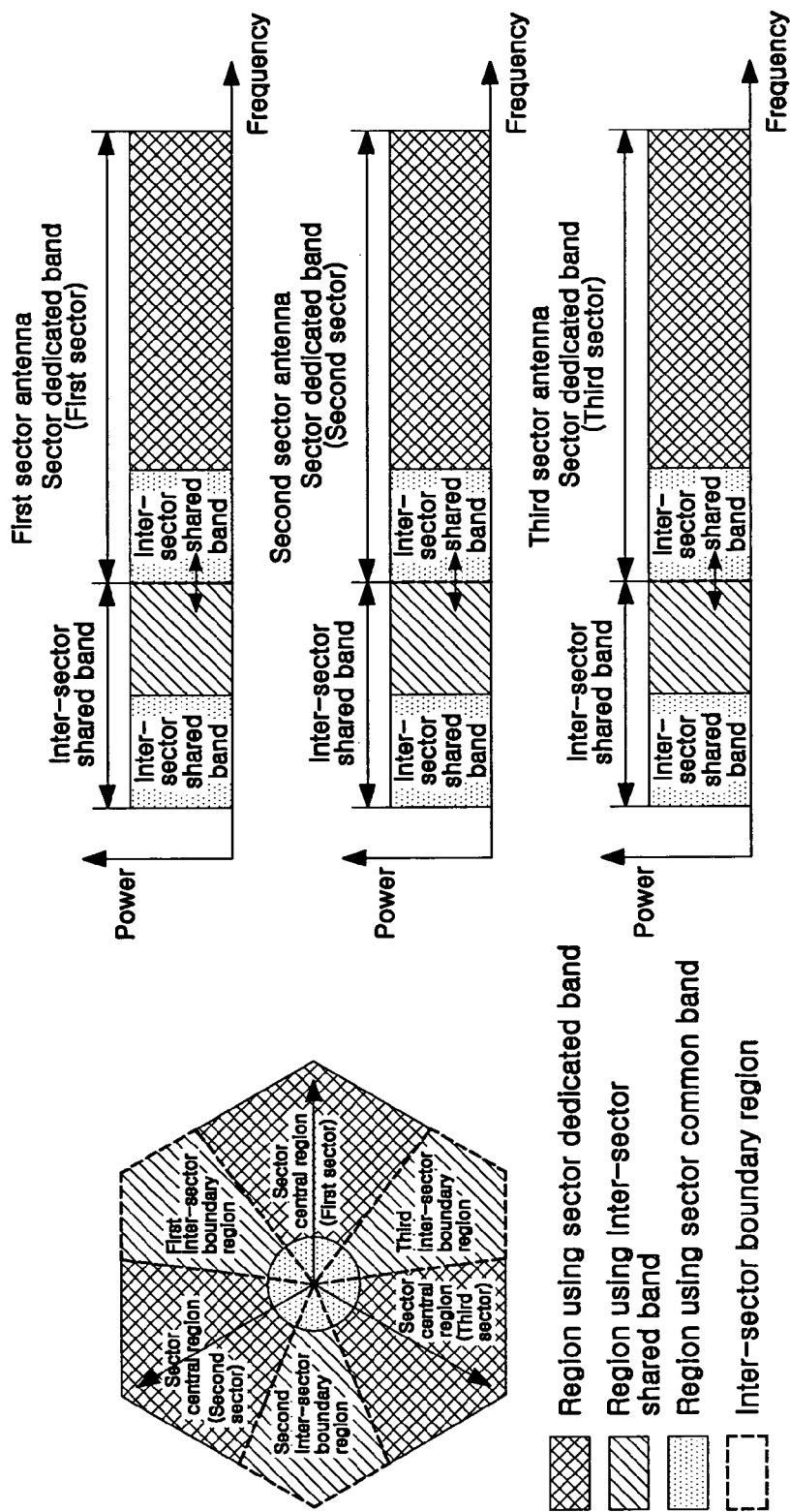

[FIG. 19]
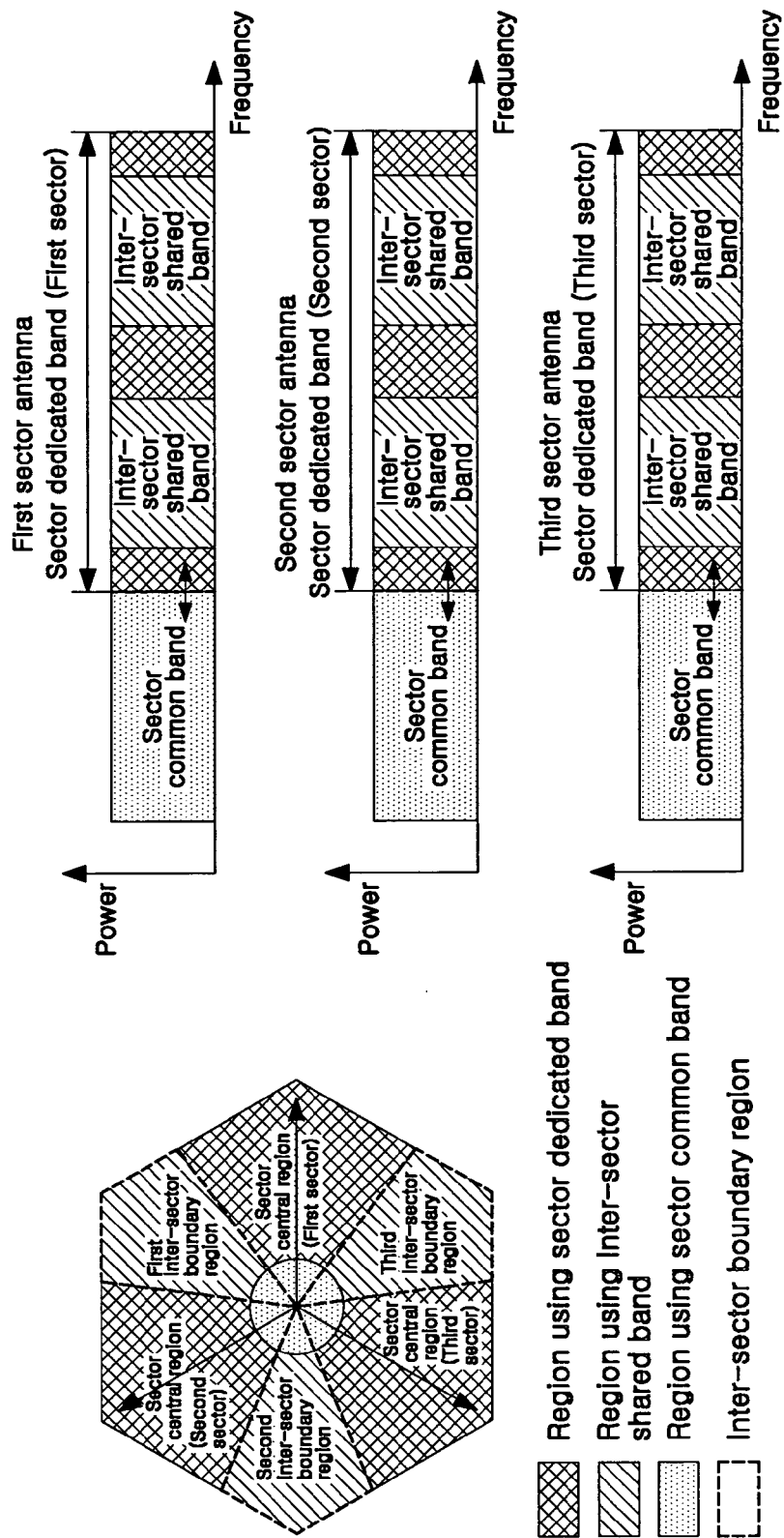

[FIG. 20]
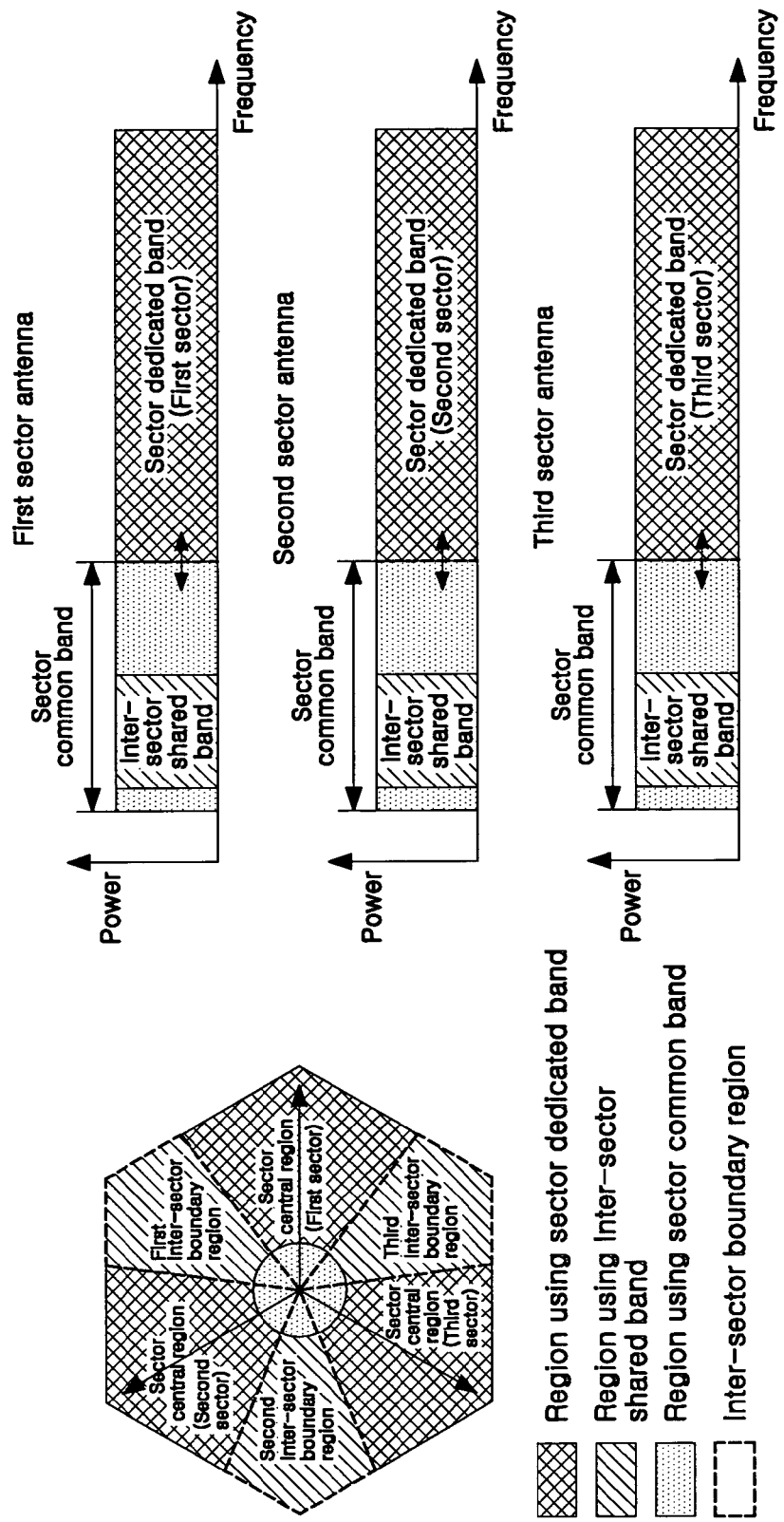

[FIG. 21]
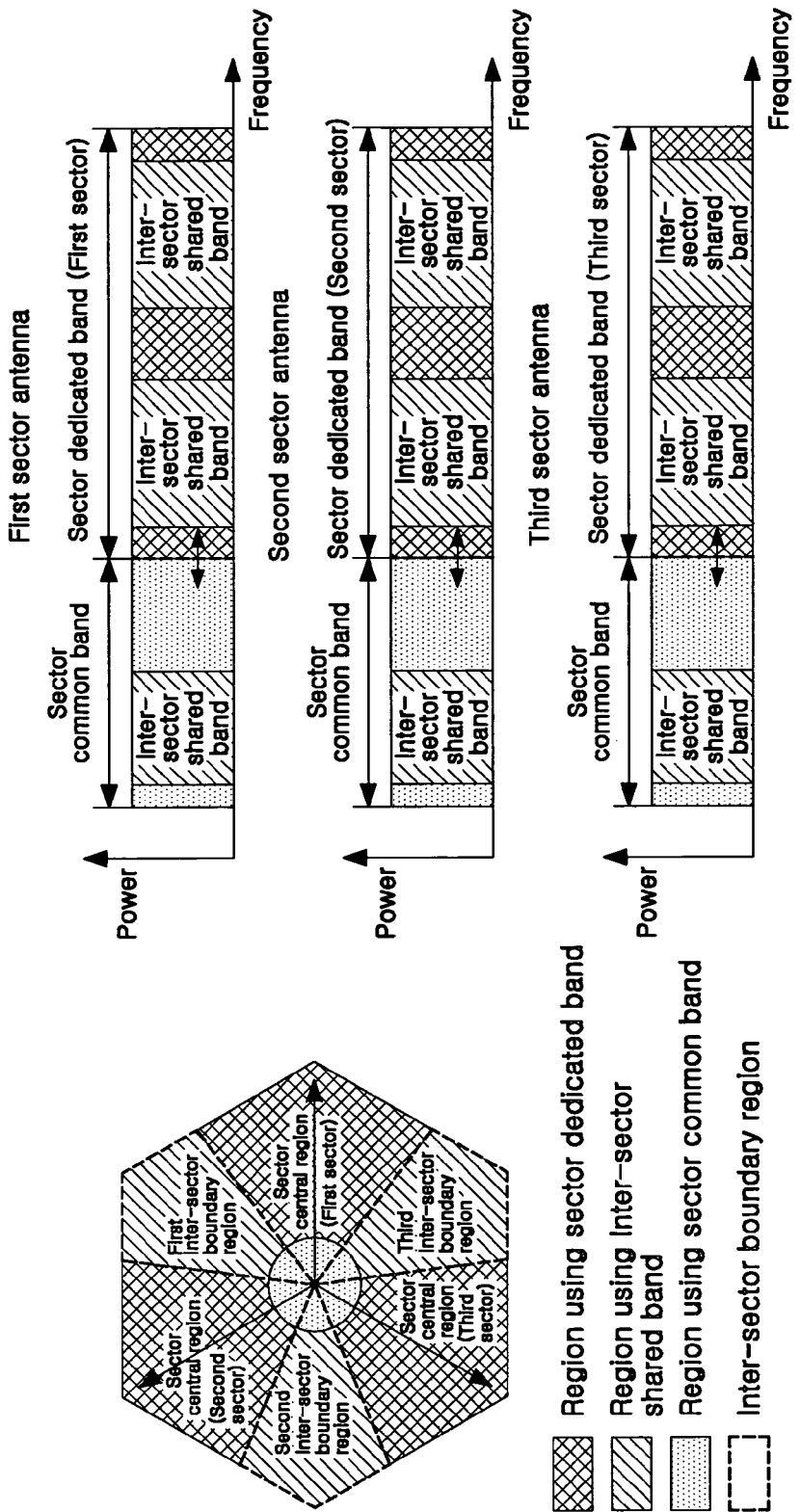

[FIG. 22]
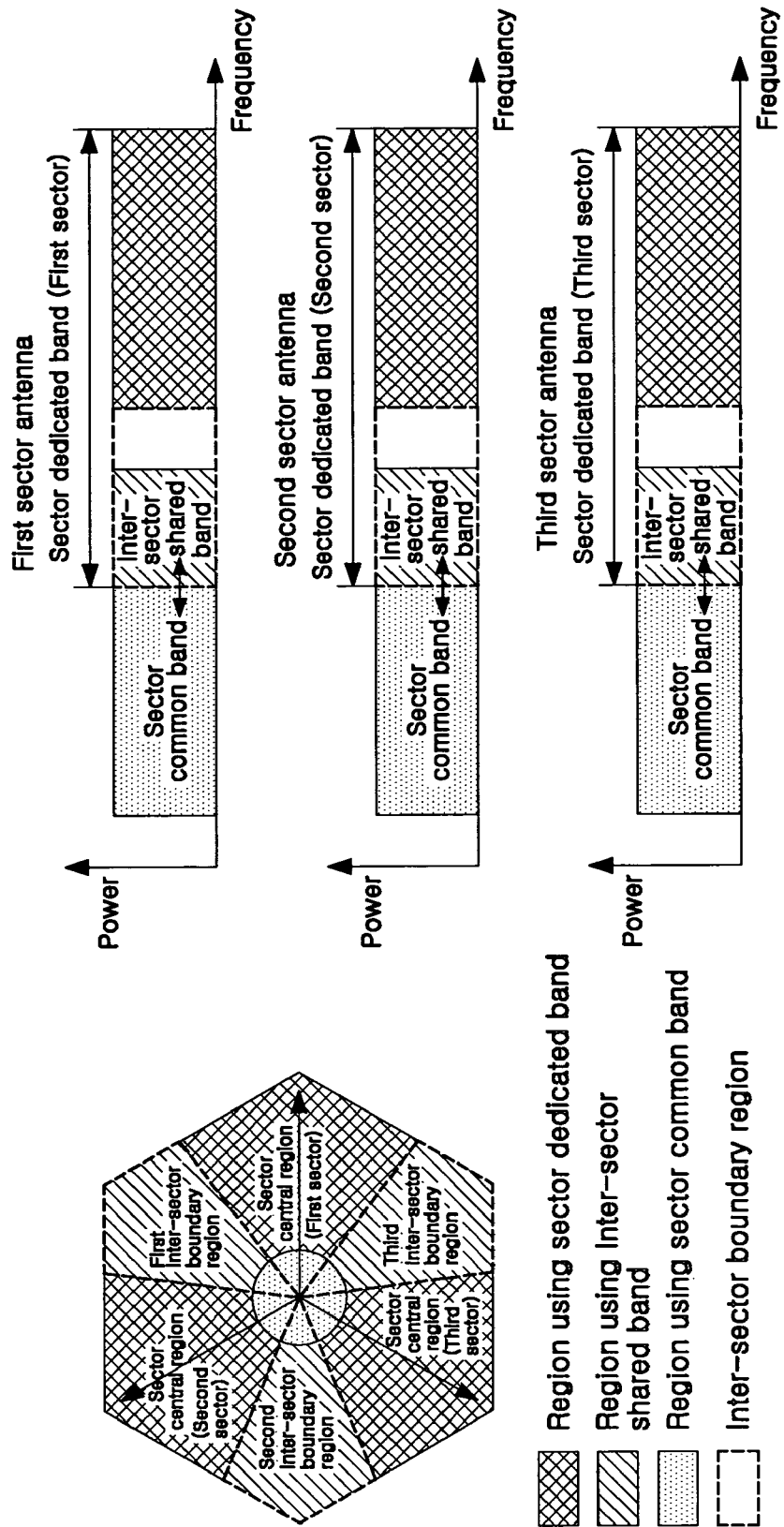

[FIG. 23]
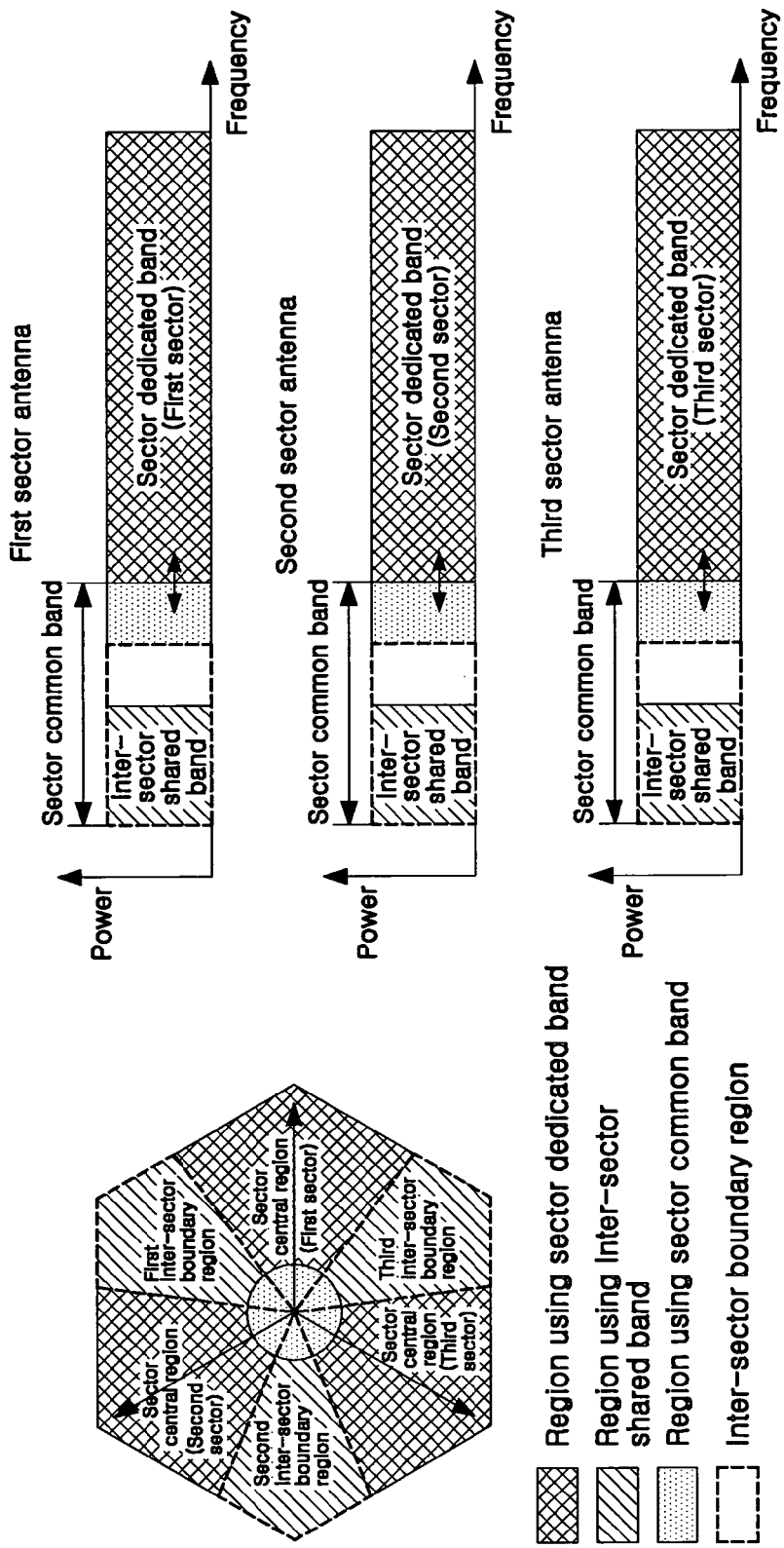

[FIG. 24]
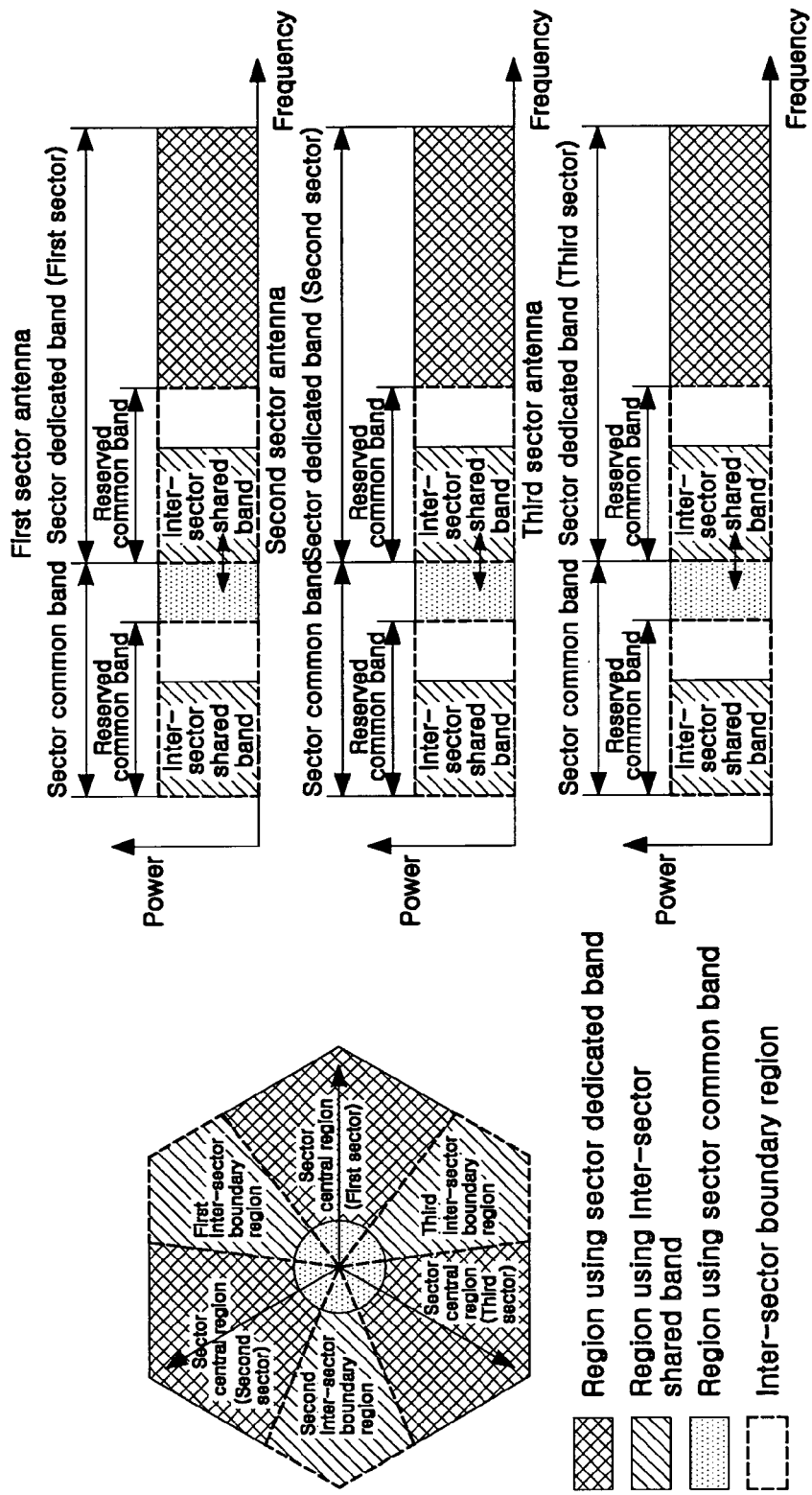

[FIG. 25]
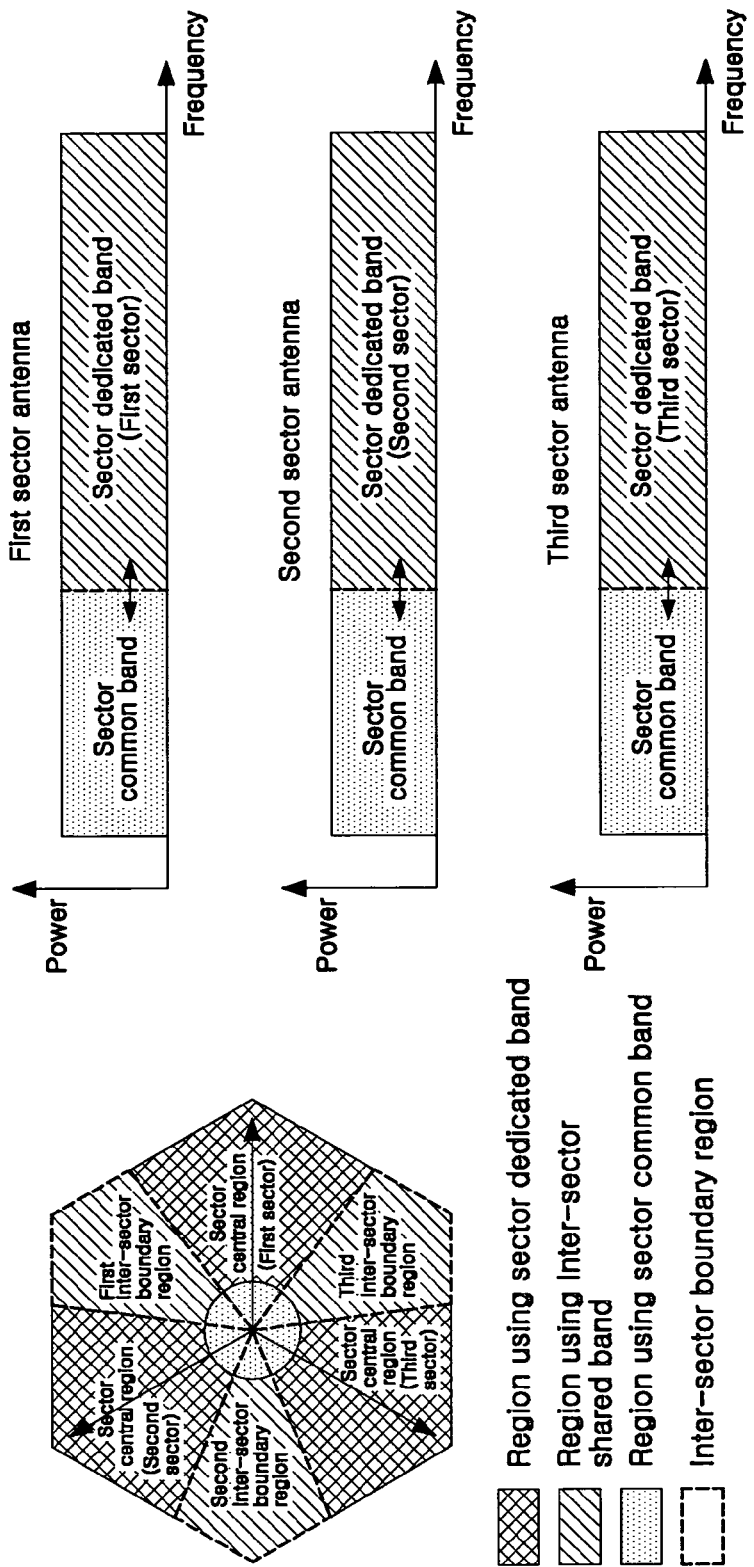

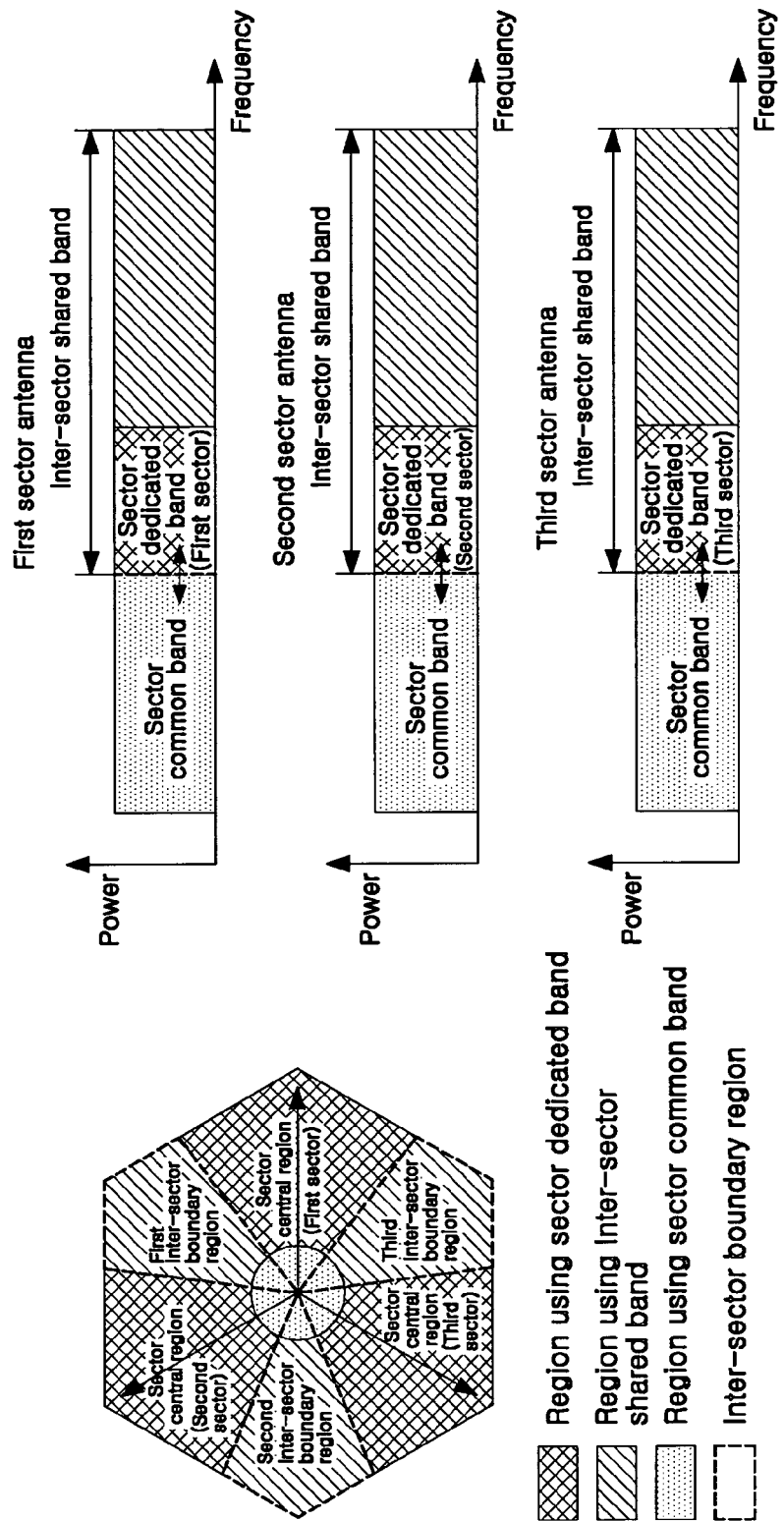
[FIG. 26]

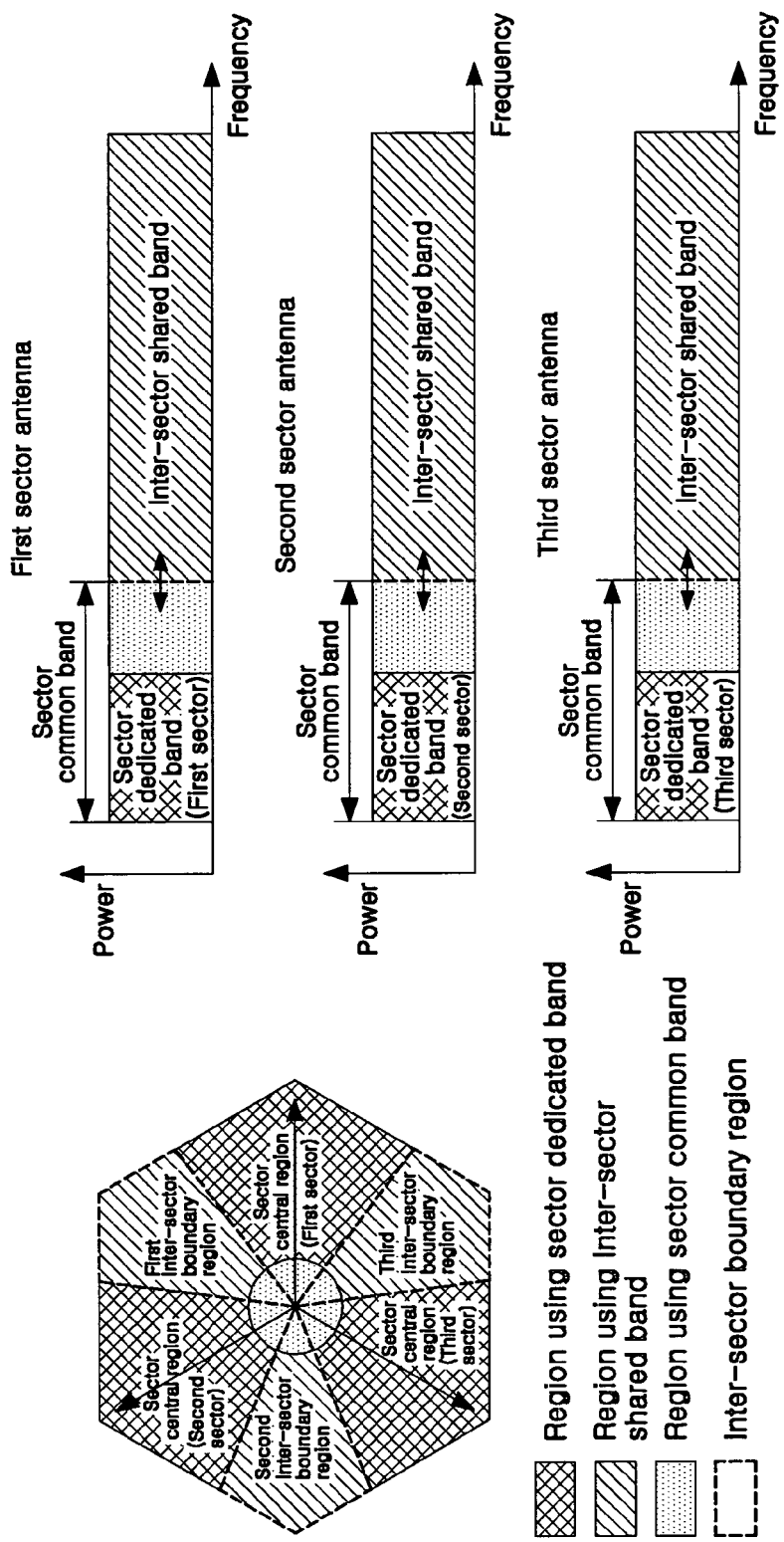
[FIG. 27]

[FIG. 28]
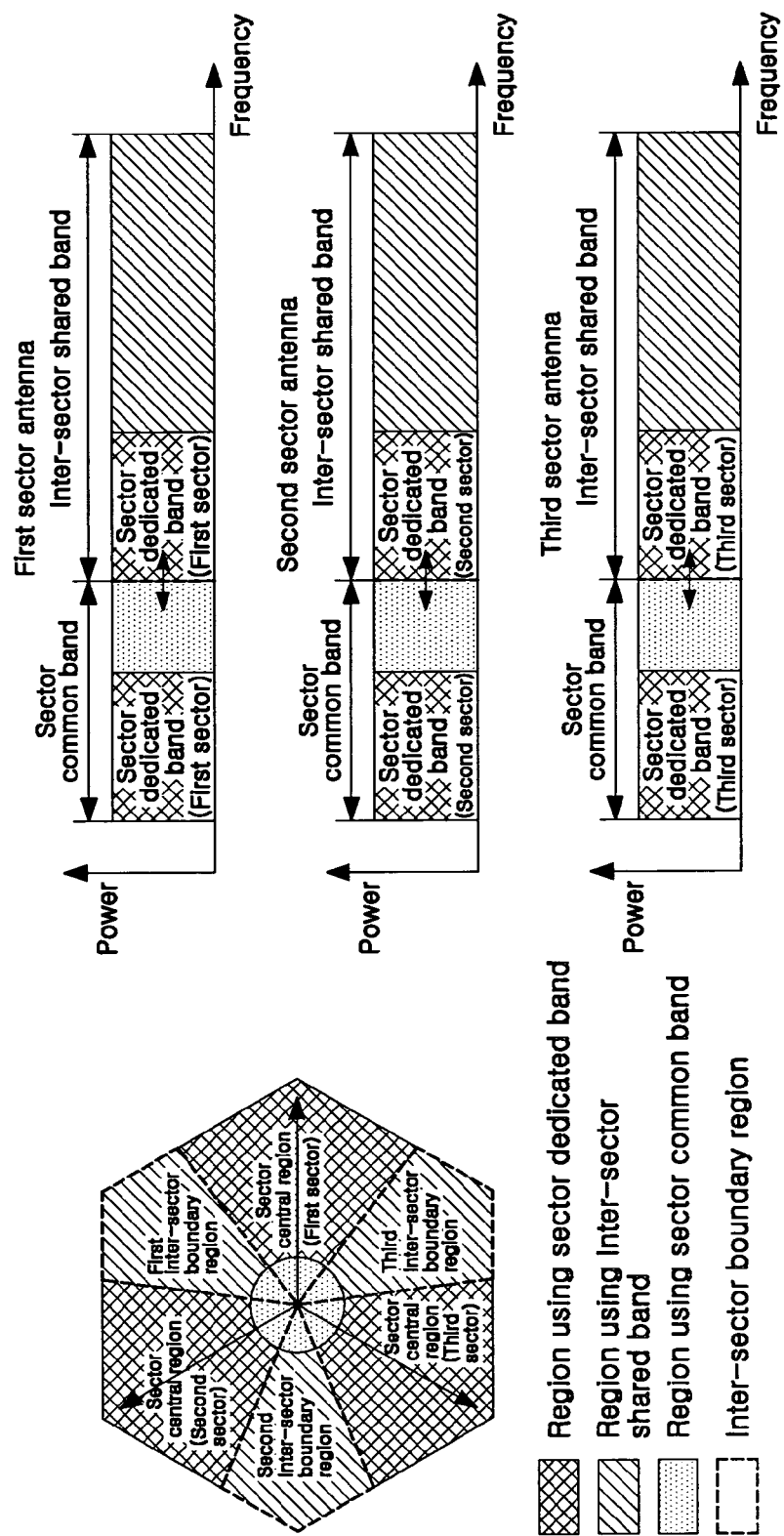

[FIG. 29]
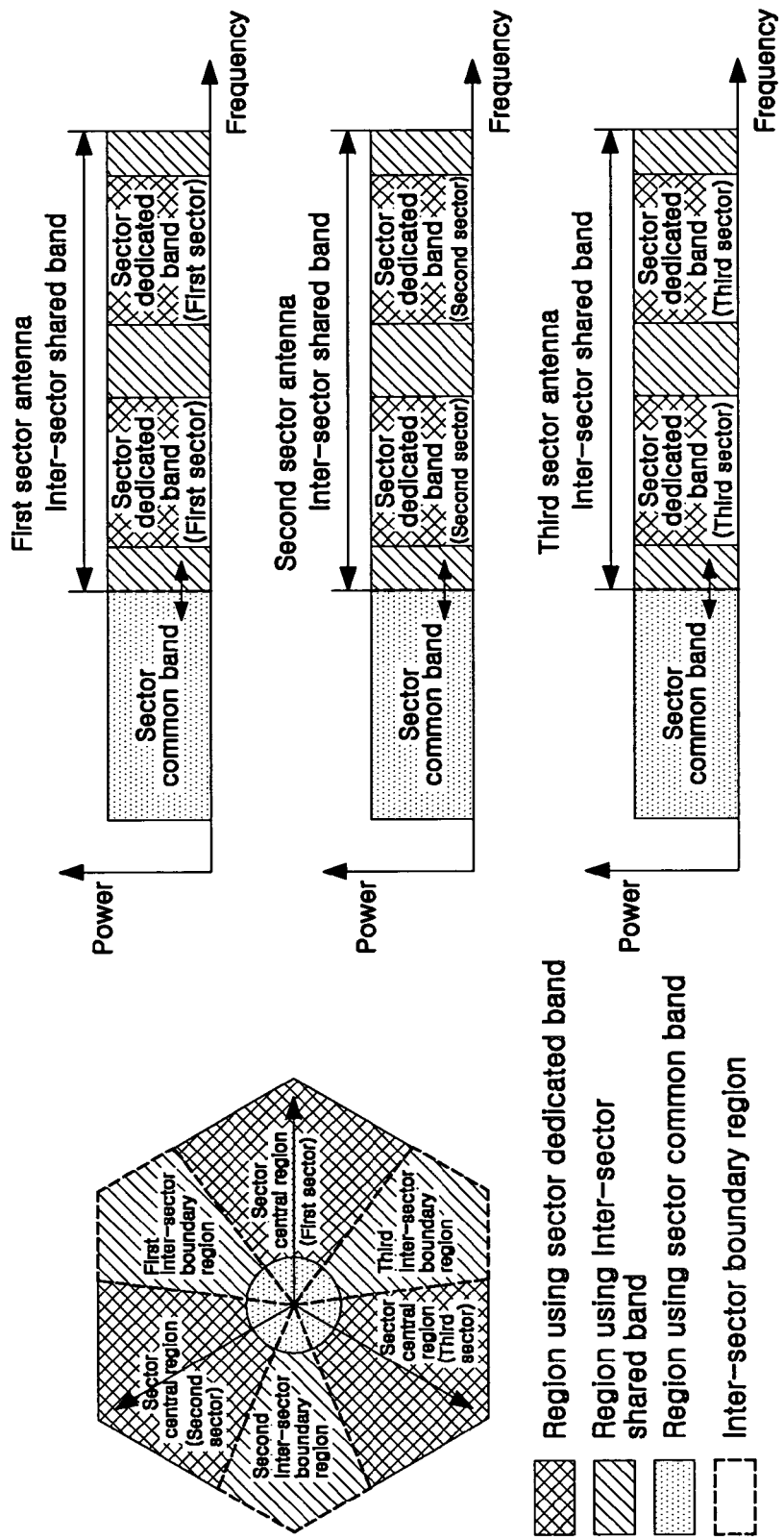

[FIG. 30]
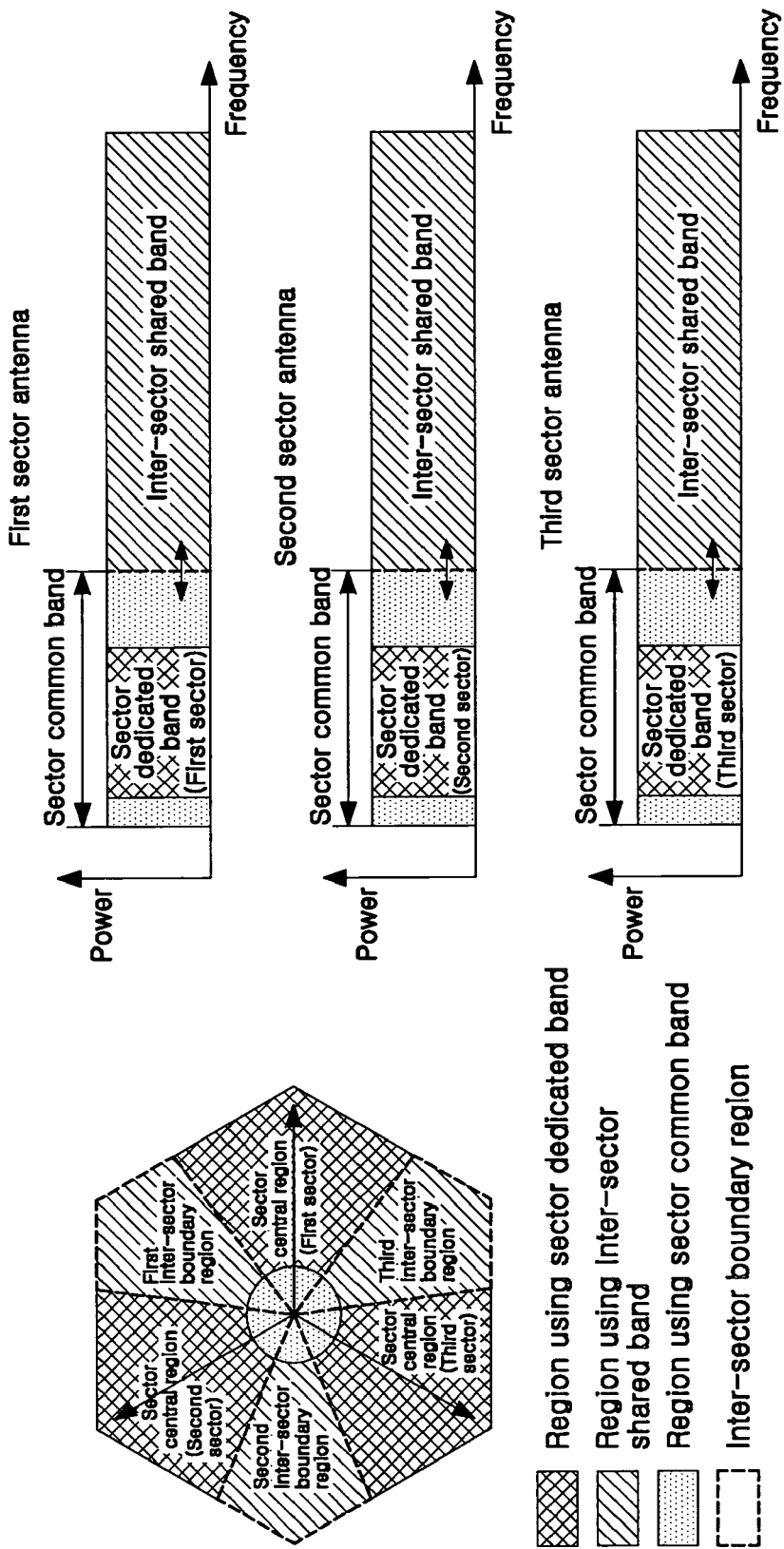

[FIG. 31]
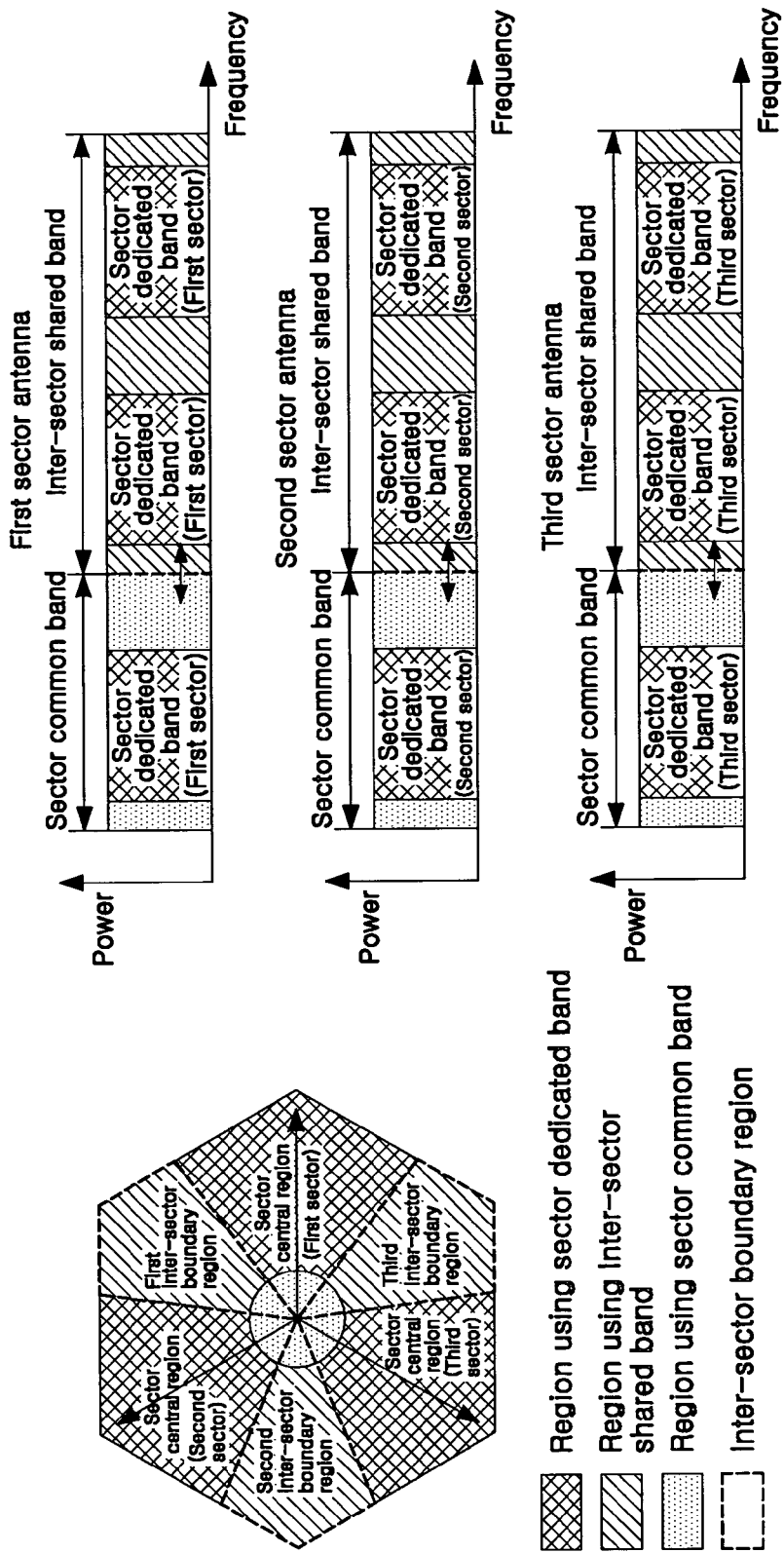

[FIG. 32]
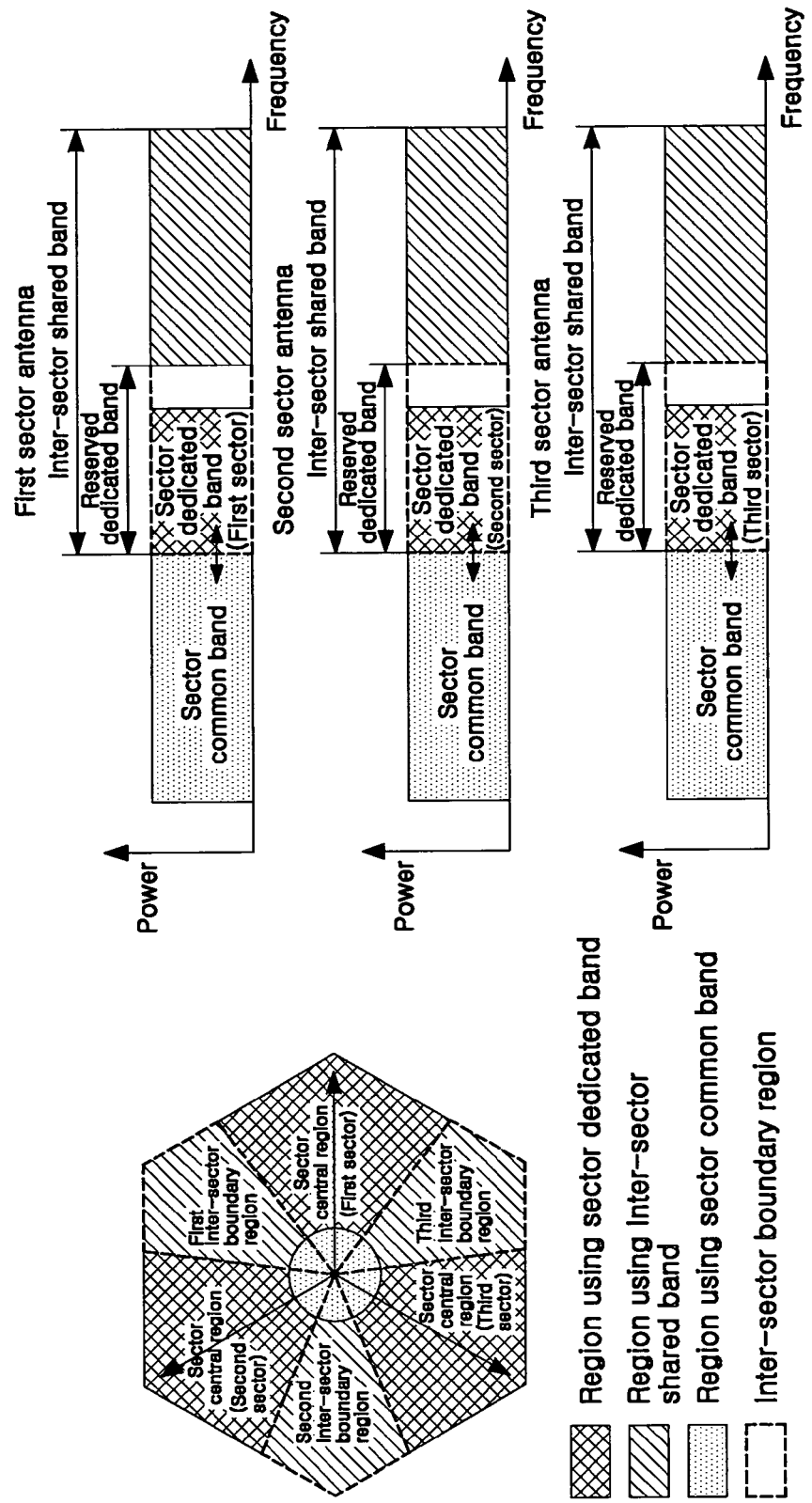

[FIG. 33]
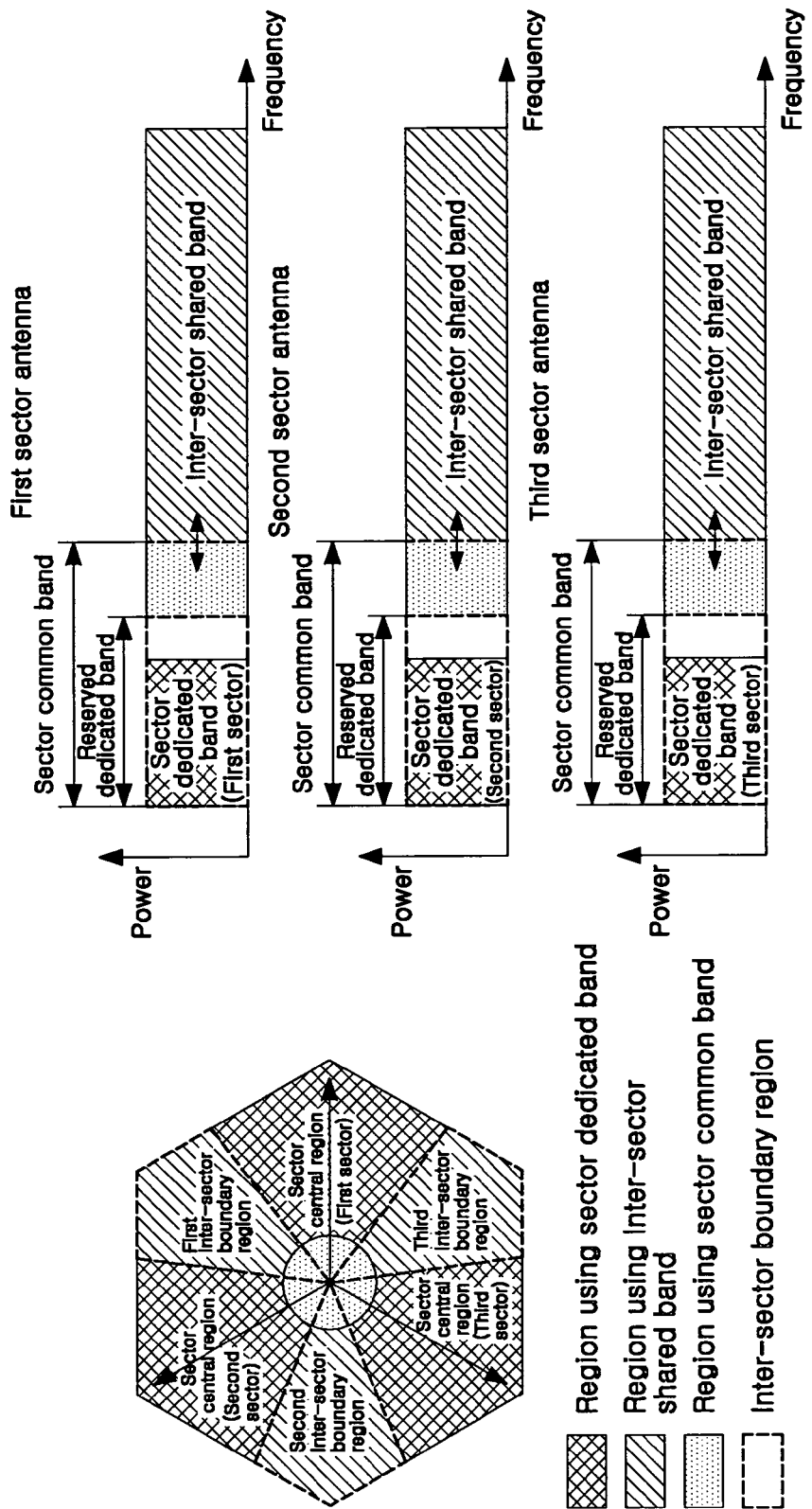

[FIG. 34]
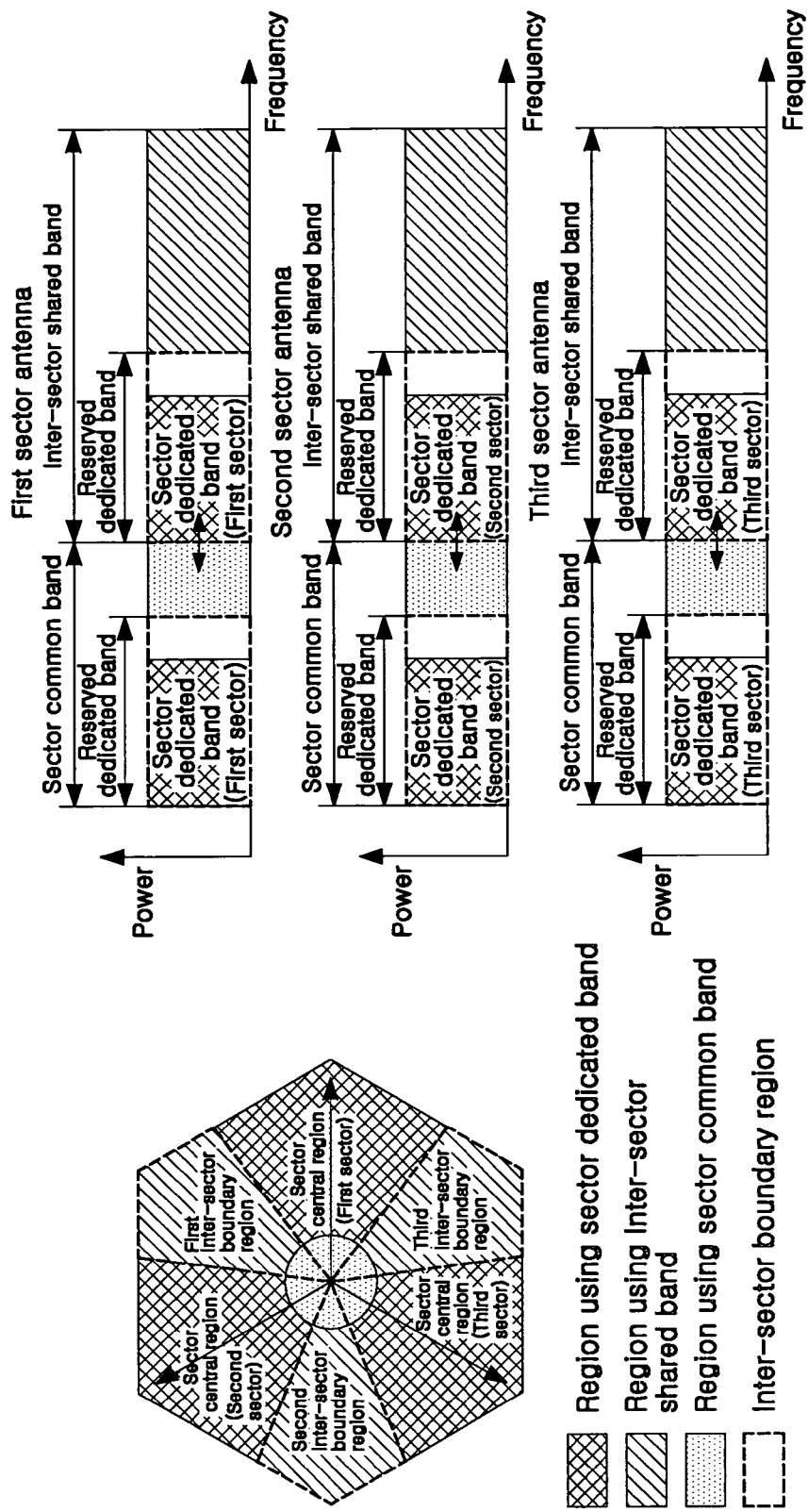

[FIG. 35]
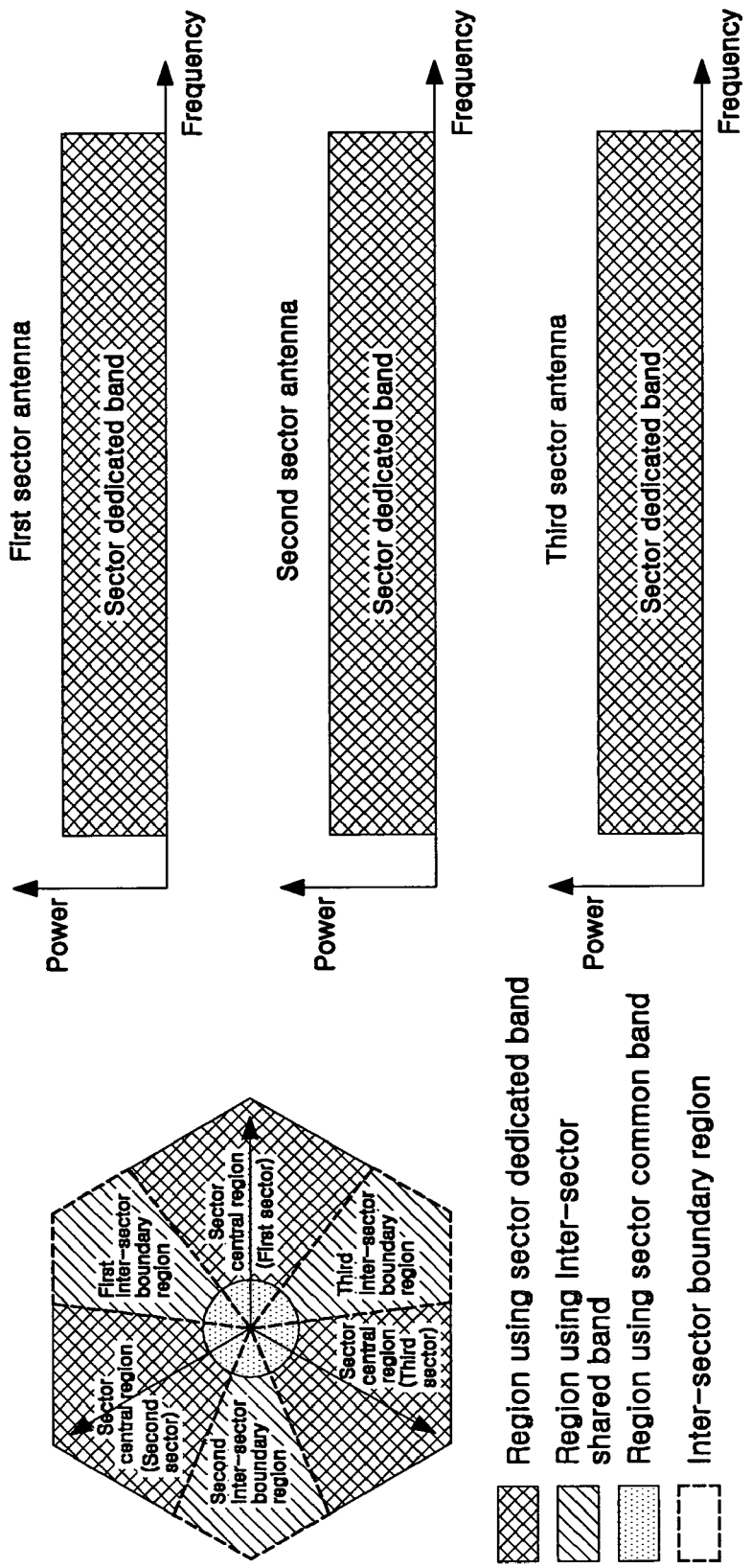

[FIG. 36]
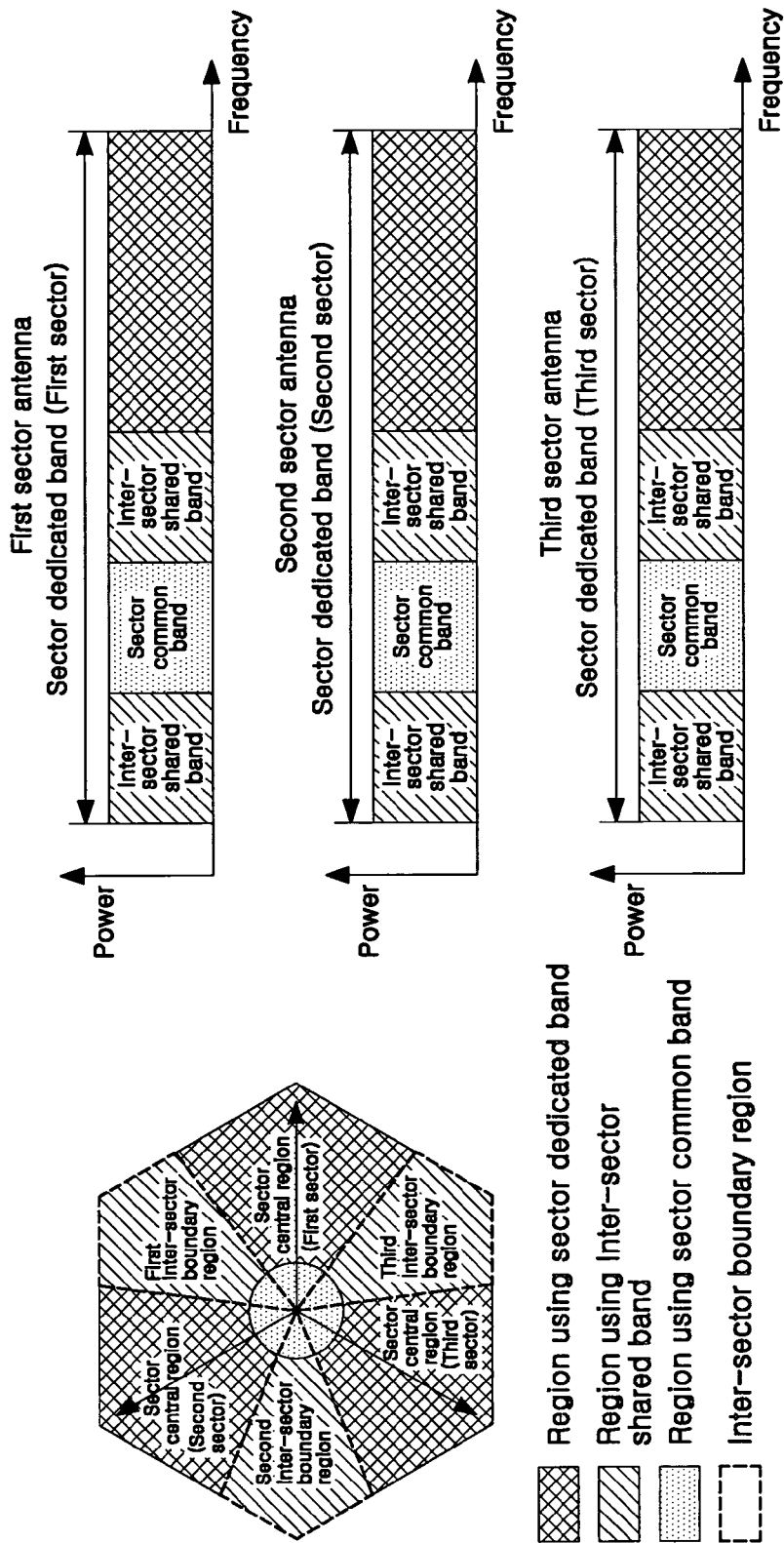

[FIG. 37]
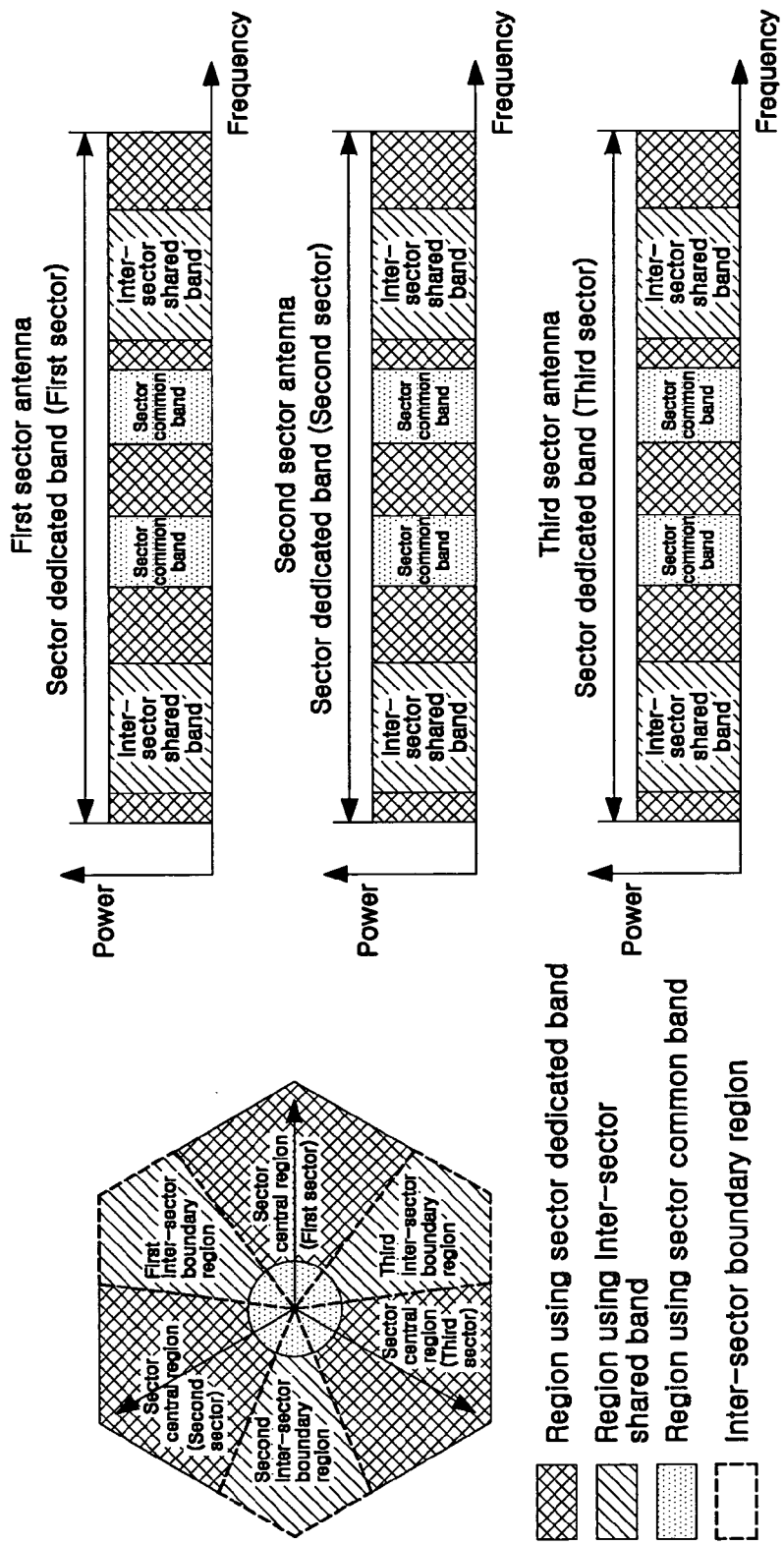

[FIG. 38]
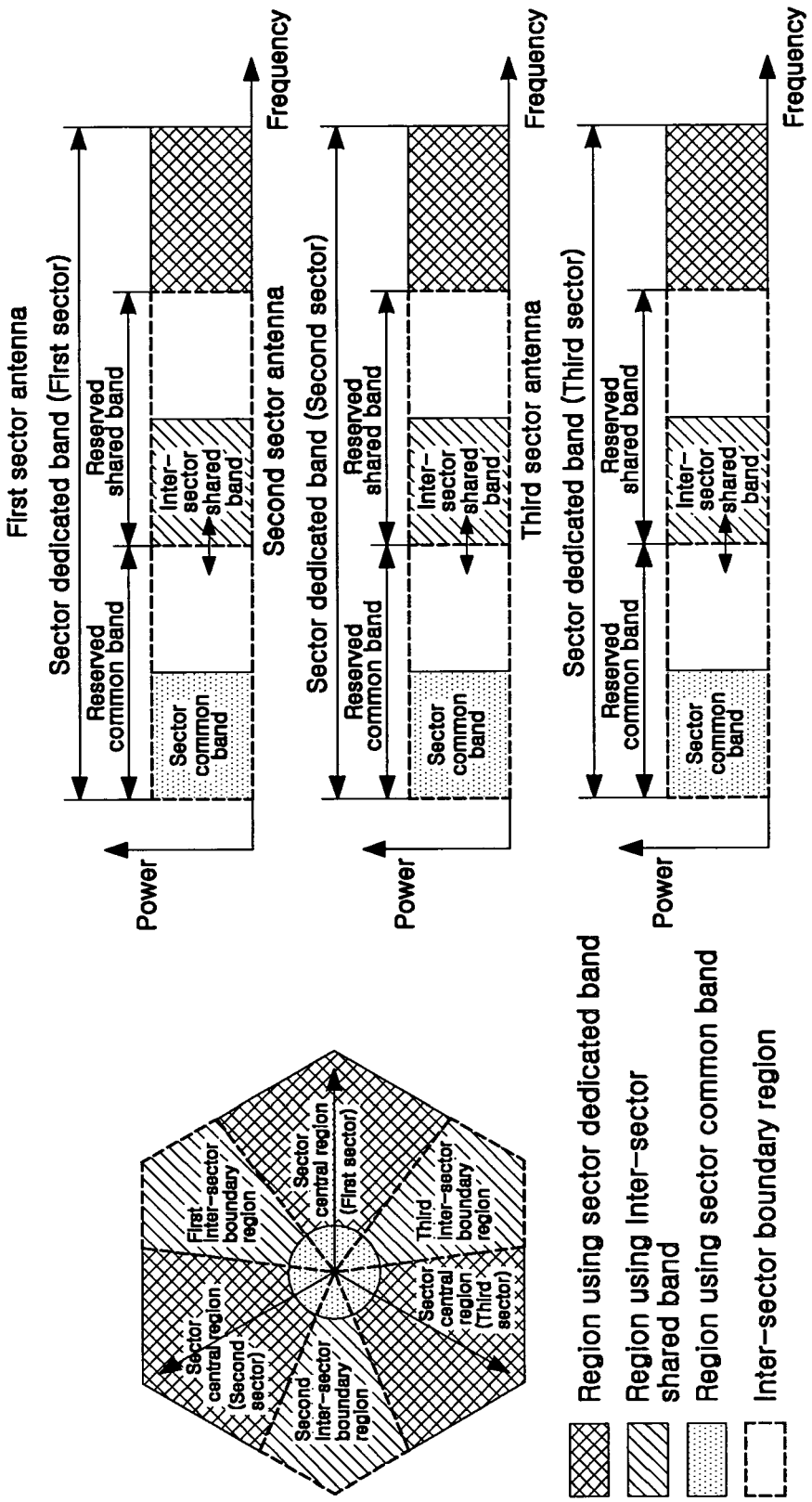

[FIG. 39]
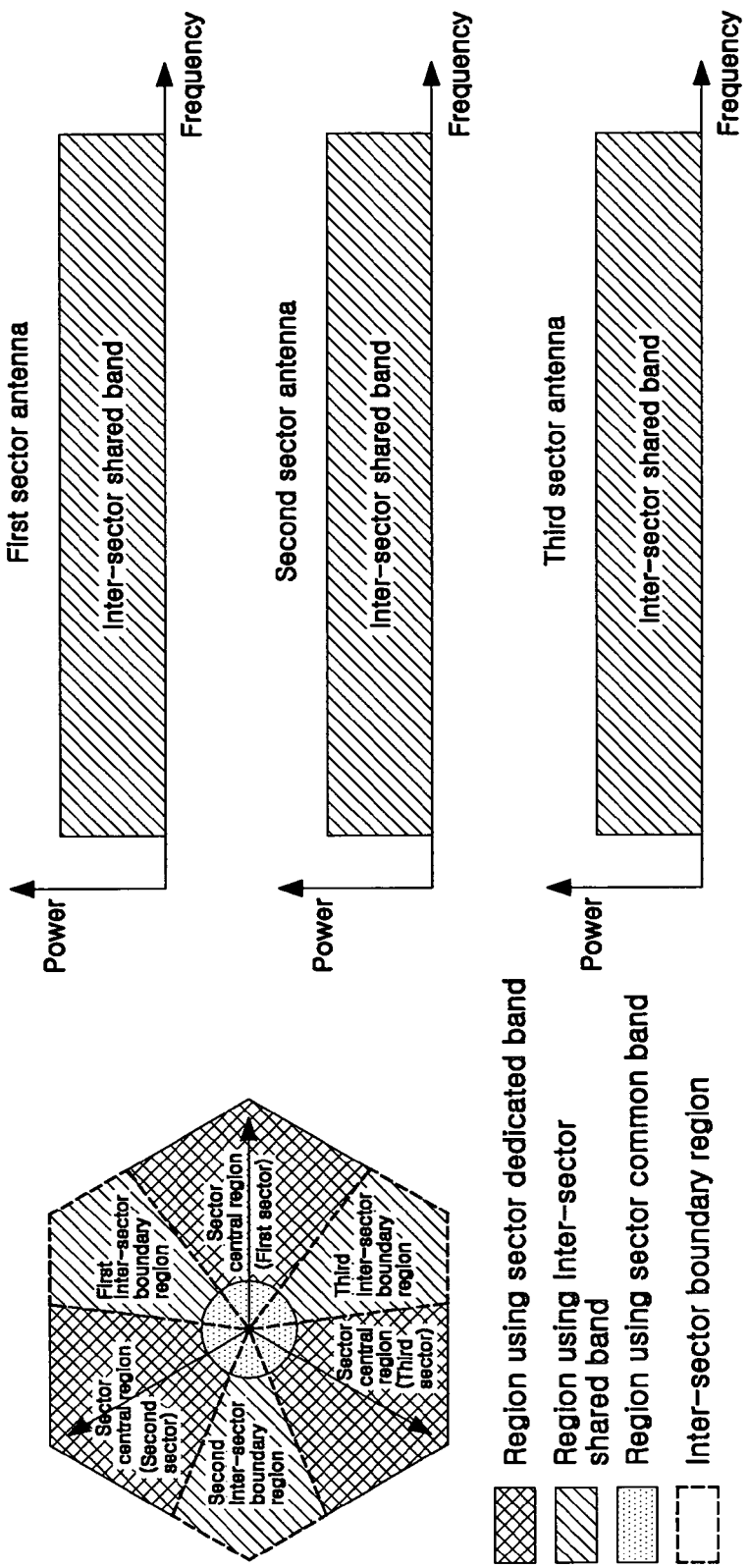

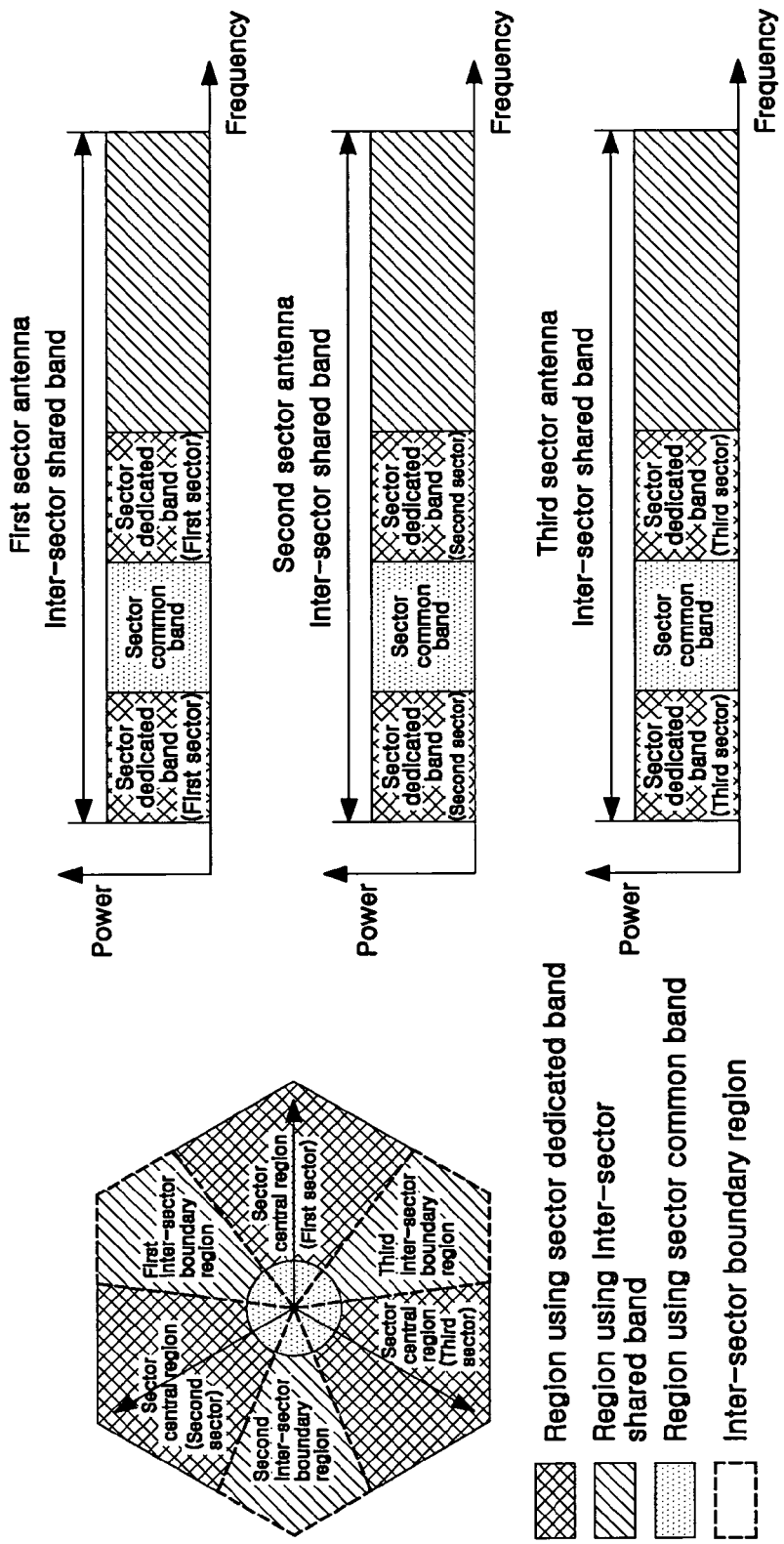
[FIG. 40]

[FIG. 41]
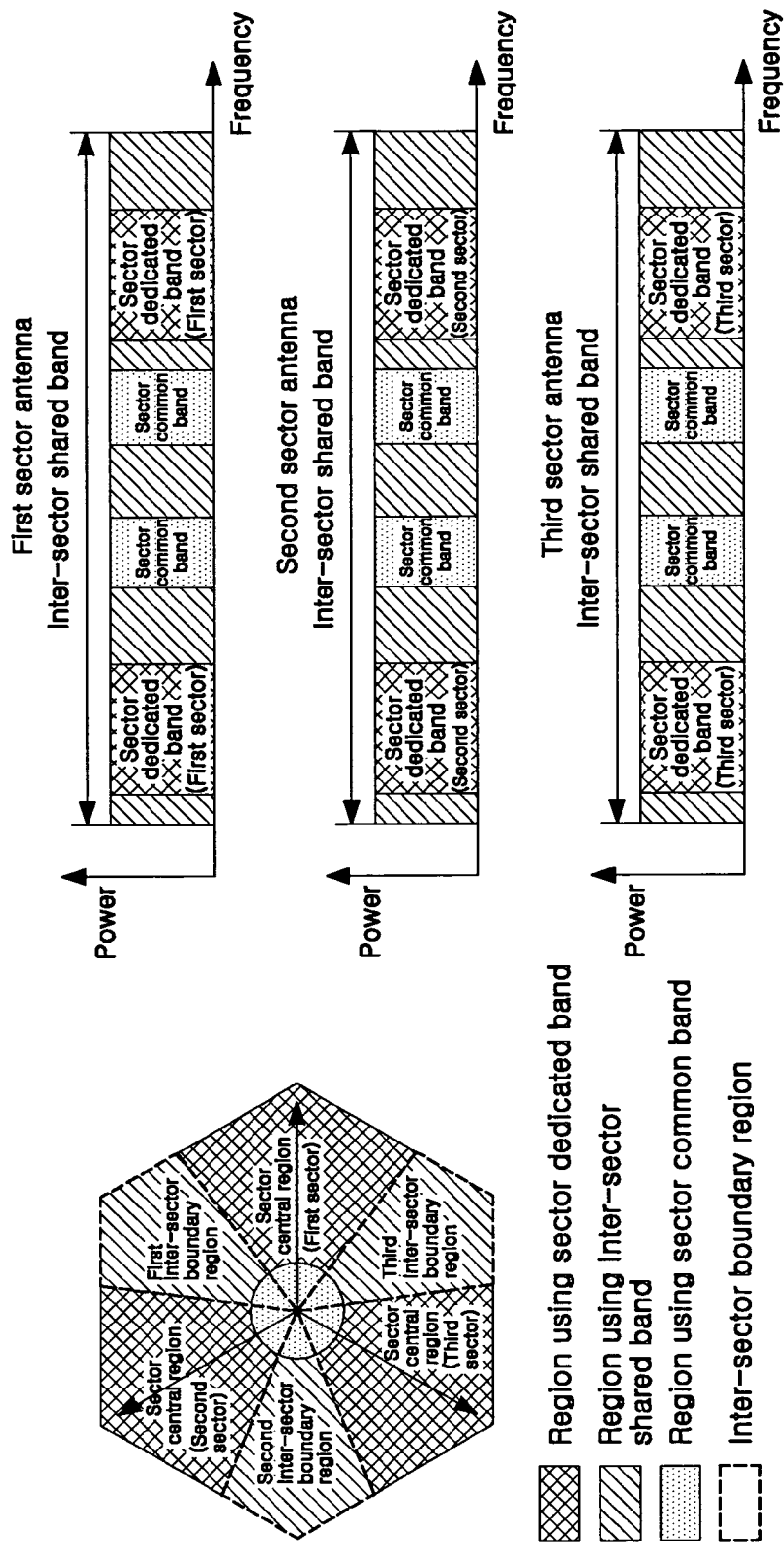

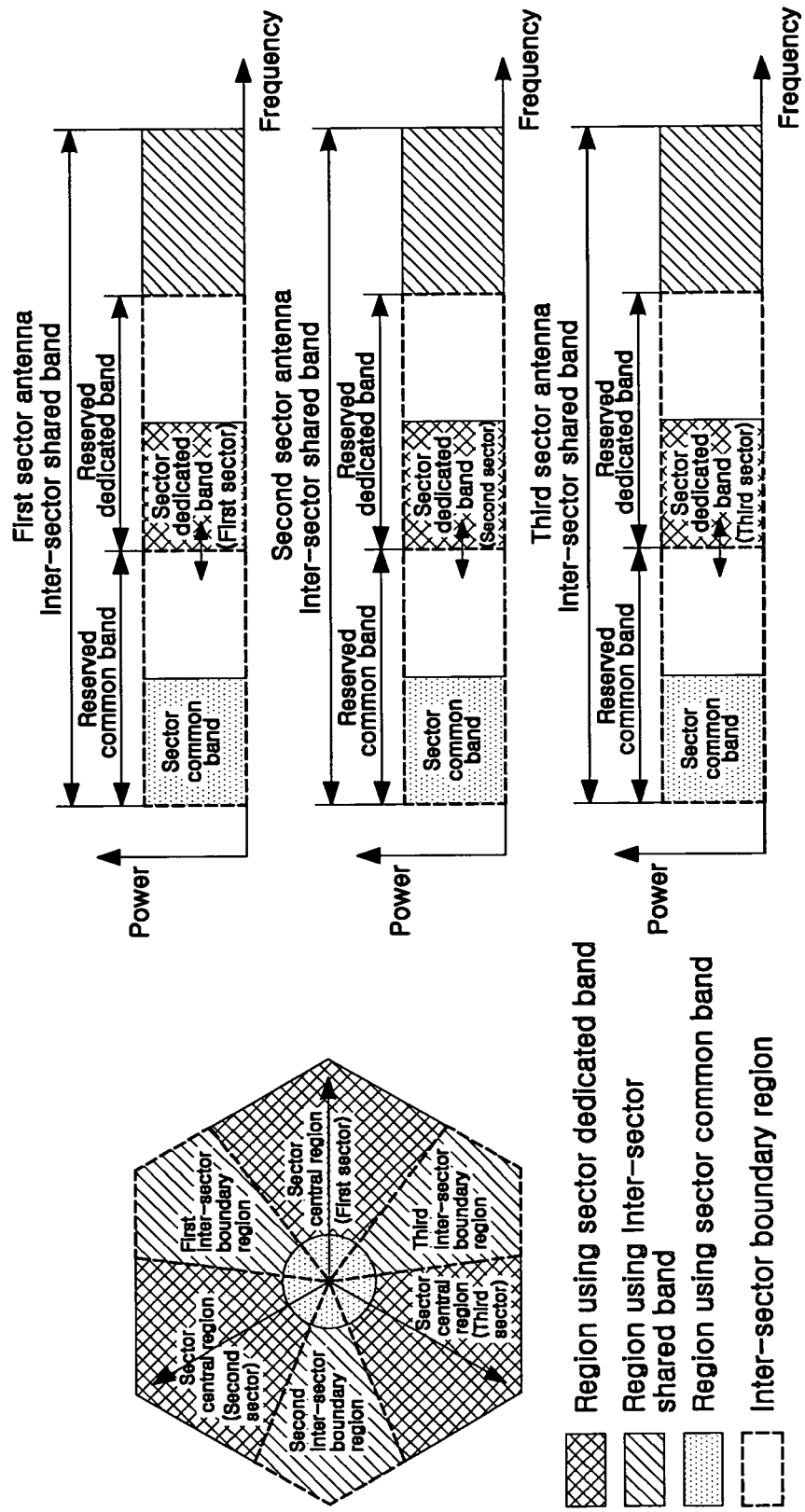
[FIG. 42]

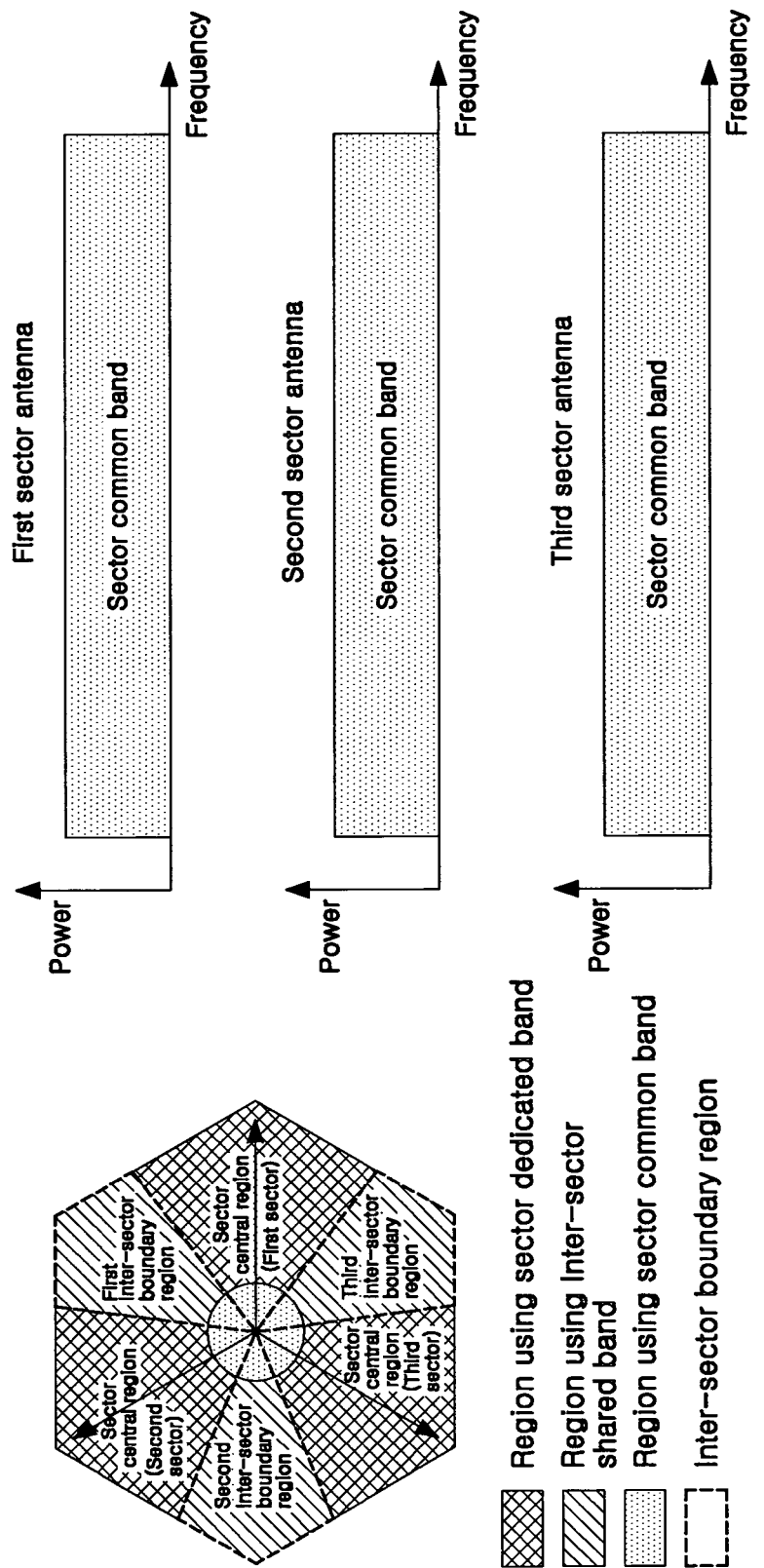
[FIG. 43]

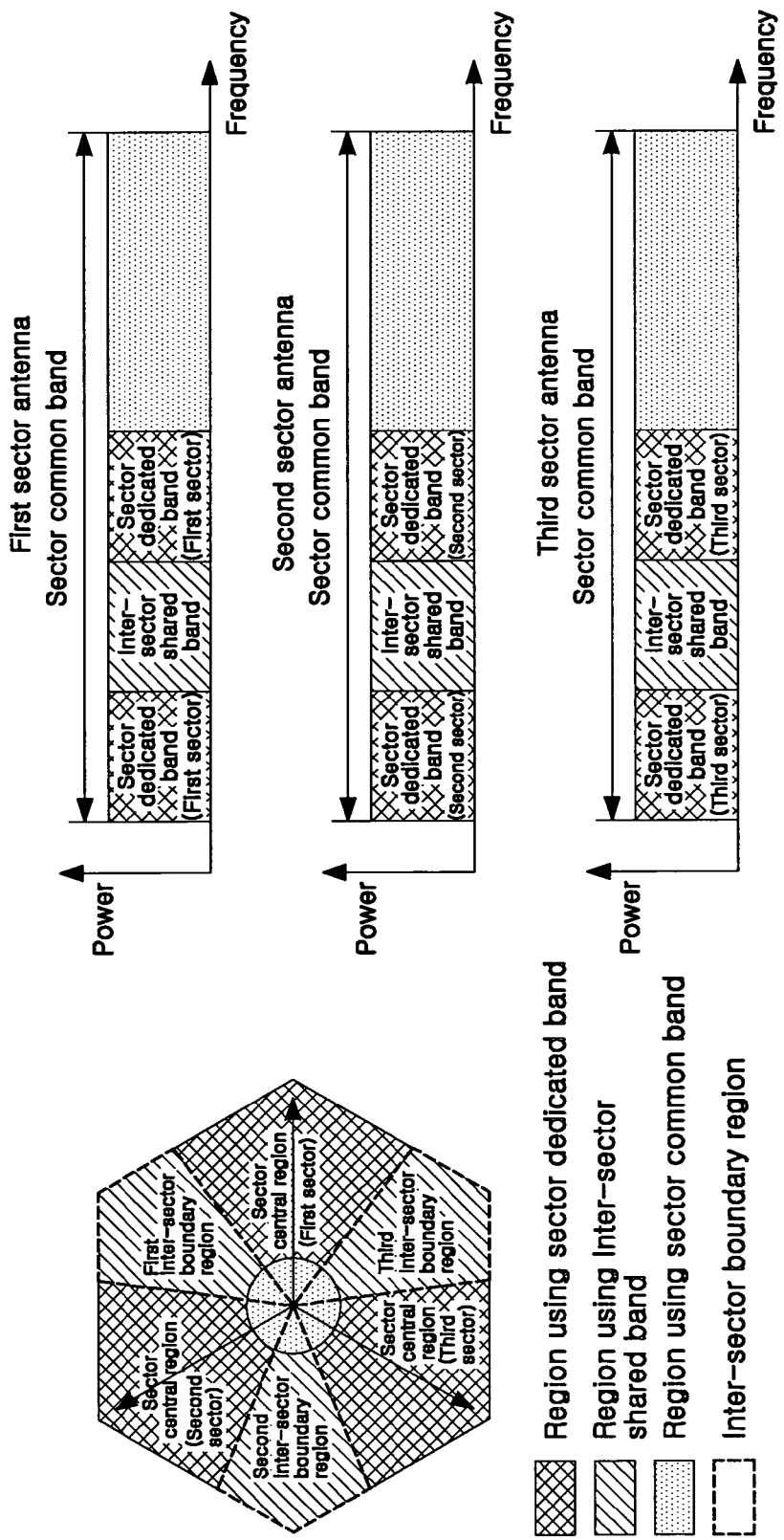
[FIG. 44]

[FIG. 45]
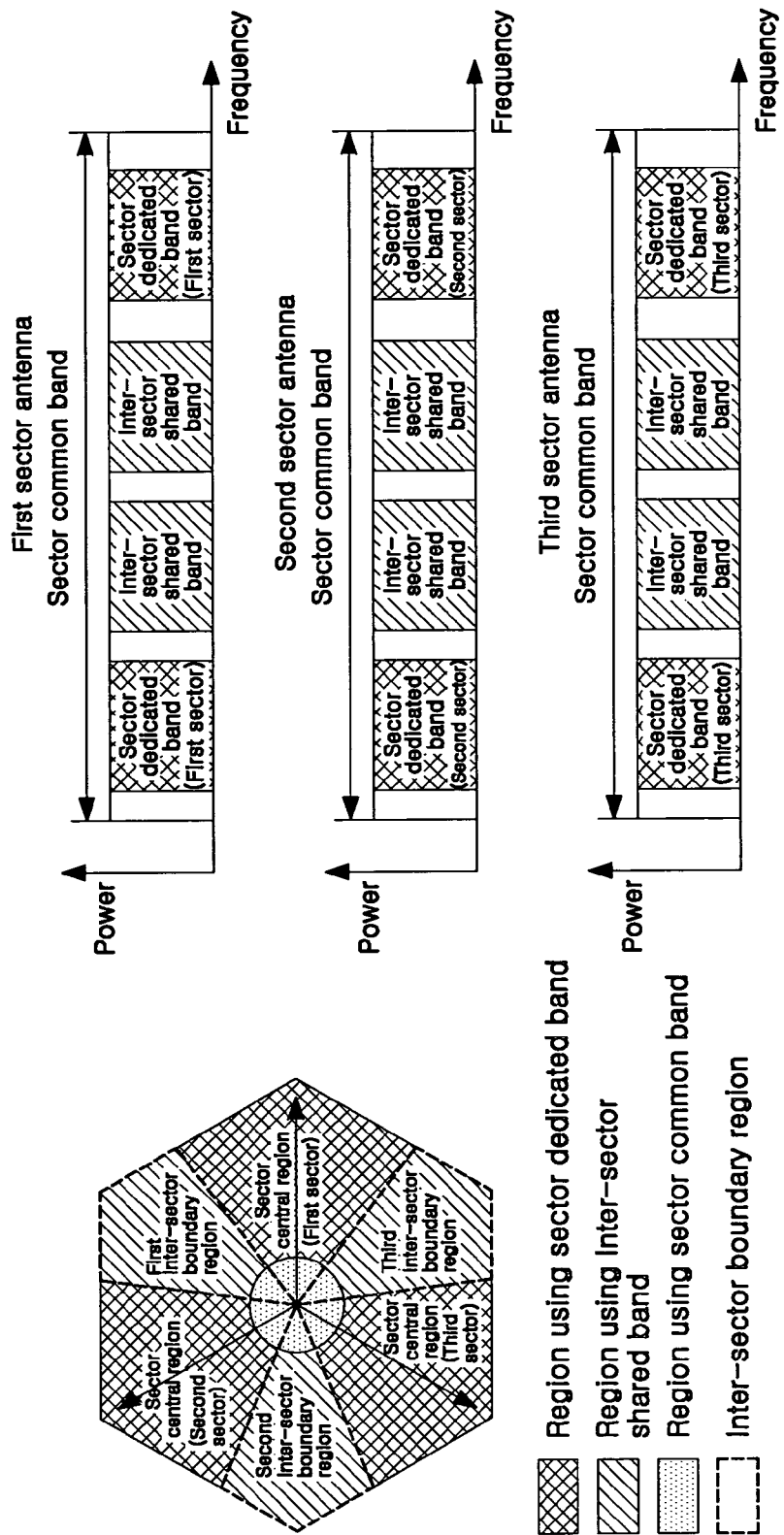

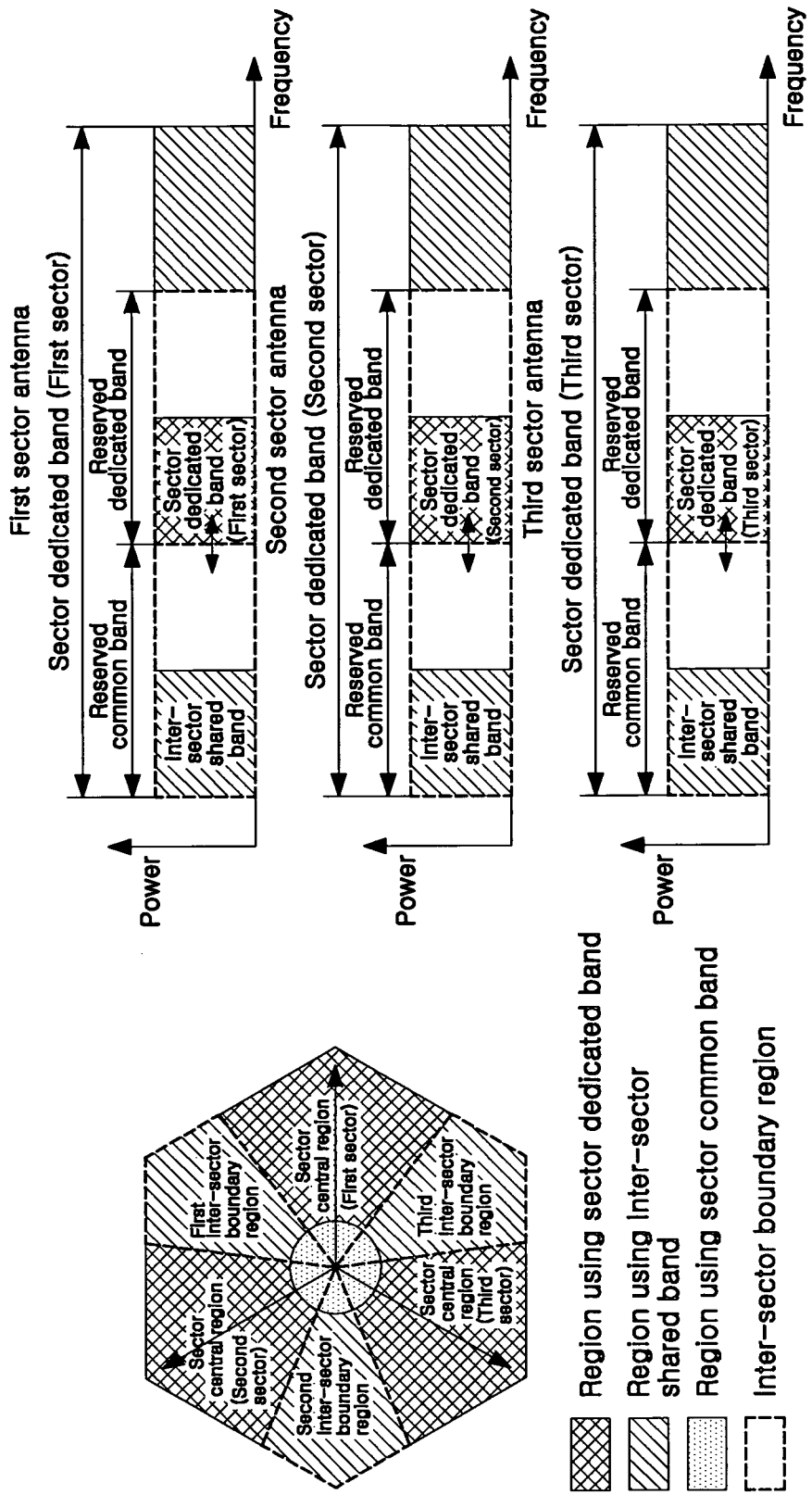
[FIG. 46]

[FIG. 47]
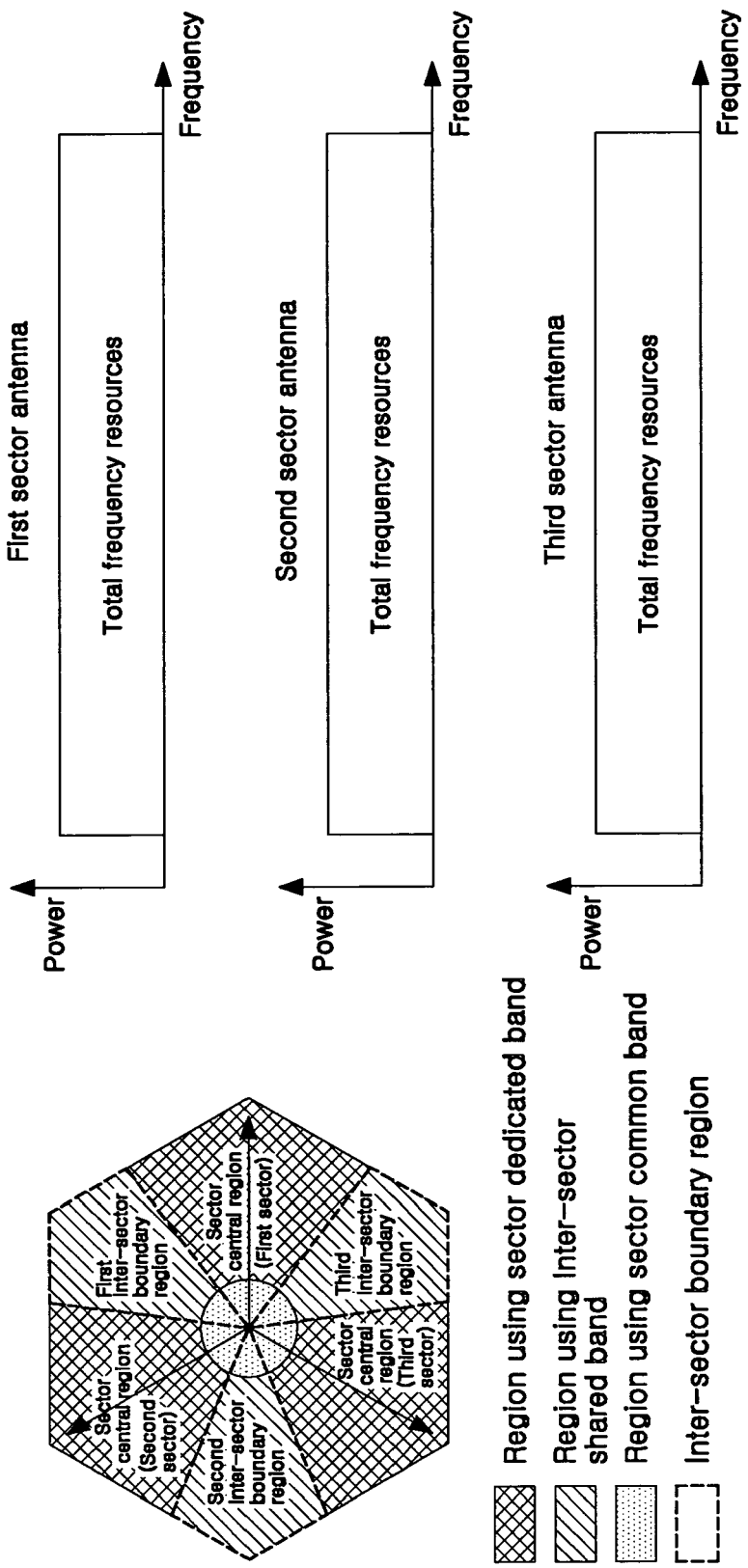

[FIG. 48]
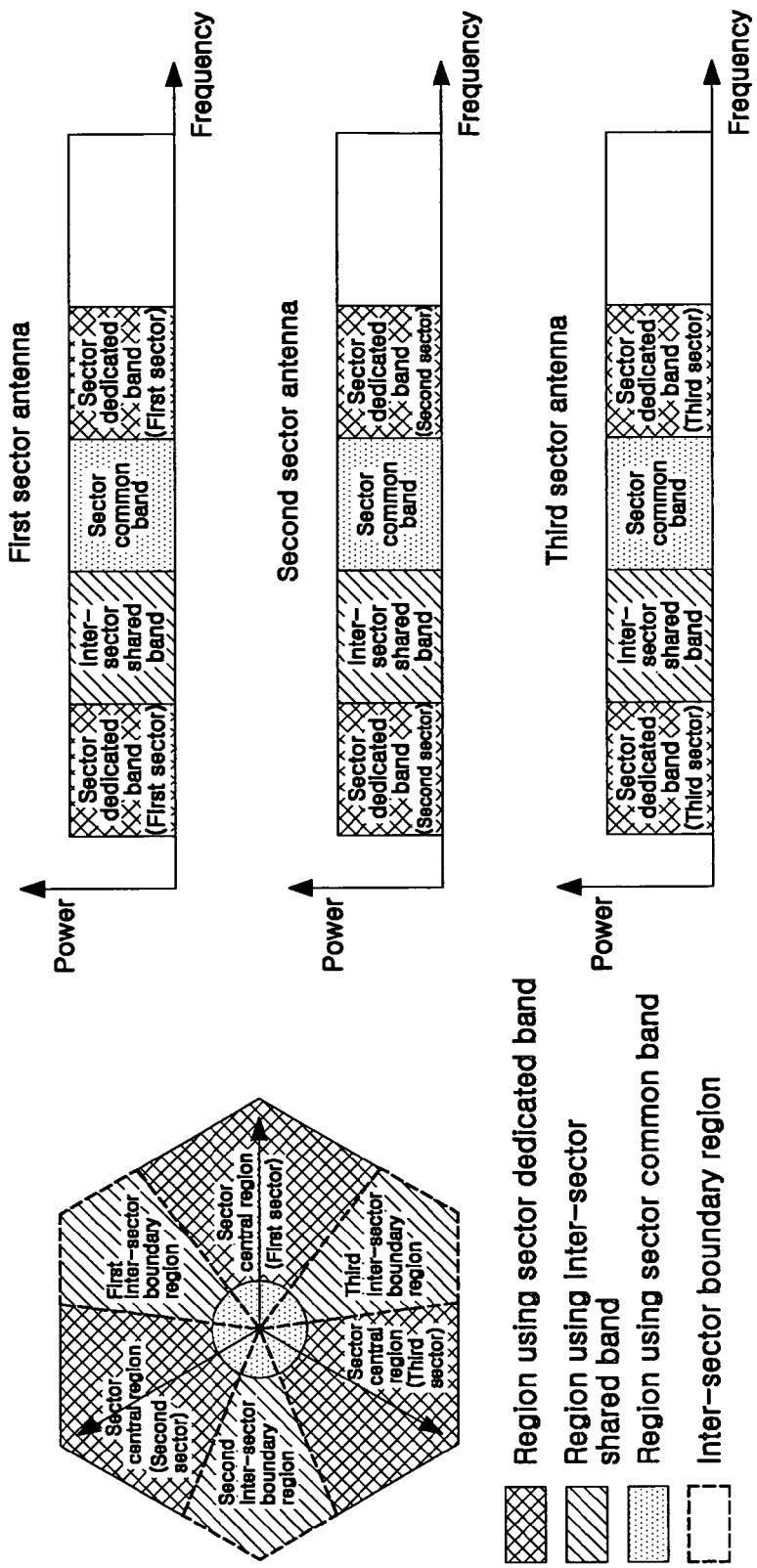

[FIG. 49]
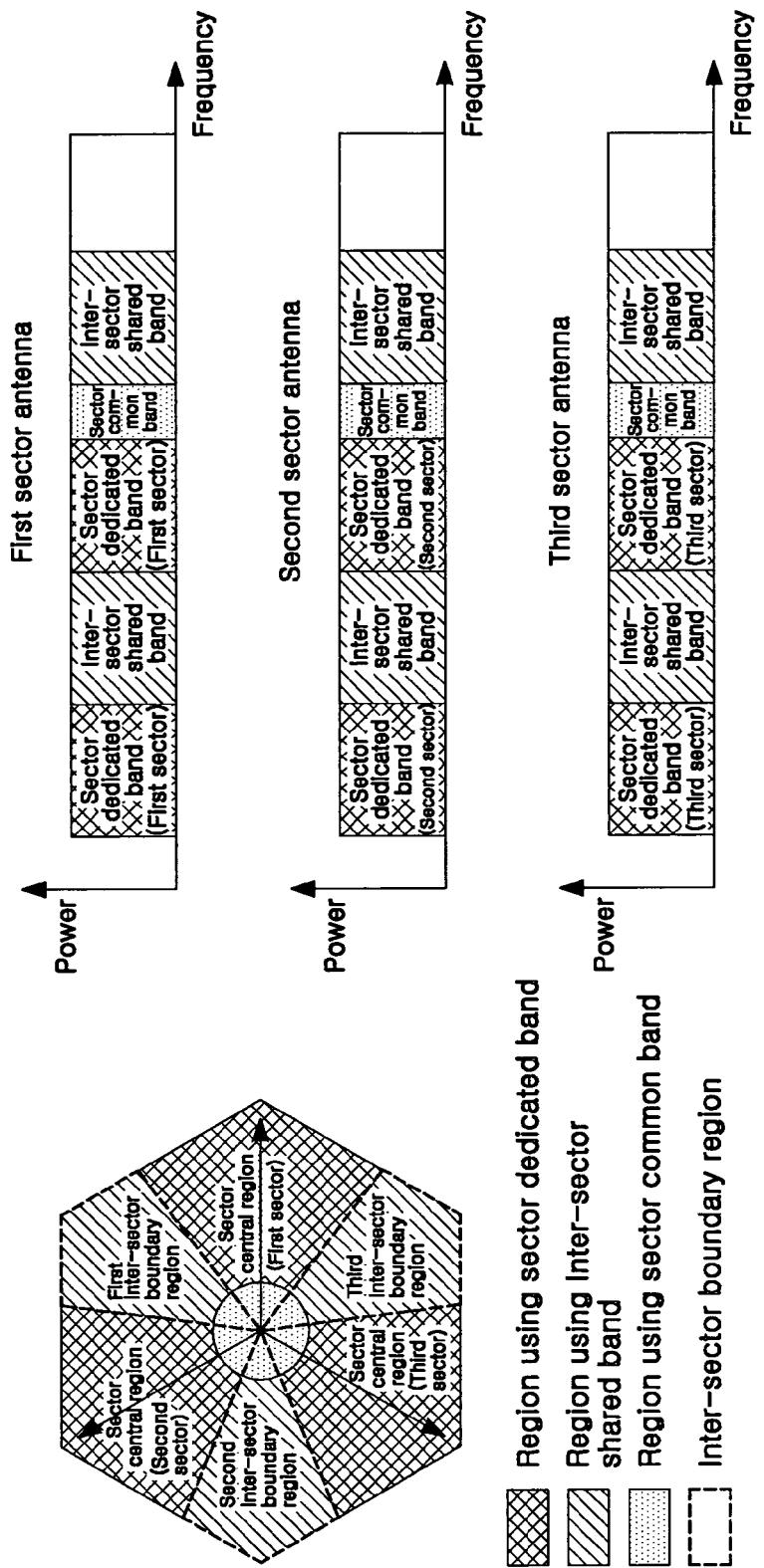

[FIG. 50]
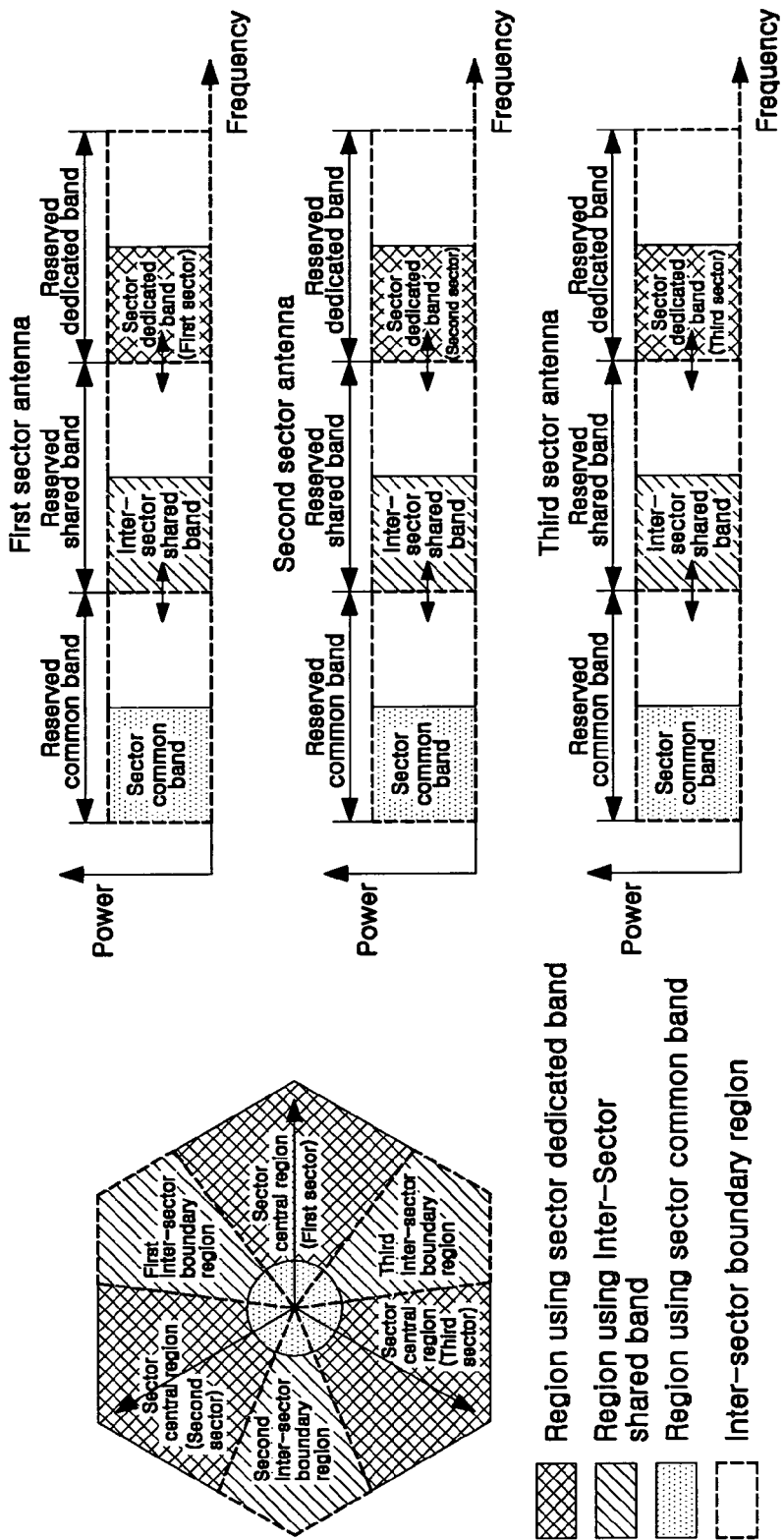

[FIG. 51]
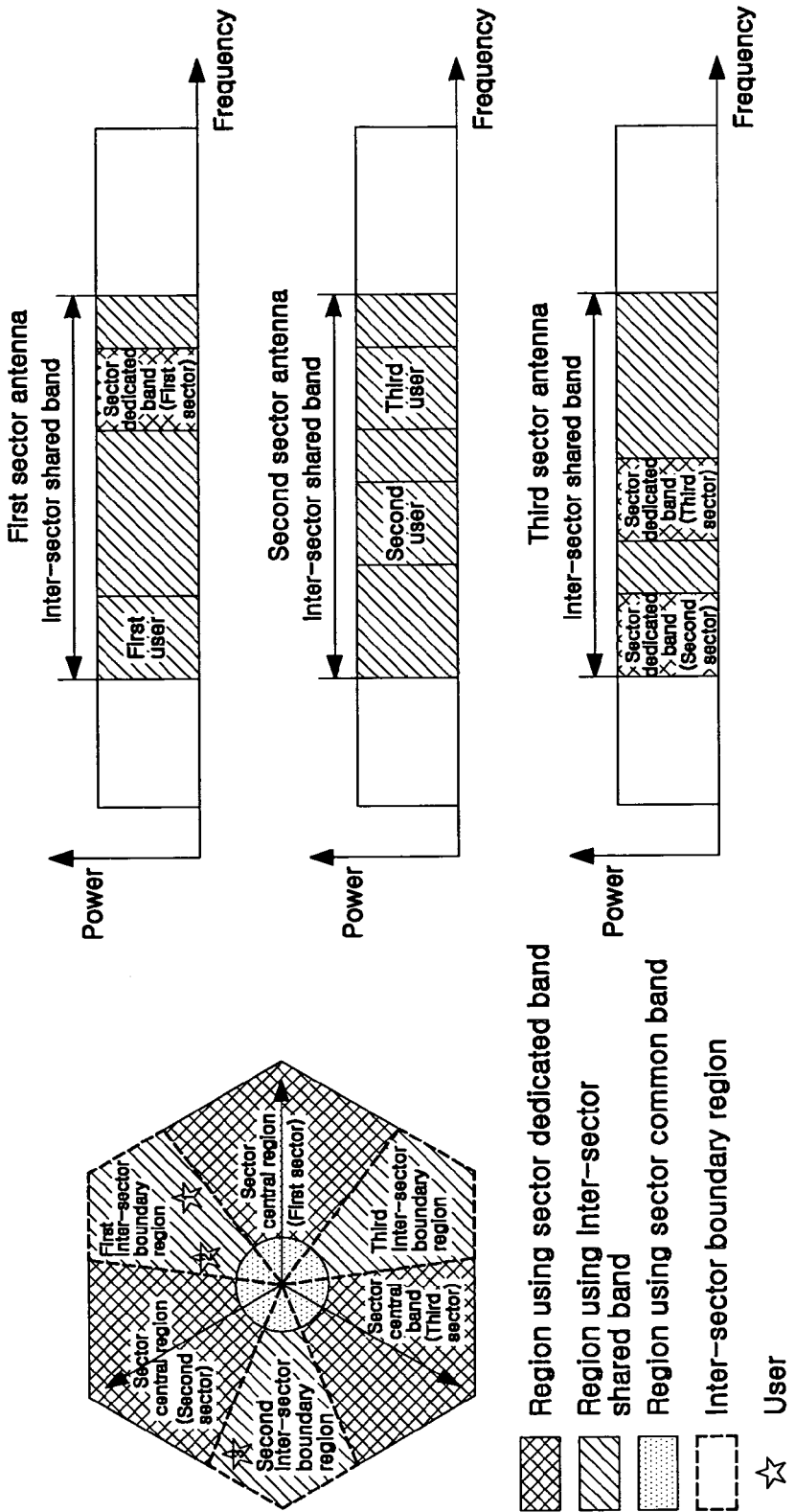

[FIG. 52]
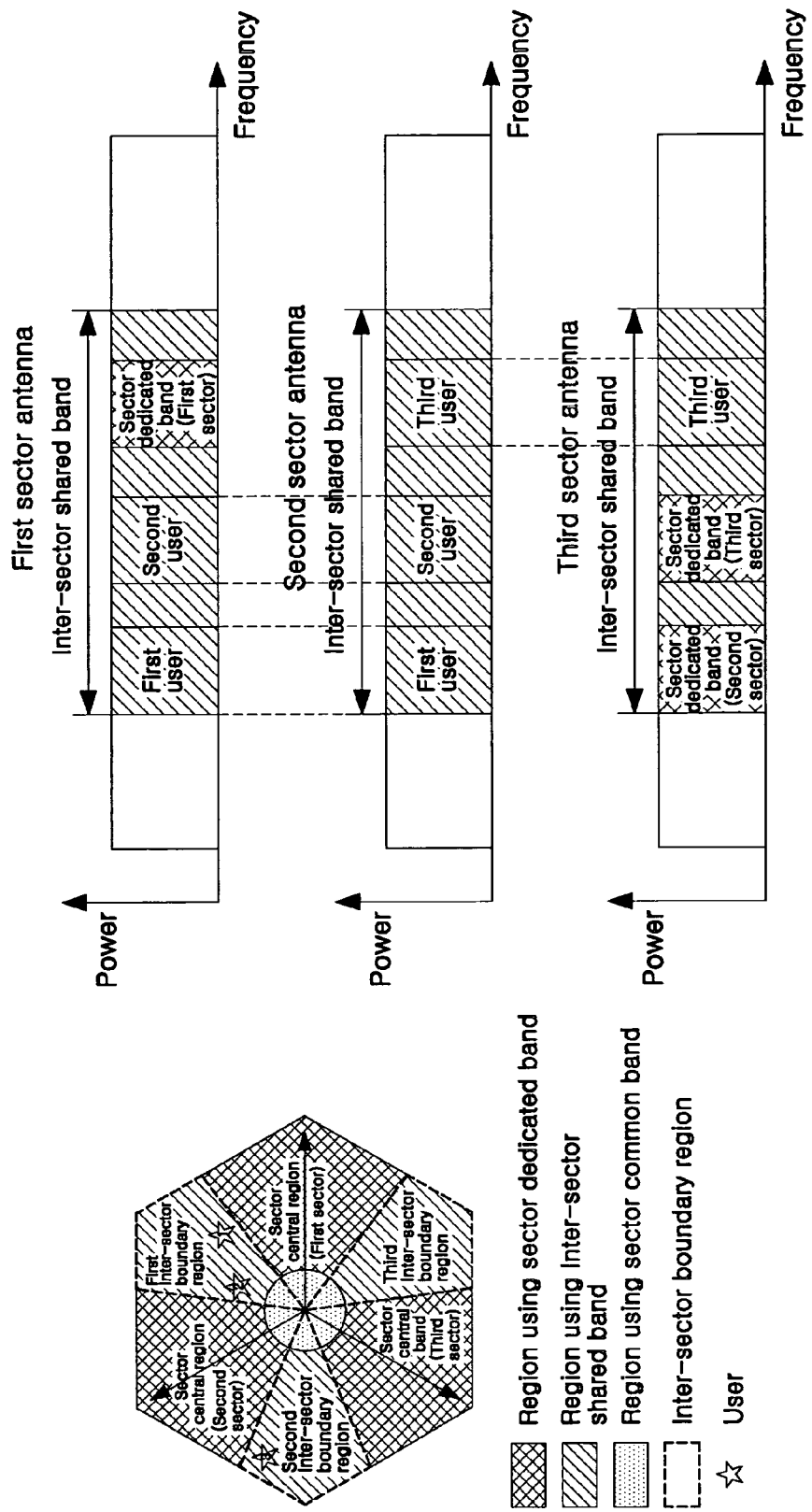

[FIG. 53]
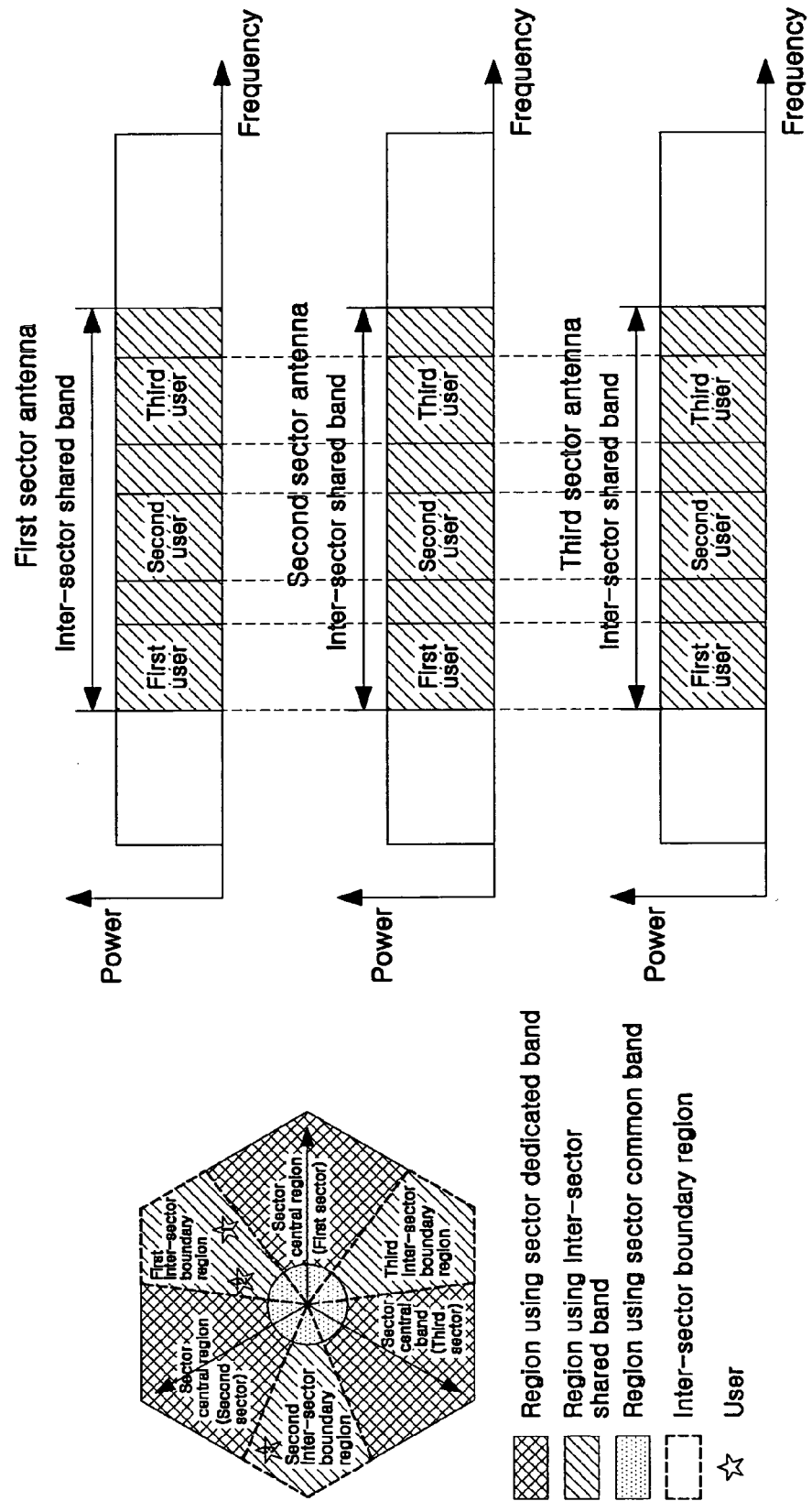

[FIG. 54]
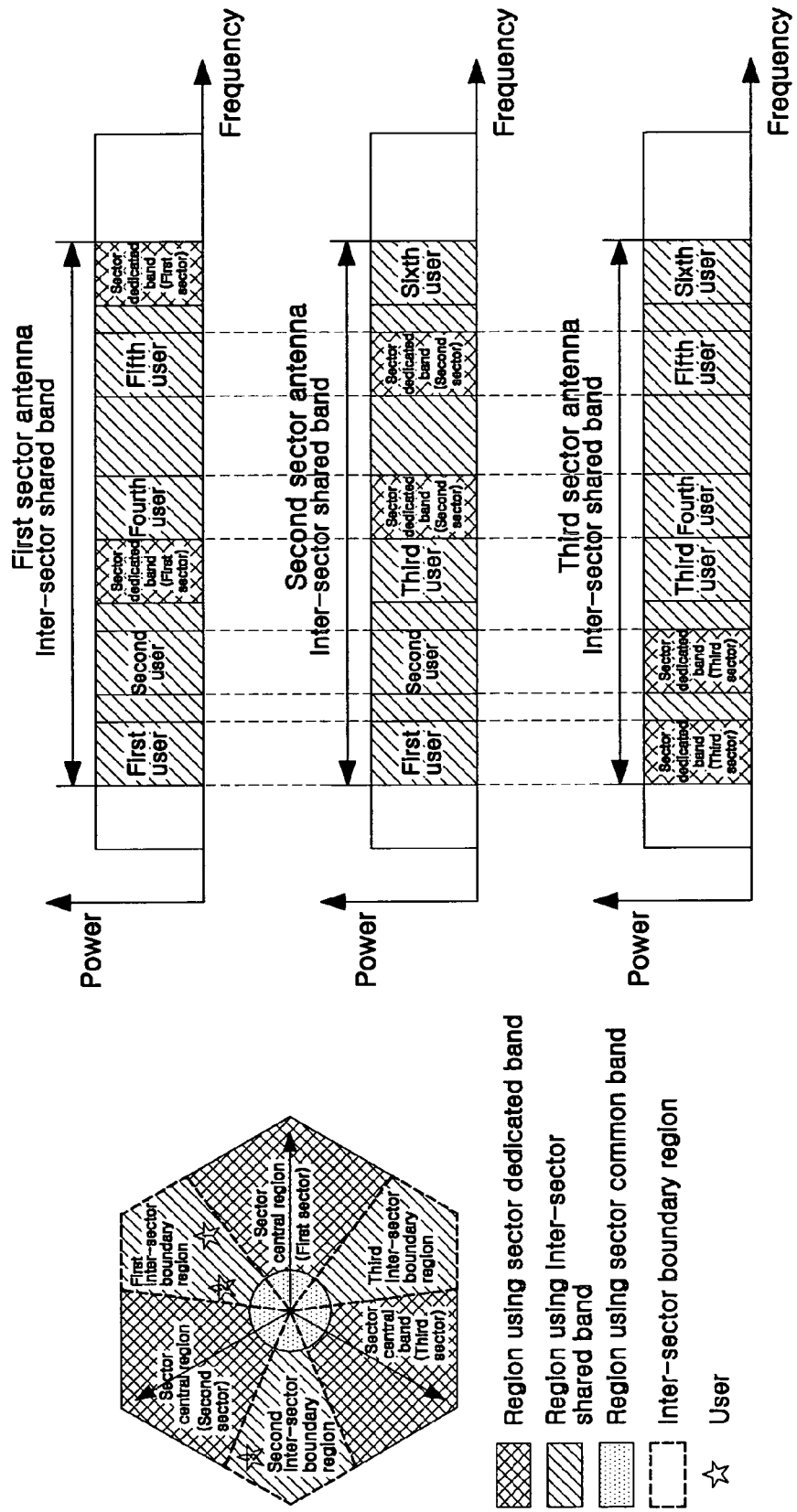

[FIG. 55]
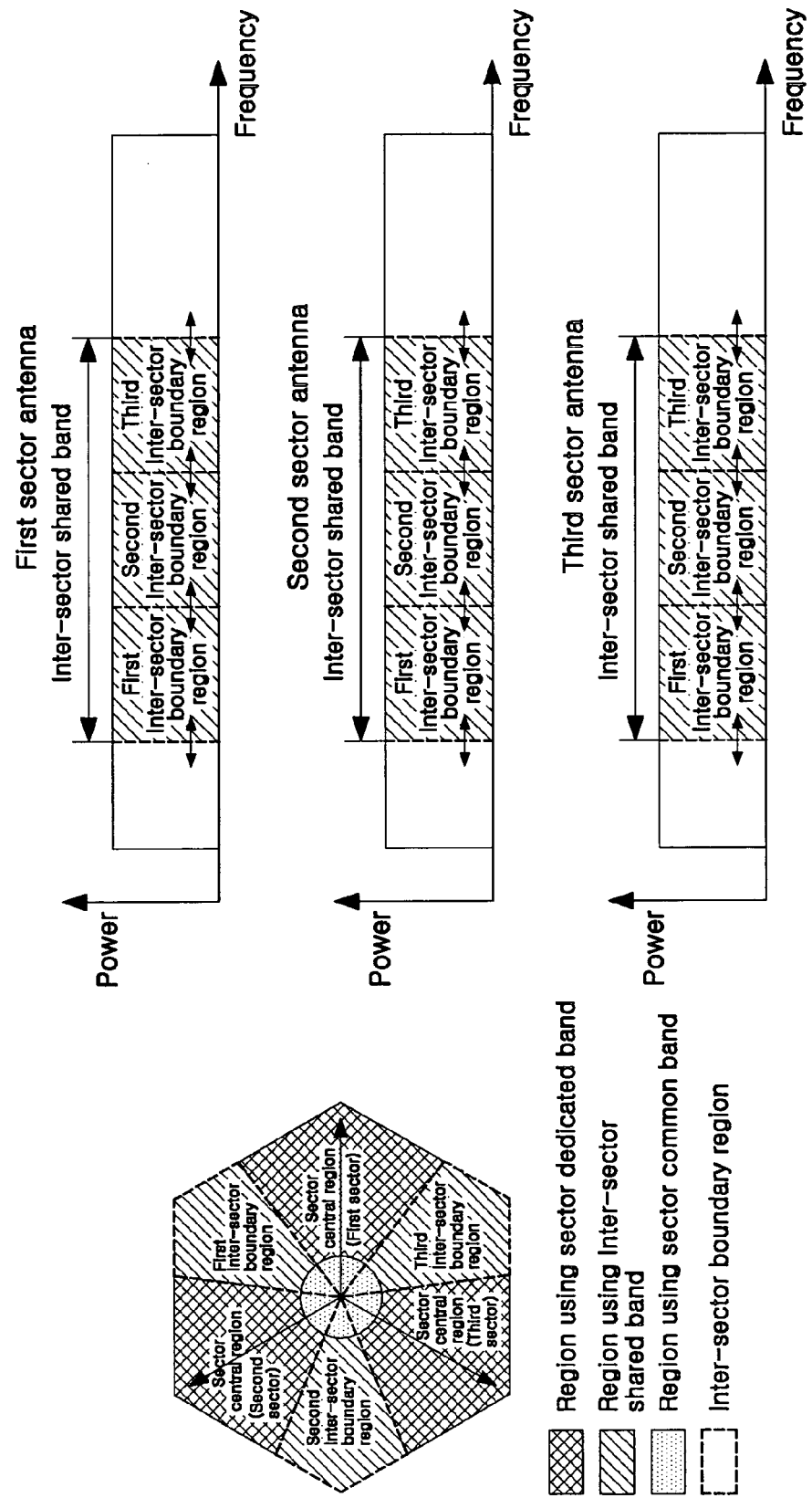

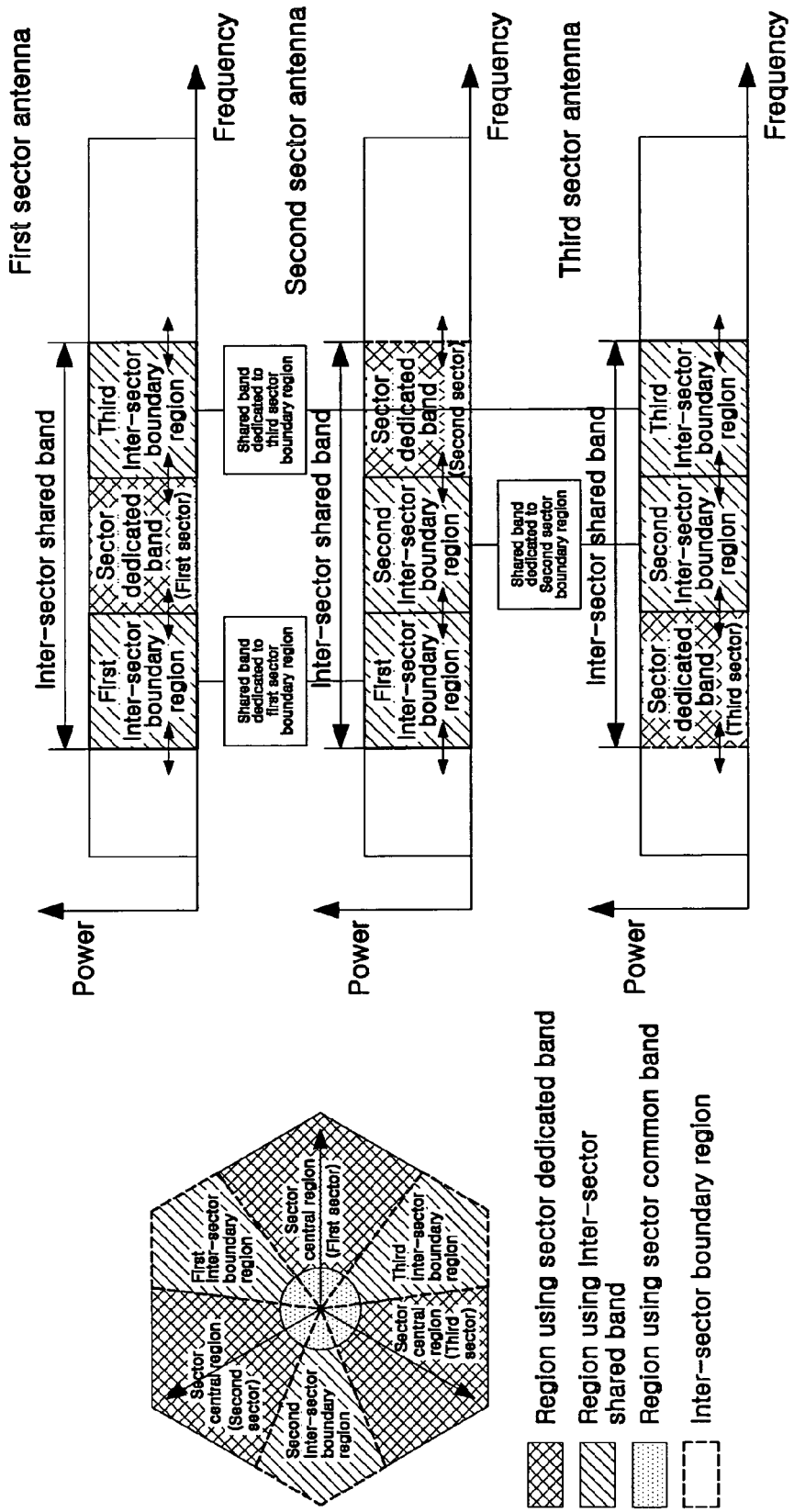
[FIG. 56]

[FIG. 57]
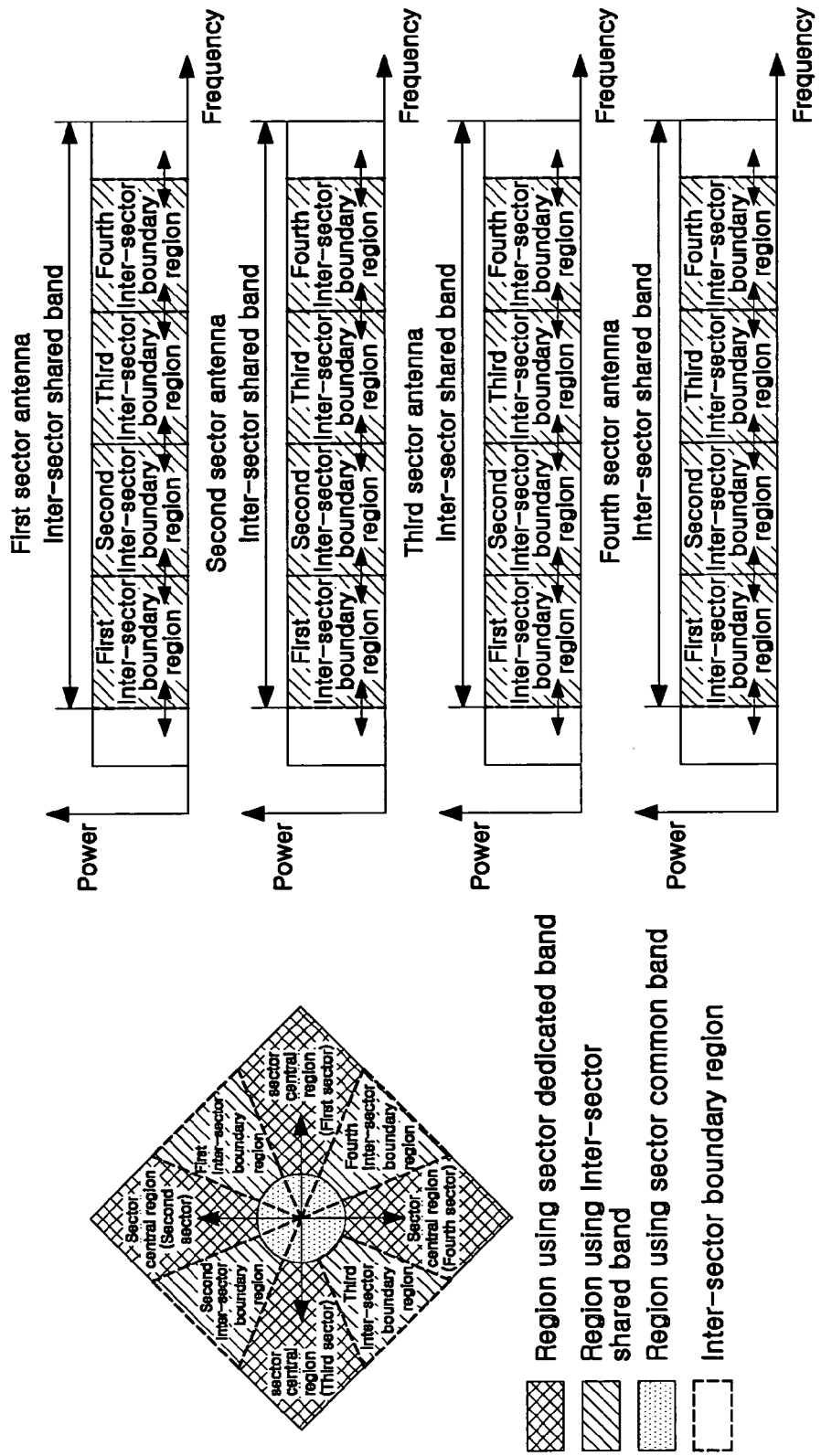

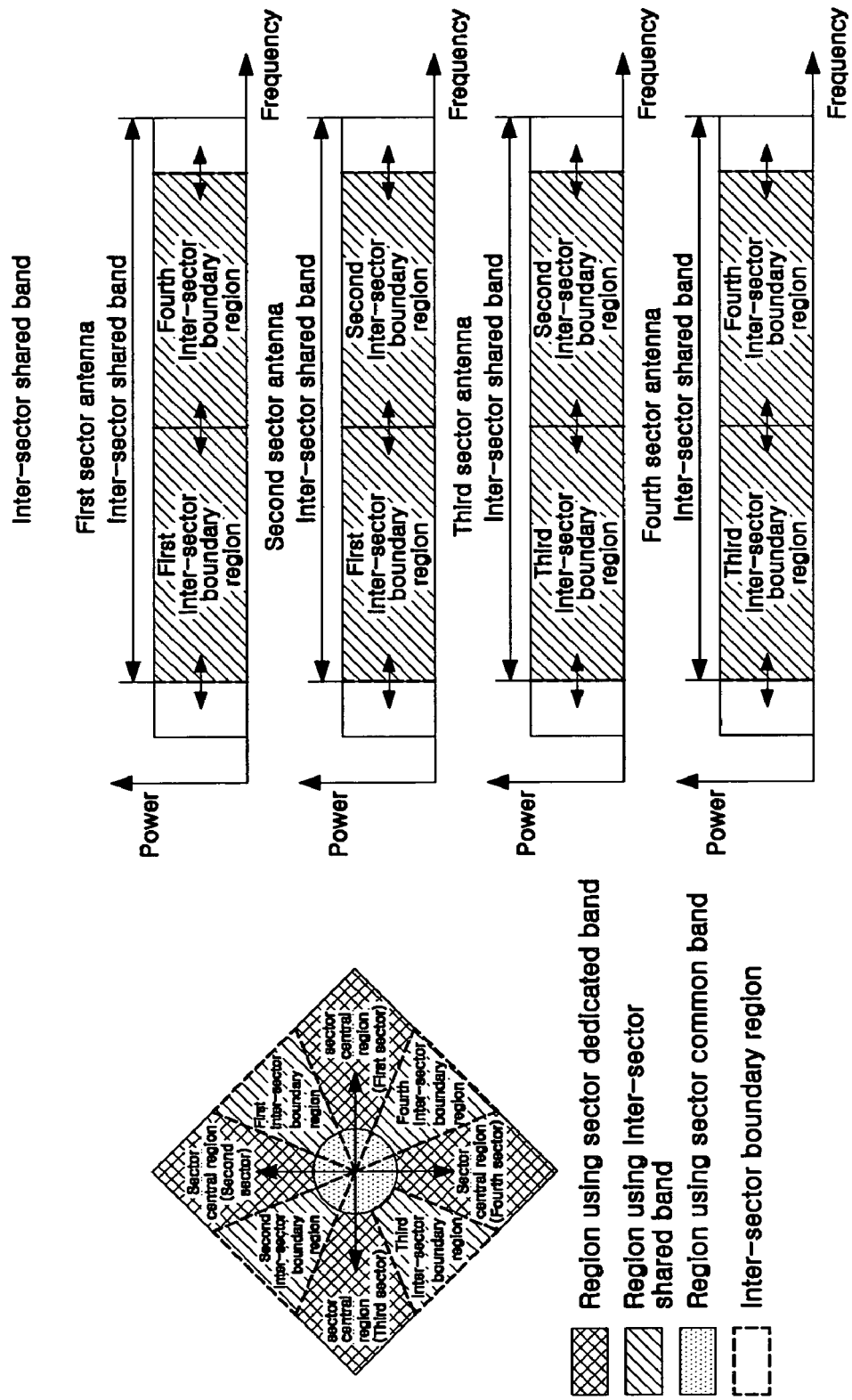
[FIG. 58]

[FIG. 59]
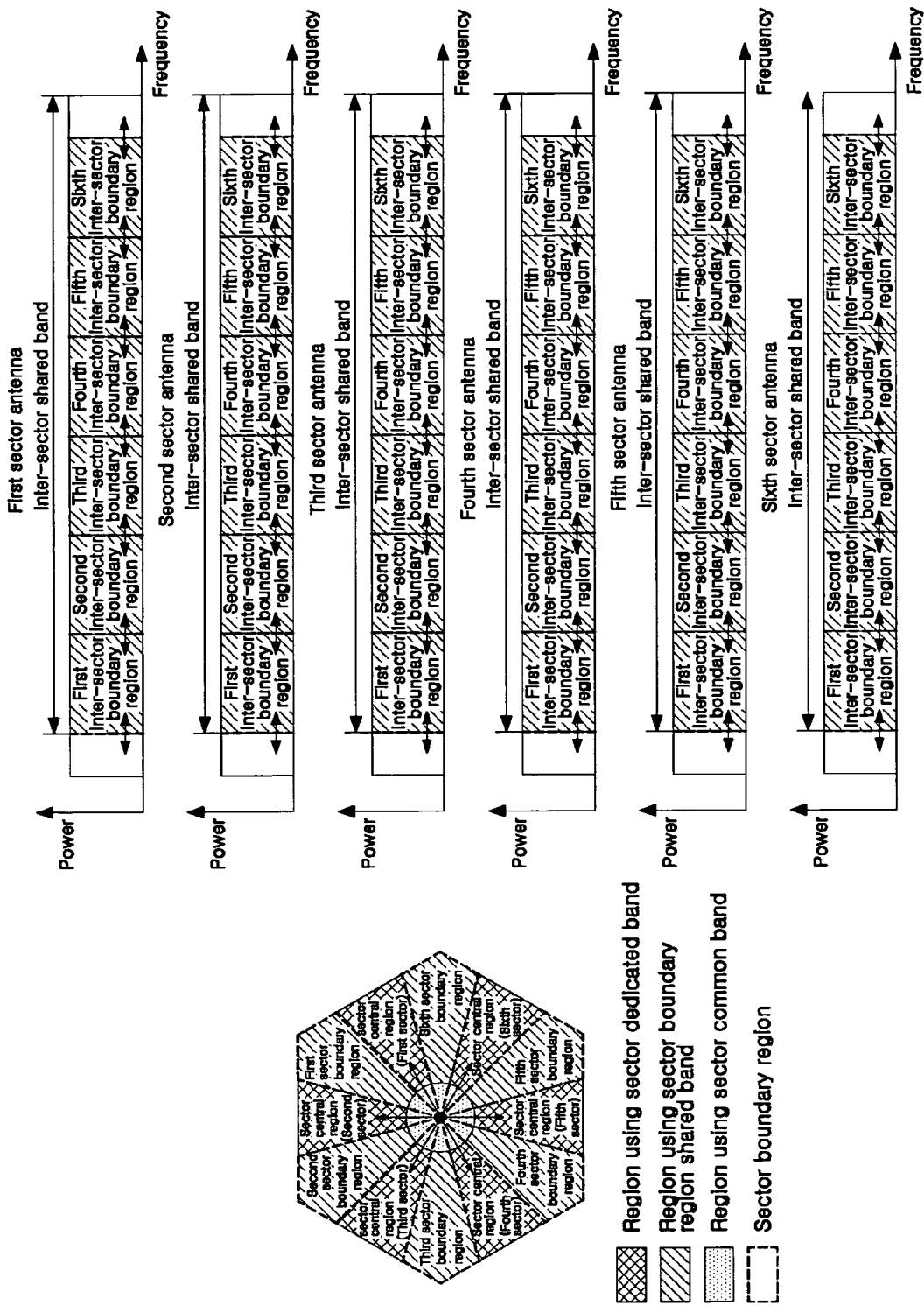

[FIG. 60]
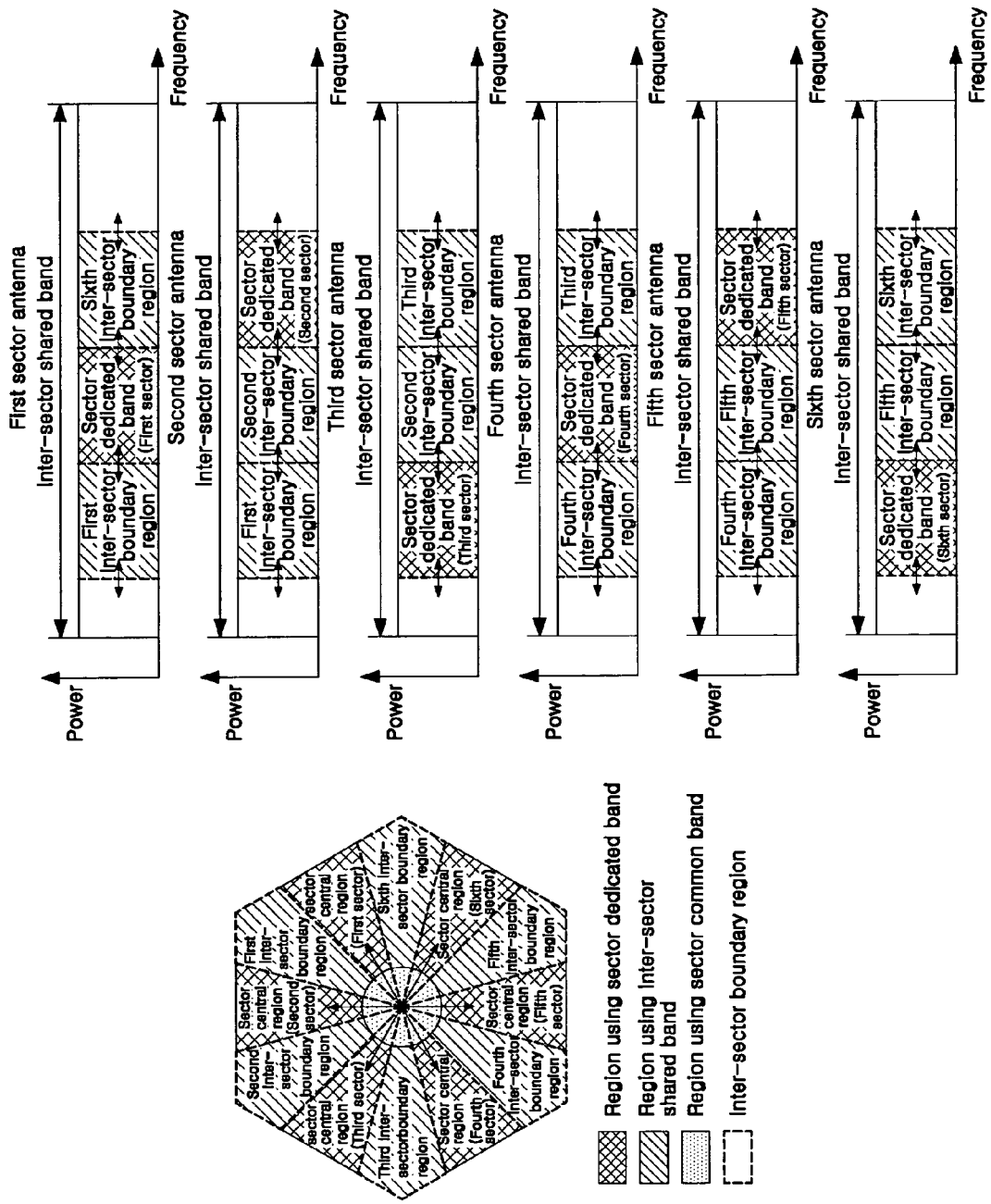

[FIG. 61]
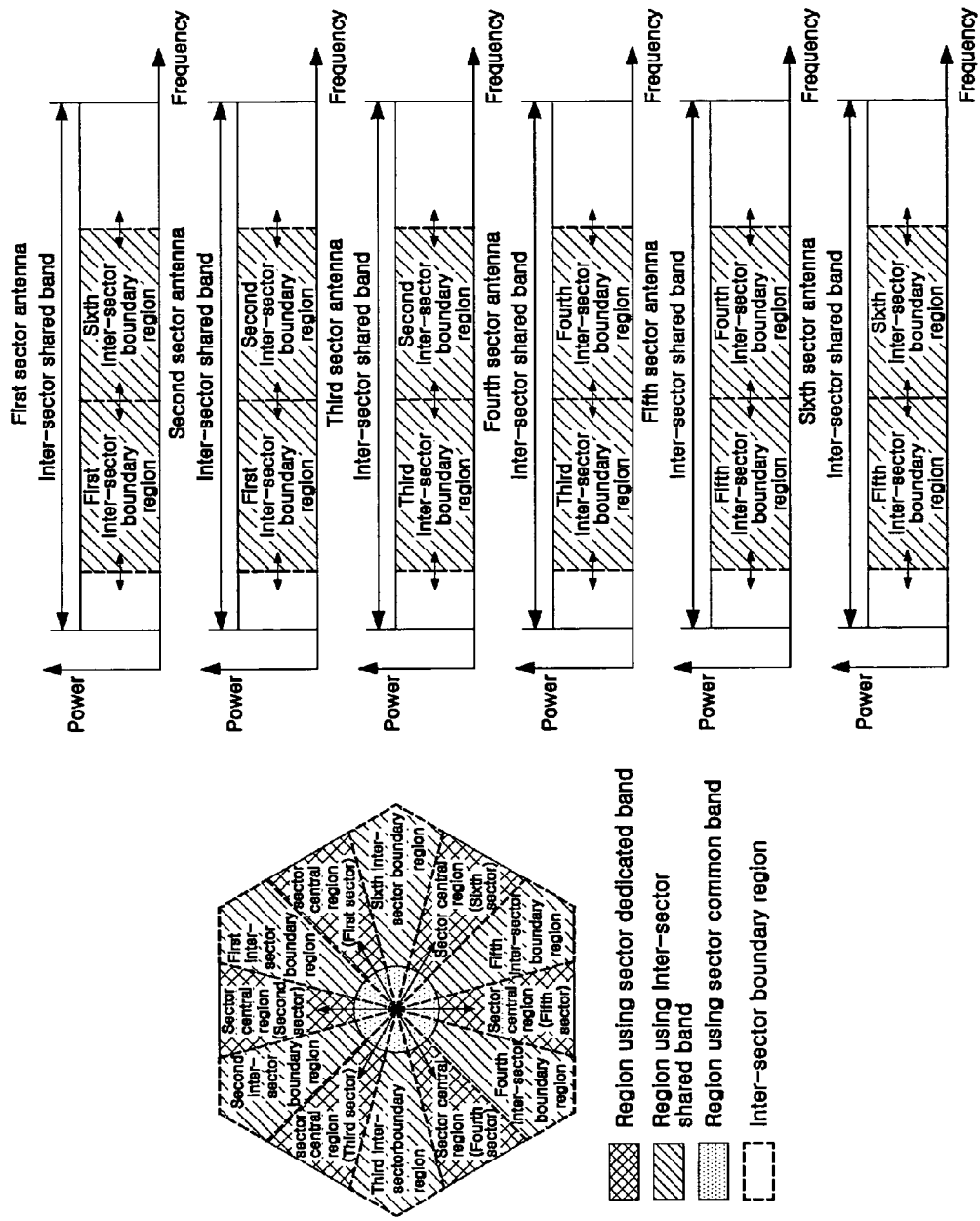

[FIG. 62]
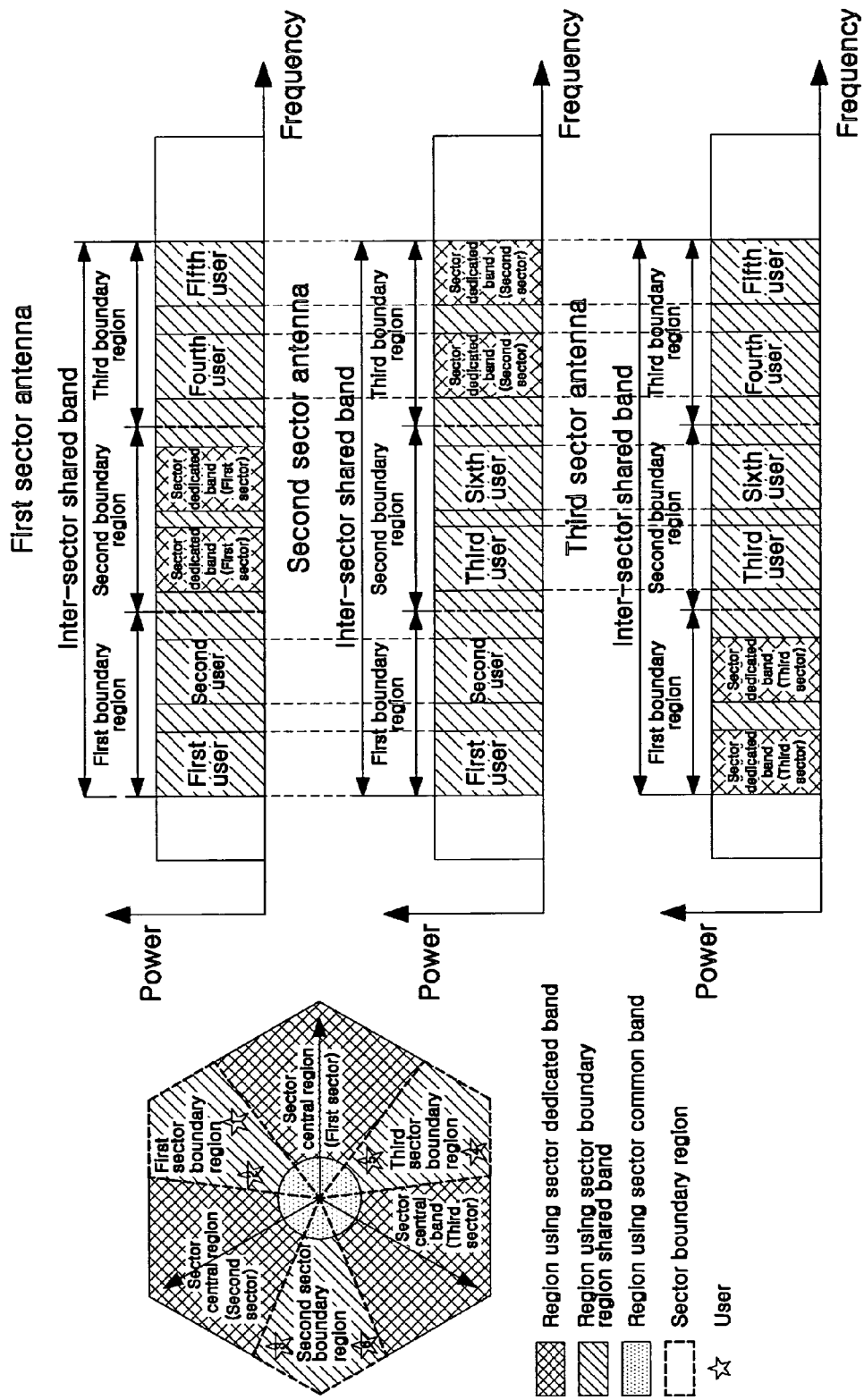

[FIG. 63]
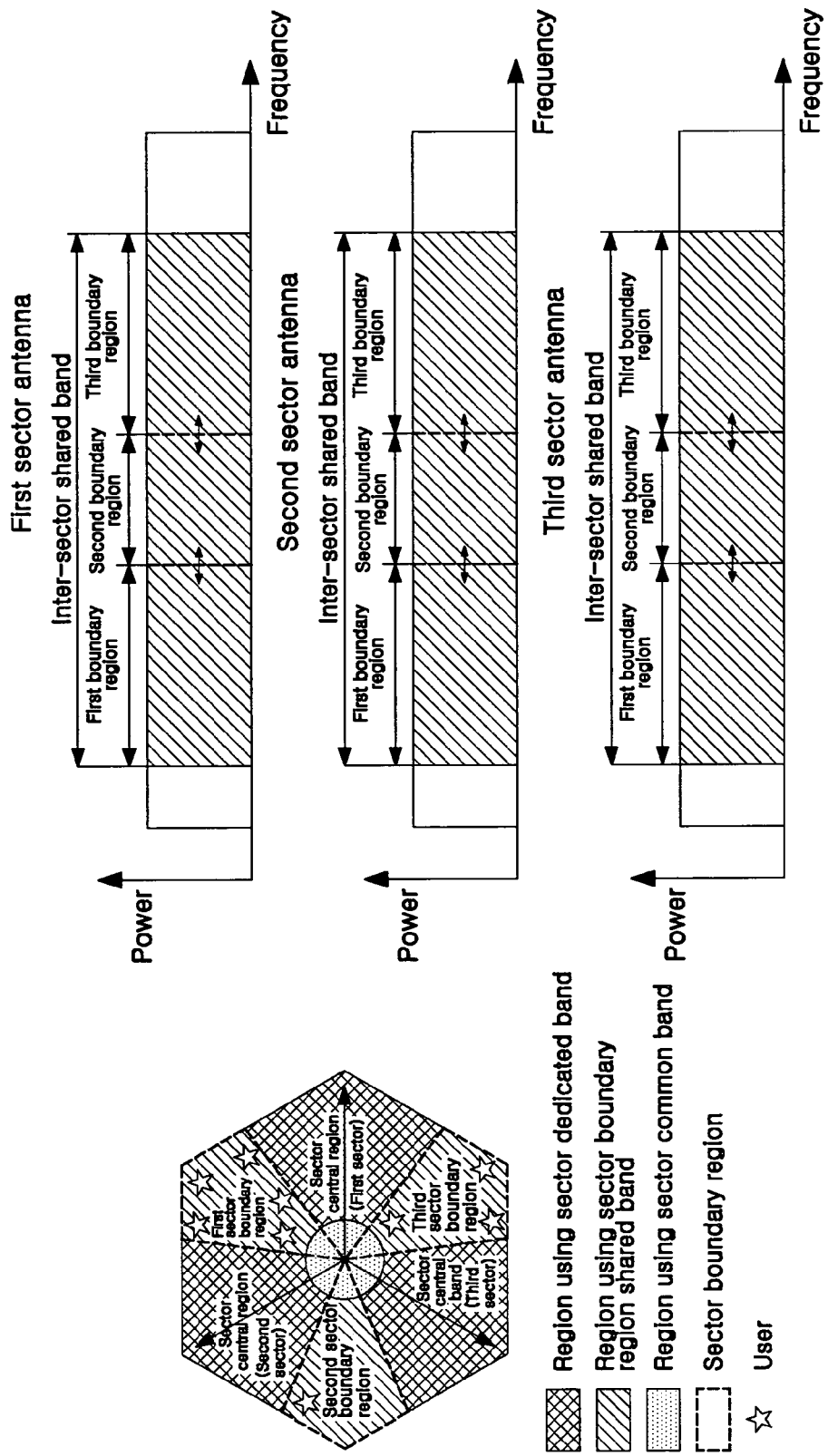

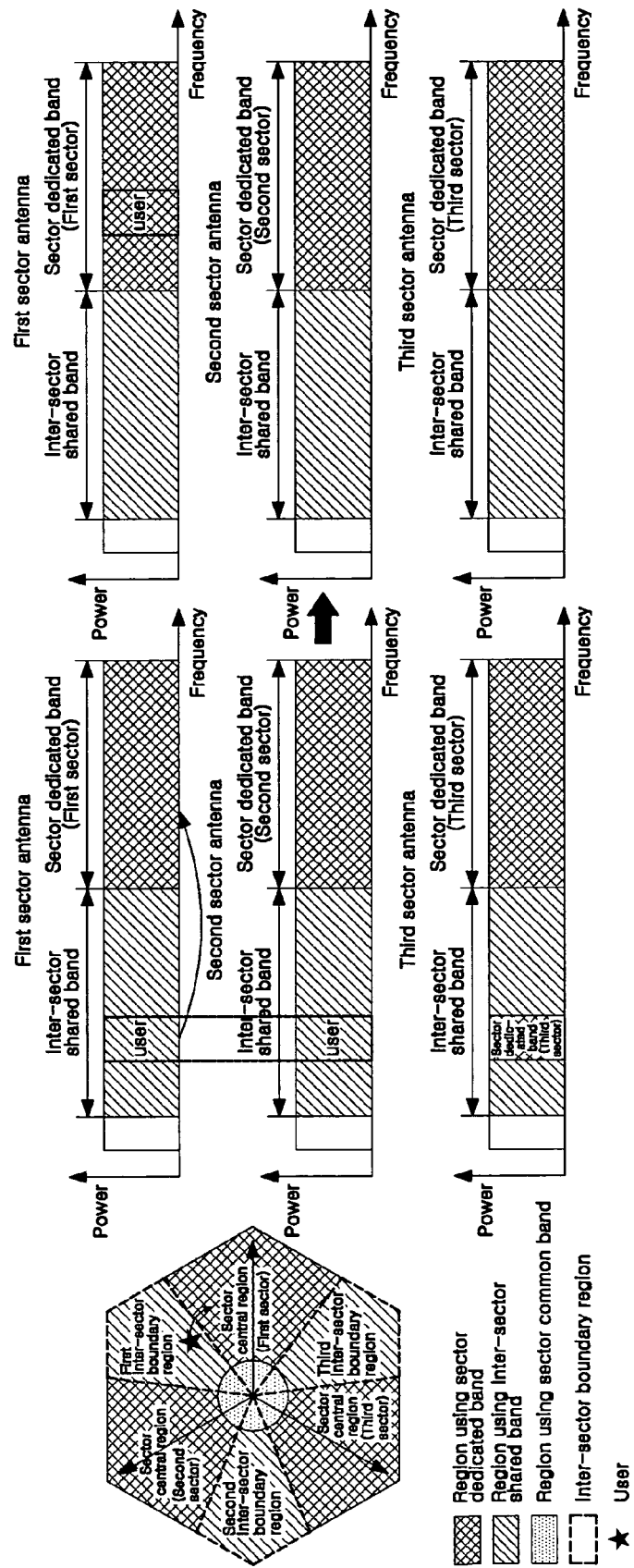
[FIG. 64]

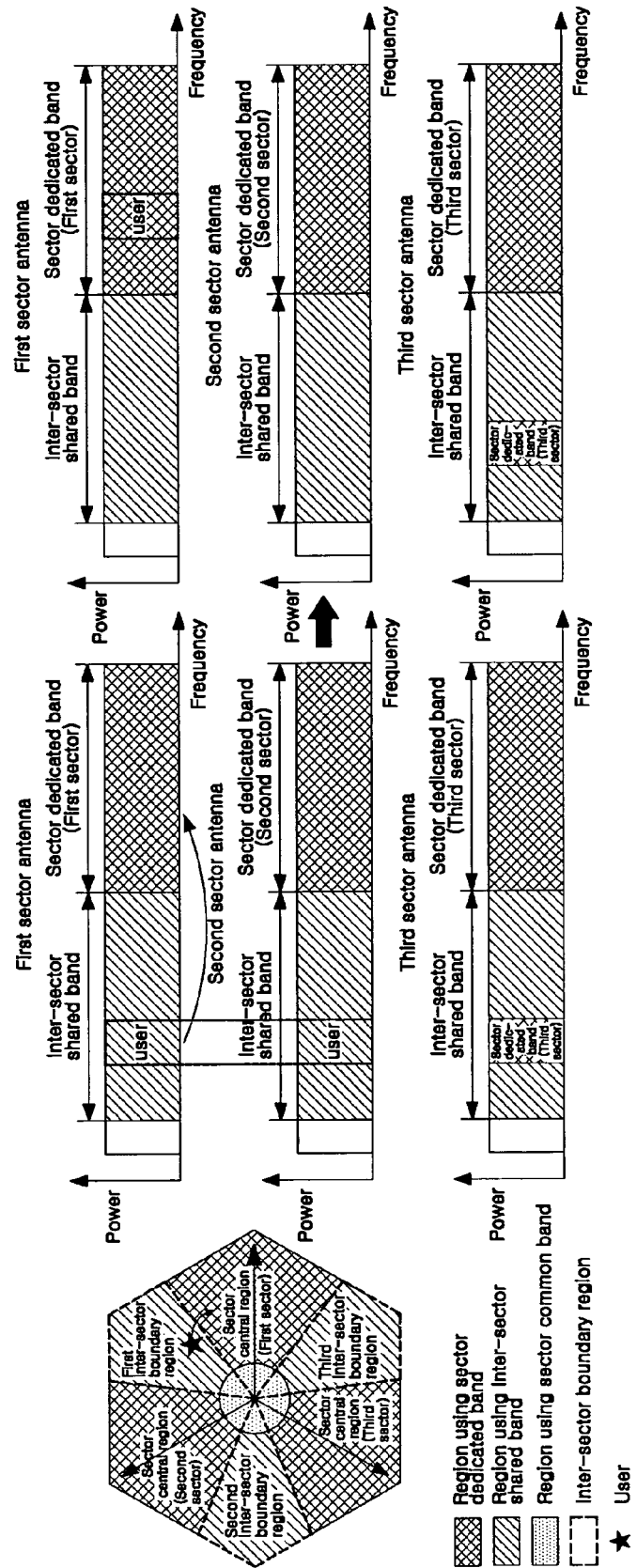
[FIG. 65]

[FIG. 66]
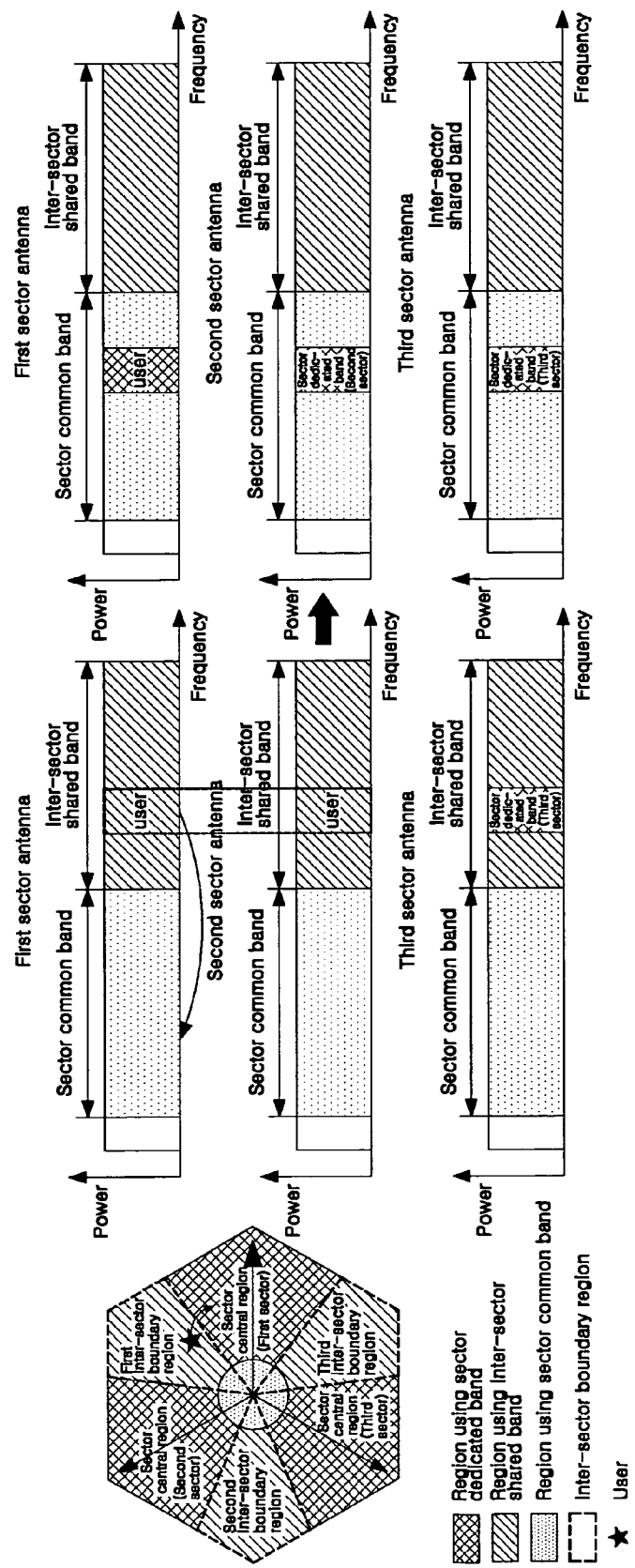

[FIG. 67]
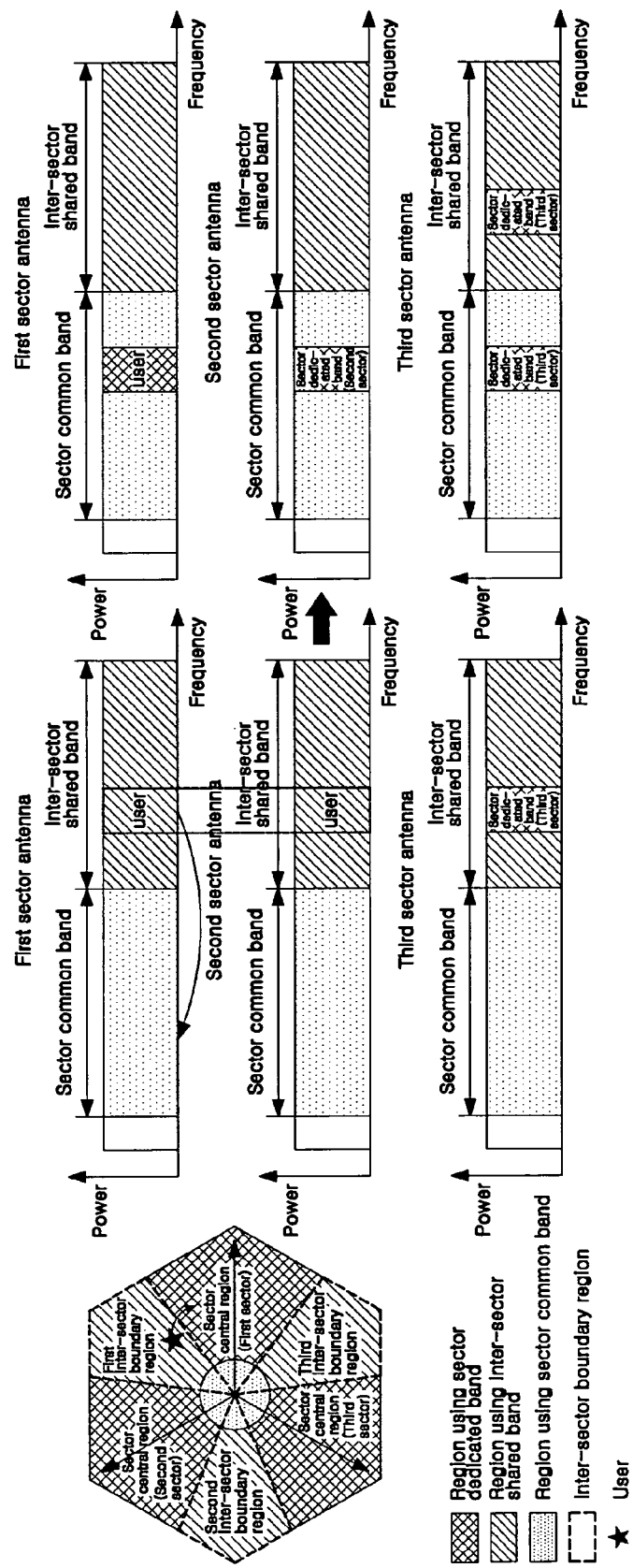

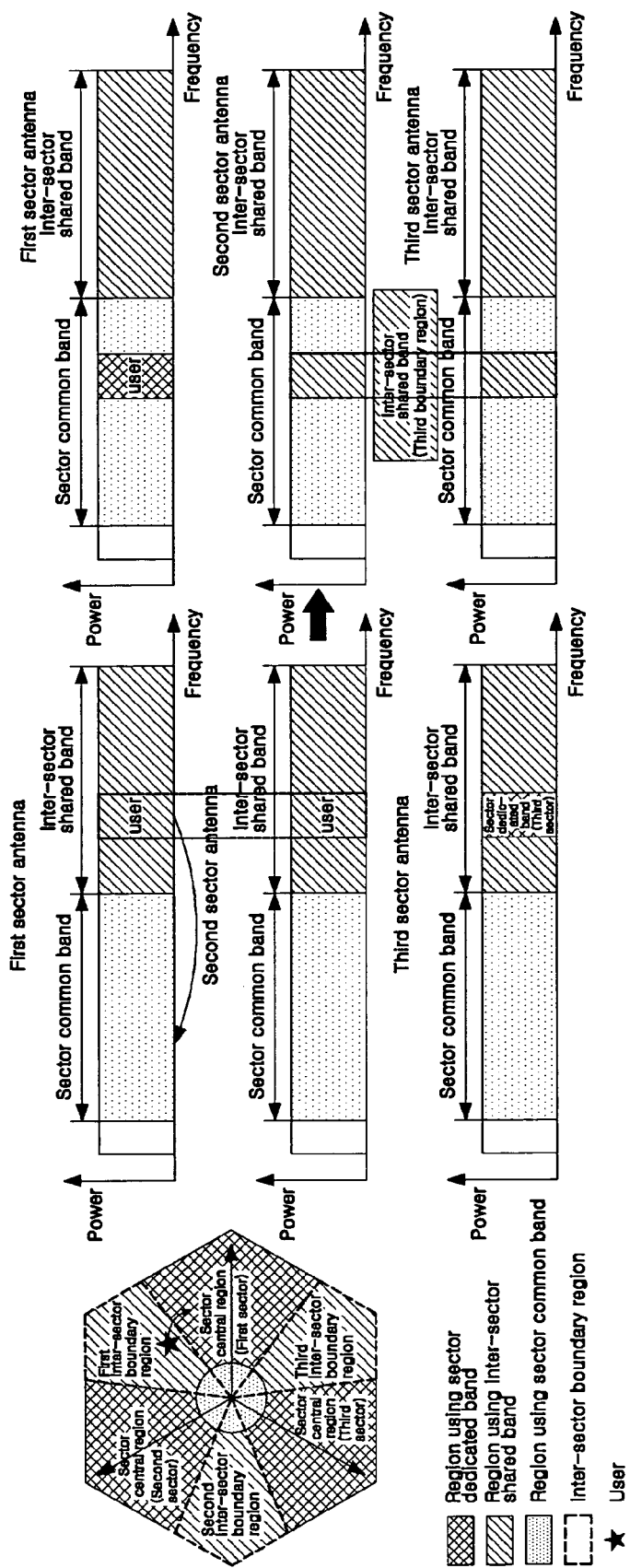
[FIG. 68]

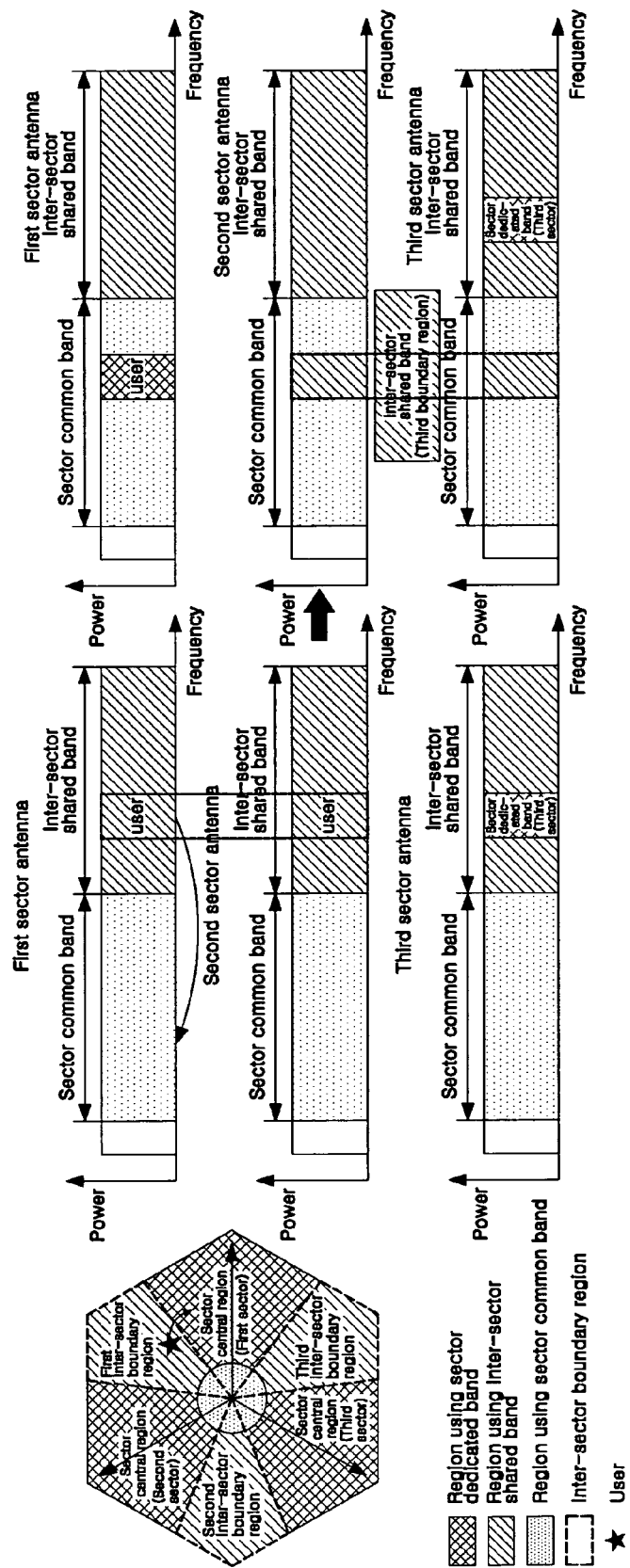
[FIG. 69]

[FIG. 70]
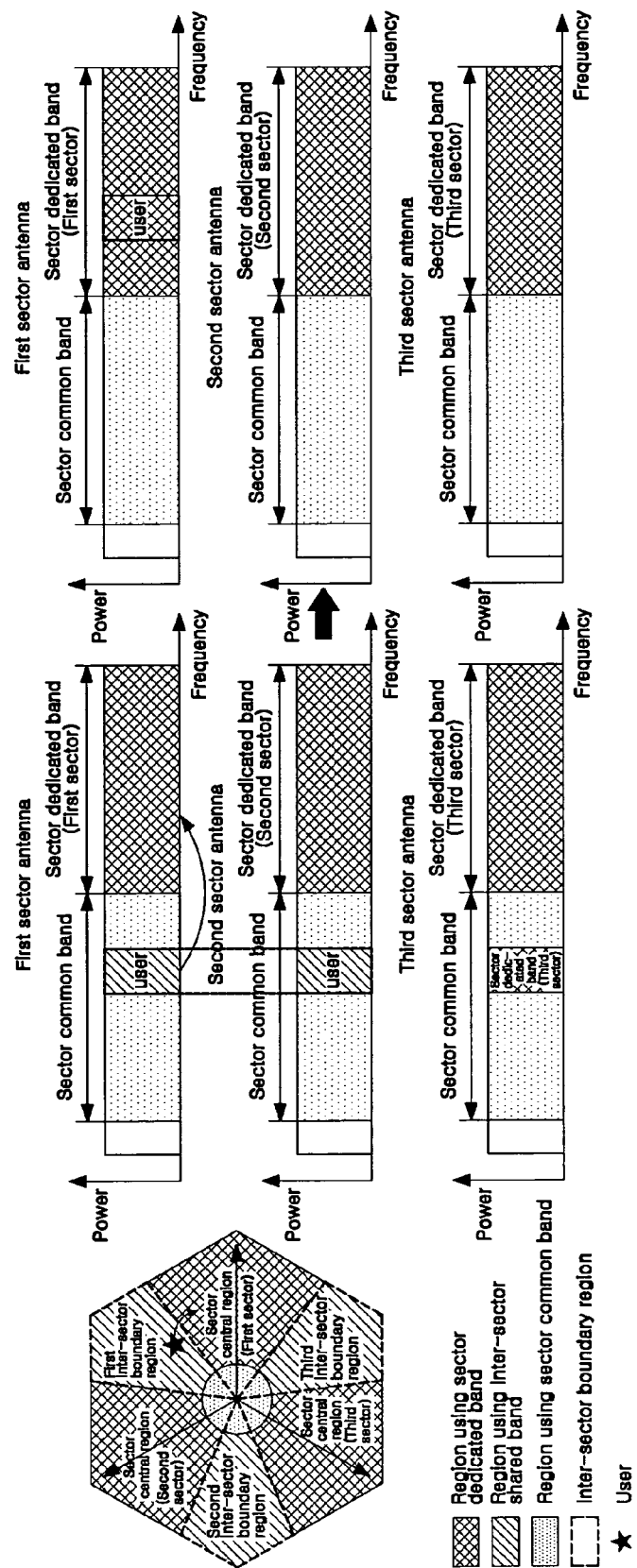

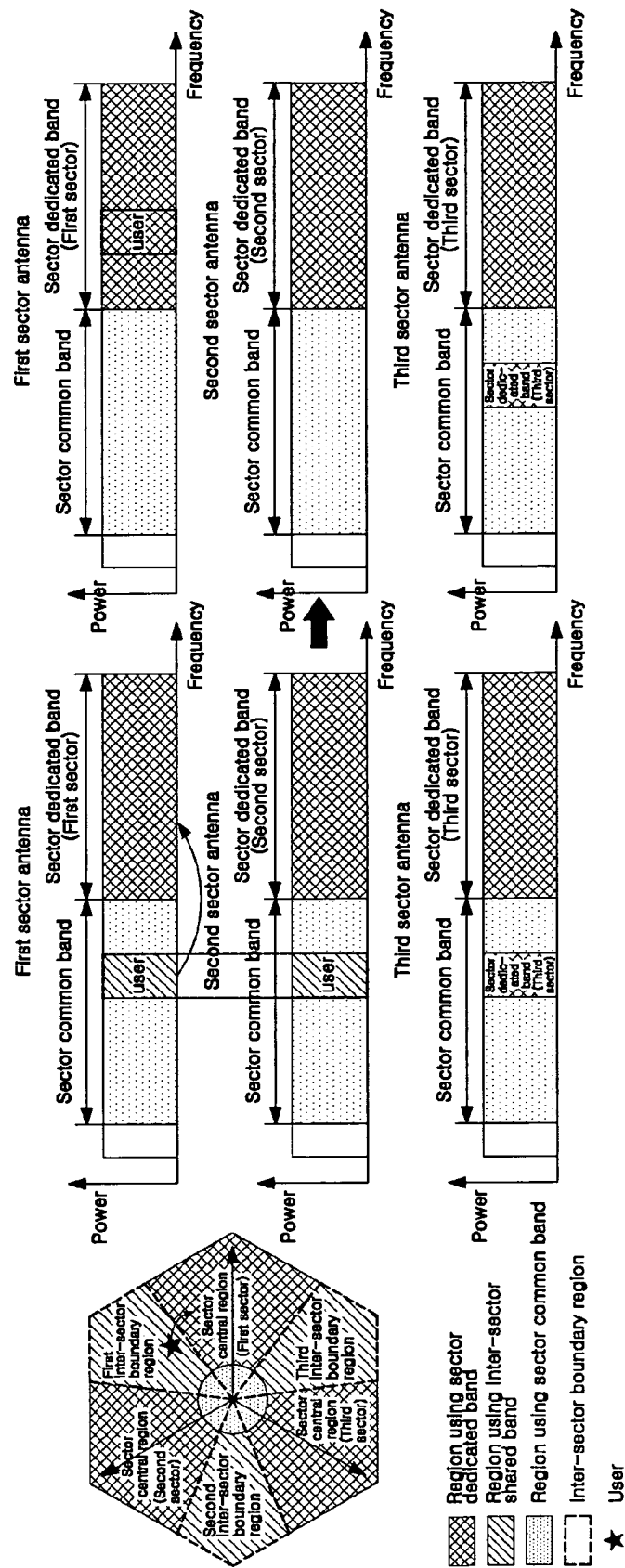
[FIG. 71]

[FIG. 72]
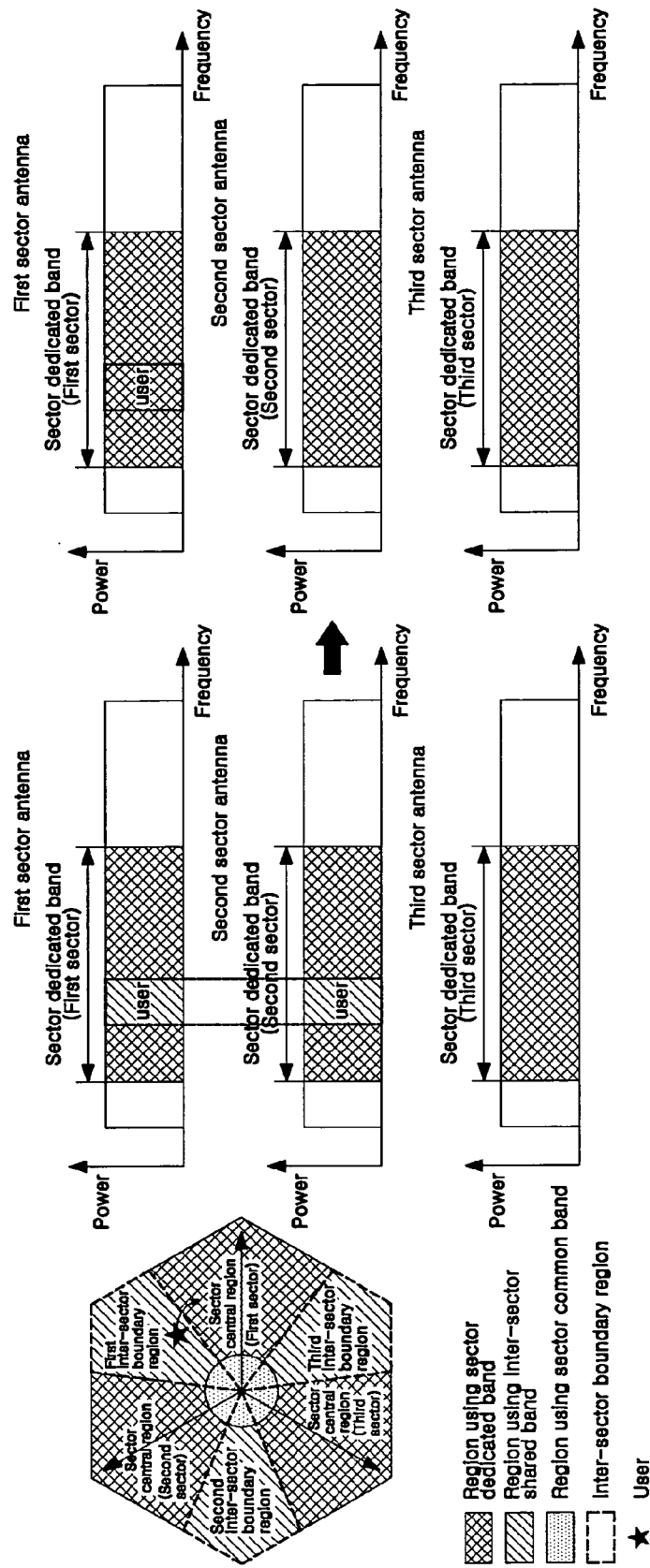

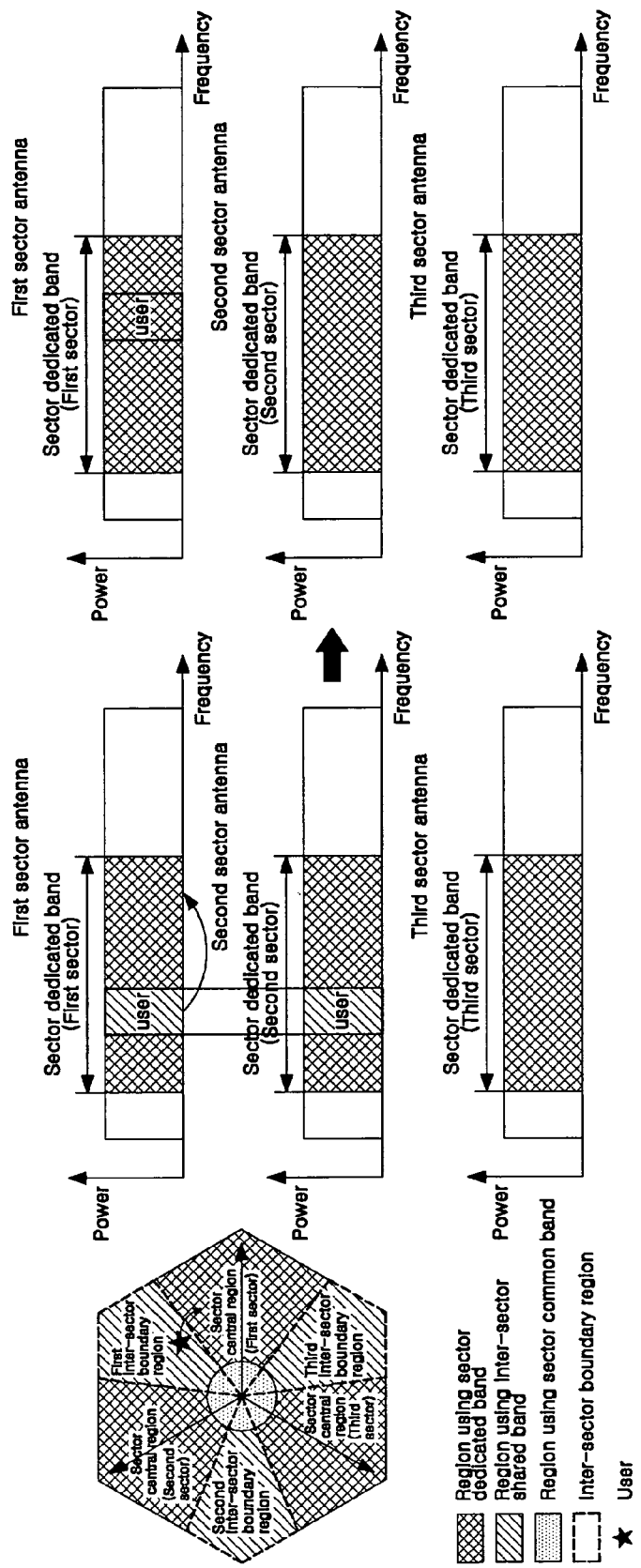

[FIG. 74]
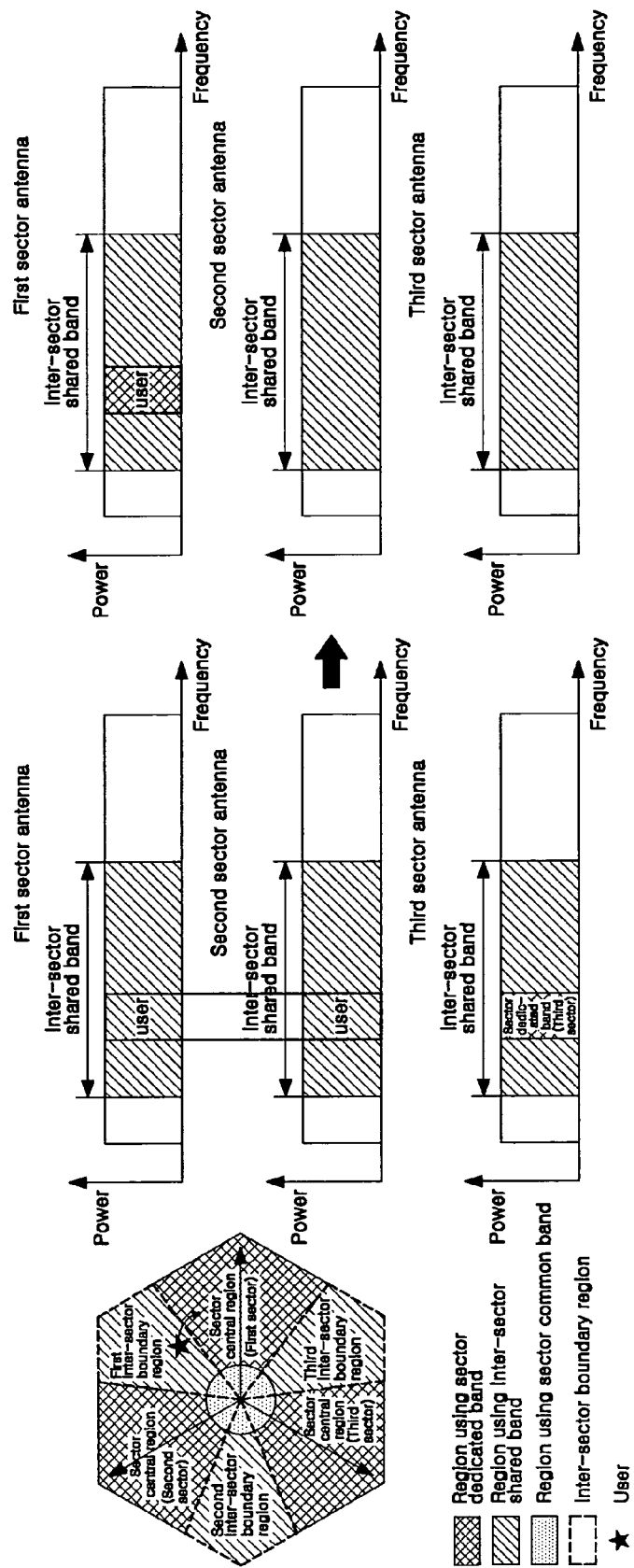

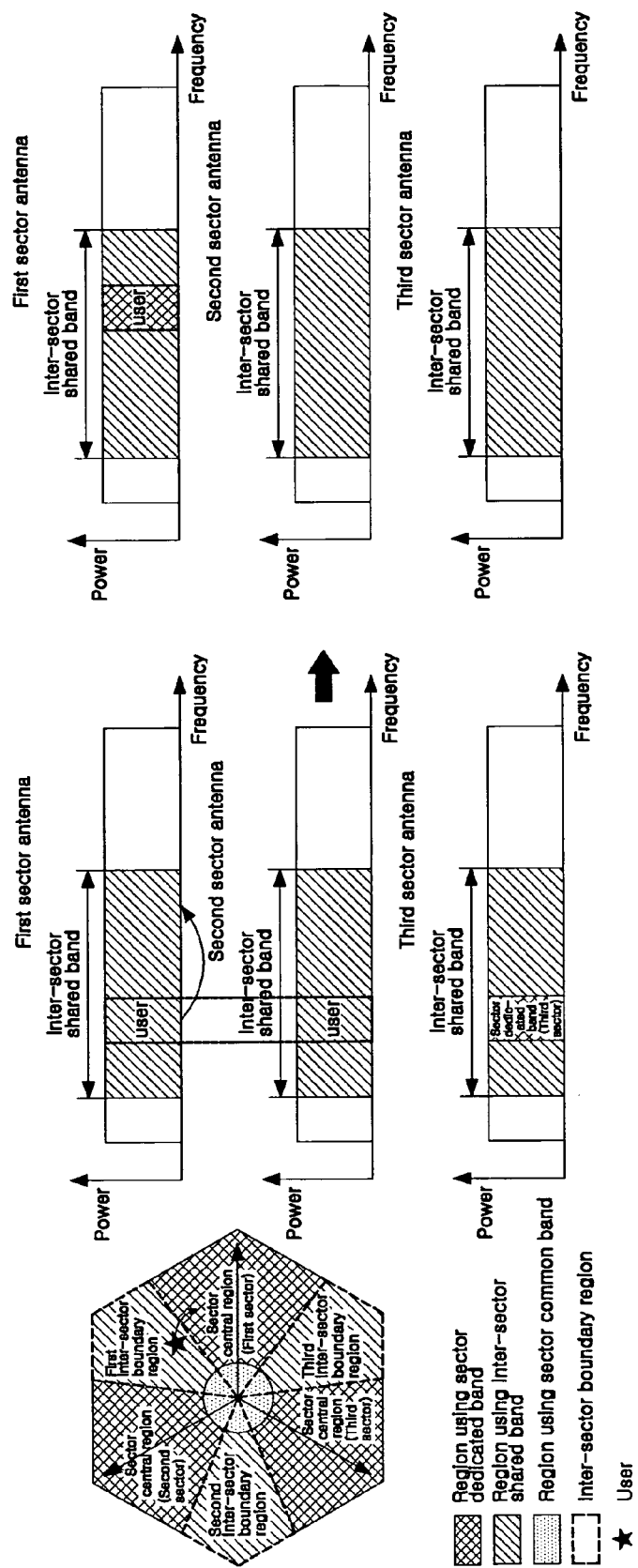
[FIG. 75]

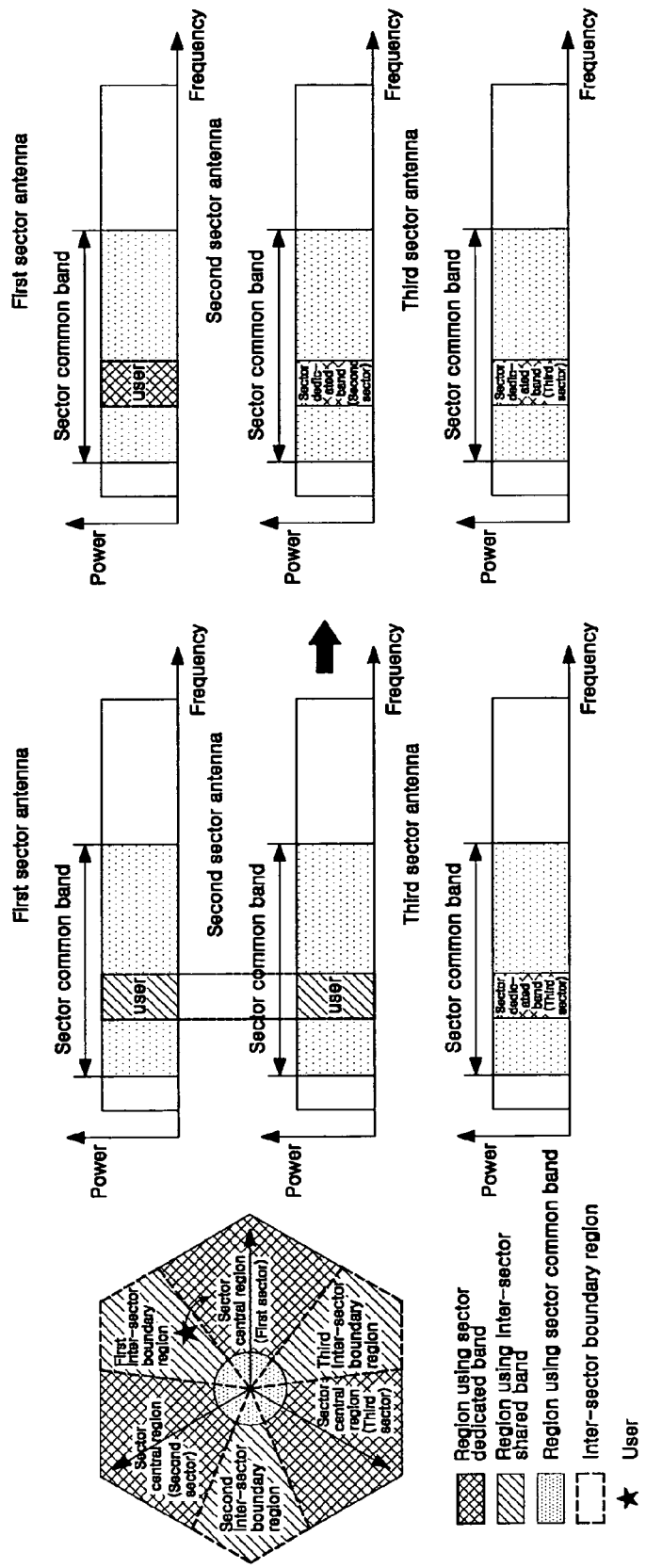
[FIG. 76]

[FIG. 77]
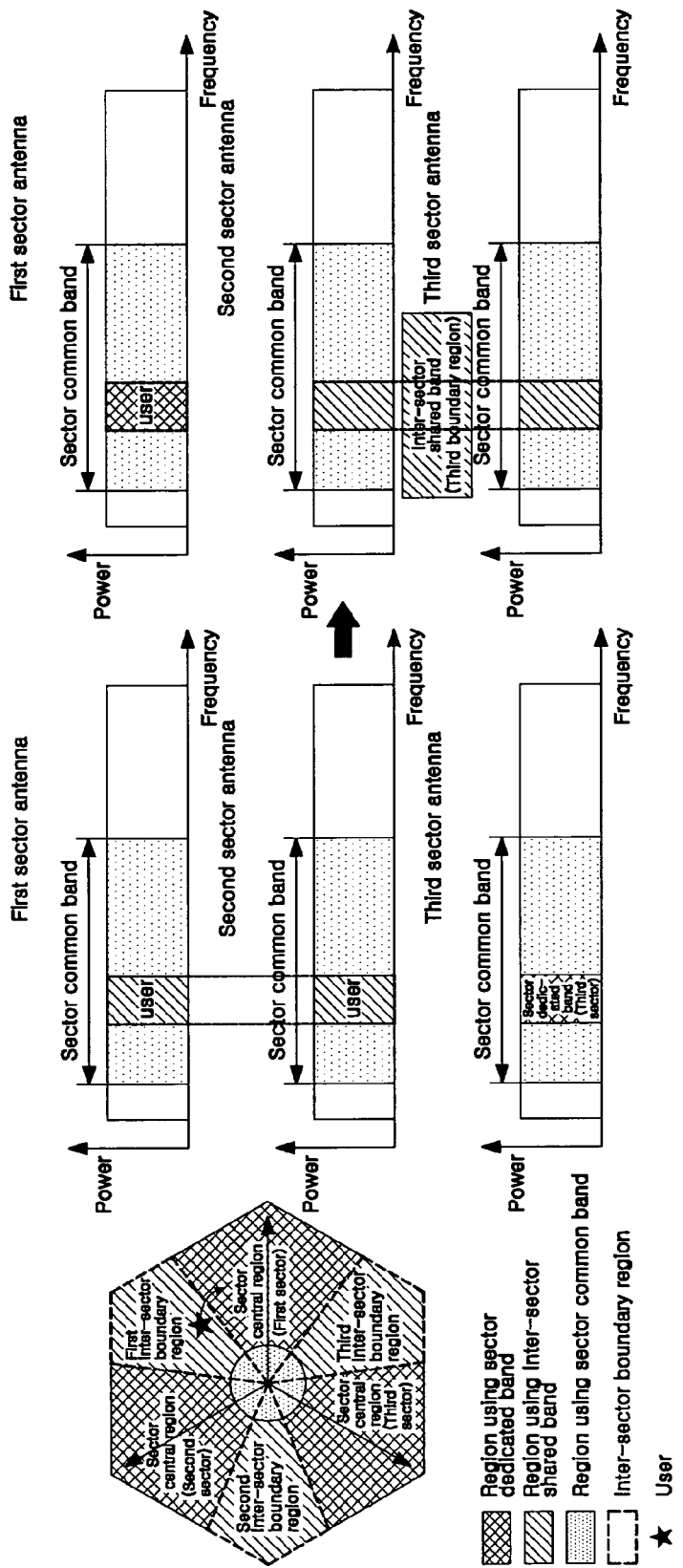

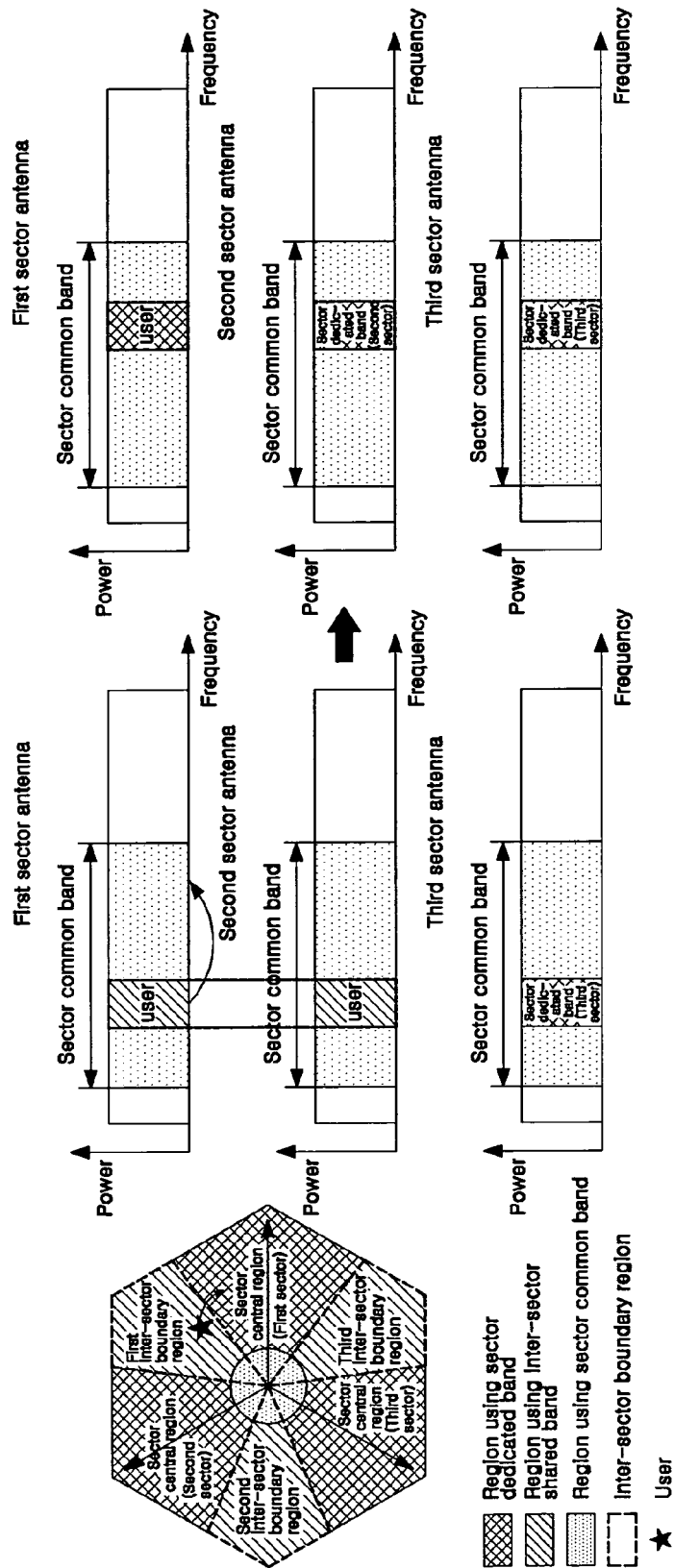
[FIG. 78]

[FIG. 79]
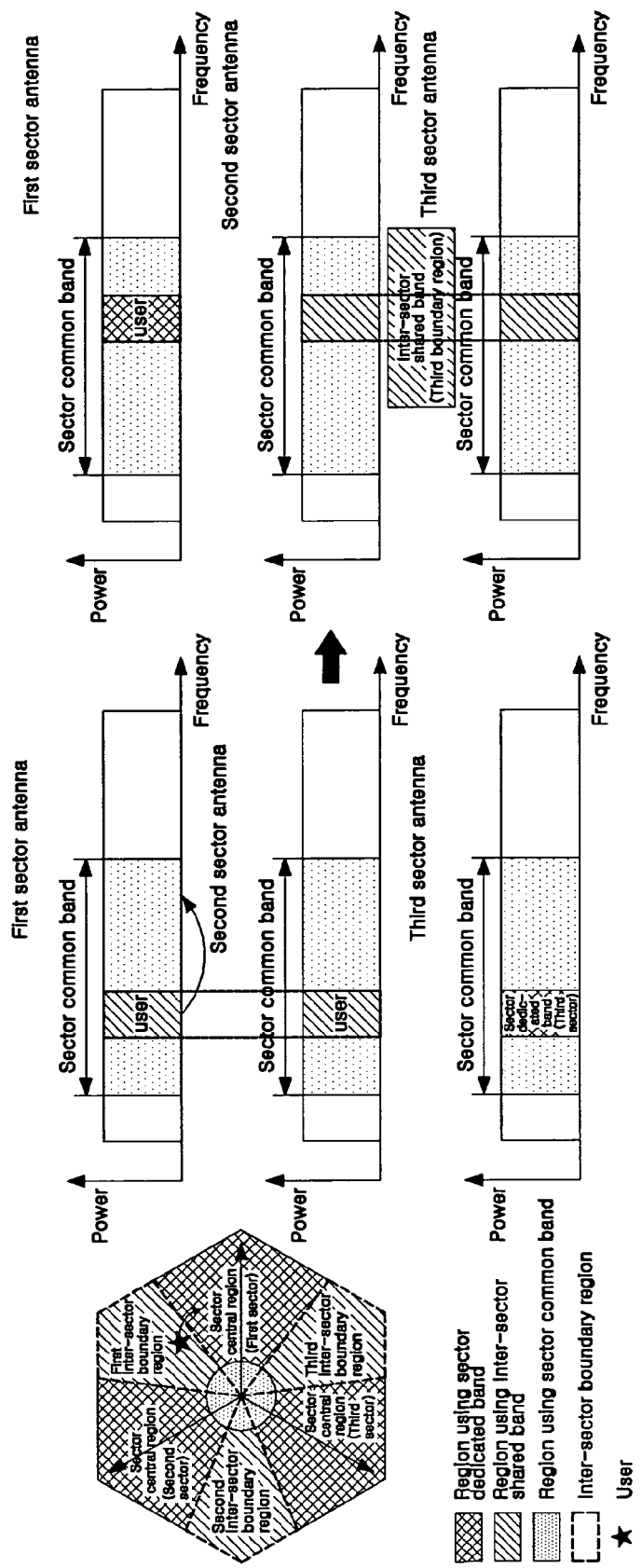

[FIG. 80]
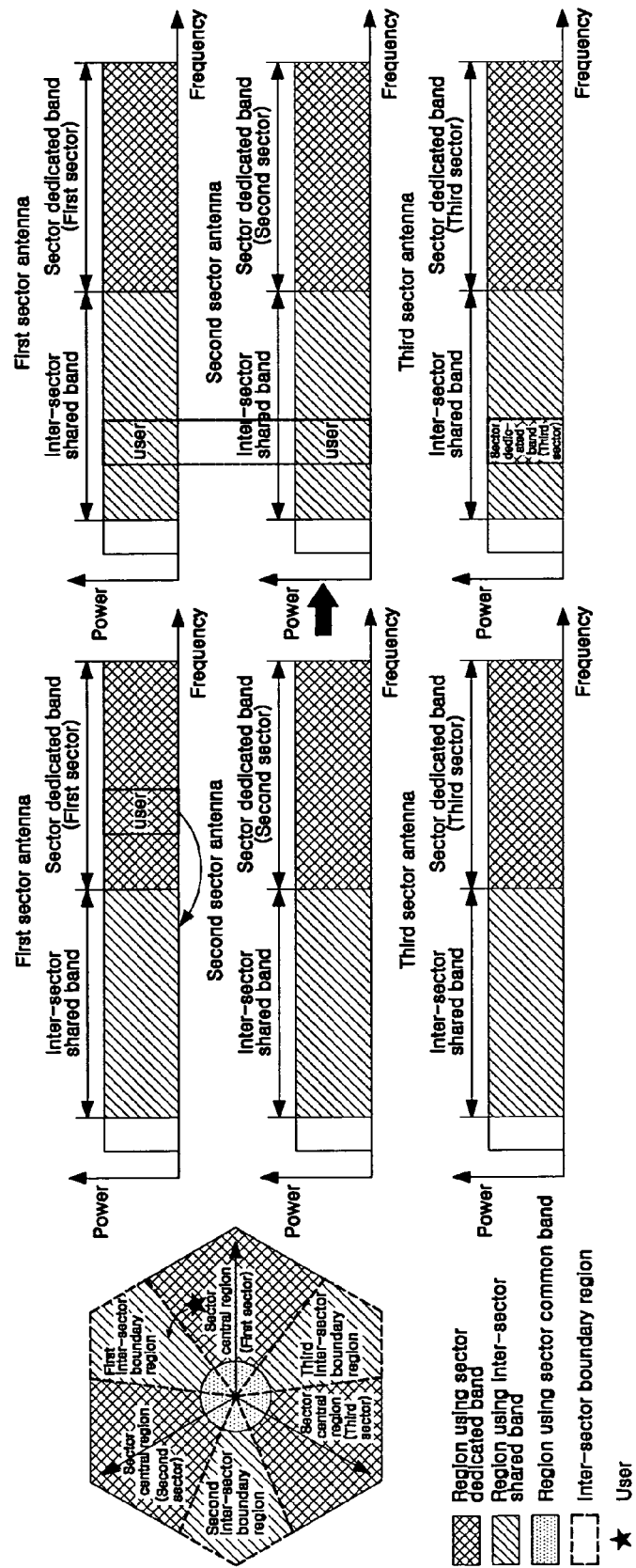

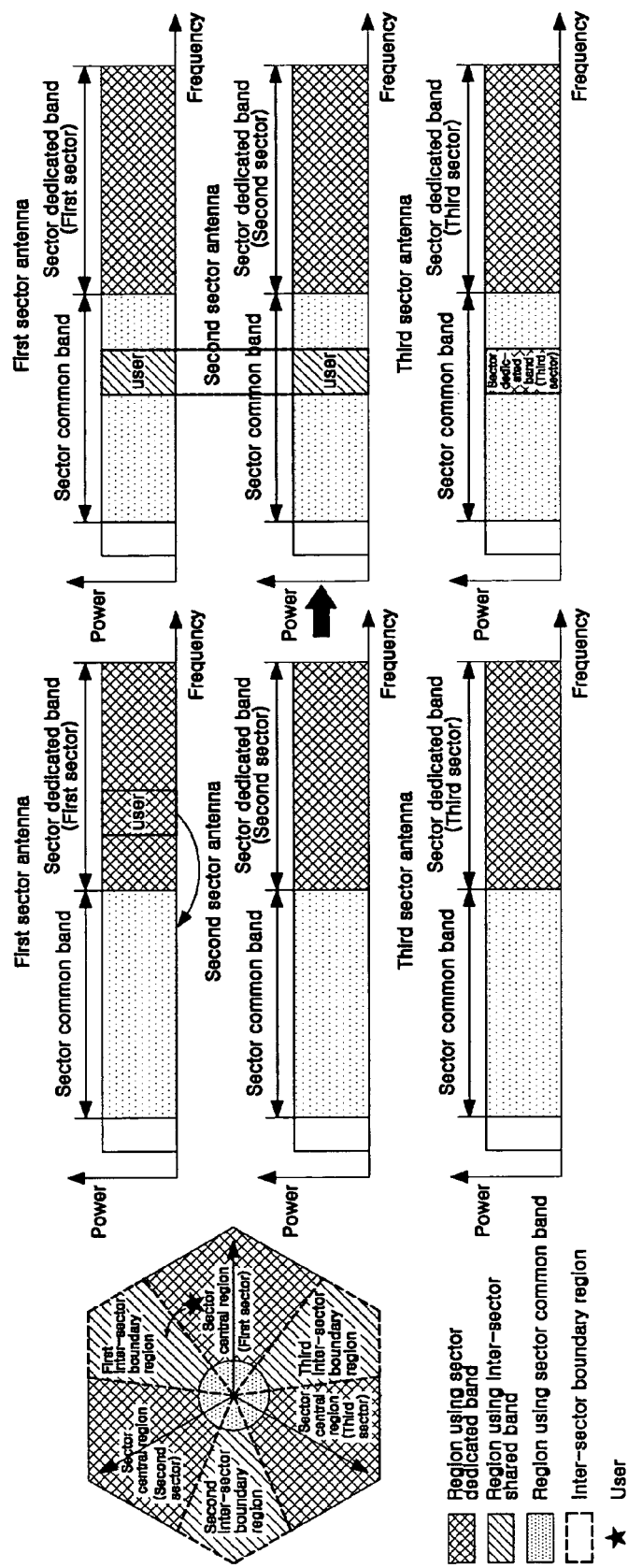
[FIG. 81]

[FIG. 82]
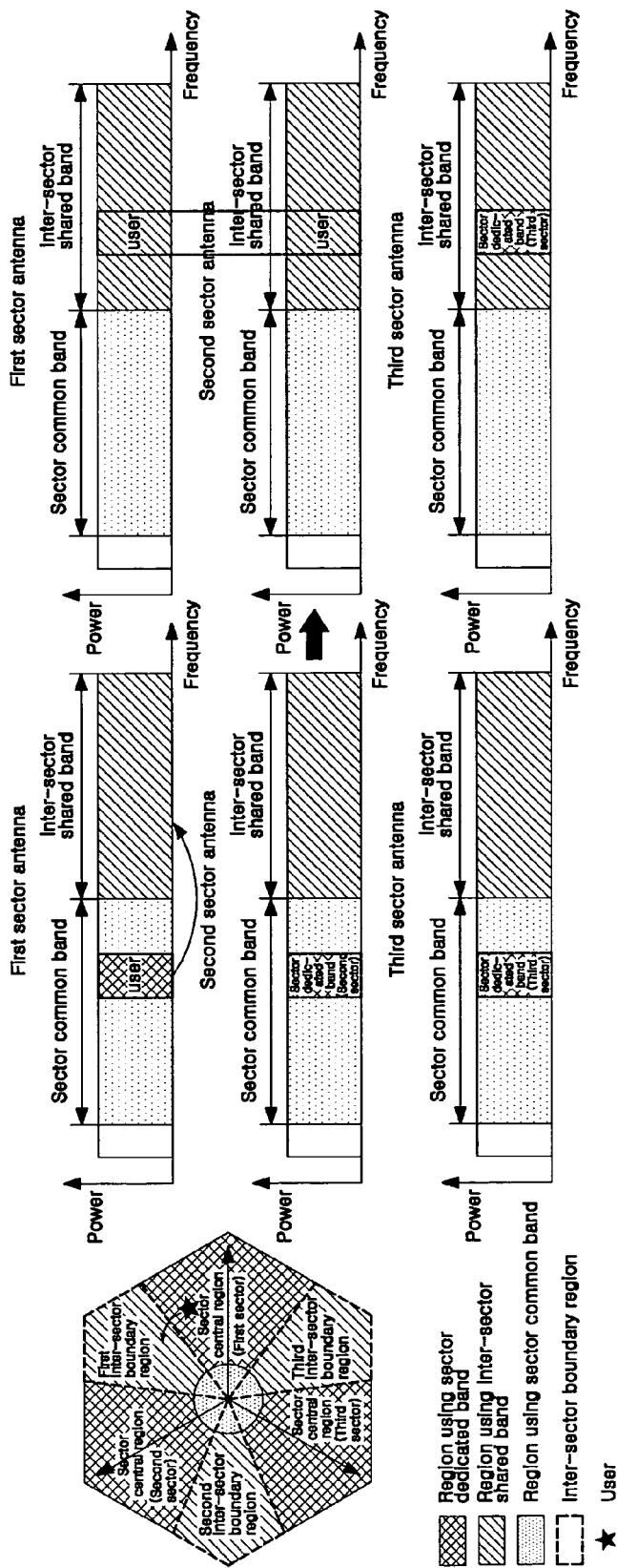

[FIG. 83]
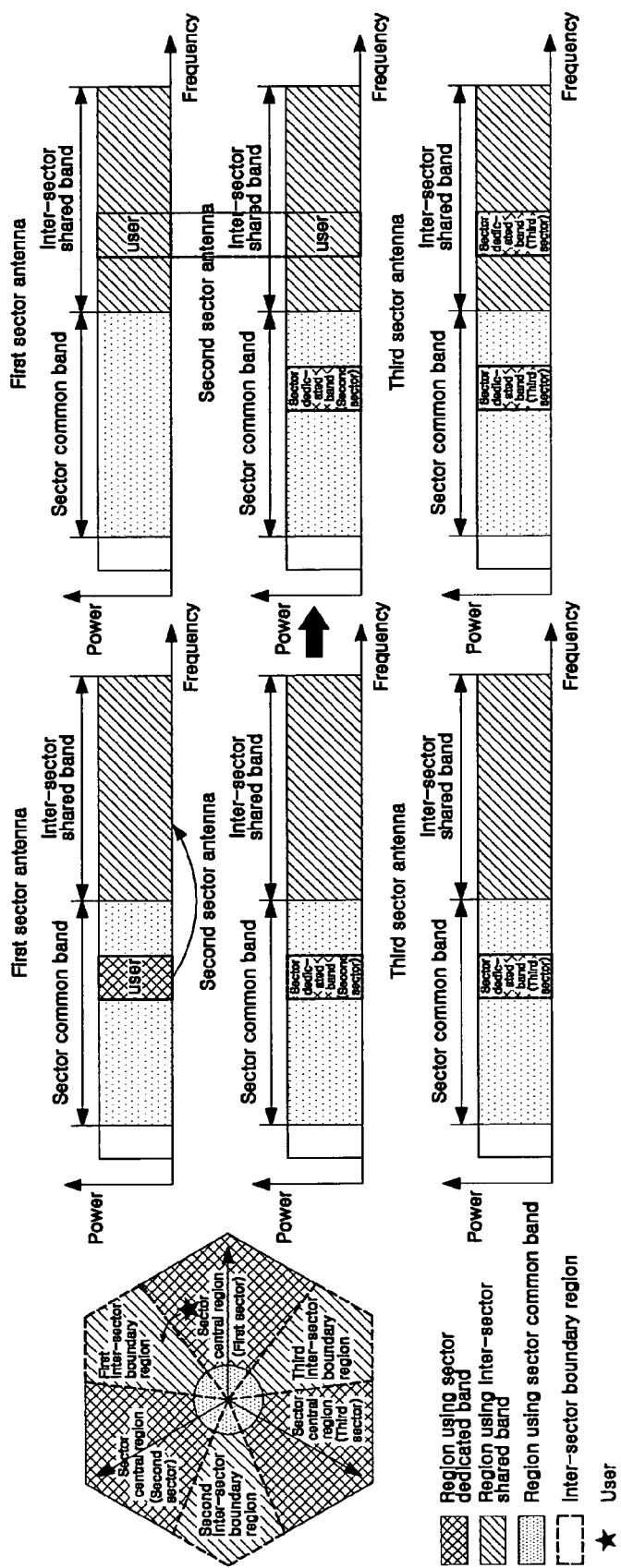

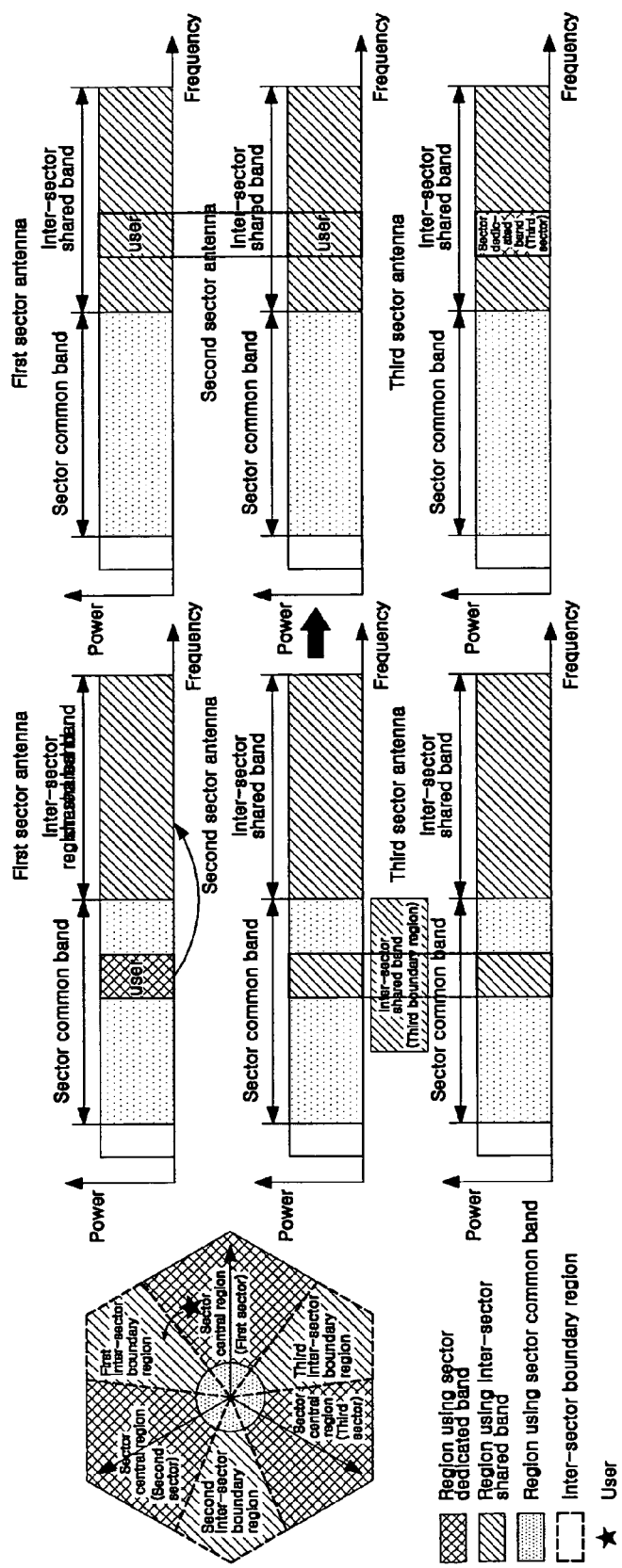
[FIG. 84]

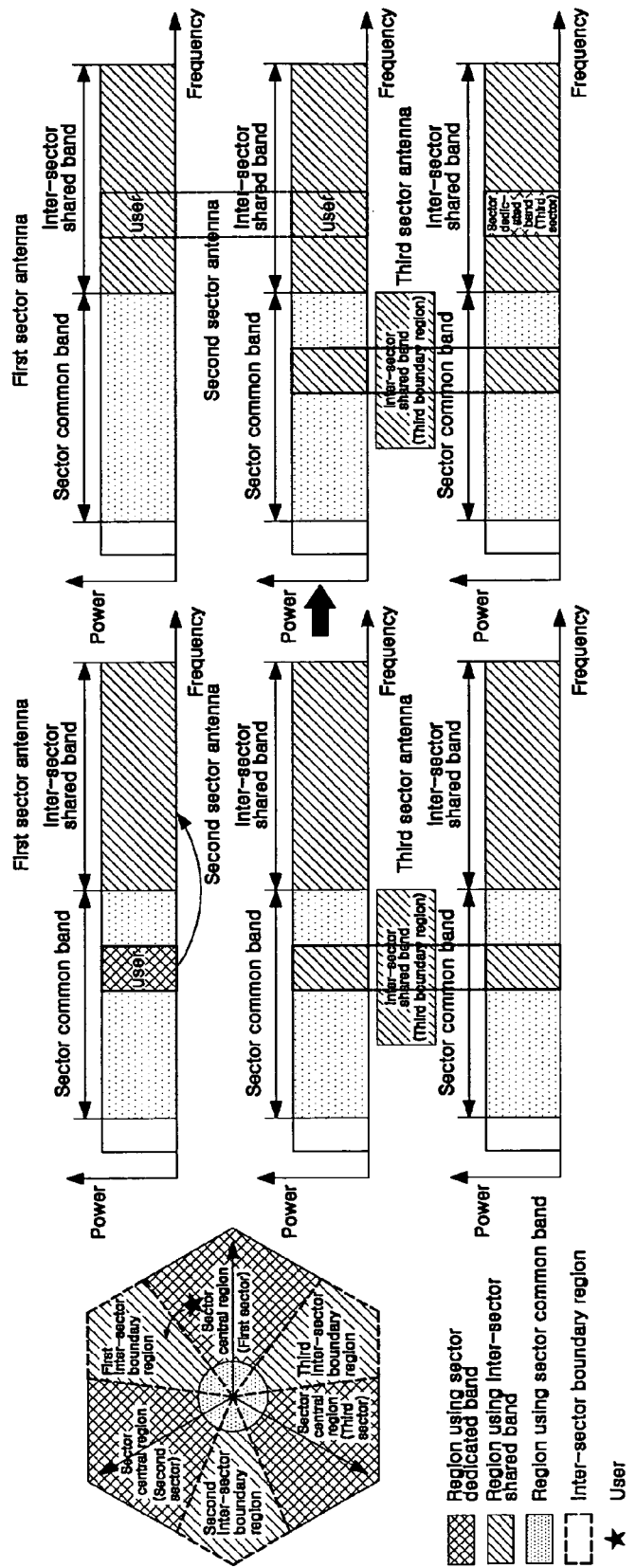
[FIG. 85]

[FIG. 86]
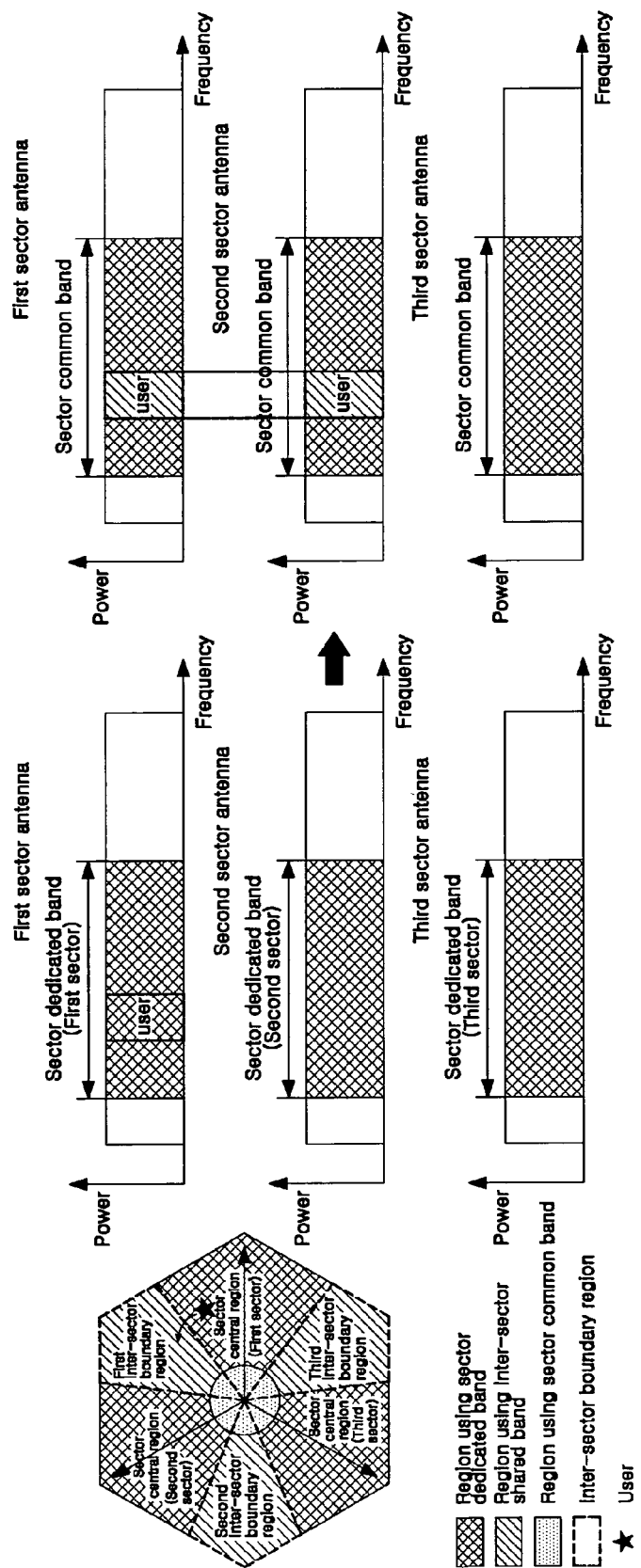

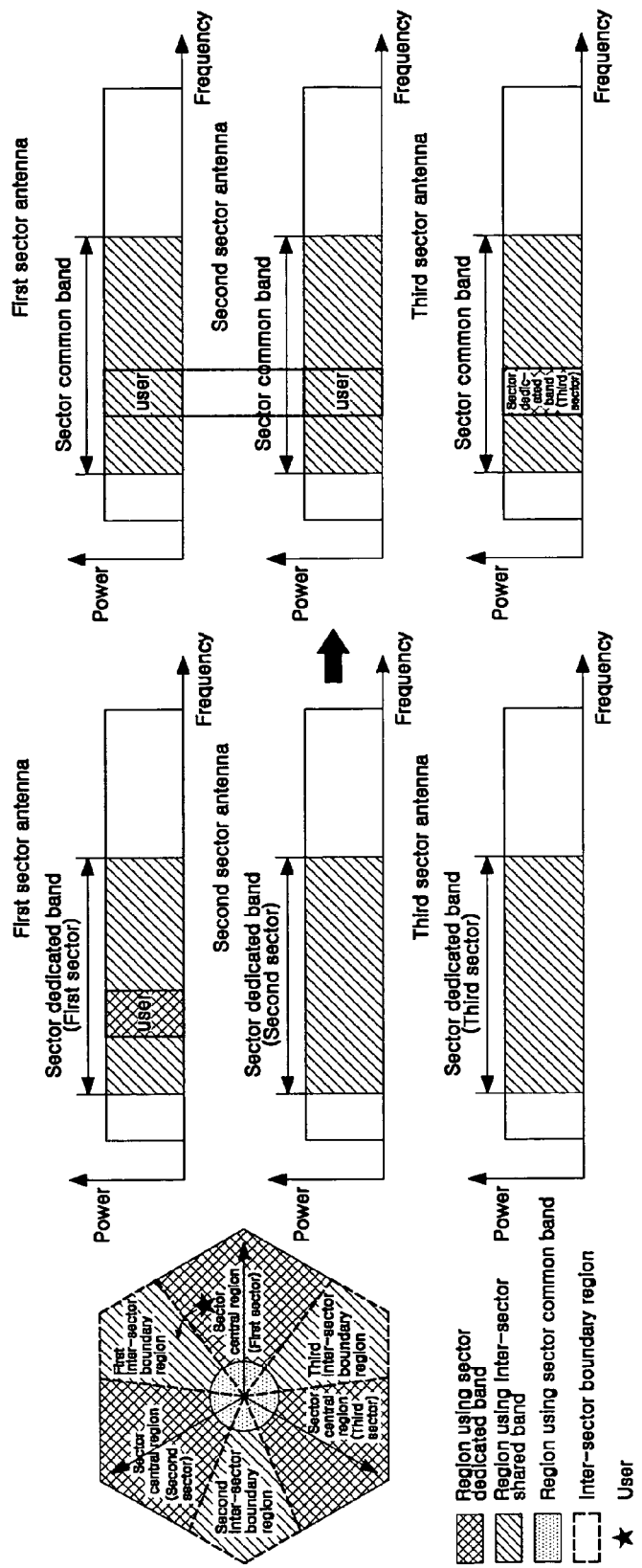
[FIG. 87]

[FIG. 88]
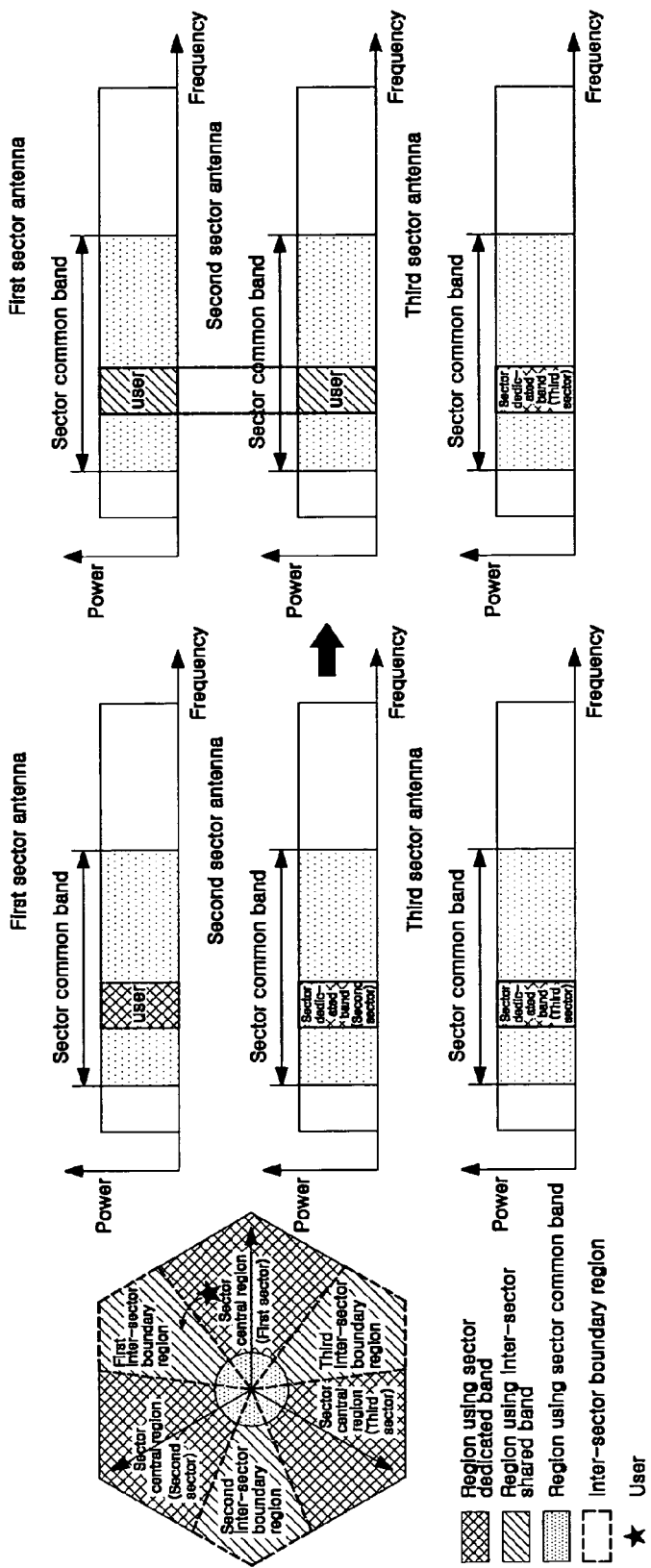

[FIG. 89]
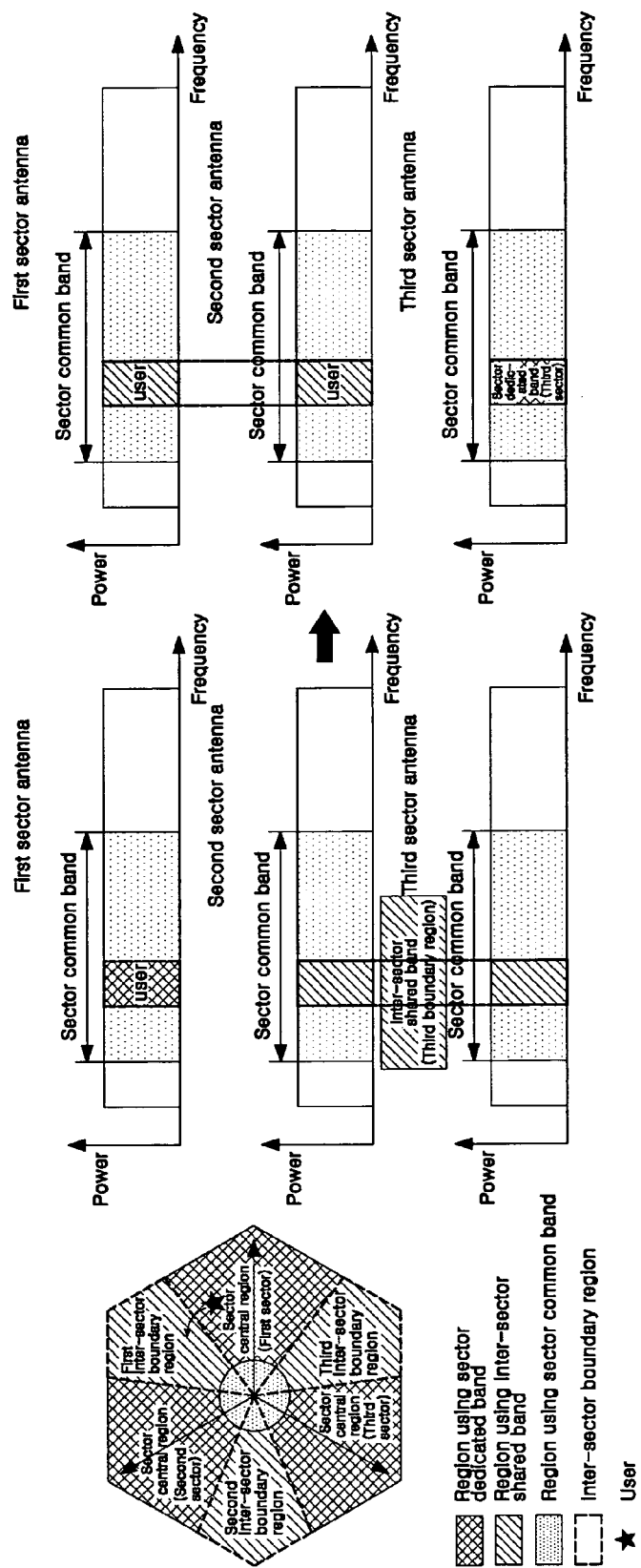

[FIG. 90]
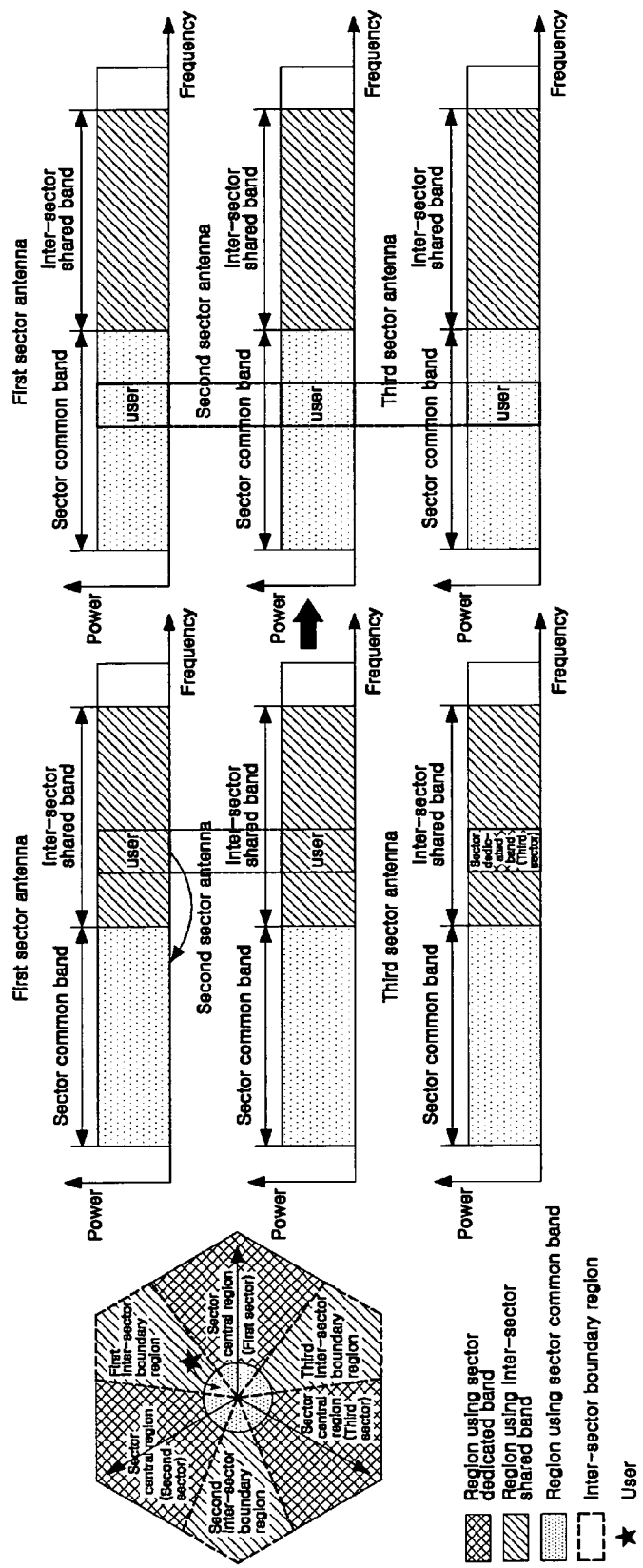

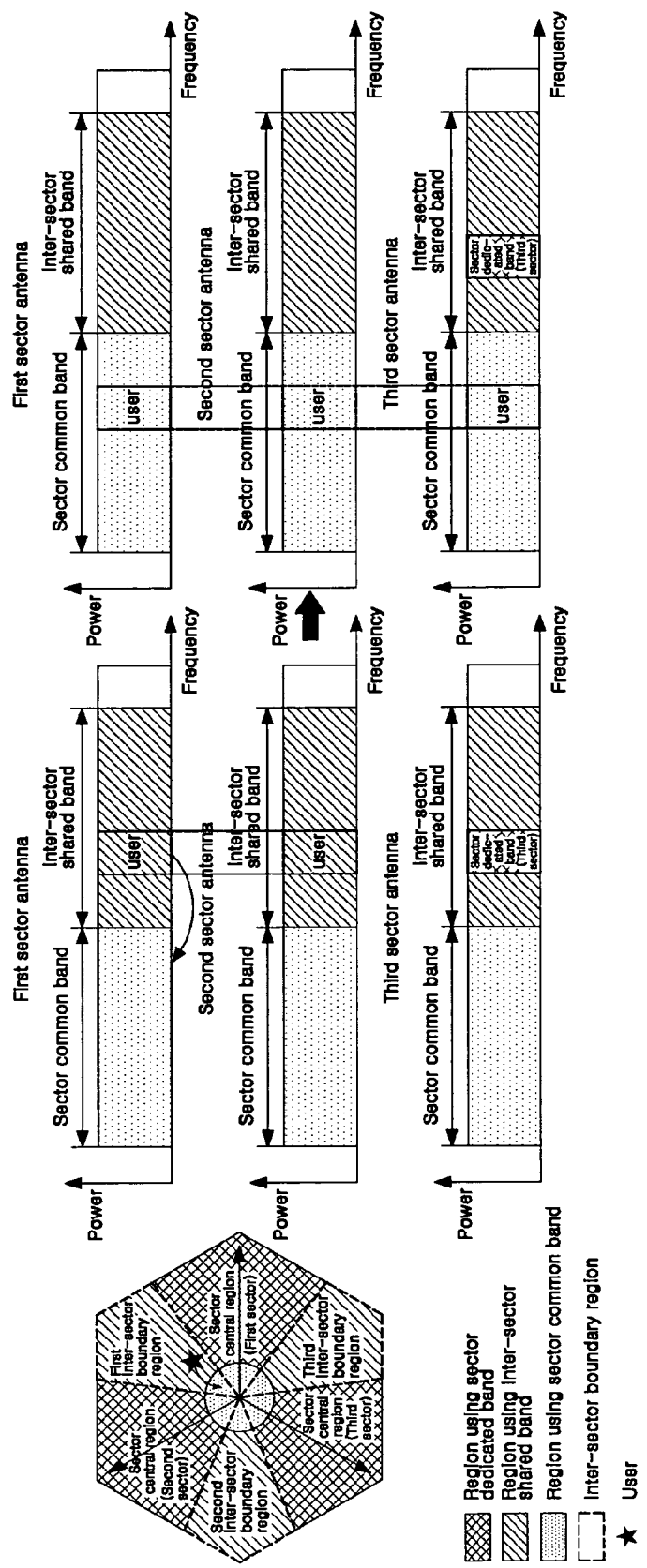
[FIG. 91]

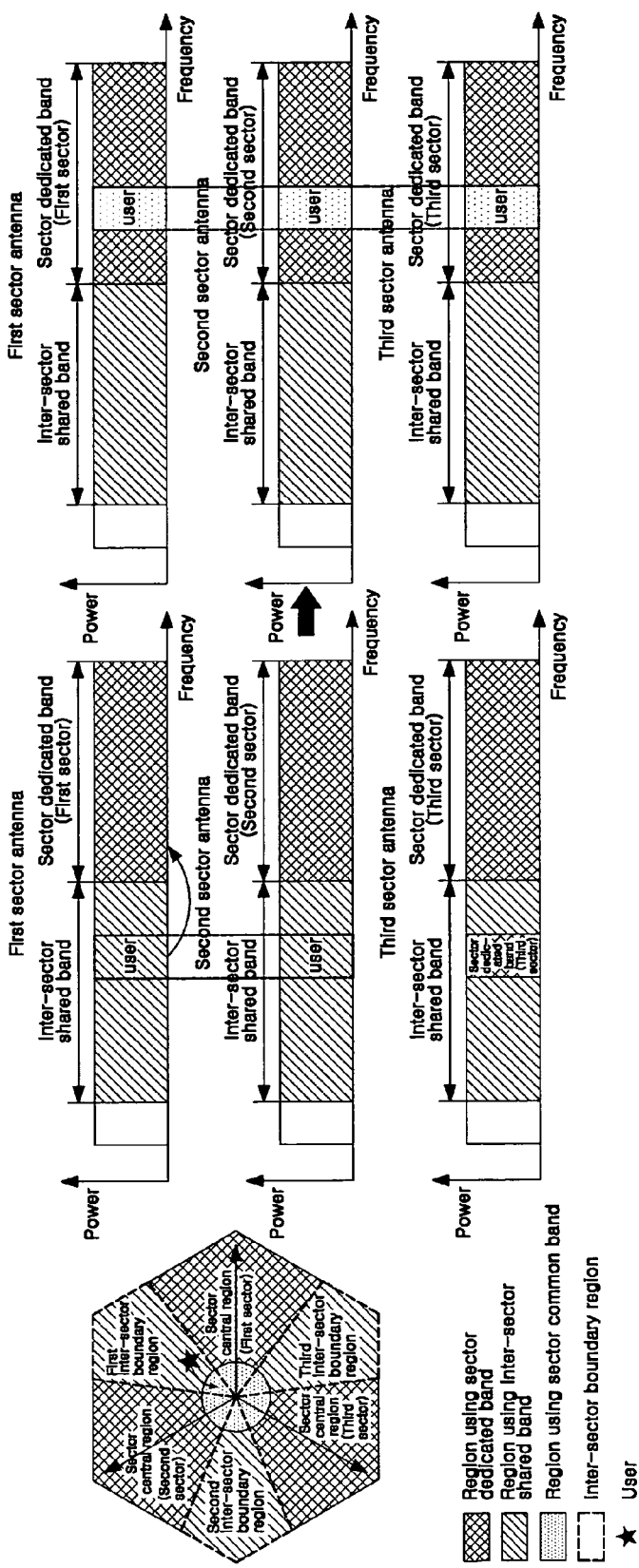
[FIG. 92]

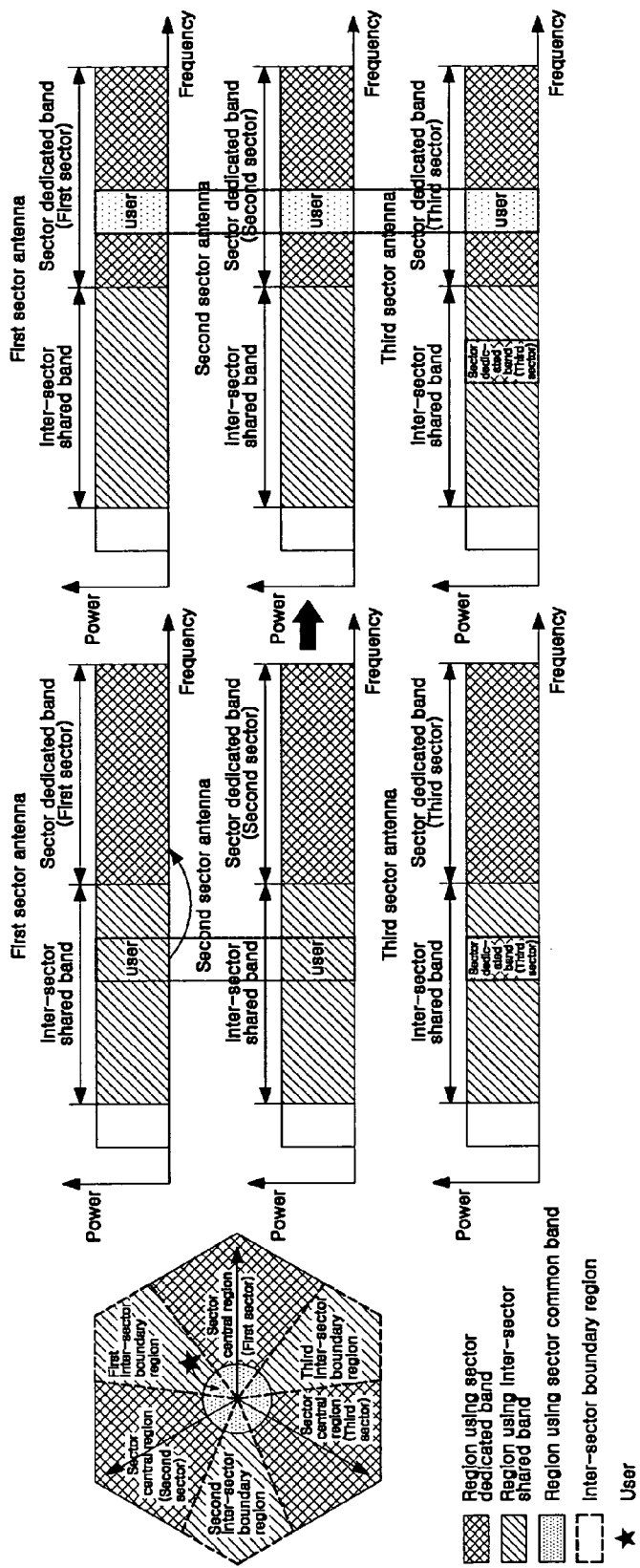
[FIG. 93]

[FIG. 94]
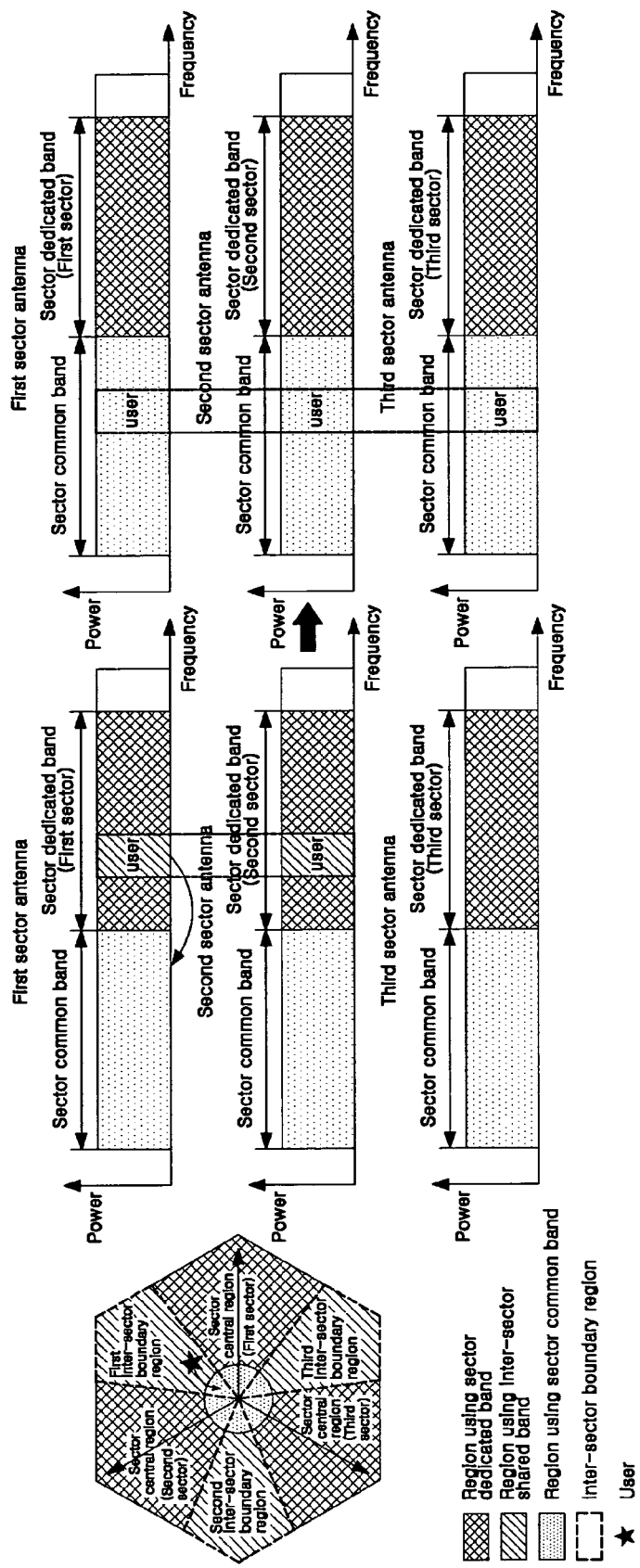

[FIG. 95]
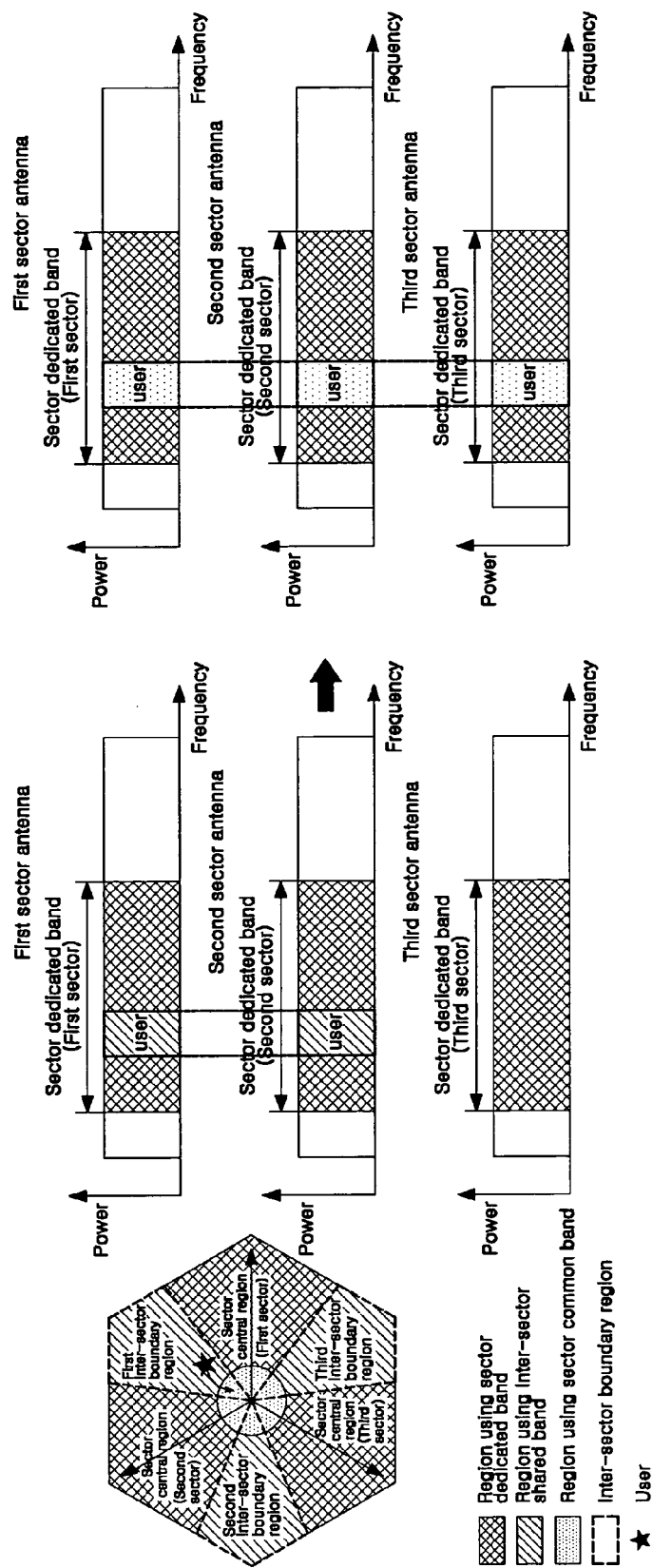

[FIG. 96]
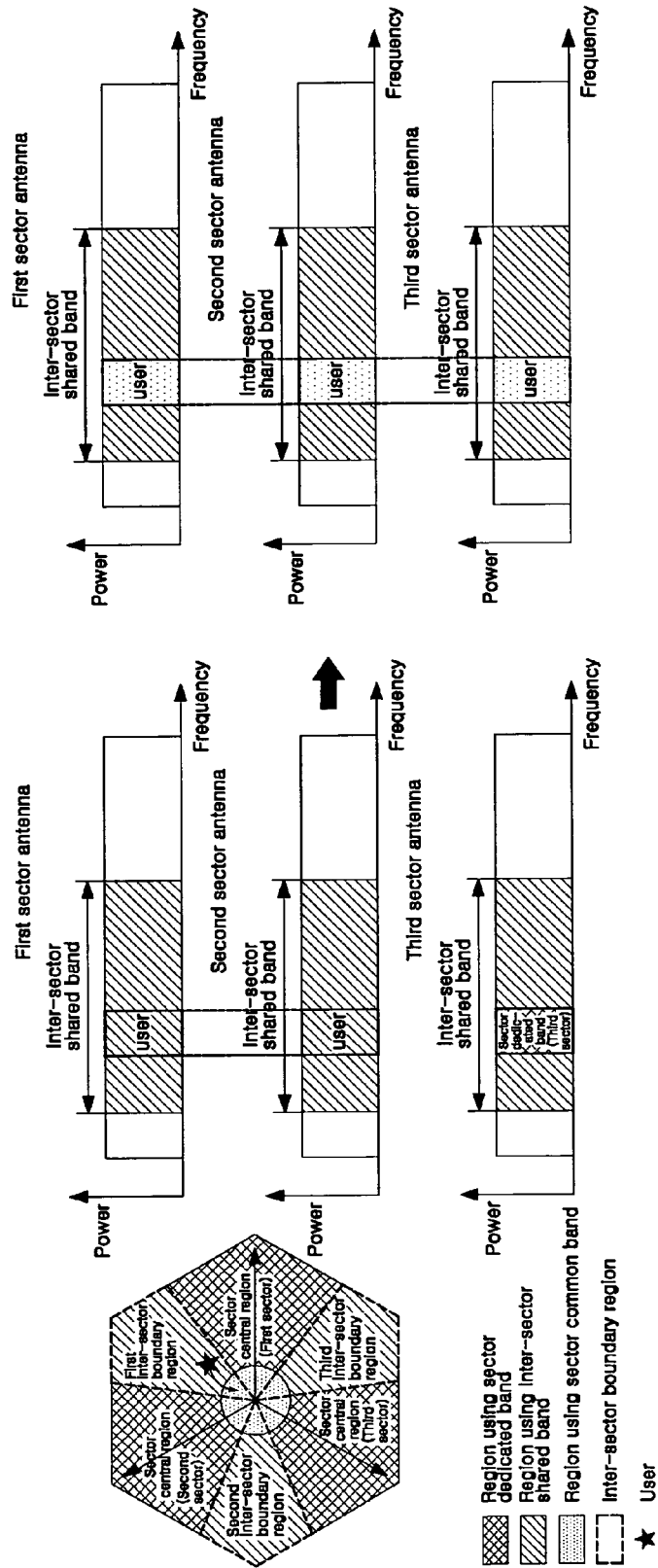

[FIG. 97]
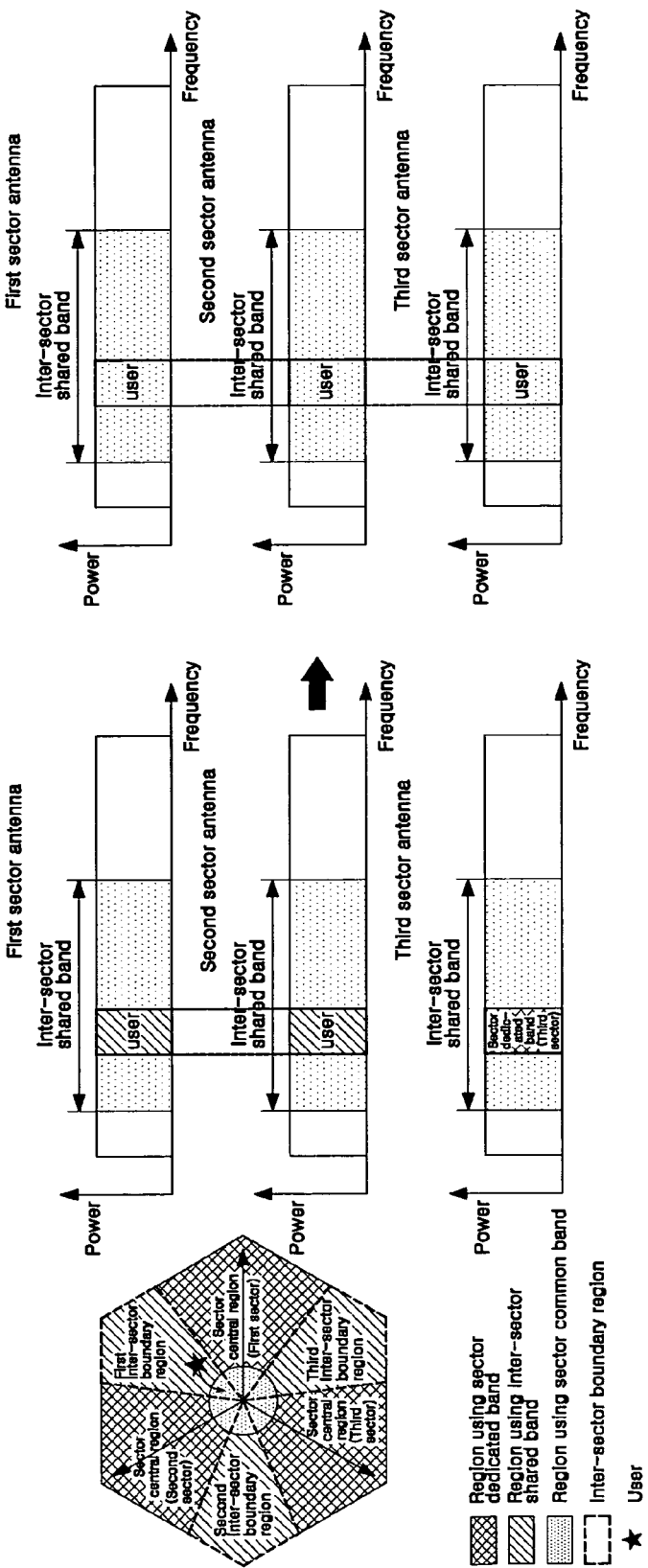

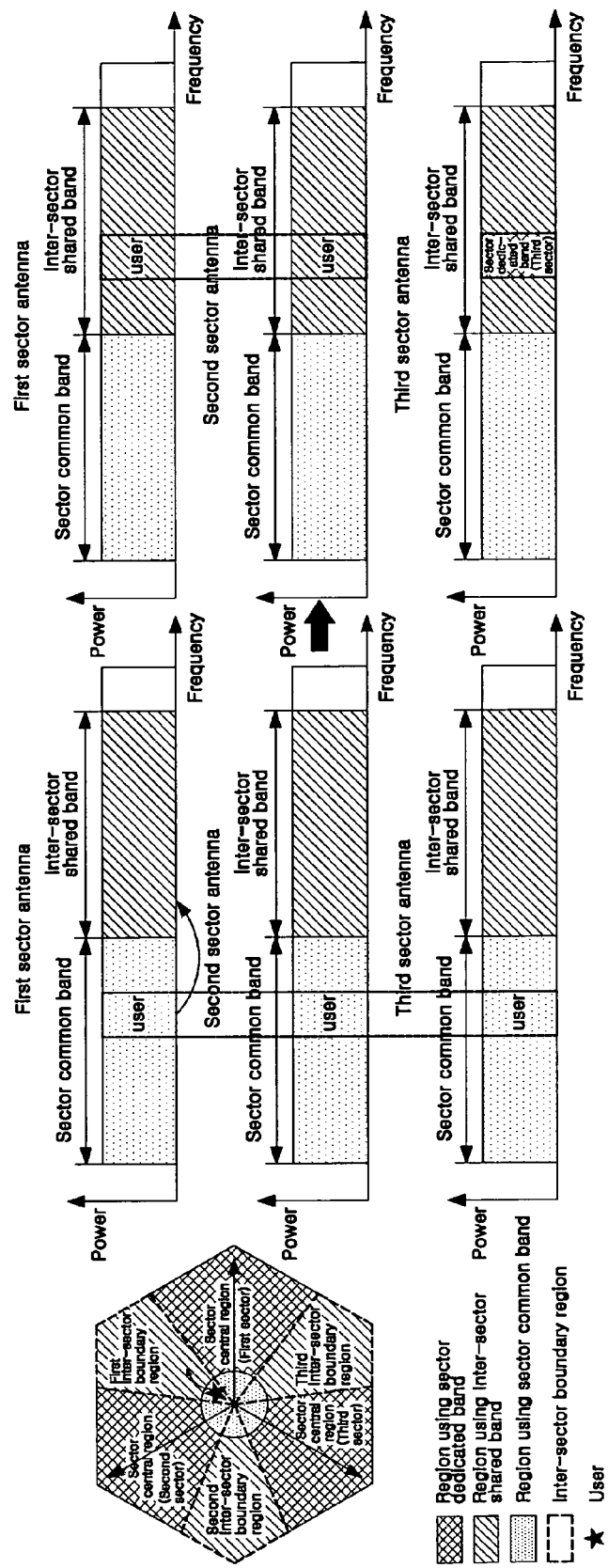
[FIG. 98]

[FIG. 99]
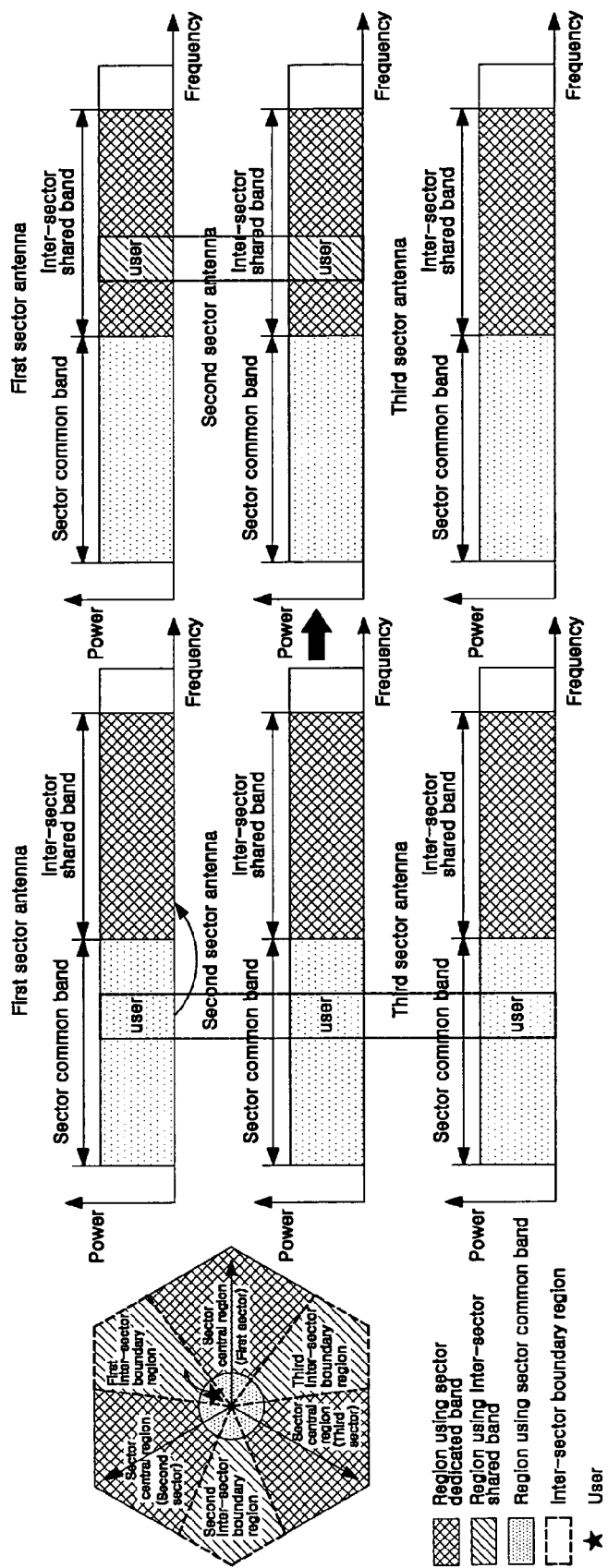

[FIG. 100]
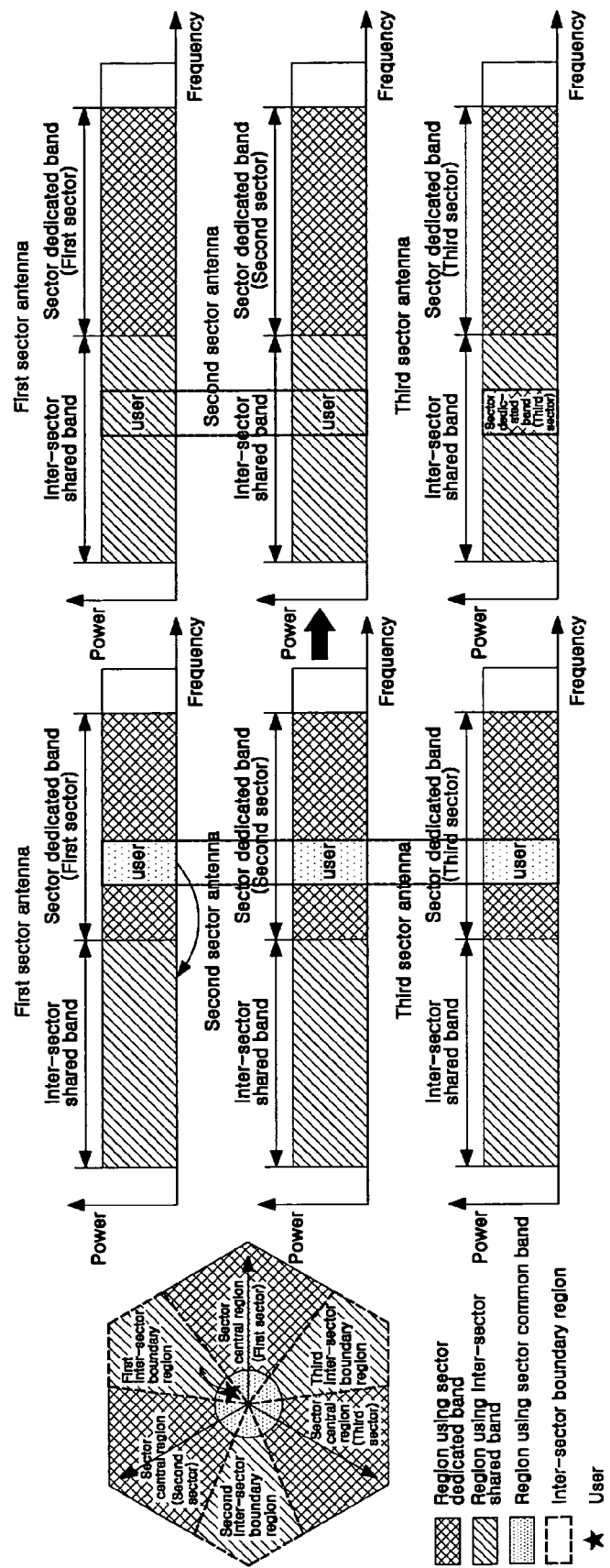

[FIG. 101]
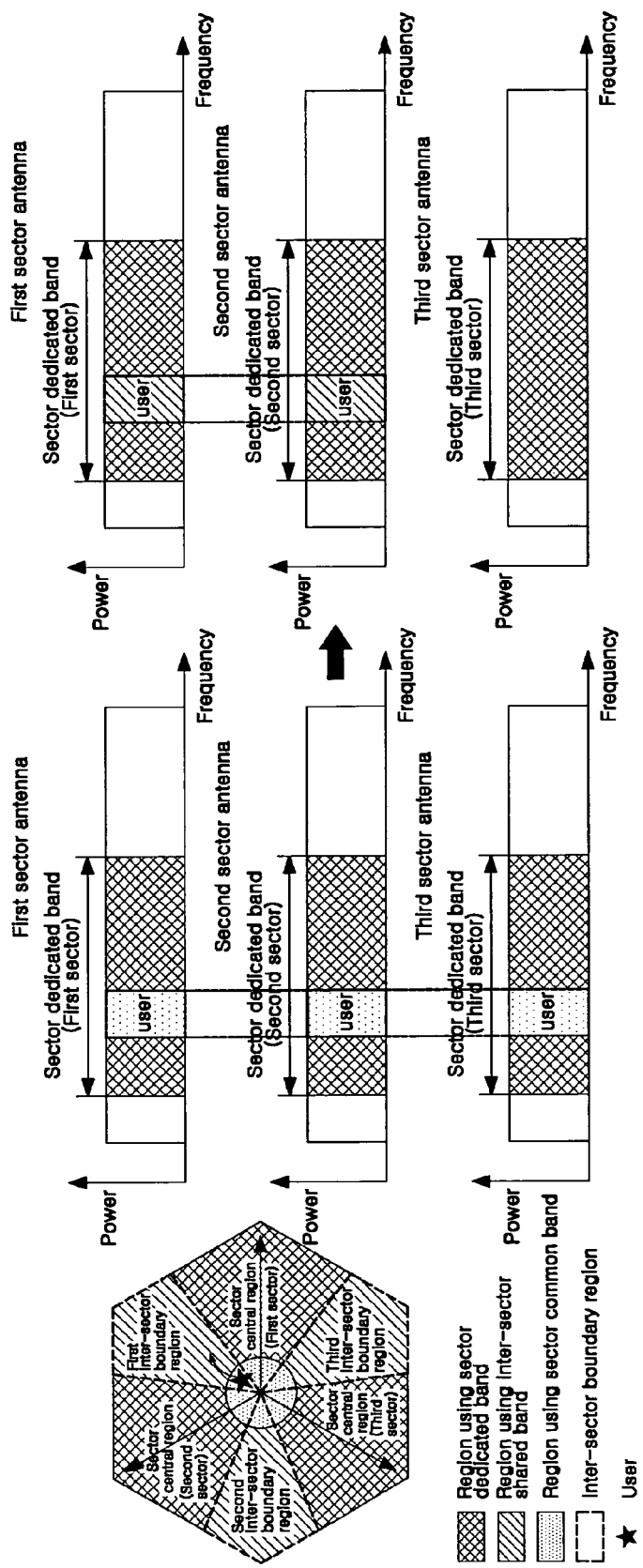

[FIG. 102]
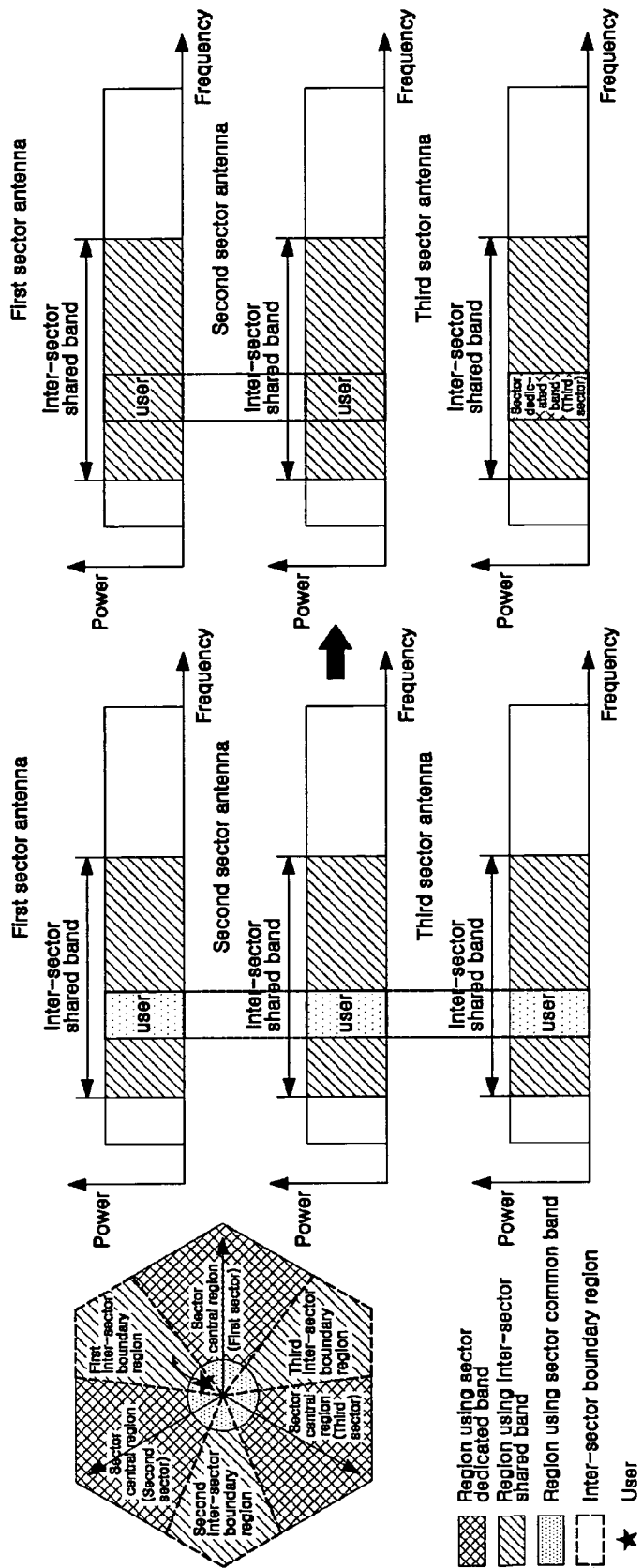

[FIG. 103]
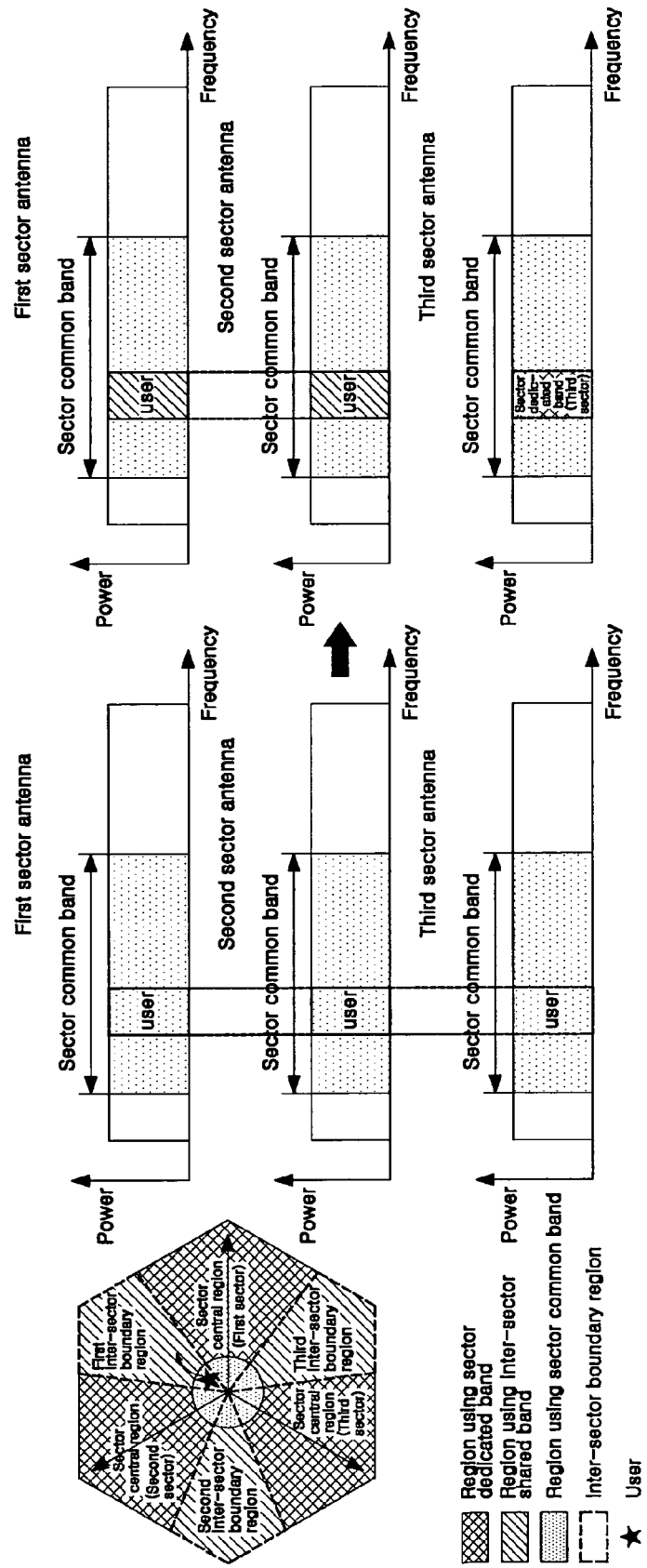

[FIG. 104]
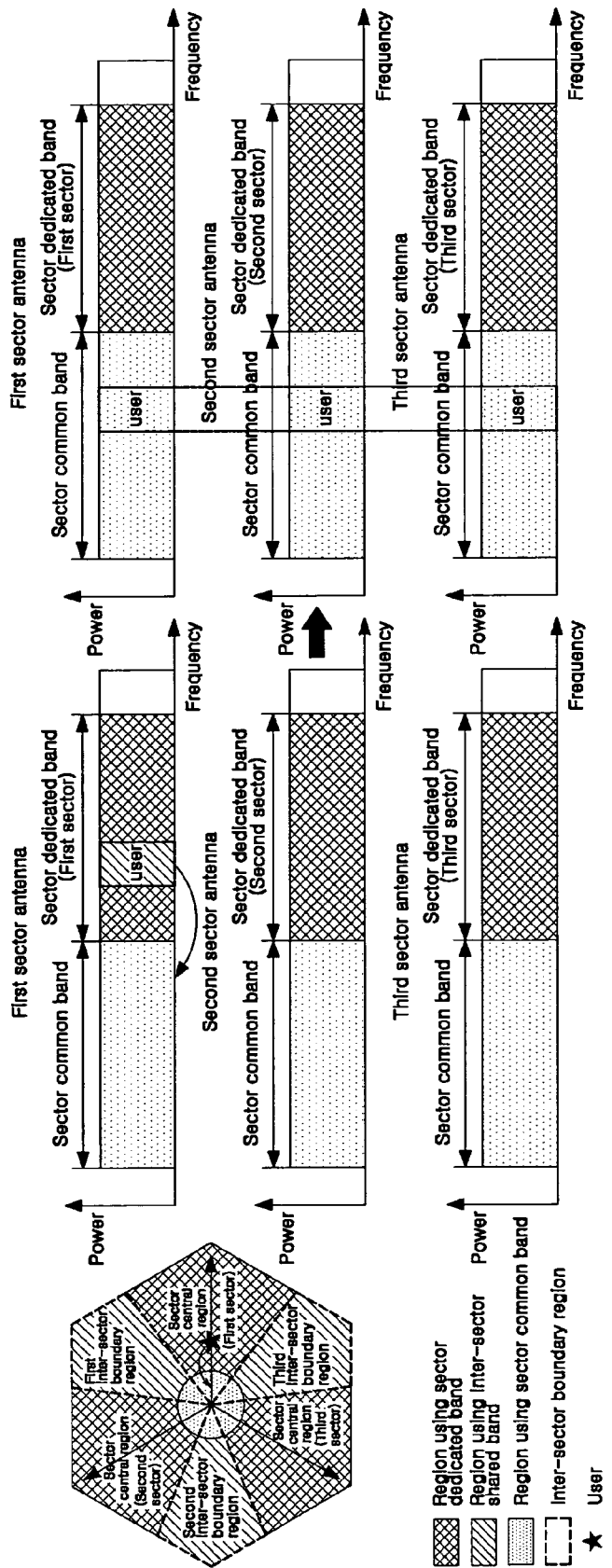

[FIG. 105]
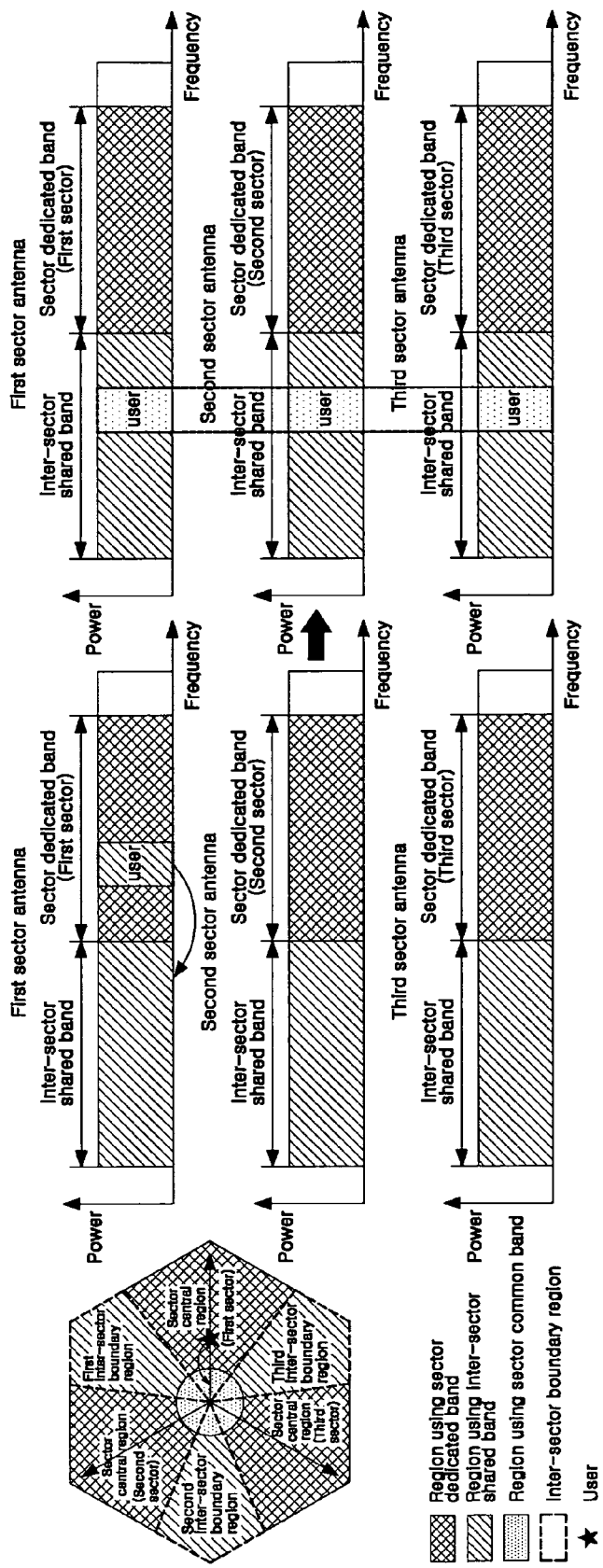

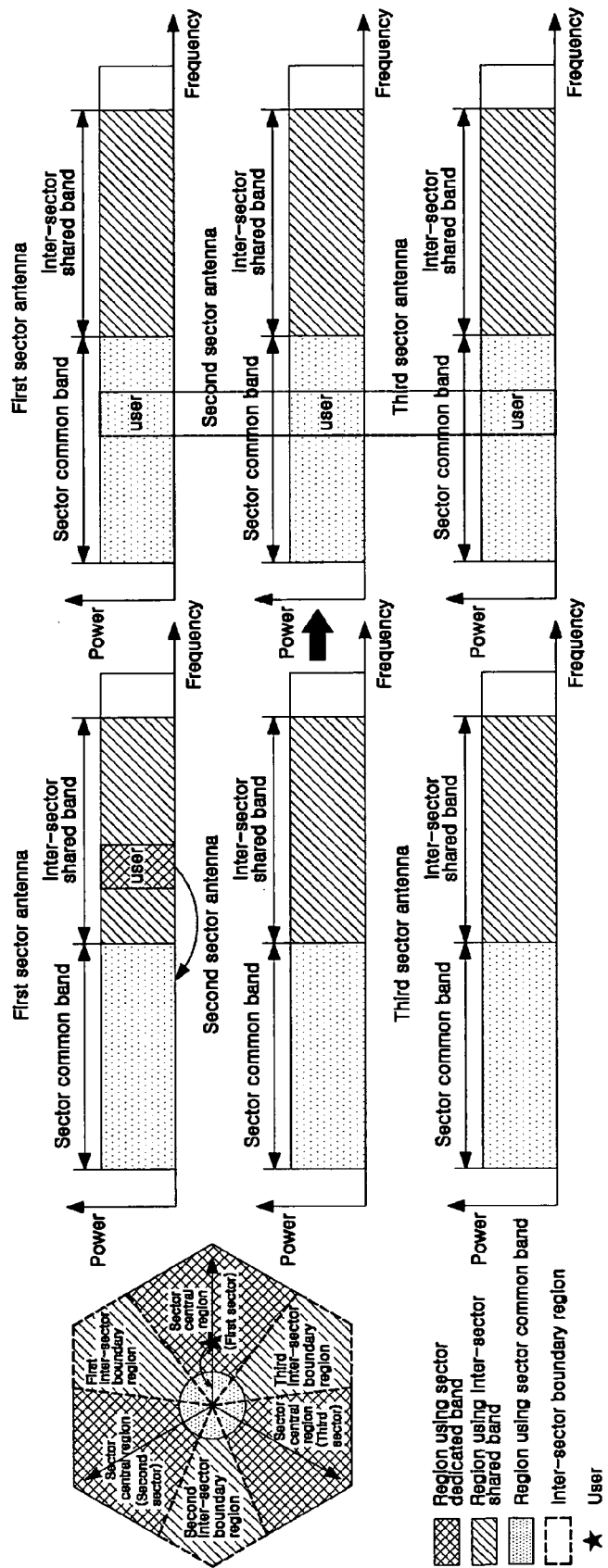
[FIG. 106]

[FIG. 107]
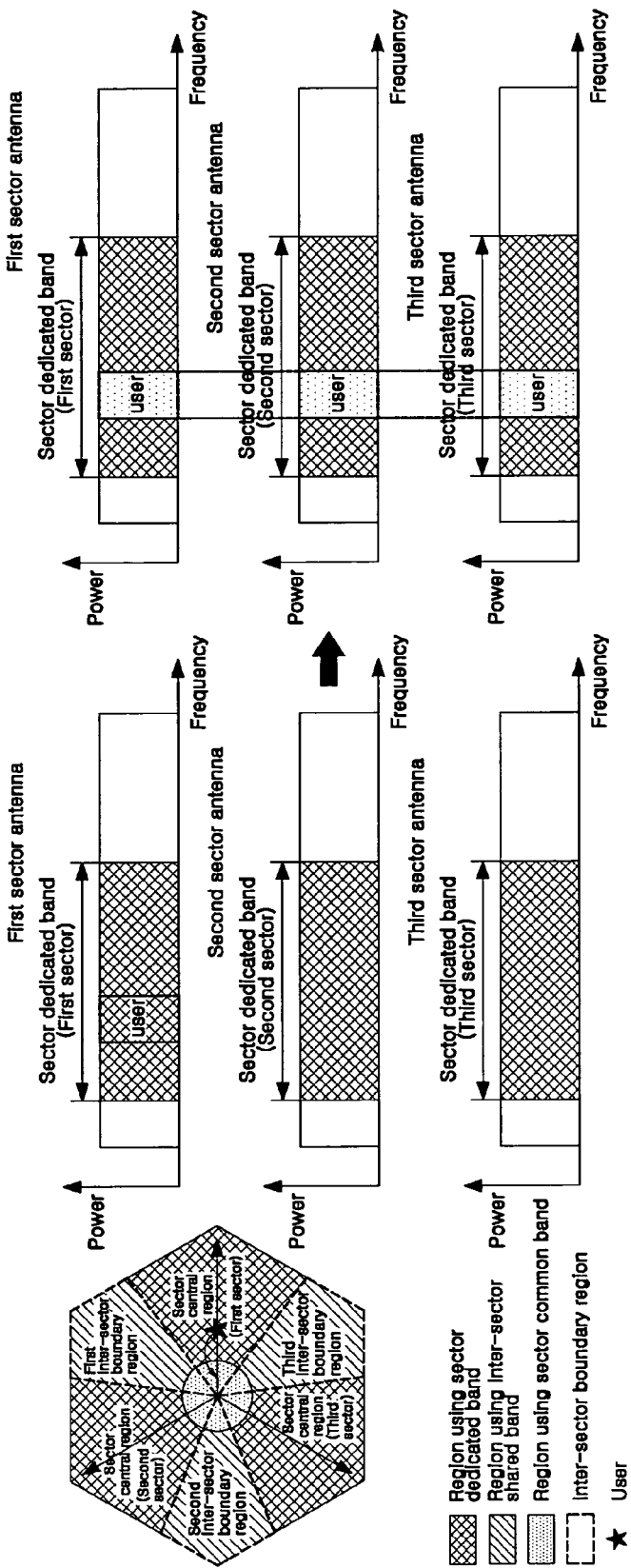

[FIG. 108]
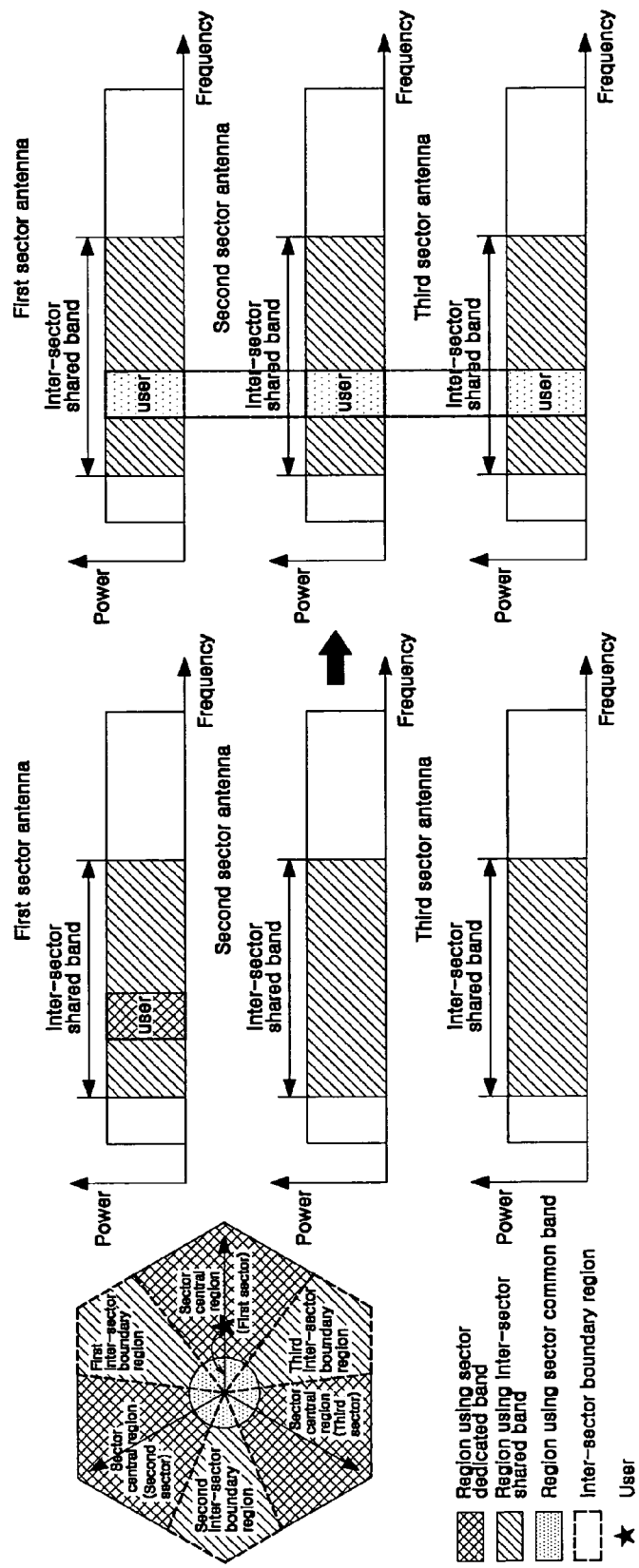

[FIG. 109]
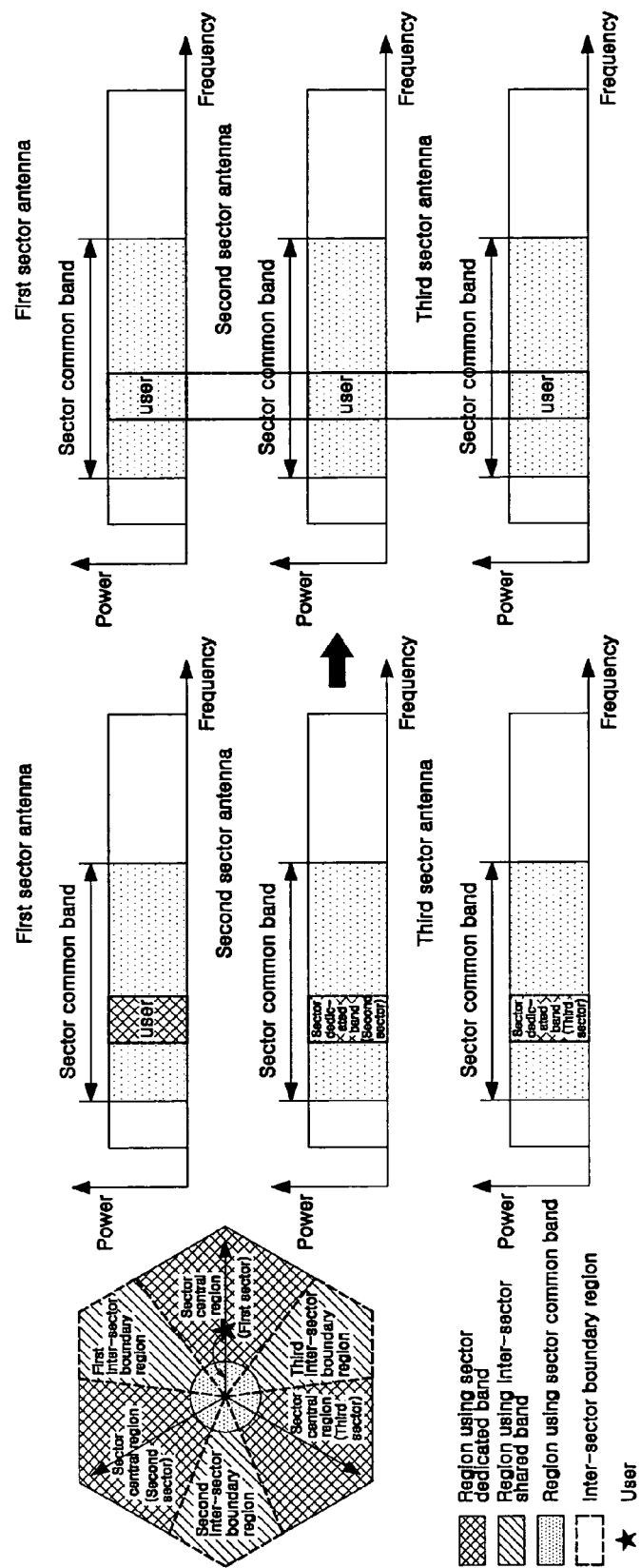

[FIG. 110]
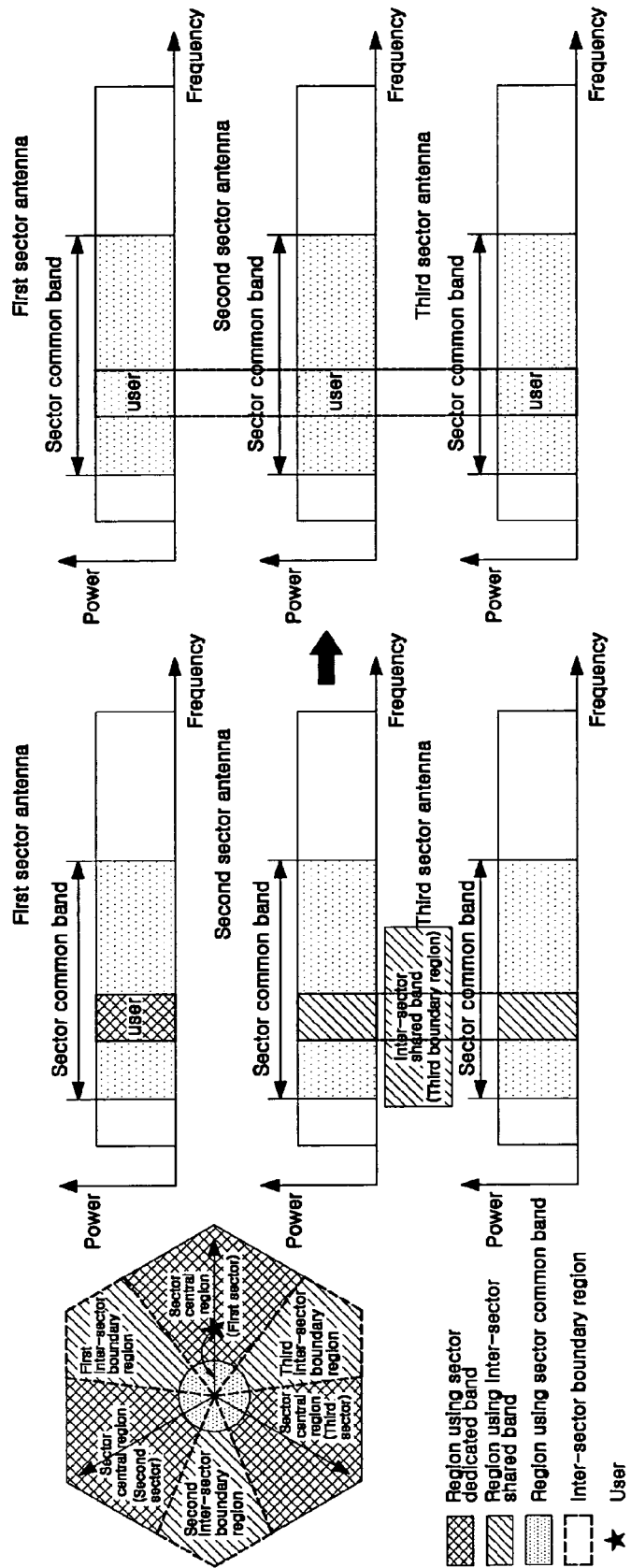

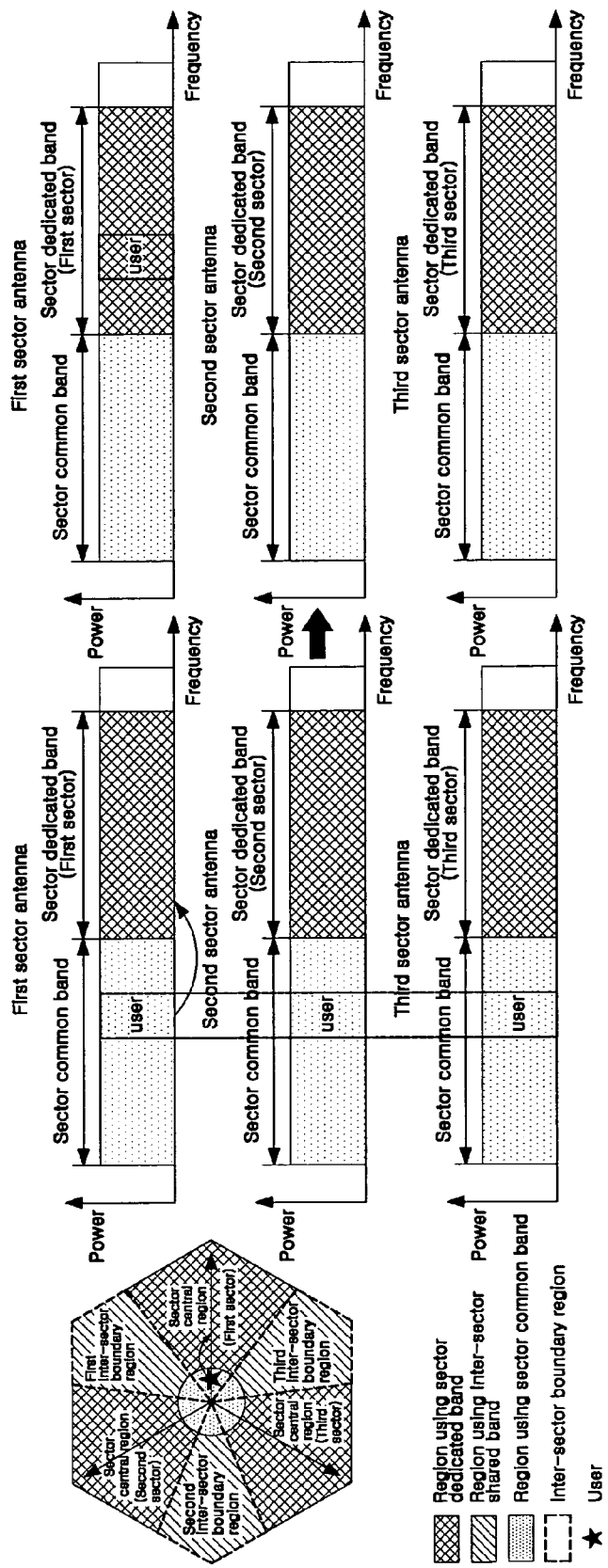
[FIG. 111]

[FIG. 112]
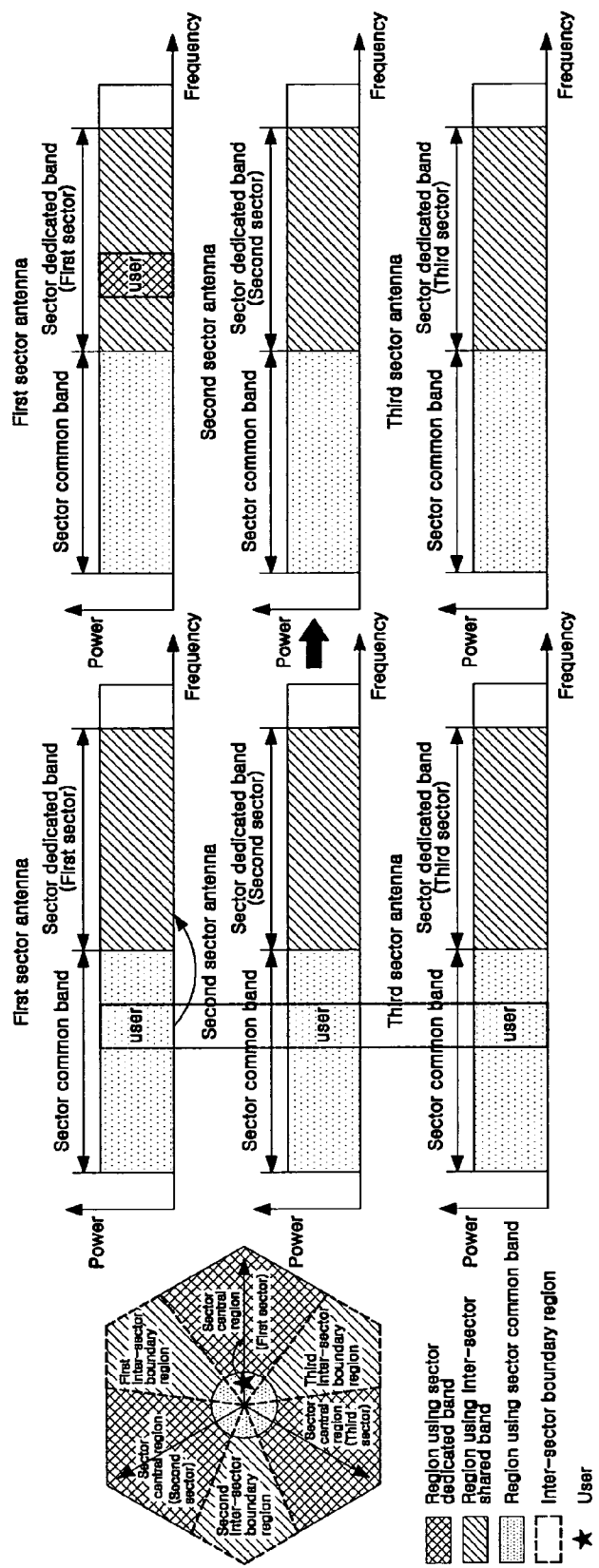

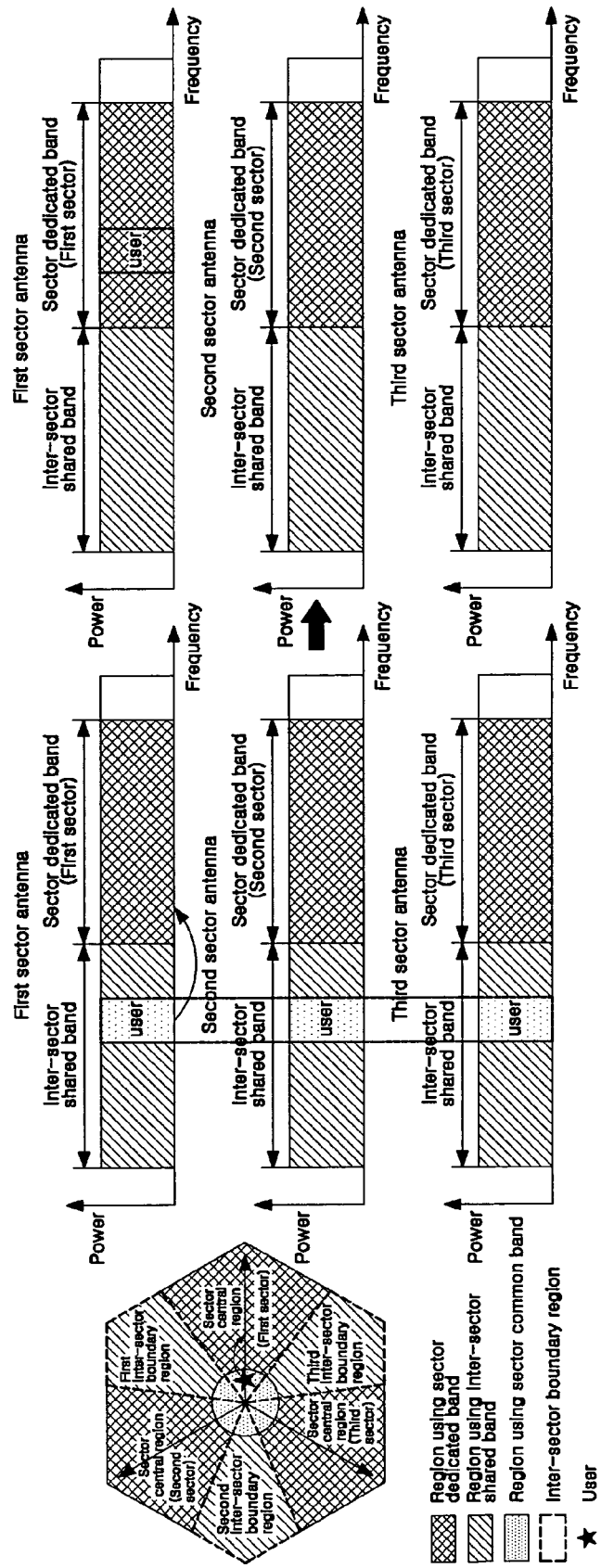
[FIG. 113]

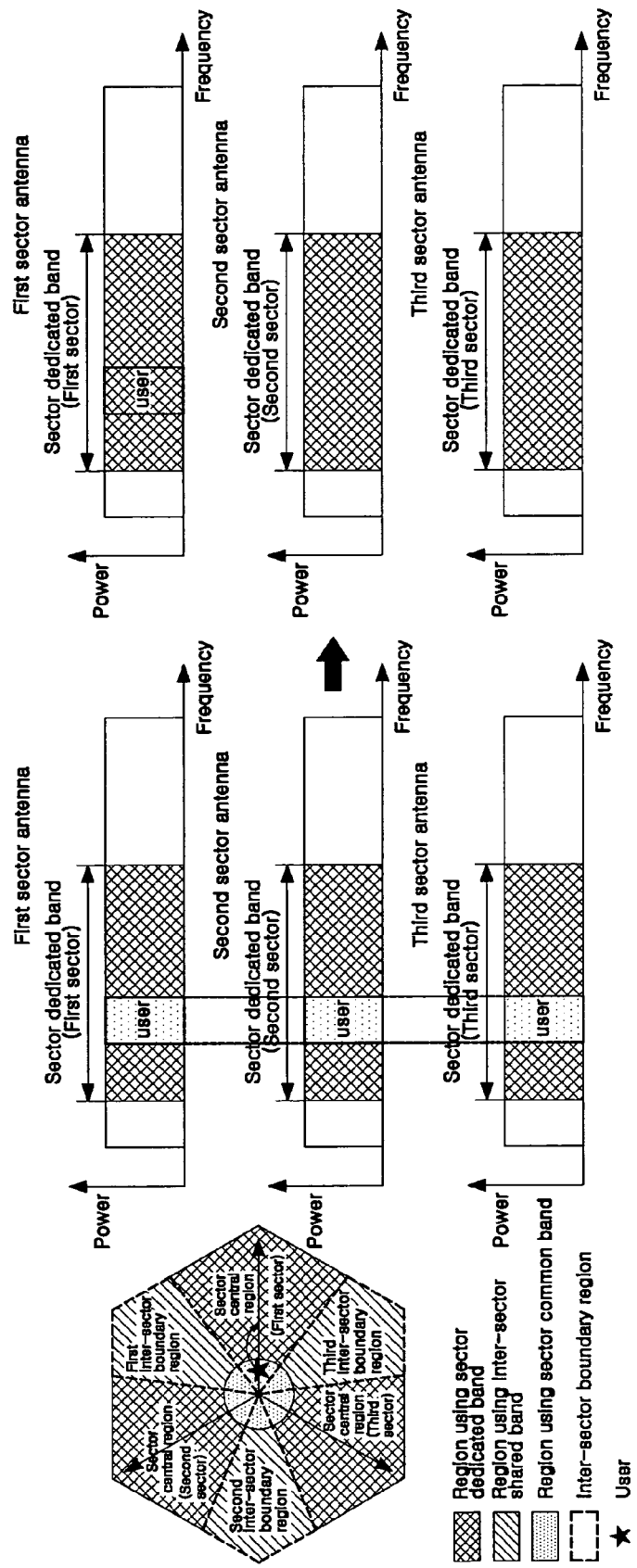
[FIG. 114]

[FIG. 115]
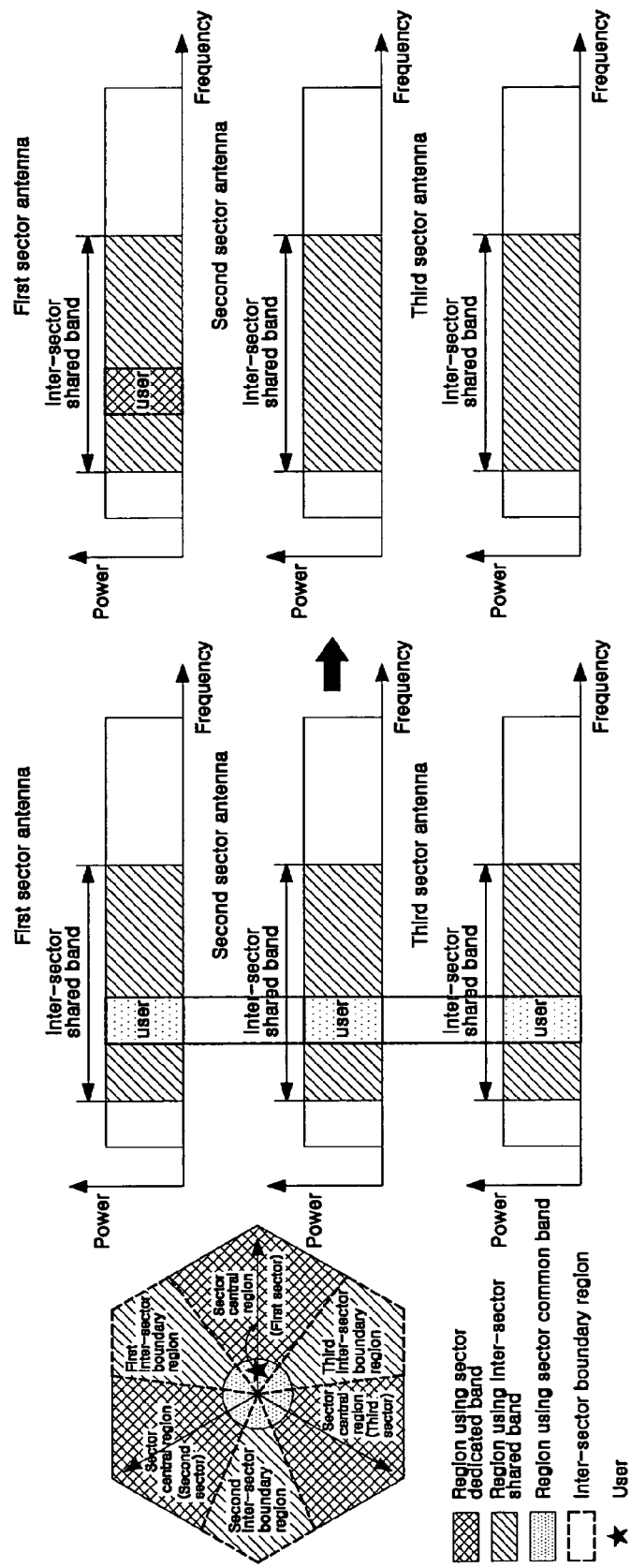

[FIG. 116]
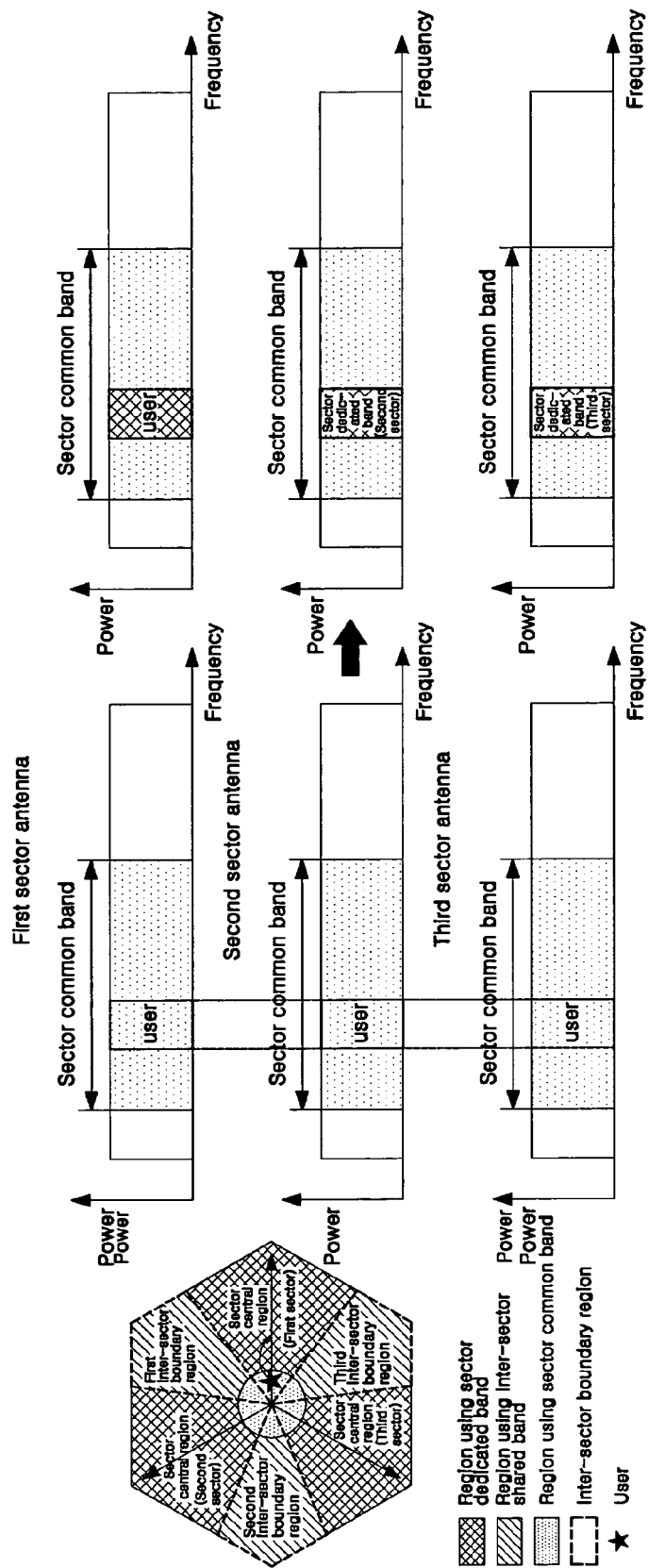

[FIG. 117]
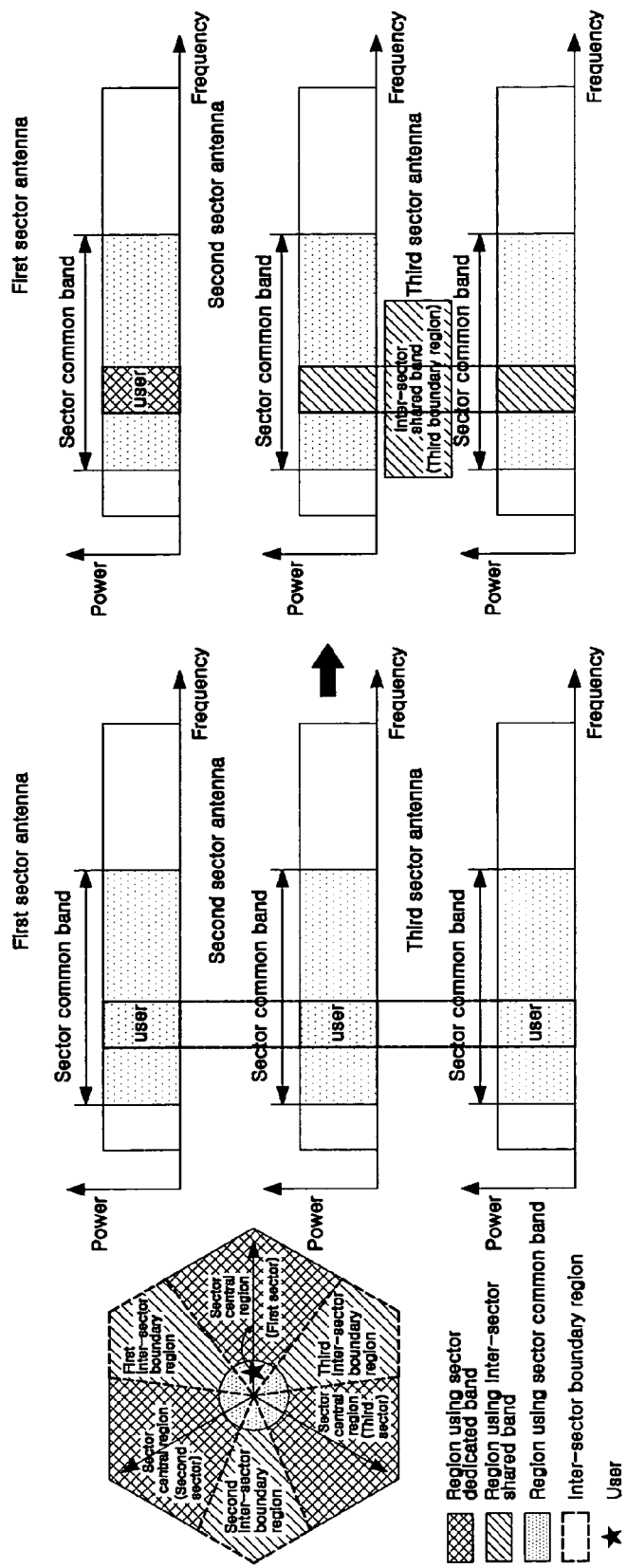

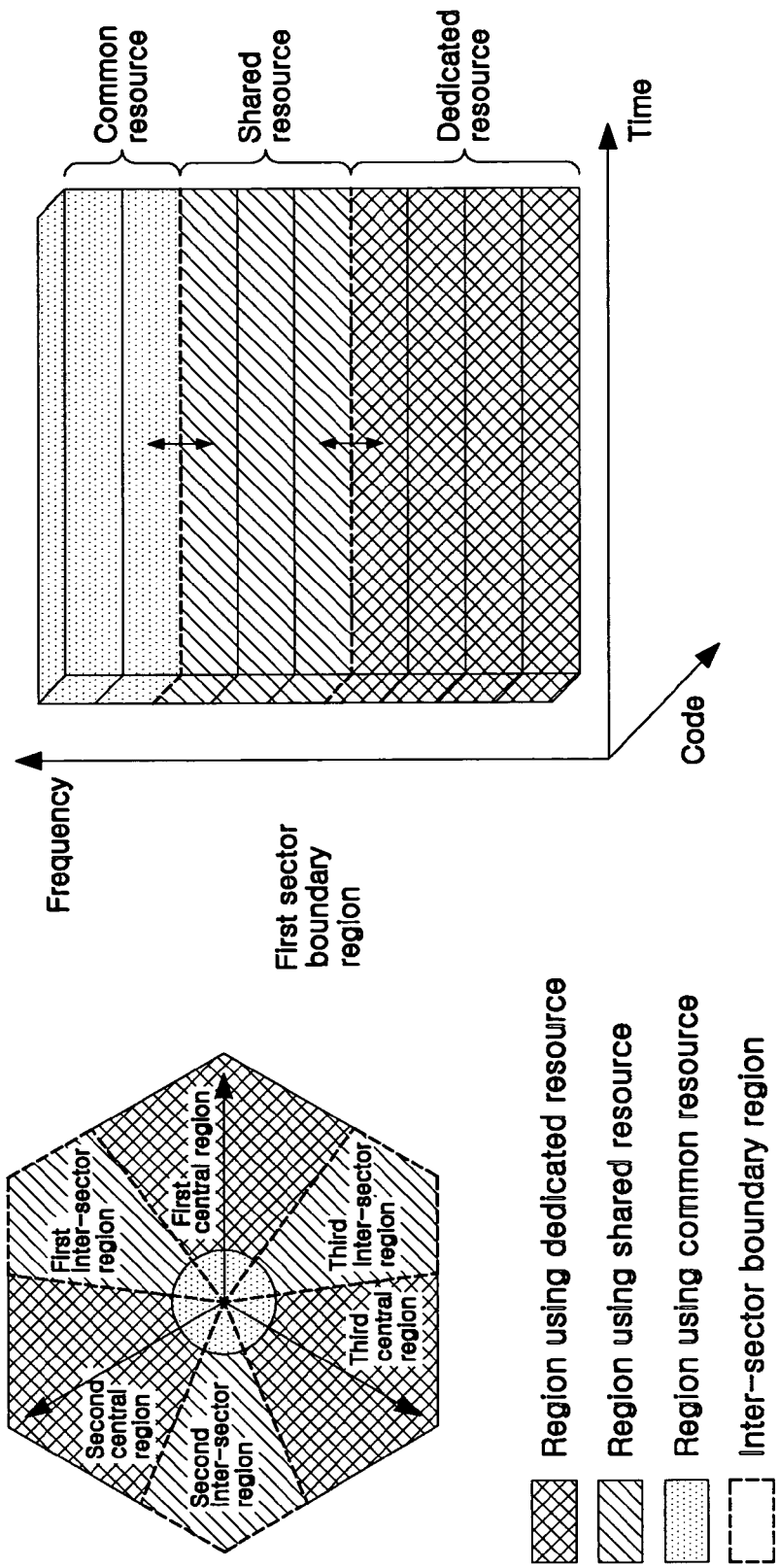

[FIG. 119]
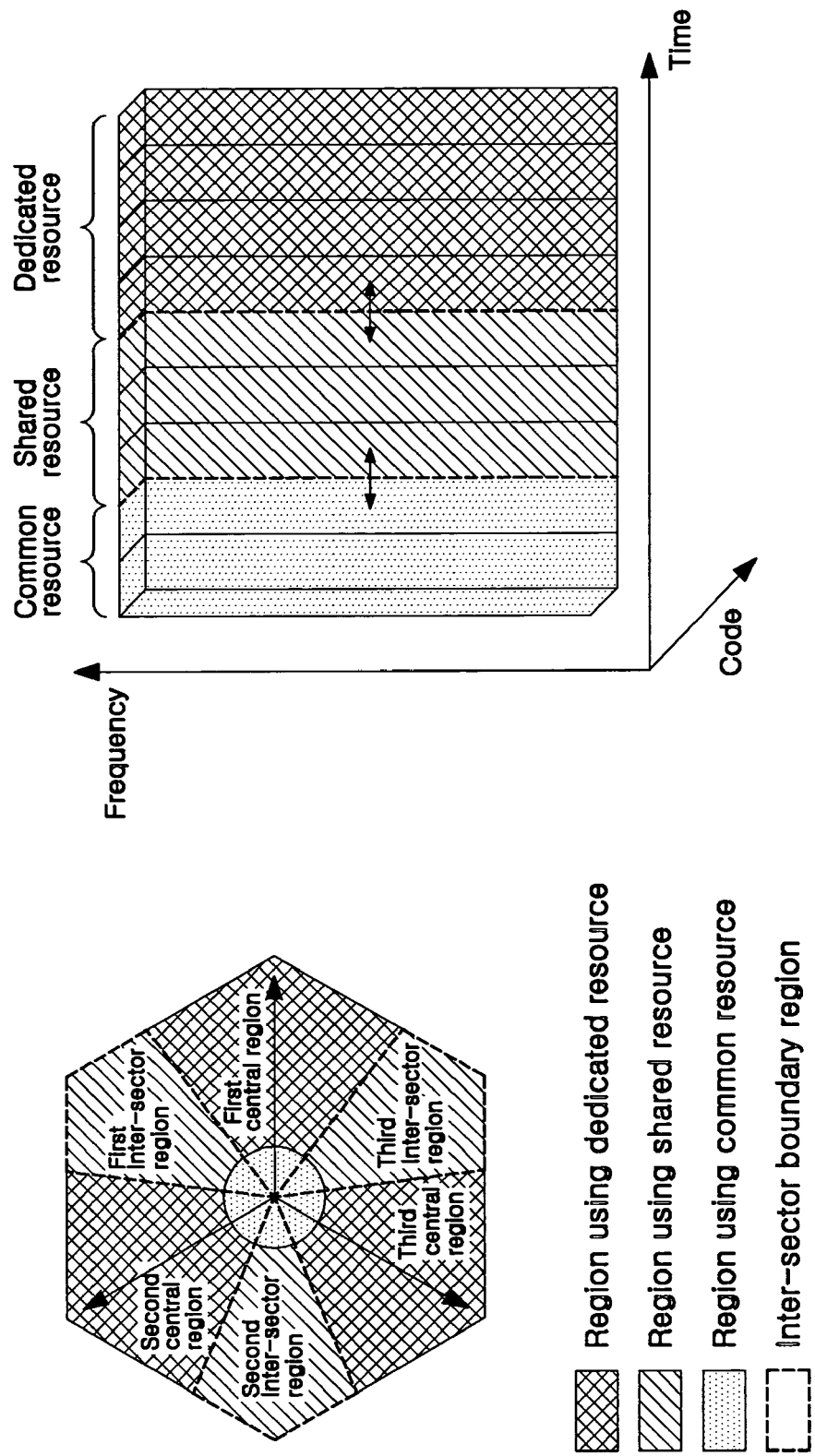

[FIG. 120]
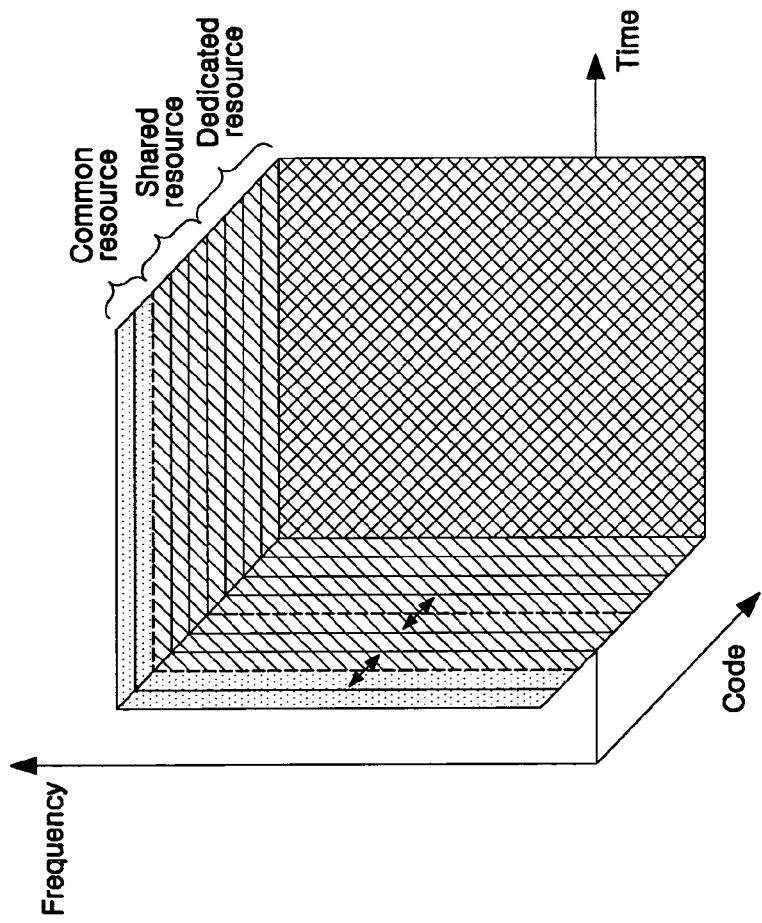
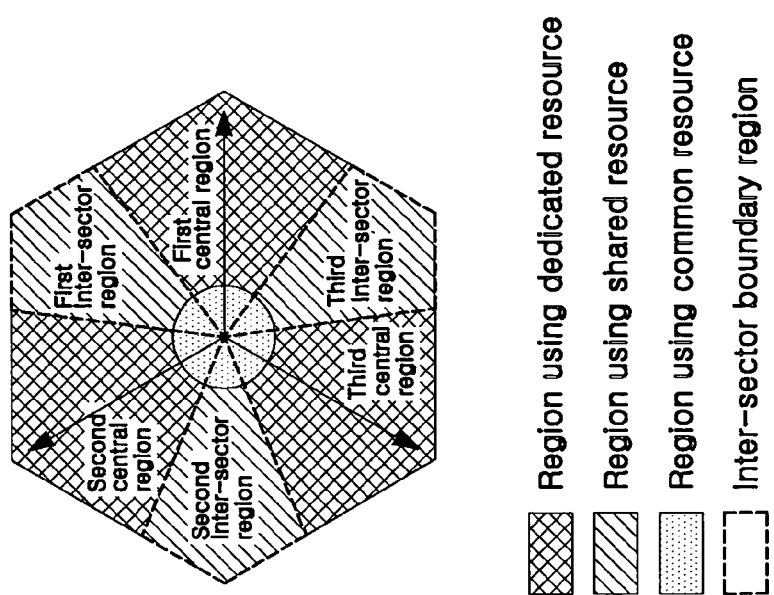

SYSTEM AND METHOD FOR USING RESOURCES IN A COMMUNICATION SYSTEM

The present application is a 371 of international application PCT/KR2008/001131 filed on Feb. 27, 2008, which in turn claims a priority to Korean Patent Application 10-2007-0019747 filed Feb. 27, 2007 and Korean Patent Application 10-2007-0074514 filed Jul. 25, 2007.

TECHNICAL FIELD

The present invention relates to a multi-sector communication system, and more particularly, to a system and method for using resources that are capable of minimizing inter-sector interference and improving use efficiency of the resources in a communication system including a cell having a multi-sector structure.

BACKGROUND ART

In a multi-sector communication system including a plurality of sectors, limited resources including frequency resources, code resources, and time slot resources are divided and used among the sectors. Since the same resources are reused by other sectors, interference can result between the sectors, particularly neighboring sectors. However, although the interference attributable to the reuse may cause performance degradation, it may also increase the entire capacity of the multi-sector communication system. The interference is severe when a frequency reuse factor is 1.

Meanwhile, a next-generation communication system is being actively studied for providing users with services with high quality of service ("QoS"), such as high transmission speed. In particular, a base station ("BS") in the next-generation communication system divides and manages one cell into a plurality of sectors. When providing communication service to mobile stations ("MSs") located in the plurality of sectors, the BS transmits data to the MSs via respective sector antennae. Here, the BS transmits the data to the MSs using beams from the sector antennae, which overlap at a boundary between the sectors. This causes interference between the sectors.

More specifically, the use of the sector antennae in the multi-sector communication system causes inter-sector interference in a signal overlap region between sectors, i.e., a inter-sector boundary region. In other words, since patterns of beams from the sector antennae cannot be designed to be orthogonal to one another, signals from neighboring sectors overlap in the inter-sector boundary region, which causes severe interference between the sector signals, that is, between the neighboring sectors.

A current communication system fails to avoid and minimize such inter-sector interference, and exhibits low reuse efficiency of frequency resources when attempting to avoid and minimize the inter-sector interference. Accordingly, there is a need for a system and method for using resources that are capable of avoiding inter-sector interference in a signal overlap region between sectors by allocating a central band orthogonal between the sectors to a inter-sector boundary region where signal overlap may occur, and greatly improving the reuse efficiency of frequency resource by allowing remaining frequency resources to be reused without inter-sector interference in sector central regions where there is no inter-sector interference.

Also, there is a need for a system and method capable of preventing signal quality from being degraded by rapid reduction of antenna gain in a inter-sector boundary region that may be caused by signal transmission or reception in the inter-sector boundary region to or from one sector for avoidance and minimization of inter-sector interference in the inter-sector boundary region. Also, there is a need for a system and method capable of providing sufficient time to perform stable dynamic channel allocation ("DCA") and guaranteeing stable QoS so that several DCAs are performed at a high speed upon inter-sector handover of MSs in a plurality of sectors of a communication system. In particular, there is a need for a system and method capable of preventing a system load from increasing due to a ping-pong phenomenon upon frequency movement in a inter-sector boundary region, on a sector central boundary line, from a inter-sector boundary region to a sector central region, or from the sector central region to the inter-sector boundary region.

In other words, in the inter-sector boundary region, signal gain greatly decreases due to rapid reduction of the antenna gain, resulting in degraded signal quality. Also, when a user moves via a sector boundary line, signal quality degradation becomes severe. This requires rapid handover to a neighboring sector, and accordingly, rapid DCA from a current sector band to another band and to a neighboring sector band. This leads to signal quality degradation and QoS degradation, and causes a ping-pong phenomenon, resulting in an increase in a system load. Thus, there is a need for a system and method for solving the problems. That is, there is a need for a system and method capable of avoiding and minimizing inter-sector interference in a inter-sector boundary region of a multi-sector communication system, simplifying a handover procedure while maintaining signal quality, and increasing reuse efficiency of the frequency resource.

Accordingly, the present invention allocates used bands and bands reused in all sectors to be orthogonal among the sectors in order to avoid and minimize inter-sector interference in a inter-sector boundary region and efficiently use frequency resources. Also, there is a need for a method and system for using resources that are capable of entirely avoiding and minimizing inter-sector interference by allocating a specific band of each sector to users located in a boundary region of the sector and by reusing a band allocated to be reused in all sectors where inter-sector interference is not considered or there is no inter-sector interference.

When an MS moves between sectors, band allocation is made based on a signal power ratio between neighboring sectors. When a user, i.e., an MS allocated a band in a current sector moves to a inter-sector boundary region, a BS serving the MS performs DCA to a band for the current sector, thus avoiding and minimizing the intersector interference. In this case, the present invention prevents signal quality degradation caused by rapid antenna gain reduction in the inter-sector boundary region in handover between sectors. In particular, the present invention prevents signal quality degradation caused by performing rapid handover to a neighboring sector with the intention of preventing rapid signal intensity degradation when an MS moves between sectors, i.e., performing rapid DCA to a band for a neighboring handover sector, and avoids and minimizes the inter-sector interference.

Also, movement of an MS to a neighboring sector requires DCA to a band for the sector, which degrades signal quality in a inter-sector boundary region and in turn necessitates several rapid DCAs. Accordingly, the present invention provides sufficient time to perform stable DCAs and guarantees QoS. Moreover, the present invention prevents a ping-pong phenomenon from being caused by frequent inter-sector handover, e.g., frequent movement between regions in a sector, and particularly, simplifies a DCA procedure and a handover procedure in more frequent and rapid movement between sectors in a cell central region, thus reducing a system load.

DISCLOSURE OF INVENTION

Technical Problem

An object of the present invention is to provide a system and method for using resources in a communication system.

Another object of the present invention is to provide a system and method for using resources in a multi-sector communication system.

Still another object of the present invention is to provide a system and method for transmitting and receiving signals in a multi-sector communication system.

Technical Solution

According to a first aspect of the present invention, provided is a method for using resources in a communication system, comprising the steps of: dividing a communication region into inter-sector boundary regions, sector central regions, and a sector common region; and allocating predetermined resources to the divided regions.

According to a second aspect of the present invention, provided is a method for using resources in a communication system, comprising the step of defining resources for a specific region from among resources available to the communication system, and allocating the same.

According to a third aspect of the present invention, provided is a method for using resources in a communication system, comprising the steps of: when a user moves between the regions of the communication system, having resources allocated in each region returned; and defining resource for a region to which the user moves.

According to a fourth aspect of the present invention, provided is a method for using resources in a communication system, comprising the steps of: when a user moves between the regions of the communication system, having resources allocated in each region returned; and allocating resources for a region to which the user moves.

According to a fifth aspect of the present invention, provided is a system for using resources in a communication system, comprising a base station for dividing a communication region into inter-sector boundary regions, sector central regions, and a sector common region and allocating predetermined resources to the divided regions.

According to a sixth aspect of the present invention, provided is a system for using resources in a communication system, comprising a base station for defining resources for a specific region from among resources available to the communication system, and allocating the same.

According to a seventh aspect of the present invention, provided is a system for using resources in a communication system, comprising a base station for having resources currently allocated in regions of the communication system returned when a user moves between the regions, and defining resource for a region to which the user moves.

According to an eighth aspect of the present invention, provided is a system for using resources in a communication system, comprising a base station for having resources currently allocated in regions of the communication system returned when a user moves between the regions, and allocating resources for a region to which the user moves.

Advantageous Effects

With the system and method for using resources in a communication system according to the present invention, it is possible to avoid and minimize interference in each sector and to prevent degradation of frequency reuse efficiency and signal quality. It is also possible to prevent an increase in a system load by supporting stable DCA and handover. It is also possible to increase system efficiency by efficiently managing the resources and to improve system performance by simplifying a resource allocation procedure.

BRIEF DESCRIPTION OF THE DRAWINGS

FIGS. 1 to 3 illustrate a inter-sector boundary region and a sector central region in a multi-sector communication system according to an exemplary embodiment of the present invention;

FIG. 4 illustrates a scheme of dividing and defining total frequency resources into a sector dedicated band, a inter-sector shared band, and a sector common band in a multi-sector communication system according to an exemplary embodiment of the present invention;

FIG. 5 illustrates a scheme of first dividing and defining total frequency resources into only a sector dedicated band and a inter-sector shared band in a multi-sector communication system according to an exemplary embodiment of the present invention;

FIGS. 6 to 8 illustrate an example in which a BS defines a sector common band from among a sector dedicated band or a inter-sector shared band in a multi-sector communication system according to a first rule in an exemplary embodiment of the present invention;

FIGS. 9 to 11 illustrate an example in which a BS defines a sector common band from among a sector dedicated band or a inter-sector shared band in a multi-sector communication system according to a second rule in an exemplary embodiment of the present invention;

FIGS. 12 to 14 illustrate an example in which a BS defines a sector common band from among a sector dedicated band or a inter-sector shared band in a multi-sector communication system according to a third rule in an exemplary embodiment of the present invention;

FIG. 15 illustrates a scheme of first dividing and defining total frequency resources into a sector dedicated band and a sector common band in a multi-sector communication system according to an exemplary embodiment of the present invention;

FIGS. 16 to 18 illustrate an example in which a BS defines a inter-sector shared band from among a sector dedicated band or a sector common band according to the first rule in a multi-sector communication system according to an exemplary embodiment of the present invention;

FIGS. 19 to 21 illustrate an example in which a BS defines a inter-sector shared band from among a sector dedicated band or a sector common band according to the second rule in a multi-sector communication system according to an exemplary embodiment of the present invention FIGS. 22 to 24 illustrate an example in which a BS defines a inter-sector shared band from among a sector dedicated band or a sector common band according to the third rule in a multi-sector communication system according to an exemplary embodiment of the present invention;

FIG. 25 illustrates a scheme of first dividing and defining total frequency resources into and as only a inter-sector shared band and a sector common band in a multi-sector communication system according to an exemplary embodiment of the present invention;

FIGS. 26 to 28 illustrate an example in which a BS defines a sector dedicated band from among a inter-sector shared band or a sector common band according to the first rule in a multi-sector communication system according to an exemplary embodiment of the present invention;

FIGS. 29 to 31 illustrate an example in which a BS defines a sector dedicated band from among a inter-sector shared band or a sector common band according to the second rule in a multi-sector communication system according to an exemplary embodiment of the present invention;

FIG. 32 to 34 illustrate an example in which a BS defines a sector dedicated band from among a inter-sector shared band or a sector common band according to the third rule in a multi-sector communication system according to an exemplary embodiment of the present invention;

FIGS. 35 to 38 illustrate a scheme of first defining total frequency resources as only a sector dedicated band in a multi-sector communication system according to an exemplary embodiment of the present invention;

FIGS. 39 to 42 illustrate a scheme of first defining total frequency resources as only a inter-sector shared band in a multi-sector communication system according to an exemplary embodiment of the present invention;

FIGS. 43 to 46 illustrate a scheme of first defining total frequency resources as only a sector common band in a multi-sector communication system according to an exemplary embodiment of the present invention;

FIGS. 47 to 50 illustrate a scheme in which total frequency resources are first not defined as any band in a multi-sector communication system according to an exemplary embodiment of the present invention;

FIGS. 51 to 53 illustrate a scheme of using a inter-sector shared band in a multi-sector communication system according to an exemplary embodiment of the present invention;

FIGS. 54 to 56 illustrate a scheme of using a inter-sector shared band in a 3-sector cell of a multi-sector communication system according to an exemplary embodiment of the present invention;

FIGS. 57 and 58 illustrate a scheme of using a inter-sector shared band in a 4-sector cell of a multi-sector communication system according to an exemplary embodiment of the present invention;

FIGS. 59 to 61 illustrate a scheme of using a inter-sector shared band in a 6-sector cell of a multi-sector communication system according to an exemplary embodiment of the present invention;

FIGS. 62 and 63 illustrate a scheme of using a inter-sector shared band in a 3-sector cell of a multi-sector communication system according to an exemplary embodiment of the present invention;

FIGS. 64 and 65 illustrate an example in which DCA is performed when a user moves from a inter-sector boundary region to a sector central region in a multi-sector communication system according to an exemplary embodiment of the present invention;

FIGS. 66 to 69 illustrate an example in which DCA is performed when a user moves from a inter-sector boundary region to a sector central region in a multi-sector communication system according to an exemplary embodiment of the present invention;

FIGS. 70 and 71 illustrate an example in which DCA is performed when a user moves from a inter-sector boundary region to a sector central region in a multi-sector communication system according to an exemplary embodiment of the present invention;

FIGS. 72 and 73 illustrate an example in which DCA is performed when a user moves from a inter-sector boundary region to a sector central region in a multi-sector communication system according to an exemplary embodiment of the present invention;

FIGS. 74 and 75 illustrate an example in which DCA is performed when a user moves from a inter-sector boundary region to a sector central region in a multi-sector communication system according to an exemplary embodiment of the present invention;

FIG. 76 to 79 illustrate an example in which DCA is performed when a user moves from a inter-sector boundary region to a sector central region in a multi-sector communication system according to an exemplary embodiment of the present invention;

FIGS. 80 to 89 illustrate an example in which DCA is performed when a user moves from a sector central region to a inter-sector boundary region in a multi-sector communication system according to an exemplary embodiment of the present invention;

FIGS. 90 to 97 illustrate an example in which DCA is performed when a user moves from a inter-sector boundary region to a cell central region in a multi-sector communication system according to an exemplary embodiment of the present invention;

FIGS. 98 to 103 illustrate an example in which DCA is performed when a user moves from a cell central region to a inter-sector boundary region in a multi-sector communication system according to an exemplary embodiment of the present invention;

FIGS. 104 to 110 illustrate an example in which DCA is performed when a user moves from a sector central region to a cell central region in a multi-sector communication system according to an exemplary embodiment of the present invention;

FIGS. 111 to 117 illustrate an example in which DCA is performed when a user moves from a cell central region to a sector central region in a multi-sector communication system according to an exemplary embodiment of the present invention; and FIGS. 118 to 120 schematically illustrate an example in which resources are defined and used in a communication system according to an exemplary embodiment of the present invention.

MODE FOR THE INVENTION

Hereinafter, exemplary embodiments of the present invention will be described in detail. However, the present invention is not limited to the exemplary embodiments disclosed below, but can be implemented in various types. Therefore, the present exemplary embodiments are provided for complete disclosure of the present invention and to fully inform the scope of the present invention to those ordinarily skilled in the art.

In embodiments of the present invention described below, a system and method for using resources in a communication system in which each cell includes a plurality of sectors ("a multi-sector communication system") are provided. Here, the multi-sector communication system is a representative method for increasing the number of users in a communication system and employs cell sectorization. In the case of the cell sectorization, a base station ("MS") uses directional antennae with a predetermined beam width, e.g., sector antennae with beam widths of 120°, 90° and 60° That is, in a communication system according to an exemplary embodiment of the present invention, a BS divides one cell into a plurality of sectors and transmits data to mobile stations (MSs) in the plurality of sectors using respective sector antennae to provide communication services. An exemplary embodiment of the present invention proposes a system and method for using resources for avoiding and minimizing interference between neighboring sectors caused when a BS transmits data to MSs through beams of sector antennae, particularly, when a BS transmits data to MSs by reusing all frequency resources in all sectors with a frequency reuse factor being 1.

More specifically, when sectors in one cell are theoretically orthogonal to one another, a system's capacity increases three, four and six times. However, since in actuality the sectors overlap and are not orthogonal to one another due to blunt beam patterns of the sector antenna, the sectorization does not greatly contribute to an increase in the system capacity. For example, an IEEE (Institute of Electrical and Electronics Engineers) 802.16 communication system is directed to a system structure capable of utilizing an exact 100% of total frequency resources in one cell by allocating ⅓ of the frequency resources to each sector. In this case, reuse of total frequency resources in all sectors with a frequency reuse factor being 1 may cause inter-sector interference. That is, in a communication system using sectorized Orthogonal Frequency Division Multiplexing ("OFDM"), i.e., an "OFDM communication system", interference is caused between users in a cell allocated an overlapping frequency band. In particular, since inter-sector interference affects system performance more greatly than inter-cell interference, the OFDM communication system divides frequency resources to be orthogonal to one another and allocates the divided resources to sectors so that there is no interference in the cell.

Accordingly, a communication system according to an exemplary embodiment of the present invention allocates used bands and bands reused in all sectors to be orthogonal among the sectors in order to avoid and minimize inter-sector interference in a intersector boundary region and efficiently use frequency resources. Accordingly, the present invention can entirely avoid and minimize inter-sector interference by allocating a specific band of each sector to users located in a boundary region of the sector and by reusing a band allocated to be reused in all sectors where inter-sector interference is not considered or there is no inter-sector interference.

When an MS moves between sectors, band allocation is made based on a signal power ratio between neighboring sectors. When a user, i.e., an MS allocated a band in a current sector, moves to a inter-sector boundary region, a BS serving the MS performs dynamic channel allocation ("DCA") to a band for the current sector, thus avoiding and minimizing the inter-sector interference. In this case, a communication system according to an exemplary embodiment of the present invention prevents signal quality degradation caused by rapid antenna gain reduction in the inter-sector boundary region in handover between sectors. In particular, a communication system according to an exemplary embodiment of the present invention prevents signal quality degradation caused by performing rapid handover to a neighboring sector with the intention of preventing rapid signal intensity degradation when an MS moves between sectors, i.e., performing rapid DCA to a band for a neighboring handover sector, and avoids and minimizes the inter-sector interference.

Also, movement of an MS to a neighboring sector requires DCA to a band for the sector, which degrades signal quality in a inter-sector boundary region and in turn requires several rapid DCAs. Accordingly, a communication system according to an exemplary embodiment of the present invention provides sufficient time to perform stable DCA and guarantees QoS. Moreover, a communication system according to an exemplary embodiment of the present invention prevents a ping-pong phenomenon from being caused by frequent inter-sector handover, e.g., frequent movement between regions in a sector, and particularly, simplifies a DCA procedure and a handover procedure in more frequent and rapid movement between sectors in a cell central region, thus reducing a system load.

Accordingly, the present invention proposes a system and method for using resources in a multi-sector system that are capable of avoiding and minimizing inter-sector interference in a inter-sector boundary region, simplifying an inter-sector handover procedure, and further increasing reuse efficiency of frequency resources while maintaining signal quality even in a inter-sector boundary region. The present invention also proposes a system and method for using resources that are capable of minimizing a ping-pong phenomenon caused by inter-sector handover or DCA and minimizing frequent DCA or inter-sector handover in a cell central region. The present invention also proposes a system and method for dividing total available frequency resources into a sector dedicated band, a inter-sector shared band, and a sector common band and using the divided inter-sector shared band resources.

While an embodiment of the present invention primarily describes use of frequency resources in a central region of each sector, i.e., a sector central region, a boundary region between sectors, i.e., a inter-sector boundary region, and a sector common region, e.g., a cell central region, the present invention may apply to use of time resources and code resources in regions of each sector. A scheme of defining and using resources in a communication system according to an exemplary embodiment of the present invention will now be described in detail with reference to FIG. 35.

FIG. 35 is a schematic diagram illustrating resource definition and use in a communication system according to an exemplary embodiment of the present invention. FIG. 35a illustrates a scheme of defining and using frequency resources in a communication system according to an exemplary embodiment of the present invention, FIG. 35b illustrates a scheme of defining and using time resources in a communication system according to an exemplary embodiment of the present invention, and FIG. 35c illustrates a scheme of defining and using code resources in a communication system according to an exemplary embodiment of the present invention.

As shown in FIGS. 118 to 120, in the communication system according to an exemplary embodiment of the present invention, frequency resources, time resources, or code resources are defined as common resources, shared resources, and dedicated resources so that specific regions of each sector, e.g., a central region, a boundary region, and a common region, e.g., a cell central region use the resources in a communication region, e.g., in a communication region including at least one cell. A scheme of defining and using frequency resources as common resources, shared resources, and dedicated resources will now be described in detail. Here, there are several schemes of dividing and defining total available frequency resources, for example, into a sector dedicated band, a inter-sector shared band, and a sector common band in a communication system according to an exemplary embodiment of the present invention.

In a first definition scheme according to an exemplary embodiment of the present invention, a BS in a multi-sector communication system divides total frequency resources into a sector dedicated band, a inter-sector shared band, and a sector common band. Frequency resources defined as the sector dedicated band are allocated to users located in a sector central region of a sector. In the other sectors in the same cell, the frequency resources defined as the sector dedicated band are also allocated to users located in the sector central region of other sectors for reuse. Also, the BS allocates frequency resources defined as the inter-sector shared band to users located in the inter-sector boundary region in such a manner that the frequency resources are not used in two sectors adjacent to the inter-sector boundary region in order to avoid and minimize interference with the neighboring sectors in the cell.

In this case, the frequency resources may be defined and reused as a sector dedicated band or a inter-sector shared band in the sectors not adjacent to the inter-sector boundary region. Here, the inter-sector shared band may be used to cooperatively transmit a signal in two sectors adjacent to the inter-sector boundary region or in a plurality of sectors including the two sectors. Also, the frequency resources defined as the sector common band are allocated to users located in the cell central regions near the BS, so that they transmit a signal in the same frequency band by cooperatively using all or some of sector antennae in a cell. This prevents DCA or inter-sector handover from being frequently performed on users moving in the cell central region.

Here, sizes of the sector dedicated band, the inter-sector shared band, and the sector common band may be changed in the total frequency resources depending on a distribution of users in the cell.

In a second definition scheme according to an exemplary embodiment of the present invention, a BS in a multi-sector communication system first divides and defines total frequency resources into only a sector dedicated band and a inter-sector shared band.

In this case, frequency resources defined as the sector dedicated band and the intersector shared band may be used as in the first definition scheme. Only when a sector common band is required by a user entering the cell central region, is inter-sector adjustment performed for defining the sector common band from among the sector dedicated band or the inter-sector shared band. Here, the sizes of the sector dedicated band and the inter-sector shared band in the total frequency resources may be changed depending, for example, on a distribution of users in the cell.

In a third definition scheme according to an exemplary embodiment of the present invention, a BS in a multi-sector communication system first divides and defines total frequency resources into only a sector dedicated band and a sector common band. In this case, frequency resources defined as the sector dedicated band and the sector common band may be used as in the first definition scheme. Only when a inter-sector shared band is required by a user entering the inter-sector boundary region, is inter-sector adjustment performed for defining the inter-sector shared band from among the sector dedicated band or the sector common band. Here, the inter-sector shared band is not used in sectors adjacent to the inter-sector boundary region, but may be defined and reused as a sector dedicated band or a inter-sector shared band in the sectors not adjacent to the inter-sector boundary region. Also, sizes of the sector dedicated band and the sector common band may be changed in the total frequency resources depending, for example, on a distribution of users in the cell.

In a fourth definition scheme according to an exemplary embodiment of the present invention, a BS in a multi-sector communication system first divides and defines total frequency resources into only a inter-sector shared band and a sector common band. In this case, the frequency resources defined as the inter-sector shared band and the sector common band may be used as in the first definition scheme. Only when a sector dedicated band is necessary due to a user entering the sector central region, is the sector dedicated band defined and used in the inter-sector shared band or the sector common band through inter-sector adjustment. Here, the sector dedicated band may be allocated to and used by users located in other sector central regions in the same cell. Also, sizes of the inter-sector shared band and the sector common band may be changed in the total frequency resources depending, for example, on a distribution of users in the cell.

In a fifth definition scheme according to an exemplary embodiment of the present invention, a BS in a multi-sector communication system first defines total frequency resources as only a sector dedicated band. In this case, the total frequency resources are defined as the sector dedicated band in all sectors so that each sector frequency reuse factor becomes 1. Only when a user enters the inter-sector boundary region or a cell central region, are a inter-sector shared band and a sector common band defined and used in the sector dedicated band through inter-sector adjustment.

In a sixth definition scheme according to an exemplary embodiment of the present invention, a BS in a multi-sector communication system first defines total frequency resources as only a inter-sector shared band. In this case, the total frequency resources are defined as the inter-sector shared band in all inter-sector boundary regions and used so that a frequency reuse factor is 1 in each inter-sector boundary region. Only when a user enters the sector central region or the cell central region, are a sector dedicated band and a sector common band defined and used in the inter-sector shared band through inter-sector adjustment.

Also, in a seventh definition scheme according to an exemplary embodiment of the present invention, a BS in a multi-sector communication system first defines total frequency resources as only a sector common band. In this case, the total frequency resources are defined as the sector common band in common to all sectors and used so that a frequency reuse factor of the cell becomes 1. Only when a user enters the sector central region or the inter-sector boundary region, are the sector dedicated band and the inter-sector shared band defined from among the sector common band through inter-sector adjustment.

Finally, in an eighth definition scheme according to an exemplary embodiment of the present invention, a BS in a multi-sector communication system does not first define total frequency resources as any band. In this case, only when a user enters the sector central region, the inter-sector boundary region, or the cell central region, are the sector dedicated band, the inter-sector shared band, and the sector common band defined and used in the total frequency resources through inter-sector adjustment. The scheme of transmitting and receiving a signal through the inter-sector shared band defined by dividing the total available frequency resources in the communication system according to an exemplary embodiment of the present invention as described above, i.e., the scheme of transmitting and receiving a signal through the frequency resources of the inter-sector shared band divided or defined from among the total frequency band to allocate to a user located in the inter-sector boundary region may include the following schemes:

In a first transmission and reception scheme according to an exemplary embodiment of the present invention, a user located in a inter-sector boundary region and allocated frequency resources of a inter-sector shared band in a multi-sector communication system transmits and receives a signal using only the most neighboring sector antenna. In this case, inter-sector shared bands that are not used in two neighboring inter-sector boundary regions may be defined and reused as a sector dedicated band or a inter-sector shared band. Signal quality may be degraded by antenna gain reduction in a inter-sector boundary region that is an edge of a sector antenna beam pattern.

In a second transmission and reception scheme according to an exemplary embodiment of the present invention, a user located in a inter-sector boundary region and allocated frequency resources of a inter-sector shared band in a multi-sector communication system transmits and receives a signal in the same frequency band by cooperatively using the two most neighboring sector antennae. In this case, inter-sector shared bands that are not used in two neighboring inter-sector boundary regions may be defined and reused as the sector dedicated band or the inter-sector shared band. Also, as the user located in the inter-sector boundary region transmits and receives a signal in the same frequency band using the two most neighboring sector antennae, the signal quality degradation caused by antenna gain reduction in the inter-sector boundary region can be prevented. Examples of the scheme of cooperatively transmitting a signal include a scheme by which two sector antennae adjacent to a inter-sector boundary region transmit the same signal in the same frequency band to a user located in a inter-sector boundary region and allocated frequency resources of the inter-sector shared band; a scheme by which two sector antennae adjacent to a inter-sector boundary region transmit the same information in the same frequency band; and a scheme by which two sector antennae adjacent to a inter-sector boundary region transmit different information in the same frequency band.

In a third transmission and reception scheme according to an exemplary embodiment of the present invention, a user located in a inter-sector boundary region and allocated frequency resources of a inter-sector shared band in a multi-sector communication system transmits and receives a signal in the same frequency band by cooperatively using all or some of sector antennae in a cell. This may consume additional power and degrade use efficiency of frequency resources of the inter-sector shared band, but can prevent a ping-pong phenomenon in the inter-sector boundary region or the cell central region and enable stable inter-sector handover. Examples of the scheme of cooperatively transmitting a signal include a scheme by which all or some of sector antennae in a cell transmit the same signal in the same frequency band to a user located in a inter-sector boundary region and allocated frequency resources of the inter-sector shared band; a scheme by which all or some of sector antennae in a cell transmit the same information in the same frequency band; and a scheme by which all or some of sector antennae in a cell transmit different information in the same frequency band. A scheme of using the inter-sector shared band defined by dividing total available frequency resources in a communication system according to an exemplary embodiment of the present invention as described above may include the following schemes:

First, in a first use scheme according to an exemplary embodiment of the present invention, frequency resources of the inter-sector shared band in a multi-sector communication system are shared among inter-sector boundary regions. In this case, in order to avoid and minimize inter-sector interference, the frequency resources of the inter-sector shared band that are being used in neighboring sectors are not used. Here, sizes of the sector dedicated band and the inter-sector shared band may be changed, and a part of the inter-sector shared band that is being used in a non-adjacent inter-sector boundary region in the cell may be reused as the sector dedicated band or the inter-sector shared band.

In a second use scheme according to an exemplary embodiment of the present invention, a multi-sector communication system sets a inter-sector boundary region dedicated band for each inter-sector boundary region. In this case, the multi-sector communication system defines inter-sector boundary region dedicated frequency bands defined from among the inter-sector shared bands to be orthogonal among inter-sector boundary regions in the inter-sector boundary regions, and allocates frequency resources only in the orthogonal inter-sector boundary region dedicated frequency band in the inter-sector boundary regions. Here, the sizes of the sector dedicated band may be changed depending on a distribution of users located in each inter-sector boundary region. A part of the inter-sector shared band that is being used in a non-adjacent inter-sector boundary region in the cell may be reused as the sector dedicated band or the inter-sector shared band.

The communication system according to an exemplary embodiment of the present invention performs DCA to define a total frequency band according to the definition scheme as described above, and flexibly allocate a sector dedicated band, a inter-sector shared band, and a sector common band to the user depending on purposer locations and interference degree in consideration of users in a sector so that the defined frequency bands can be used according to the transmission and reception schemes and use schemes. Here, in an embodiment of the present invention, when a user moves from a inter-sector boundary region to a neighboring sector central region, from a inter-sector boundary region to a neighboring cell central region, from cell central region to a neighboring inter-sector boundary region, from a cell central region to a neighboring sector central region, and restrictively, from a sector central region to a neighboring cell central region, current allocated frequency resources of the inter-sector shared band or the sector common band are allowed to continue to be used for a predetermined period of time and DCA to a frequency band for a region where a user is located is performed depending on a resource load rate and signal quality when required, thereby simplifying an inter-sector handover procedure and preventing a ping-pong phenomenon.

A inter-sector boundary region and a sector central region in a multi-sector communication system according to an exemplary embodiment of the present invention will be described in detail with reference to FIG. 1. FIG. 1 illustrates a inter-sector boundary region and a sector central region in a multi-sector communication system according to an exemplary embodiment of the present invention. FIG. 1 illustrates inter-sector boundary regions and sector central regions in 3-sectors of a clover cell, FIG. 1b illustrates inter-sector boundary regions and sector central regions in 3-sectors of a hexagonal cell, and FIG. 1c illustrates inter-sector boundary regions and sector central regions in 3-sectors of a hexagonal cell.

Referring to FIG. 1, each of cells 101, 111, and 121 is divided into three sectors, i.e., a first sector, a second sector, and a third sector, each including a inter-sector boundary region and a sector central region. In this case, the inter-sector boundary region and sector central region have a predetermined area ratio (103,113,123). In each of the cells 101, 113, and 123, a BS transmits a signal to users located in each sector using beam patterns 105, 115, and 125 of sector antennae. A scheme of dividing, defining and using total frequency resources as described above in a communication system according to an exemplary embodiment of the present invention will now be described in greater detail with reference to the accompanying drawings.

FIG. 2 illustrates a scheme of dividing and defining total frequency resources into a sector dedicated band, a inter-sector shared band and a sector common band in a multi-sector communication system according to an exemplary embodiment of the present invention.

Referring to FIG. 2, a BS in the multi-sector communication system divides total frequency resources into a sector dedicated band, a inter-sector shared band, and a sector common band according to the first definition scheme described above. The BS then allocates frequency resources defined as the sector dedicated band for each sector to users located in the sector central region of the sector, and allocates the frequency resources defined as the sector dedicated band to users located in sector central regions of the other sectors in the same cell for resource reuse.

The BS also allocates frequency resources defined as the inter-sector shared band to users located in the inter-sector boundary region in such a manner that the frequency resources are not used in two sectors adjacent to the inter-sector boundary region to avoid and minimize interference with neighboring sectors in the cell. Here, the BS defines the frequency resources as the sector dedicated band or the inter-sector shared band in sectors not adjacent to the inter-sector boundary region for resource reuse.

Also, the BS allocates frequency resources defined as the sector common band to users located in the cell central region near the BS, so that they transmit a signal in the same frequency band by cooperatively using all or some of sector antennae in the cell. This prevents DCA or inter-sector handover from being frequently performed on users moving in a cell central region. The BS changes sizes of the sector dedicated band, the inter-sector shared band, and the sector common band in the total frequency resources depending, for example, on a distribution of users in the cell.

FIG. 3 illustrates a scheme of first dividing and defining total frequency resources into only a sector dedicated band and a inter-sector shared band in a multi-sector communication system according to an exemplary embodiment of the present invention.

Referring to FIG. 3, a BS in the multi-sector communication system first divides and defines total frequency resources into only a sector dedicated band and a inter-sector shared band according to the second definition scheme described above. The BS then allocates frequency resources defined as the sector dedicated band for each sector to the users located in the sector central region of the sector, and also allocates frequency resources defined as the sector dedicated band to users located in sector central regions of other sectors in the same cell for resource reuse.

Also, the BS allocates frequency resources defined as the inter-sector shared band to users located in the inter-sector boundary region in such a manner that the frequency resources are not used in two sectors adjacent to the inter-sector boundary region to avoid and minimize interference with the neighboring sectors in the cell. The BS defines the frequency resources as the sector dedicated band or the inter-sector shared band in sectors not adjacent to the inter-sector boundary region for resource reuse.

The BS changes, for example, sizes of the sector dedicated band and the inter-sector shared band in the total frequency resources depending, for example, on a distribution of users in the cell. When a user enters the cell central region, the BS performs inter-sector adjustment to define the sector common band from among the sector dedicated band or the inter-sector shared band according to a predetermined rule, and uses the sector common band.

Also, the BS allocates frequency resources defined as the sector common band to users located in the cell central region near the BS allocation, so that a user transmits a signal in the same frequency band by cooperatively using all or some sector antennae in a cell, which prevents DCA or inter-sector handover from being frequently performed on users moving in the cell central region. Rules by which the BS defines the sector common band in the sector dedicated band or the inter-sector shared band will be described with reference to FIGS. 6 to 14.

FIGS. 6 to 8 illustrates an example in which a BS defines the sector common band from among the sector dedicated band or the inter-sector shared band in a multi-sector communication system according to a first rule in an exemplary embodiment of the present invention.

Referring to FIGS. 6 to 8, when a user enters the cell central region, the BS sequentially defines the sector common band from among the sector dedicated band or the inter-sector shared band in a predefined order, and allocates the sector common band according to the first rule. If a band to be defined as the sector common band is occupied by a user located in the sector central region or the inter-sector boundary region, the BS first allocates the band to the user located in the cell central region, in which another band is allocated to the user located in the sector central region or the inter-sector boundary region. That is, according to the first rule, the BS defines the sector common band from among the sector dedicated band as shown in FIG. 6, the inter-sector shared band as shown in FIG. 7, or the sector dedicated band and the inter-sector shared band as shown in FIG. 8.

FIG. 5 illustrates an example in which a BS defines a sector common band from among a sector dedicated band or a inter-sector shared band in a multi-sector communication system according to a second rule in an exemplary embodiment of the present invention.

FIGS. 9 to 11 illustrates an example in which a BS defines a sector common band from among a sector dedicated band or a inter-sector shared band in a multi-sector communication system according to a second rule in an exemplary embodiment of the present invention.

Referring to FIGS. 9 to 11, when a user enters the cell central region, the BS defines an empty band in the sector dedicated band or the inter-sector shared band as the sector common band, and allocates the sector common band according to the second rule. If there are no empty frequency resources in the sector dedicated bands or the shared band for all inter-sector boundary regions in all sectors, the BS allocates another frequency band to users located in the sector central region or the inter-sector boundary region to prepare an empty band in each sector, defines the empty band as the sector common band, and allocates the same to the users located in the cell central region. That is, according to the second rule, the BS defines the sector common band from among the sector dedicated band as shown in FIG. 9, the inter-sector shared band as shown in FIG. 10, or the sector dedicated band and the inter-sector shared band as shown in FIG. 11.

FIGS. 12 to 14 illustrates an example in which a BS defines a sector common band from among a sector dedicated band or a inter-sector shared band in a multi-sector communication system according to a third rule in an exemplary embodiment of the present invention.

Referring to FIGS. 12 to 14, in the third rule, a BS sets a reserved common band for users located in the cell central region within a sector dedicated band or a inter-sector shared band in advance, and defines and allocates the reserved band as a sector common band when a user enters the cell central region. If a band to be defined as the sector common band is occupied by a user located in the sector central region or the inter-sector boundary region, the BS first allocates the band to the user located in the cell central region, in which another band is allocated to the user located in the sector central region or the inter-sector boundary region. Preferably, a reserved common band is not allocated to users located in the sector central region or the inter-sector boundary region. Here, when the reserved common band is used, the band is used in reverse order of the order in which the resources are allocated to mobile stations located in the cell central region. That is, according to the third rule, the BS defines the sector common band from among the sector dedicated band as shown in FIG. 12, the inter-sector shared band as shown in FIG. 13, or the sector dedicated band and the inter-sector shared band as shown in FIG. 14.

FIG. 15 illustrates a scheme of first dividing and defining total frequency resources into a sector dedicated band and a sector common band in a multi-sector communication system according to an exemplary embodiment of the present invention.

Referring to FIG. 15, a BS in the multi-sector communication system first divides and defines total frequency resources into only a sector dedicated band and a sector common band according to the third definition scheme described above. The BS then allocates frequency resources defined as the sector dedicated band for each sector to users located in the sector central region of the sector, and also allocates frequency resources defined as the sector dedicated band to users located in sector central regions of other sectors in the same cell for resource reuse.

The BS allocates frequency resources defined as the sector common band to users located in the cell central region near the BS so that they transmit a signal in the same frequency band by cooperatively using all or some of sector antennae in a cell. This prevents DCA or inter-sector handover from being frequently performed on users moving in the cell central region. The BS changes sizes of the sector dedicated band and the sector common band in the total frequency resources, depending, for example, on a distribution of users in the cell. When a user enters the inter-sector boundary region, the BS performs inter-sector adjustment to define the inter-sector shared band in the dedicated band or the sector common band according to a predetermined rule.

Also, the BS allocates frequency resources defined as the inter-sector shared band to users located in the inter-sector boundary region in such a manner that the frequency resources are not used in two sectors in the cell adjacent to the inter-sector boundary region in order to avoid interference with the neighboring sectors. In this case, the frequency resources may be defined and reused as a sector dedicated band or a inter-sector shared band in sectors not adjacent to the inter-sector boundary region. Rules by which a BS defines a inter-sector shared band from among a sector dedicated band or a sector common band will be described with reference to FIGS. 8 through 10.

FIGS. 16 to 18 illustrates an example in which a BS defines a inter-sector shared band from among a sector dedicated band or a sector common band according to a first rule in a multi-sector communication system according to an exemplary embodiment of the present invention.

Referring to FIGS. 16 to 18, when a user enters the inter-sector boundary region, the BS sequentially defines and allocates the inter-sector shared band within the sector dedicated band or the sector common band in a predefined order according to the first rule. If a band to be defined as the inter-sector shared band is occupied by a user located in the sector central region or the cell central region, the BS first allocates the band to the user located in the boundary region, in which another band is allocated to the user located in the sector central region or the cell central region. That is, according to the first rule, the BS defines the inter-sector shared band from among the sector dedicated band as shown in FIG. 16, the sector common band as shown in FIG. 17, or the sector dedicated band and the sector common band as shown in FIG. 18.

FIGS. 19 to 21 illustrates an example in which a BS defines a inter-sector shared band from among a sector dedicated band or a sector common band according to a second rule in a multi-sector communication system according to an exemplary embodiment of the present invention.

Referring to FIGS. 19 to 21, when a user enters the inter-sector boundary region, the BS defines and allocates an empty band in the sector dedicated band or the sector common band as the inter-sector shared band. When there are no empty frequency resources in common to sector dedicated bands for two sectors adjacent to the inter-sector boundary region or there are no empty frequency resources in the sector common band, the BS selects any one sector, allocates another frequency band to a user located in a sector central region of the sector to prepare the empty band in common to the two sectors adjacent to the inter-sector boundary region, defines the band as the inter-sector shared band, and allocates the same to the user located in the inter-sector boundary region. That is, the BS defines the inter-sector shared band from among the sector dedicated band as shown in FIG. 19, the sector common band as shown in FIG. 20, or the sector dedicated band and the sector common band as shown in FIG. 21, according to the second rule.

FIGS. 22 to 24 illustrates an example in which a BS defines a inter-sector shared band from among a sector dedicated band or a sector common band according to a third rule in a multi-sector communication system according to an exemplary embodiment of the present invention.

Referring to FIGS. 22 to 24, in the third rule, a BS sets a reserved shared band for users located in a inter-sector boundary region within a sector dedicated band or a sector common band, and defines and allocates the reserved shared band as a inter-sector shared band when a user enters the inter-sector boundary region. If a band to be defined as the inter-sector shared band is occupied by a user located in the sector central region or the cell central region, the BS first allocates the band to the user located in the inter-sector boundary region, in which another band is allocated to the user located in the sector central region or the cell central region. Preferably, the reserved shared band is not allocated to the user located in the sector central region or the cell central region. Here, when the reserved shared band is used, the band is used in reverse order of the order in which the resources are allocated to mobile stations located in the inter-sector boundary region. That is, according to the third rule, the BS defines the inter-sector shared band from among the sector dedicated band as shown in FIG. 22, the sector common band as shown in FIG. 23, or the sector dedicated band and the sector common band as shown in FIG. 24.

FIGS. 25 illustrates a scheme of first dividing and defining total frequency resources into and as only a inter-sector shared band and a sector common band in a multi-sector communication system according to an exemplary embodiment of the present invention.

Referring to FIG. 25, a BS in the multi-sector communication system first divides and defines total frequency resources into and as only a inter-sector shared band and a sector common band according to the fourth definition scheme described above. The BS then allocates frequency resources defined as the inter-sector shared band to users located in the inter-sector boundary region in such a manner that the frequency resources are not used in two sectors in the cell adjacent to the inter-sector boundary region in order to avoid interference with the neighboring sectors. For resource reuse, the BS defines the frequency resources as the sector dedicated band or the inter-sector shared band in sectors not adjacent to the inter-sector boundary region.

The BS allocates frequency resources defined as the sector common band to users located in the cell central region near the BS so that they transmit a signal in the same frequency band by cooperatively using all or some sector antennae in a cell. This prevents DCA or inter-sector handover from being frequently performed on users moving in the cell central region. The BS changes sizes of the inter-sector shared band and the sector common band within the total frequency resources, depending, for example, on a distribution of users in the cell. When a user enters the sector central region, the BS performs inter-sector adjustment to define the sector dedicated band in the inter-sector shared band or the sector common band according to a predetermined rule.

Also, the BS allocates the frequency resources defined as the sector dedicated band for one sector, to the users located in the sector central region of the sector, and, for resource reuse, defines the frequency resources as the sector dedicated band for other sectors in the same cell to allocate the same to users located in sector central regions. In this case, the frequency resources may be defined and reused as a inter-sector shared band in sectors not adjacent to the sector. Rules by which a BS defines a sector dedicated band from among the inter-sector shared band or the sector common band will be described with reference to FIGS. 12 to 14.

FIGS. 26 to 28 illustrates an example in which a BS defines a sector dedicated band from among a inter-sector shared band or a sector common band according to a first rule in a multi-sector communication system according to an exemplary embodiment of the present invention.

Referring to FIGS. 26 to 28, in the first rule, when a user enters a sector central region of one sector, the BS sequentially defines and allocates the sector dedicated band from among the inter-sector shared band or the sector common band in a predefined order. In this case, when a band to be defined as the sector dedicated band is occupied by a user located in the inter-sector boundary region or the cell central region, the BS first allocates the band to the user located in the sector central region, in which another band is allocated to the user located in the inter-sector boundary region or the cell central region. That is, the BS defines the sector dedicated band from among the inter-sector shared band according to the first rule as shown in FIG. 26, the sector common band as shown in FIG. 27, or the inter-sector shared band and the sector common band as shown in FIG. 28.

FIGS. 29 to 31 illustrates an example in which a BS defines a sector dedicated band from among a inter-sector shared band or a sector common band according to the second rule in a multi-sector communication system according to an exemplary embodiment of the present invention.

Referring to FIGS. 29 to 31, in the second rule, when a user enters a sector central region of one sector, a BS defines an empty band in a inter-sector shared band or a sector common band, as the sector dedicated band, and allocates the same. That is, the BS defines the sector dedicated band from among the inter-sector shared band as shown in FIG. 29 according to the second rule, the sector common band as shown FIG. 30, or the inter-sector shared band and the sector common band as shown in FIG. 31.

FIGS. 32 to 34 illustrates an example in which a BS defines a sector dedicated band from among a inter-sector shared band or a sector common band according to the third rule in a multi-sector communication system according to an exemplary embodiment of the present invention.

Referring to FIGS. 32 to 34, in the third rule, a BS sets a reserved dedicated band for users located in a sector central region within a sector boundary band or a sector common band, and defines and allocates the reserved dedicated band as a sector dedicated band when a user enters the cell central region. If a band to be defined as the sector dedicated band is occupied by a user located in the inter-sector boundary region or the cell central region, the BS first allocates the band to the user located in the sector central region, in which another band is allocated to the user located in the inter-sector boundary region or the cell central region. Preferably, the reserved dedicated band is not allocated to the user located in the inter-sector boundary region or the cell central region. Here, when the reserved dedicated band is used, the band is used in reverse order of the order in which the resources are allocated to users located in the cell central region. That is, according to the third rule, the BS defines the sector dedicated band from among the inter-sector shared band as shown in FIG. 32, the sector common band as shown in FIG. 33, or the inter-sector shared band and the sector common band as shown in FIG. 34.

FIGS. 35 to 38 illustrates a scheme of first defining total frequency resources as only a sector dedicated band in a multi-sector communication system according to an exemplary embodiment of the present invention.

Referring to FIG. 35, a BS in the multi-sector communication system first defines total frequency resources as only a sector dedicated band according to the fifth definition scheme described above. The BS then allocates frequency resources defined as the sector dedicated band for each sector to users located in the sector central region of the sector, and also allocates the frequency resources defined as the sector dedicated band to users located in sector central regions of the other sectors in the same cell for resource reuse. When a user enters the inter-sector boundary region, the BS performs inter-sector adjustment to define the inter-sector shared band in the sector dedicated band according to a predetermined rule.

Also, the BS allocates frequency resources defined as the inter-sector shared band to users located in the inter-sector boundary region in such a manner that the frequency resources are not used in sectors adjacent the inter-sector boundary region to avoid interference with neighboring sectors in the cell. For resource reuse, the BS defines the frequency resources as the sector dedicated band or the inter-sector shared band in sectors not adjacent to the inter-sector boundary region. When a user enters the cell central region, the BS performs inter-sector adjustment to define the sector common band in the sector dedicated band according to a predetermined rule.

Also, the BS allocates frequency resources defined as the sector common band to users located in the cell central region near the BS so that they transmit a signal in the same frequency band by cooperatively using all or some sector antennae in a cell. This prevents DCA or inter-sector handover from being frequently performed on users moving in the cell central region. Rules by which the BS defines the sector common band from among the sector dedicated band sector or the boundary region shared band will be described with reference to FIGS. 15b to 15d.

Referring to FIG. 36, when a user enters the inter-sector boundary region or the cell central region, the BS sequentially defines the inter-sector shared band or the sector common band from among the sector dedicated band in a predefined order according to a first rule through inter-sector adjustment, and allocates the same. If a band to be defined as the inter-sector shared band or the sector common band is occupied by users located in sector central regions of sectors in the cell, the BS first allocates the band to the user located in the intersector boundary region or the cell central region, in which another band is allocated to the other users located in the sector central regions of sectors.

Referring to FIG. 37, when a user enters the inter-sector boundary region or the cell central region, the BS defines an empty band in the sector dedicated band as the inter-sector shared band or the sector common band according to the second rule, and allocates the same. When a user enters the inter-sector boundary region and there is no empty band in common to the sector dedicated bands for two sectors adjacent to the inter-sector boundary region frequency resources or when a users enters the cell central region and there are no empty frequency resources in common to all sector dedicated bands, the BS allocates another frequency band to a user located in the sector central region to prepare the empty band in common to the sector dedicated bands for the two sectors adjacent to the inter-sector boundary region, defines the band as the inter-sector shared band, and allocates the same to the user located in the inter-sector boundary region, or prepares the empty band in common to all the sectors, defines the band as the sector common band, and allocates the same to the user located in the cell central region.

Referring to FIG. 38, in the third rule, a BS sets a reserved shared band or a reserved common band for users located in a inter-sector boundary region or a cell central region within a sector dedicated band, and defines and allocates the reserved shared band as a inter-sector shared band or a sector common band when a user enters the inter-sector boundary region or the cell central region. If a band to be defined as the inter-sector shared band or the sector common band is occupied by a user located in the sector central region, the BS first allocates the band to the user located in the inter-sector boundary region or the cell central region, in which another band is allocated to the user located in the sector central region. Here, the BS changes sizes of the reserved shared band and the reserved common band depending, for example, on a distribution of users in the cell. Preferably, the reserved shared band or the reserved common band is not allocated to the user located in the sector central region. Here, when the reserved shared band or the reserved common band is used, the band is used in reverse order of the order in which the resources are allocated to mobile stations located in the inter-sector boundary region or the cell central region.

FIGS. 39 to 42 illustrates a scheme of first defining total frequency resources as only a inter-sector shared band in a multi-sector communication system according to an exemplary embodiment of the present invention.

Referring to FIG. 39, a BS in the multi-sector communication system first defines the total frequency resources as only a inter-sector shared band according to the sixth definition scheme described above. The BS then allocates frequency resources defined as the inter-sector shared band to users located in the inter-sector boundary region in such a manner that the frequency resources are not used in two sectors in the cell adjacent to the inter-sector boundary region in order to avoid interference with the neighboring sectors. For resource reuse, the BS defines the frequency resources as sector dedicated bands or inter-sector shared bands in sectors not adjacent to the inter-sector boundary region. When a user enters the sector central region, the BS performs inter-sector adjustment to define frequency resources in the inter-sector shared band as the sector dedicated band according to a predetermined rule.

The BS also allocates frequency resources defined as a sector dedicated band for one sector to users located in the sector central region of the sector, and, for resource reuse, defines the frequency resources as the sector dedicated band for other sectors in the same cell to allocate the same to users located in sector central regions. For additional resource reuse, the BS defines the frequency resources as the inter-sector shared band in non-neighboring sectors. When a user enters the cell central region, the BS performs inter-sector adjustment to define the sector common band in the sector dedicated band according to a predetermined rule.

Also, the BS allocates the frequency resources defined as the sector common band to users located in cell central regions near the BS so that they transmit a signal in the same frequency band by cooperatively using all or some of sector antennae in a cell. This prevents DCA or inter-sector handover from being frequently performed on users moving in the cell central region. Rules by which the BS defines the sector dedicated band and the sector common band from among the inter-sector shared band will be described with reference to FIGS. 16b to 16d.

Referring to FIG. 40, when a user enters the sector central region or the cell central region, the BS performs inter-sector adjustment to sequentially define the sector dedicated band or the sector common band in the inter-sector shared band in a predefined order according to a first rule, and allocate the same. If a band to be defined as the sector dedicated band or the sector common band is occupied by a user located in the inter-sector boundary region, the BS first allocates the band to the user located in the sector central region or the cell central region after allocating another band to the other users.

Referring to FIG. 41, when a user enters the sector central region or the cell central region, the BS defines an empty band in the inter-sector shared band as the sector dedicated band or the sector common band according to the second rule and allocates the same to the user. When a user enters the cell central region and there is no empty band in common to all inter-sector shared bands, the BS performs inter-sector adjustment to allocate another frequency band to a user located in the inter-sector boundary region to prepare the empty band in common to all the inter-sector shared bands, define the empty band as the sector common band, allocate the same to the users located in the cell central region.

Referring to FIG. 42, in the third rule, a BS sets a reserved dedicated band or a reserved common band for users located in a sector central region or a cell central region within a sector boundary band, and defines and allocates the reserved band as a sector dedicated band or a sector common band when a user enters the sector central region or the cell central region. If a band to be defined as the sector dedicated band or the sector common band is occupied by a user located in the inter-sector boundary region, the BS first allocates the band to the user located in the sector central region or the cell central region, in which another band is allocated to the user located in the inter-sector boundary region. Here, the BS changes sizes of the reserved dedicated band and the reserved common band depending, for example, on a distribution of users in the cell. Preferably, the reserved dedicated band or the reserved common band is not allocated to the user located in the inter-sector boundary region. Here, the reserved dedicated band or the reserved common band is used in reverse order of the order in which the resources are allocated to mobile stations located in the cell central region.

FIGS. 43 to 46 illustrates a scheme of first defining total frequency resources as only a sector common band in a multi-sector communication system according to an exemplary embodiment of the present invention.

Referring to FIG. 43, a BS in the multi-sector communication system first defines total frequency resources as only the resource sector common band according to the seventh definition scheme described above. The BS then allocates frequency resources defined as the sector common band to users located in cell central regions near the BS so they transmit a signal in the same frequency band by cooperatively using all or some sector antennae in a cell. This prevents DCA or handover from being frequently performed on users moving in the cell central region near the BS. When a user enters the sector central region, the BS performs inter-sector adjustment to define the sector dedicated band in the common band according to a predetermined rule.

The BS also allocates frequency resources defined as the sector dedicated band for one sector to users located in the sector central region of the sector, and, for resource reuse, defines the frequency resources as a sector dedicated band for the other sectors in the same cell to allocate the same to users located in a sector central region of the sector. For additional resource reuse, the BS defines the frequency resources as the inter-sector shared band in non-neighboring sectors. When a user enters the inter-sector boundary region, the BS performs inter-sector adjustment to define the inter-sector shared band in the common band according to a predetermined rule.

Also, the BS allocates frequency resources defined as the inter-sector shared band, to users located in the inter-sector boundary region in such a manner that the frequency resources are not used in two sectors in the cell adjacent to the inter-sector boundary region in order to avoid interference with the neighboring sectors. For resource reuse, the BS defines the frequency resources as the sector dedicated band or the inter-sector shared band in sectors not adjacent to the inter-sector boundary region. Here, the BS defines the frequency resources as the inter-sector shared band in non-neighboring sectors for resource reuse. Rules by which a BS in a multi-sector communication system defines a sector dedicated band and a inter-sector shared band from among a sector common band will be described with reference to FIGS. 17b to 17d.

Referring to FIG. 44, when a user enters the sector central region or the inter-sector boundary region, the BS sequentially defines and allocates a sector dedicated band or a inter-sector shared band from among a sector common band in a predefined order through inter-sector adjustment, according to a first rule. If a band to be defined as the sector dedicated band or the inter-sector shared band is occupied by users located in a cell central region near the BS, the BS first allocates the band to the user located in the sector central region or the inter-sector boundary region after allocating another band to the users located in the cell central region.

Referring to FIG. 45, when a user enters the sector central region or the inter-sector boundary region, the BS defines an empty band in the sector common band as the sector dedicated band or the inter-sector shared band according to the second rule, and allocates the same. When a user enters the inter-sector boundary region and there are no empty frequency resources in common to the sector common bands for two sectors adjacent to the inter-sector boundary region, the BS allocates another band to a user who is using the sector dedicated band defined from among the sector common band in the neighboring two sectors, prepares the empty band in common to the sector common bands for the two sectors adjacent to the inter-sector boundary region, defines the band as the inter-sector shared band for the inter-sector boundary region, and allocates the same to the user located in the inter-sector boundary region.

Referring to FIG. 46, in the third rule, a BS sets a reserved dedicated band or a reserved shared band for users located in a sector central region or a inter-sector boundary region within a sector common band, and defines and allocates the reserved band as a sector dedicated band or a inter-sector shared band when a user enters the sector central region or the inter-sector boundary region. If a band to be defined as the sector dedicated band or the inter-sector shared band is occupied by a user located in the cell central region, the BS first allocates the band to the user located in the sector central region or the inter-sector boundary region, in which another band is allocated to the user located in the cell central region. Here, the BS changes sizes of the reserved dedicated band and the reserved shared band depending, for example, on a distribution of users in the cell. Preferably, the reserved dedicated band or the reserved shared band is not allocated to users located in the cell central region or the cell central region. Here, when the reserved dedicated band or the reserved shared band is used, it is used in reverse order of the order in which the resources are allocated to mobile stations located in the sector central region or the inter-sector boundary region.

FIGS. 47 to 50 illustrates a scheme in which total frequency resources are first not defined as any band in a multi-sector communication system according to an exemplary embodiment of the present invention.

Referring to FIG. 47, a BS in the multi-sector communication system first does not define the total frequency resources as any band according to the eighth definition scheme described above. When a user enters the sector central region, the BS then performs inter-sector adjustment to define the sector dedicated band in the total frequency resources according to a predetermined rule.

The BS allocates frequency resources defined as a sector dedicated band for one sector to users located in the sector central region of the sector, and, for resource reuse, defines the frequency resources as the sector dedicated band for other sectors in the same cell to allocate the same to users located in a sector central region of the sector. For additional resource reuse, the BS defines the frequency resources as the inter-sector shared band in non-neighboring sectors. When a user enters the inter-sector boundary region, the BS performs inter-sector adjustment to define the inter-sector shared band in the total frequency resources according to a predetermined rule.

Also, the BS allocates frequency resources defined as the inter-sector shared band to users located in the inter-sector boundary region in such a manner that the frequency resources are not used in two sectors in the cell adjacent to the inter-sector boundary region in order to avoid interference with the neighboring sectors. For resource reuse, the BS defines the frequency resources as the sector dedicated band or the inter-sector shared band in sectors not adjacent to the inter-sector boundary region. When a user enters the cell central region, the BS performs inter-sector adjustment to define the sector common band in the total frequency resources according to a predetermined rule.

The BS also allocates frequency resources defined as the sector common band to users located in cell central regions near the BS so that they transmit a signal in the same frequency band by cooperatively using all or some sector antennae in a cell. This prevents DCA or handover from being frequently performed on users moving in the cell central region. Rules by which a BS defines a sector dedicated band, a inter-sector shared band, and a sector common band in total frequency resources will be described with reference to FIGS. 18b to 18d.

Referring to FIG. 48, when a user enters the sector central region, the inter-sector boundary region, or the cell central region, the BS performs inter-sector adjustment to sequentially define the sector dedicated band, the inter-sector shared band, and the sector common band in the total frequency resources in a predefined order and allocate the same.

Referring to FIG. 50, when a user enters the sector central region, the inter-sector boundary region, and the cell central region, the BS defines an empty band in the total frequency resources as the sector dedicated band, the inter-sector shared band, and the sector common band according to the second rule, and allocates the same to the user. When a user enters the inter-sector boundary region and there are no empty frequency resources in common to two sectors adjacent to the inter-sector boundary region, or when a users enters the cell central region and there are no empty frequency resources in common to all the sectors, the BS allocates another frequency band to a user located in the sector central region, prepares the empty band in common to the two sectors adjacent to the inter-sector boundary region, defines the band as the inter-sector shared band, and allocates the same to the user located in the inter-sector boundary region, or prepares the empty band in common to all the sectors, defines the band as the sector common band, and allocates the same to users located in the cell central region.

Referring to FIG. 51, a BS sets a reserved dedicated band, a reserved shared band, or a reserved common band for users located in a sector central region, a inter-sector boundary region, or a cell central region within total frequency resources, and defines and allocates the reserved band as a sector dedicated band, a inter-sector shared band, or a sector common band when a user enters the sector central region, the inter-sector boundary region, or the cell central region. If a band to be defined as the band for one region is occupied by a user located in the other region, the BS first allocates the band to the user located in the region, in which another band is allocated to the user located in the other region. In this case, the BS may change sizes of the reserved dedicated band, the reserved shared band, and the reserved common band depending, for example, on a distribution of users in the cell. Preferably, the reserved band for one region is not allocated to users located in the other regions. Here, when the reserved band for the other region is used, it is used in reverse order of the order in which the resources are allocated to users located in relevant region. A scheme of using a inter-sector shared band defined by dividing total available frequency resources, i.e., a scheme of transmitting and receiving a signal through the frequency resources of the inter-sector shared band divided or defined from among the total frequency band to allocate to a user located in the inter-sector boundary region, as described above, in a communication system according to an exemplary embodiment of the present invention will be described with reference to FIGS. 51 to 53.

FIGS. 51 to 53 illustrates a scheme of using a inter-sector shared band in a multi-sector communication system according to an exemplary embodiment of the present invention. FIGS. 19a to 19c illustrate signal transmission and reception schemes using the frequency resources of the inter-sector shared band defined from among a total frequency band to be allocated to users located in the inter-sector boundary region according to the three transmission and reception schemes, as described above, in a multi-sector communication system.

Referring to FIG. 51, the multi-sector communication system transmits and receives a signal using only the most neighboring sector antenna according to the first transmission and reception scheme described above. That is, a user located in the inter-sector boundary region and allocated the frequency resources of the inter-sector shared band is connected only to the most neighboring sector antenna to transmit and receive a signal. For reuse, the multi-sector communication system defines inter-sector shared bands for the respective sectors that are not used in two neighboring inter-sector boundary regions, as the sector dedicated band or as the inter-sector shared band. Here, in the inter-sector boundary region that is an edge of a sector antenna beam pattern, antenna gain reduction may result in signal quality degradation.

More specifically, although a first user and a second user are both located in the first inter-sector boundary region, the most neighboring sector antennae differ, and the first user is connected to the first sector antenna and the second user is connected to the second sector antenna. A third user is located in the second inter-sector boundary region and is most adjacent to a second sector antenna. Accordingly, the third user is connected to the second sector antenna. In this case, the third sector antenna allocates a frequency band used for the first sector antenna to transmit and receive a signal to and from the first user and a frequency band used for the second sector antenna to transmit and receive a signal to and from the second user, as the sector dedicated band, to users located in a third sector central region. Also, the first sector antenna allocates a frequency band used for the third sector antenna to transmit and receive a signal to and from the third user, as the sector dedicated band, to a user located in the first sector central region.

Referring to FIG. 52, the multi-sector communication system transmits and receives a signal in the same frequency band by cooperatively using the two most neighboring sector antennae according to the second transmission and reception scheme described above. That is, a user located in the inter-sector boundary region and allocated the frequency resources of the inter-sector shared band transmits and receives a signal by cooperatively using the two most neighboring sector antennae. For reuse, the multi-sector communication system defines inter-sector shared bands for respective sectors that are not used in two neighboring inter-sector boundary regions, as the sector dedicated band or the inter-sector shared band. Also, since a user located in the inter-sector boundary region that is an edge of the sector antenna beam pattern transmits and receives a signal in the same frequency band by cooperatively using the two most neighboring sector antennae, signal quality degradation caused by antenna gain reduction in the inter-sector boundary region can be prevented.

Here, a scheme by which the two sector antennae transmit and receive a signal to and from the user includes a 2-1 transmission and reception scheme in which the two most neighboring sector antennae transmit the same signal in the same frequency band to a user located in the inter-sector boundary region and allocated the frequency resource of the inter-sector shared band, a 2-2 transmission and reception scheme in which the two most neighboring sector antennae transmit the same information in the same frequency band to a user located in the inter-sector boundary region and allocated the frequency resources of the inter-sector shared band, and a 2-3 transmission and reception scheme in which the two most neighboring sector antennae transmit different information in the same frequency band to a user located in the inter-sector boundary region and allocated the frequency resources of the inter-sector shared band. In this case, the scheme by which the two sector antennae transmit a signal may be applied, for example, to spatial division multiple access ("SDMA") and space time code ("STC").

More specifically, since both the first user and the second user are located in the first inter-sector boundary region, they are connected to the two most neighboring sector antennae, i.e., the first sector antenna and the second sector antenna to cooperatively transmit and receive a signal in the same frequency band. Since the third user is located in a second inter-sector boundary region, it is connected to the second and third most neighboring sector antennae to cooperatively transmit and receive a signal in the same frequency band. In this case, the third sector antenna allows the frequency band used for the first sector and the second sector antenna transmit and receive a signal to and from the first user and the second user, to be allocated, as a sector dedicated band, to a user located in the third sector central region. Also, the first sector antenna allows the frequency band used for the second sector and the third sector antenna to transmit and receive a signal to and from the third user to be allocated, as the sector dedicated band, to the user located in the first sector central region.

Referring to FIG. 53, the multi-sector communication system transmits and receives a signal in the same frequency band by cooperatively using all or some sector antennae in one cell according to the third transmission and reception scheme described above. In this case, a user located in the inter-sector boundary region and allocated the frequency resources of the inter-sector shared band transmits and receives a signal in the same frequency band by cooperatively using all or some sector antennae in one cell. As all or some of the sector antennae in one cell cooperatively transmit and receive a signal in the same frequency band to and from the user located in the inter-sector boundary region, it may lead to additional power consumption and degraded use efficiency of the frequency resources of the inter-sector shared band. However, when the user moves from the inter-sector boundary region or the cell central region to a neighboring sector, stable inter-sector handover is possible.

Examples of the scheme by which all or some sector antennae transmit and receive a signal to and from a user include a 3-1 transmission and reception scheme by which all or some sector antennae transmit and receive the same signal in the same frequency band to the user located in the inter-sector boundary region and allocated the frequency resources of the inter-sector shared band; a 3-2 transmission and reception scheme by which all or some sector antennae transmit the same information in the same frequency band to the user located in the inter-sector boundary region and allocated the frequency resources of the inter-sector shared band; and a 3-3 transmission and reception scheme by which all or some sector antennae transmit different information in the same frequency band to the user located in the inter-sector boundary region and allocated the frequency resources of the inter-sector shared band. This may apply to SDMA and STC.

That is, since all of the first, second and third users are located in the inter-sector boundary region, they are simultaneously connected to all sector antennae and transmit and receive a signal in the same frequency band cooperatively. The scheme of using the inter-sector shared band defined by dividing total available frequency resources as described above in the multi-sector communication system according to an exemplary embodiment of the present invention, i.e., the scheme of using the frequency resources of the inter-sector shared band defined from among a total frequency band to be allocated to users located in the inter-sector boundary region will now be described with reference to the accompanying drawings.

FIGS. 54 to 56 illustrates a scheme of using a inter-sector shared band in a 3-sector cell of a multi-sector communication system according to an exemplary embodiment of the present invention.

Referring to FIG. 54, in the multi-sector communication system, the frequency resources of the inter-sector shared band are shared among inter-sector boundary regions according to the first use scheme described above. Also, in order to avoid inter-sector interference, the frequency resources of the inter-sector shared band that are being used in neighboring sectors are not used. In this case, the frequency resources may be reused as the sector dedicated band or the inter-sector shared band for non-adjacent sectors. Here, the multi-sector communication system changes a size of the inter-sector shared band in the total frequency resources depending, for example, on a distribution of users in a cell.

More specifically, the frequency resources of the inter-sector shared band are shared among inter-sector boundary regions in such a manner that a user located in the inter-sector boundary region and allocated the frequency resources of the inter-sector shared band transmits and receives a signal in the same frequency band by cooperatively using the two most neighboring sector antennae.

Referring to FIG. 55, the multi-sector communication system divides a inter-sector shared band into inter-sector boundary regions according to the second use scheme described above. In this case, the multi-sector communication system defines the boundary region dedicated frequency bands from among the inter-sector shared band to be orthogonal among inter-sector boundary regions and allocates the frequency resources to be orthogonal among the inter-sector boundary regions. Here, the multi-sector communication system changes sizes of the sector dedicated band and the inter-sector shared band in the total frequency resources depending, for example, on a distribution of users in the cell.

Referring to FIG. 56, the multi-sector communication system divides the inter-sector shared band by the number of sectors to be orthogonal to one another in a 3-sector cell according to the second use scheme described above, and allocates a dedicated shared band to each inter-sector boundary region. Here, the multi-sector communication system changes sizes of the dedicated shared bands for the inter-sector boundary region depending, for example, on a distribution of users in the inter-sector boundary region. Also, in the 3-sector cell, the inter-sector shared bands are divided and used in the inter-sector boundary regions, and a user located in the inter-sector boundary region transmits and receives a signal in the same frequency band by cooperatively using the two most neighboring sector antennae. In this case, in order to avoid inter-sector interference in each sector, unused frequency resources of the inter-sector shared band may be reused as the sector dedicated band.

FIG. 57 and 58 illustrates a scheme of using a inter-sector shared band in a 4-sector cell of a multi-sector communication system according to an exemplary embodiment of the present invention.

Referring to FIG. 57, the multi-sector communication system divides a inter-sector shared band by the number of sectors to be orthogonal to one another in the 4-sector cell according to the second use scheme described above and allocates a dedicated shared band to each inter-sector boundary region. Here, the multi-sector communication system changes sizes of the dedicated shared bands for the inter-sector boundary region depending, for example, on a distribution of users in the inter-sector boundary region. In this case, the multi-sector communication system allows the frequency resources of the inter-sector shared band to be reused in non-neighboring inter-sector boundary regions. Also, the multi-sector communication system defines inter-sector shared bands that are not used in two neighboring inter-sector boundary regions, as the sector dedicated band, for reuse.

Referring to FIG. 58, the multi-sector communication system divides a inter-sector shared band into two bands to be orthogonal to each other in a 4-sector cell according to the second use scheme described above and allocates the same as a dedicated shared band for each inter-sector boundary region. In this case, the frequency resources of the inter-sector shared band allocated to the inter-sector boundary region are not used by sectors adjacent to the inter-sector boundary region in order to avoid interference with neighboring sectors in the cell. In this case, the multi-sector communication system allows the frequency resources of the inter-sector shared band to be reused in non-neighboring inter-sector boundary regions.

FIGS. 59 to 61 illustrates a scheme of using a inter-sector shared band in a 6-sector cell of a multi-sector communication system according to an exemplary embodiment of the present invention.

Referring to FIG. 59, the multi-sector communication system divides a inter-sector shared band by the number of sectors to be orthogonal to one another in a 6-sector cell according to the second use scheme described above, and allocates a dedicated shared band to each inter-sector boundary region. Here, the multi-sector communication system changes sizes of the dedicated shared bands for the inter-sector boundary region depending, for example, on a distribution of users in the inter-sector boundary region. In this case, the multi-sector communication system allows the frequency resources of the inter-sector shared band to be reused in non-neighboring inter-sector boundary regions. Also, the multi-sector communication system defines inter-sector shared bands that are not used in two neighboring inter-sector boundary regions, as the sector dedicated band, for reuse.

Referring to FIG. 60, the multi-sector communication system divides a inter-sector shared band into three bands to be orthogonal to one another in a 6-sector cell according to the second use scheme described above, and allocates the same as a dedicated shared band for each inter-sector boundary region. In this case, the frequency resources of the inter-sector shared band allocated to the inter-sector boundary region are not used by sectors adjacent to the inter-sector boundary region in order to avoid interference with neighboring sectors in the cell. In this case, the multi-sector communication system allows the frequency resources of the inter-sector shared band to be reused in non-neighboring inter-sector boundary regions. Also, the multi-sector communication system defines the inter-sector shared band that is not used in two neighboring inter-sector boundary regions, as the sector dedicated band, for reuse.

Referring to FIG. 61, the multi-sector communication system divides a inter-sector shared band into two bands to be orthogonal to each other in a 6-sector cell according to the second using scheme described above, and allocates the same as a dedicated shared band for each inter-sector boundary region. In this case, the frequency resources of the inter-sector shared band allocated to the inter-sector boundary region are not used by sectors adjacent to the inter-sector boundary region in order to avoid interference with neighboring sectors in the cell. In this case, the multi-sector communication system allows the frequency resources of the inter-sector shared band to be reused in non-neighboring inter-sector boundary regions.

FIG. 62 and 63 illustrates a scheme of using a inter-sector shared band in a 3-sector cell of a multi-sector communication system according to an exemplary embodiment of the present invention.

Referring to FIG. 62, the multi-sector communication system uses frequency resources through the scheme of using the frequency resources of the inter-sector shared band into dedicated bands to be orthogonal to each other in each inter-sector boundary region in a 3-sector cell according to the second use scheme described above. In this case, the inter-sector shared band is shared by a user located in the inter-sector boundary region and allocated the frequency resources of the inter-sector shared band by transmitting and receiving a signal in the same frequency band by cooperatively using the two sector antennae most adjacent to the user.

Referring to FIG. 63, the multi-sector communication system divides the frequency resources of the inter-sector shared band in a 3-sector cell according to the second use scheme described above and uses the same variably. That is, the multi-sector communication system changes a size of the dedicated band defined from among each inter-sector boundary region depending, for example, on a distribution of users located in each inter-sector boundary region. An example in which DCA is performed in a multi-sector communication system according to an exemplary embodiment of the present invention will now be described in detail with reference to the accompanying drawings.

First, the multi-sector communication system according to an exemplary embodiment of the present invention uses the following information, i.e., parameters for DCA:

A parameter used for identifying the inter-sector boundary region and the sector central region.

A parameter used for identifying locations of the cell central region and a cell non-center region.

After obtaining the information for the DCA, a multi-sector communication system performs the DCA. More specifically, when the multi-sector communication system obtains the information for the DCA between the inter-sector shared band and the sector dedicated band, it performs the DCA based on the obtained information.

For example, in a downlink ("DL"), the MS of the user simultaneously receives signals from BSs for the sectors located in a cell central region. In this case, the signals differ in intensity among user locations according to a designed antenna beam pattern. First, the BS measures a power ratio between two signals having the largest intensity upon initialization, and compares it with a boundary value. When the measured value is smaller than the boundary value, the user is determined not to be located in the inter-sector boundary region. When the measured value is greater than the boundary value, the user is determined to be located in the sector central region. The MS periodically measures and compares the intensities of the largest signals from two sector antennae to determine a sector central region or a inter-sector boundary region in which the user is located. Here, for example, a pilot signal is used to measure the intensity of the signal transmitted from each sector antenna.

The MS then transmits the power ratio between the two largest signals to the BS. Based on the power ratio, the BS determines a sector central region or inter-sector boundary region in which the user is located, whether DCA is needed, and which of the antennae is used to transmit and receive a signal for resource allocation and system operation.

In an uplink ("UL"), a signal from the MS of the user is simultaneously received by all sector antennae for BSs located in the cell central region. In this case, the BS measures signals from the two sector antennae that receive the largest signals from the MS, compares the signal with a boundary value to determine a central region or a inter-sector boundary region in which the user is located. The BS then measures a signal of the two sector antennae that receive the largest signal from the MS, and compares the signal with the boundary value to determine a sector central region or inter-sector boundary region in which the user is located, whether DCA is needed, and which of the antennae is used to transmit and receive a signal for resource allocation and system operation.

When information for DCA between the sector common band and another band is obtained, the multi-sector communication system performs DCA based on the obtained information. That is, in a communication system in which a sector common band is set in total frequency resources, information for DCA between the sector common band and the inter-sector shared band or the sector dedicated band is necessary. The information for DCA between the inter-sector shared band and the sector dedicated band as described above is used to determine the location of the user. When DCA is performed, the MS measures SINR of its signal excluding an interference signal and compares the measured SINR with a center reference value. When the measured value is smaller than the center reference value, the user is determined not to be located in the cell central region. When the measured value is greater than the center reference value, the user is determined to be located in the cell central region. The MS periodically measures and compares the SINR to determine whether the user is located in the cell central region or not.

The MS transmits the SINR to the BS. Upon receipt of the SINR, the BS determines whether the user is located in the cell central region or not, whether DCA is needed, and which of the antennae is used to transmit and receive data for resource allocation and system operation.

Also, the multi-sector communication system according to an exemplary embodiment of the present invention performs DCA to dynamically allocate the sector dedicated band, the inter-sector shared band, and the sector common band to users in a sector according to user locations and an interference degree that depend on mobility of the users, in order to efficiently use the total frequency resources including the frequency bands defined as described above. For convenience of description, it is assumed that a multi-sector communication system according to an exemplary embodiment of the present invention performs DCA depending on the mobility of the user in a 3-sector cell. Although the embodiment of the present invention will describe DCA in a 3-sector cell, the present invention may apply to DCA in a multi-sector cell including a 4-sector cell and a 6-sector cell.

Also, in the embodiment of the present invention, the scheme of sharing the inter-sector shared band, for example, a scheme by which a user located in the inter-sector boundary region and allocated the frequency resources of the inter-sector shared band transmits and receives a signal in the same frequency band by cooperatively using the two most neighboring sector antennae, will be described. Here, the multi-sector communication system according to an exemplary embodiment of the present invention performs DCA by using a first DCA scheme of having the frequency resources, which are allocated to and used by a user upon performing DCA to a different frequency band from an existing frequency band, returned fully as an initially set band in all sectors, and a second DCA scheme of having the frequency resources returned partially as an initially set band only in some of the sectors. An example in which DCA is performed when a user moves from a inter-sector boundary region to a sector central region will now be described.

FIG. 61 and 65 illustrates an example in which DCA is performed when a user moves from a inter-sector boundary region to a sector central region in a multi-sector communication system according to an exemplary embodiment of the present invention. In FIG. 64 and 65, the multi-sector communication system allocates a sector dedicated band to a user who is currently using a inter-sector shared band and has the inter-sector shared band returned from the user.

Referring to FIG. 64, the multi-sector communication system fully returns the frequency resources of the inter-sector shared band used by the user, as the inter-sector shared band in all the sectors according to a first DCA scheme. That is, since the user moves from a first inter-sector boundary region to a first sector central region, the user returns the previous inter-sector shared band and is allocated the sector dedicated band for the first sector. In this case, a user allocated the same frequency band as the inter-sector shared band and as the sector dedicated band for the third sector, returns the band and is allocated the sector dedicated band for the third sector.

Referring to FIG. 65, the multi-sector communication system partially returns, as the inter-sector shared band, the frequency resources of the inter-sector shared band used by the user in only two neighboring sectors to which the user is connected according to the second DCA scheme. That is, since the user moves from the first inter-sector boundary region to the first sector central region, the user returns the previous inter-sector shared band and is allocated the sector dedicated band for the first sector. In this case, the user allocated the same frequency band as the inter-sector shared band and the sector dedicated band for the third sector allocation, continues to use the band without returning the same.

Accordingly, when the user moves from the inter-sector boundary region to the sector central region, the multi-sector communication system immediately performs a DCA procedure to allocate the sector dedicated band to the user and have the inter-sector shared band in use returned from the user. Or, when the user stays in the sector central region for a predetermined period of time or lacks the frequency resources of the inter-sector shared band while using the current frequency resources of the inter-sector shared band, the multi-sector communication system performs a DCA procedure to allocate the sector dedicated band to the user and have the inter-sector shared band in use returned from the user.

FIGS. 66 to 69 illustrates an example in which DCA is performed when a user moves from a inter-sector boundary region to a sector central region in a multi-sector communication system according to an exemplary embodiment of the present invention. In FIGS. 66 to 69, the multi-sector communication system defines the sector dedicated band from among the sector common band, allocates the same to a user who is currently using the inter-sector shared band, and has the inter-sector shared band returned from the user.

Referring to FIG. 66, the multi-sector communication system allows the frequency resources of the sector dedicated band defined from among the sector common band allocated to the user, to be reused as the sector dedicated band in other sectors according to the first DCA scheme. That is, the frequency resources of the inter-sector shared band used by the user are fully returned as the inter-sector shared band in all the sectors.

Referring to FIG. 67, the multi-sector communication system allows the frequency resources of the sector dedicated band defined from among the sector common band allocated to the user, to be reused as the sector dedicated band in other sectors according to the second DCA scheme. That is, the frequency resources of the inter-sector shared band used by the user are partially returned as the inter-sector shared band only in two neighboring sectors to which the user is connected.

Referring to FIG. 68, the multi-sector communication system allows the frequency resources of the sector dedicated band defined from among the sector common band allocated to the user, to be reused as a inter-sector shared band for a inter-sector boundary region not adjacent to the sector where the user is located according to the first DCA scheme. That is, the frequency resources of the inter-sector shared band are fully returned, as the inter-sector shared band, from the user in all the sectors.

Referring to FIG. 69, the multi-sector communication system allows the frequency resources of the sector dedicated band defined from among the sector common band allocated to the user, to be reused as a inter-sector shared band for a inter-sector boundary region not adjacent to the sector where the user is located according to the second DCA scheme. That is, the frequency resources of the inter-sector shared band are partially returned, as the inter-sector shared band, from the user in only two neighboring sectors to which the user is connected.

Accordingly, when the user moves from the inter-sector boundary region to the sector central region, the multi-sector communication system immediately performs a DCA procedure to define the sector dedicated band in the sector common band, allocate the same to the user, and have the inter-sector shared band in use returned from the user. Or, when the user stays in the sector central region for a predetermined period of time or lacks the frequency resources of the inter-sector shared band while using the current frequency resources of the inter-sector shared band, the multi-sector communication system performs a DCA procedure to define the sector dedicated band in the sector common band, allocate the same to the user, and have the inter-sector shared band in use returned from the user.

FIG. 70 and 71 illustrates an example in which DCA is performed when a user moves from a inter-sector boundary region to a sector central region in a multi-sector communication system according to an exemplary embodiment of the present invention. In FIG. 70 and 71, the multi-sector communication system allocates the sector dedicated band to a user who is currently using the inter-sector shared band defined from among the sector common band, and returns frequency resources defined as the inter-sector shared band in the sector common band, as the sector common band.

Referring to FIG. 70, the multi-sector communication system fully returns the frequency resources of the inter-sector shared band defined from among the sector common band used by the user, as the sector common band, in all the sectors according to the first DCA scheme.

Referring to FIG. 71, the multi-sector communication system partially returns the frequency resources of the inter-sector shared band defined from among the sector common band used by the user in only two neighboring sectors to which the user is connected, as the sector common band, according to the second DCA scheme.

Accordingly, when the user moves from the inter-sector boundary region to the sector central region, the multi-sector communication system immediately performs a DCA procedure to allocate the sector dedicated band to the user and have the inter-sector shared band defined from among the sector common band returned from the user. Or, when the user stays in the sector central region for a predetermined period of time or lacks the frequency resources of the sector common band while continuing to use the frequency resources of the inter-sector shared band defined from among the sector common band, the multi-sector communication system performs a DCA procedure to allocate the sector dedicated band to the user and have the inter-sector shared band defined from among the sector common band returned from the user.

FIG. 72 and 73 illustrates an example in which DCA is performed when a user moves from a inter-sector boundary region to a sector central region in a multi-sector communication system according to an exemplary embodiment of the present invention. In FIG. 72 and 73, the multi-sector communication system allocates a sector dedicated band to a user who is currently using the inter-sector shared band defined from among the sector dedicated band.

Referring to FIG. 72, the multi-sector communication system defines the frequency resources of the inter-sector shared band defined from among the sector dedicated band currently used by the user, as the sector dedicated band, so that the user continues to use the same. Accordingly, when the user moves from the inter-sector boundary region to the sector central region, the multi-sector communication system immediately performs a DCA procedure to redefine the inter-sector shared band defined from among the sector dedicated band, as the sector dedicated band, in the sector where the user is located so that the user continues to use the frequency resources. Or, when the user stays in the sector central region for a predetermined period of time or lacks the frequency resources of the sector dedicated band while using the current frequency resources of the inter-sector shared band, the multi-sector communication system performs a DCA procedure to redefine the inter-sector shared band defined from among the sector dedicated band, as the sector dedicated band, in the sector where the user is located so that the user continues to use the frequency resources.

Referring to FIG. 73, the multi-sector communication system defines different frequency resources from the frequency resources of the inter-sector shared band defined from among the sector dedicated band currently used by the user, as the sector dedicated band, so that the user uses the same. In this case, the frequency resources in use are returned as the sector dedicated band, either fully, according to the first DCA scheme, or partially, according to the second DCA scheme. Accordingly, when the user moves from the inter-sector boundary region to the sector central region, the multi-sector communication system immediately performs a DCA procedure to allocate empty frequency resources in the sector dedicated band to the user in the sector where the user is located, and to have the inter-sector shared band defined from among the sector dedicated band returned as the sector dedicated band. Or, when the user stays in the sector central region for a predetermined period of time or lacks the frequency resources of the sector dedicated band while using the current frequency resources of the inter-sector shared band, the multi-sector communication system performs a DCA procedure to allocate empty frequency resources in the sector dedicated band to the user in the sector where the user is located and have the inter-sector shared band defined from among the sector dedicated band returned from the user, as the sector dedicated band.

FIG. 74 and 75 illustrates an example in which DCA is performed when a user moves from a inter-sector boundary region to a sector central region in a multi-sector communication system according to an exemplary embodiment of the present invention. In FIG. 74 and 75, the multi-sector communication system defines a sector dedicated band from among a inter-sector shared band and allocates the same to a user who is currently using the inter-sector shared band.

Referring to FIG. 74, the multi-sector communication system defines the frequency resources of the inter-sector shared band currently used by the user, as a sector dedicated band so that the user continues to use the frequency resources. Accordingly, when the user moves from the inter-sector boundary region to the sector central region, the multi-sector communication system immediately performs a DCA procedure to redefine frequency resources of the inter-sector shared band that are being used by the user, as the sector dedicated band, in the sector where the user is located, so that the user continues to use the frequency resources. Or, when the user stays in the sector central region for a predetermined period of time or lacks the frequency resources of the inter-sector shared band while using the current frequency resources of the inter-sector shared band, the multi-sector communication system performs a DCA procedure to redefine frequency resources of the inter-sector shared band that is being used by the user, as the sector dedicated band, in the sector where the user is located, so that the user continues to use the frequency resources.

Referring to FIG. 75, the multi-sector communication system defines different frequency resources from the frequency resources of the inter-sector shared band currently used by the user, as the sector dedicated band, so that the user uses the same. In this case, the frequency resources in use are fully returned as the inter-sector shared band according to the first DCA scheme or partially returned as the inter-sector shared band according to the second DCA scheme. Accordingly, when the user moves from the inter-sector boundary region to the sector central region, the multi-sector communication system immediately performs a DCA procedure to define empty frequency resources in the inter-sector shared band, as the sector dedicated band, in the sector where the user is located, allocate the same to the user, and have the inter-sector shared band in use returned from the user. Or, when the user stays in the sector central region for a predetermined period of time or lacks the frequency resources of the inter-sector shared band while using the current frequency resources of the inter-sector shared band, the multi-sector communication system performs a DCA procedure to define empty frequency resources in the inter-sector shared band, as the sector dedicated band, in the sector where the user is located, allocate the same to the user, and have the inter-sector shared band returned from the user.

FIGS. 76 to 79 illustrates an example in which DCA is performed when a user moves from a inter-sector boundary region to a sector central region in a multi-sector communication system according to an exemplary embodiment of the present invention. In FIGS. 76 to 79, the multi-sector communication system defines the sector dedicated band from among the sector common band and allocates the same to a user who is currently using the inter-sector shared band defined from among the sector common band.

Referring to FIG. 76, the multi-sector communication system redefines the frequency resources of the inter-sector shared band, as sector dedicated band, in the sector common band currently used by the user so that the user continues to use the frequency resources. Also, the multi-sector communication system allows the sector dedicated band defined from among the sector common band allocated to the user, to be reused as the sector dedicated band in other sectors. Accordingly, when the user moves from the inter-sector boundary region to the sector central region, the multi-sector communication system immediately performs a DCA procedure to redefine frequency resources of the inter-sector shared band defined from among the sector common band used by the user, as the sector dedicated band, in the sector where the user is located so that the user continues to use the frequency resources. Or, when the user stays in the sector central region for a predetermined period of time or lacks the frequency resources of the sector common band while continuing to use the frequency resources of the inter-sector shared band defined from among the sector common band, the multi-sector communication system performs a DCA procedure to redefine frequency resources of the inter-sector shared band defined from among the sector common band used by the user, as the sector dedicated band, in the sector where the user is located, so that the user continues to use the frequency resources.

Referring to FIG. 77, the multi-sector communication system redefines the frequency resources of the inter-sector shared band, as the sector dedicated band, in the sector common band currently used by the user so that the user continues to use the frequency resources. Also, the multi-sector communication system allows the sector dedicated band defined from among the sector common band allocated to the user, to be reused as a inter-sector shared band for a inter-sector boundary region not adjacent to the sector where the user is located. Accordingly, when the user moves from the inter-sector boundary region to the sector central region, the multi-sector communication system immediately performs a DCA procedure to redefine frequency resources of the inter-sector shared band defined from among the sector common band used by the user, as the sector dedicated band, in the sector where the user is located so that the user continues to use the frequency resources. Or, when the user stays in the sector central region for a predetermined period of time or lacks the frequency resources of the sector common band while continuing to use the frequency resources of the inter-sector shared band defined from among the sector common band, the multi-sector communication system performs a DCA procedure to redefine frequency resources of the inter-sector shared band defined from among the sector common band used by the user, as the sector dedicated band, in the sector where the user is located, so that the user continues to use the frequency resources.

Referring to FIG. 78, the multi-sector communication system defines the frequency resources of the sector common band different from the frequency resources of the inter-sector shared band defined from among the sector common band currently used by the user, as the sector dedicated band, so that the user uses the same. In this case, the frequency resources in use are fully returned as the sector common band according to the first DCA scheme or partially returned as the sector common band according to the second DCA scheme. Also, the multi-sector communication system allows the sector dedicated band defined from among the sector common band allocated to the user, to be reused as the sector dedicated band in other sectors. Accordingly, when the user moves from the inter-sector boundary region to the sector central region, the multi-sector communication system immediately performs a DCA procedure to define empty frequency resources in the sector common band, as the sector dedicated band, in the sector where the user is located, allocate the same to the user, and have the inter-sector shared band defined from among the sector common band returned as the sector common band. Or, when the user stays in the sector central region for a predetermined period of time or lacks the frequency resources of the sector common band while continuing to use the frequency resources of the inter-sector shared band defined from among the sector common band, the multi-sector communication system performs a DCA procedure to define empty frequency resources in the sector common band, as the sector dedicated band, in the sector where the user is located, allocate the same to the user, and have the inter-sector shared band defined from among the sector common band returned as the sector common band.

Referring to FIG. 79, the multi-sector communication system defines the frequency resources of the sector common band different from the frequency resources of the inter-sector shared band defined from among the sector common band currently used by the user, as the sector dedicated band, so that the user uses the same. In this case, the frequency resources in use are fully returned as the sector common band according to the first DCA scheme or partially returned as the common band according to the second DCA scheme sector. Also, the multi-sector communication system allows the sector dedicated band defined from among the sector common band allocated to the user, to be reused as a inter-sector shared band for a inter-sector boundary region not adjacent to the sector where the user is located. Accordingly, when the user moves from the inter-sector boundary region to the sector central region, the multi-sector communication system immediately performs a DCA procedure to define empty frequency resources in the sector common band, as the sector dedicated band, in the sector where the user is located, allocate the same to the user, and have the inter-sector shared band defined from among the sector common band returned as the sector common band. Or, when the user stays in the sector central region for a predetermined period of time or lacks the frequency resources of the sector common band while continuing to use the frequency resource of the inter-sector shared band defined from among the sector common band, the multi-sector communication system performs a DCA procedure to define empty frequency resources in the sector common band, as the sector dedicated band, in the sector where the user is located, allocate the same to the user, and have the inter-sector shared band defined from among the sector common band returned as the sector common band. An example in which DCA is performed when a user moves from a sector central region to a inter-sector boundary region will now be described.

FIGS. 80 to 89 illustrates an example in which DCA is performed when a user moves from a sector central region to a inter-sector boundary region in a multi-sector communication system according to an exemplary embodiment of the present invention.

Referring to FIG. 80, the multi-sector communication system allocates a inter-sector shared band to a user who is currently using the sector dedicated band, and has the sector dedicated band returned from the user. Accordingly, when the user moves from the sector central region to the inter-sector boundary region, the multi-sector communication system immediately performs a DCA procedure to allocate the inter-sector shared band to the user and have the sector dedicated band returned from the user.

Referring to FIG. 81, the multi-sector communication system defines the inter-sector shared band from among the sector common band, allocates the same to a user who is currently using the sector dedicated band, and has the sector dedicated band returned from the user. Accordingly, when the user moves from the sector central region to the inter-sector boundary region, the multi-sector communication system immediately performs a DCA procedure to define the inter-sector shared band in the sector common band, allocate the same to the user, and have the sector dedicated band returned from the user.

Referring to FIG. 82, the multi-sector communication system allocates the inter-sector shared band to a user who is currently using the sector dedicated band defined from among the sector common band, and has frequency resources in use returned, as the sector common band, from the user. Also, the multi-sector communication system allows the frequency resources of the sector dedicated band defined from among the sector common band allocated to the user, to be reused as a sector dedicated band in other sectors. In this case, frequency resources of the sector dedicated band defined from among the sector common band used by the user are fully returned as the sector common band in all the sectors according to the first DCA scheme. Accordingly, when the user moves from the sector central region to the inter-sector boundary region, the multi-sector communication system immediately performs a DCA procedure to allocate the inter-sector shared band to the user and have the sector dedicated band defined from among the sector common band returned, as the sector common band, from the user.

Referring to FIG. 83, the multi-sector communication system allocates the inter-sector shared band to a user who is currently using the sector dedicated band defined from among the sector common band, and has frequency resources in use returned, as the sector common band, from the user. Also, the multi-sector communication system allows the frequency resources of the sector dedicated band defined from among the sector common band allocated to the user, to be reused as the sector dedicated band in other sectors. In this case, frequency resources of the sector dedicated band defined from among the sector common band used by the user are partially returned as the sector common band according to the second DCA scheme only in a sector to which the user is connected. Accordingly, when the user moves from the sector central region to the inter-sector boundary region, the multi-sector communication system immediately performs a DCA procedure to allocate the inter-sector shared band to the user and have the sector dedicated band defined from among the sector common band returned, as the sector common band, from the user.

Referring to FIG. 84, the multi-sector communication system allocates the inter-sector shared band to a user who is currently using the sector dedicated band defined from among the sector common band, and has frequency resources in use returned, as the sector common band, from the user. Also, the multi-sector communication system allows the frequency resources of the sector dedicated band defined from among the sector common band allocated to the user, to be reused as a inter-sector shared band for a inter-sector boundary region not adjacent to the sector where the user is located. In this case, frequency resources of the sector dedicated band defined from among the sector common band used by the user are fully returned as the sector common band in all the sectors according to the first DCA scheme. Accordingly, when the user moves from the sector central region to the inter-sector boundary region, the multi-sector communication system immediately performs a DCA procedure to allocate the inter-sector shared band to the user and have the sector dedicated band defined from among the sector common band returned, as the sector common band, from the user.

Referring to FIG. 85, the multi-sector communication system allocates the inter-sector shared band to a user who is currently using the sector dedicated band defined from among the sector common band, and has frequency resources in use returned, as the sector common band, from the user. Also, the multi-sector communication system allows the frequency resources of the sector dedicated band defined from among the sector common band allocated to the user, to be reused as a inter-sector shared band for a inter-sector boundary region not adjacent to the sector where the user is located. In this case, frequency resources of the sector dedicated band defined from among the sector common band used by the user are partially returned as the sector common band only in a sector to which the user is connected. Accordingly, when the user moves from the sector central region to the inter-sector boundary region, the multi-sector communication system immediately performs a DCA procedure to allocate the inter-sector shared band to the user and have the sector dedicated band defined from among the sector common band returned, as the sector common band, from the user.

Referring to FIG. 86, the multi-sector communication system defines the inter-sector shared band from among the sector dedicated band and allocates the same to a user who is currently using the sector dedicated band. Also, the multi-sector communication system redefines the frequency resources of the sector dedicated band currently used by the user, as the inter-sector shared band so that the user continues to use the frequency resources. Accordingly, when the user moves from the sector central region to the inter-sector boundary region, the multi-sector communication system immediately performs a DCA procedure to allow the user to continue to use the frequency resources of the dedicated band and redefine the same as the inter-sector shared band in two sectors adjacent to the user. When the frequency resources used by the user are occupied by other users in neighboring sectors that are not yet connected with the user, the multi-sector communication system redefines the frequency resources as the inter-sector shared band to be used by the user after allocating another band to the other users.

Although not shown, the multi-sector communication system defines different frequency resources from the frequency resources of the sector dedicated band currently used by the user, as the inter-sector boundary region shared so that the user uses the same. In this case, the frequency resources in use are returned as the sector dedicated band either fully, according to the first DCA scheme, or partially, according to the second DCA scheme. Accordingly, when the user moves from the sector central region to the inter-sector boundary region, the multi-sector communication system immediately performs a DCA procedure to define a band in the sector dedicated empty band in common to two sectors adjacent to the user, as the inter-sector shared band, allocate the same to the user who is using the sector dedicated band, and have the sector dedicated band returned from the user. If there is no empty band in common to the two sectors adjacent to the user, the multi-sector communication system allocates another frequency band to a user located in the sector central region or the inter-sector boundary region to prepare the empty band in common to the two sectors adjacent to the user, defines the band as the inter-sector shared band, and allocates the inter-sector shared band to the user.

Referring to FIG. 87, the multi-sector communication system allocates the inter-sector shared band to a user who is currently using the sector dedicated band defined from among the inter-sector shared band. Also, the multi-sector communication system redefines the frequency resources of the sector dedicated band defined from among the inter-sector shared band currently used by the user, as the inter-sector shared band so that the user continues to use the frequency resources. Accordingly, when the user moves from the sector central region to the inter-sector boundary region, the multi-sector communication system immediately performs a DCA procedure to allow the user to continue to use the frequency resources of the dedicated band defined from among the inter-sector shared band sector and redefine the frequency resources as the inter-sector shared band in two sectors adjacent to the user to be used by the user. If the frequency resources used by the user are occupied by other users in neighboring sectors that are not yet connected with the user, the multi-sector communication system redefines the frequency resources as the inter-sector shared band to be used by the user, after allocating another band to the other users.

Although not shown, the multi-sector communication system allows the user to use frequency resources of the inter-sector shared band different from the frequency resources of the sector dedicated band defined from among the inter-sector shared band currently used by the user. In this case, the frequency resources in use are fully returned as the inter-sector shared band according to the first DCA scheme or partially returned as the inter-sector shared band according to the second DCA scheme. Accordingly, when the user moves from the sector central region to the inter-sector boundary region, the multi-sector communication system immediately performs a DCA procedure to allocate a band in the inter-sector boundary region shared empty band in common to two sectors adjacent to the user, to the user who is using the sector dedicated band defined from among the inter-sector shared band, and to have the sector dedicated band defined from among the inter-sector shared band returned from the user. If there is no empty band in common to the two sectors adjacent to the user, the multi-sector communication system allocates another other frequency band to a user located in the sector central region or the inter-sector boundary region to prepare the empty band in common to the two sectors adjacent to the user, defines the band as the inter-sector shared band, and allocates the same to the user.

Referring to FIG. 88, the multi-sector communication system defines the inter-sector shared band from among the sector common band and allocates the same to a user who is currently using the sector dedicated band defined from among the sector common band. Also, the multi-sector communication system redefines frequency resources of the sector dedicated band defined from among the sector common band currently used by the user, as the inter-sector shared band so that the user continues to use the frequency resources. In this case, the multi-sector communication system allows the sector dedicated band defined from among the sector common band allocated to the user, to be reused as a sector dedicated band in other sectors. Accordingly, when the user moves from the sector central region to the inter-sector boundary region, the multi-sector communication system immediately performs a DCA procedure to allow the user to continue to use the frequency resources of the sector dedicated band defined from among the sector common band and redefine the frequency resources as the inter-sector shared band in two sectors adjacent to the user to be used by the user. If the frequency resources used by the user are occupied by other users in neighboring sectors that are not yet connected with the user, the multi-sector communication system redefines the frequency resources as the inter-sector shared band to be used by the user after allocating another band to the other users.

Referring to FIG. 89, the multi-sector communication system defines the inter-sector shared band from among the sector common band and allocates the same to a user who is currently using the sector dedicated band defined from among the sector common band. Also, the multi-sector communication system redefines frequency resources of the sector dedicated band defined from among the sector common band currently used by the user, as the inter-sector shared band so that the user continues to use the frequency resources. In this case, the multi-sector communication system allows the sector dedicated band defined from among the sector common band allocated to the user, to be reused as a inter-sector shared band for a inter-sector boundary region not adjacent to the sector where the user is located. Accordingly, when the user moves from the sector central region to the inter-sector boundary region, the multi-sector communication system immediately performs a DCA procedure to allow the user to continue to use the frequency resources of the sector dedicated band defined from among the sector common band and redefine the frequency resources as the inter-sector shared band in two sectors adjacent to the user to be used by the user. If the frequency resources used by the user are occupied by other users in neighboring sectors that are not yet connected with the user, the multi-sector communication system redefines the frequency resources as the inter-sector shared band to be used by the user, after allocating another band to the other users.

Although not shown, the multi-sector communication defines system frequency resources different from the frequency resources of the sector dedicated band defined from among the sector common band currently used by the user, as the inter-sector shared band, so that the user uses the same. In this case, the frequency resources in use are returned as the sector common band fully according to the first DCA scheme or partially according to the second DCA scheme. Accordingly, when the user moves from the sector central region to the inter-sector boundary region, the multi-sector communication system immediately performs a DCA procedure to define an empty band in common to two sectors adjacent to the user, as the inter-sector shared band, allocate the same to the user who is using the sector dedicated band defined from among the sector common band, and have the sector dedicated band defined from among the common band in use returned from the user. If there is no empty band in common to the two sectors adjacent to the user, the multi-sector communication system allocates another frequency band to a user located in the sector central region or the inter-sector boundary region to prepare the empty band in common to the two sectors adjacent to the user, defines the band as the inter-sector shared band, and allocates the same to the user. An example in which DCA is performed when a user moves from a inter-sector boundary region to a cell central region will be described.

FIGS. 90 to 97 illustrates an example in which DCA is performed when a user moves from a inter-sector boundary region to a cell central region in a multi-sector communication system according to an exemplary embodiment of the present invention.

Referring to FIG. 90, the multi-sector communication system allocates the sector common band to a user who is currently using the inter-sector shared band, and has the inter-sector shared band in use returned from the user. In this case, the inter-sector shared band used by the user is fully returned according to the first DCA scheme. Accordingly, when the user moves from the inter-sector boundary region to the cell central region, the multi-sector communication system immediately performs a DCA procedure to allocate the sector common band to the user and have the inter-sector shared band returned from the user. When the user stays in the cell central region for a predetermined period of time or lacks the frequency resources of the inter-sector shared band while using the current frequency resources of the inter-sector shared band, the multi-sector communication system performs a DCA procedure to allocate the sector common band to the user and have the inter-sector shared band returned from the user.

Referring to FIG. 91, the multi-sector communication system allocates the sector common band to a user who is currently using the inter-sector shared band, and has the inter-sector shared band in use returned from the user. In this case, the inter-sector shared band in used by the user is partially returned from the user according to the second DCA scheme. Accordingly, when the user moves from inter-sector boundary region to the cell central region, the multi-sector communication system immediately performs a DCA procedure to allocate the sector common band to the user and have the inter-sector shared band returned from the user. Or, when the user stays in the cell central region for a predetermined period of time or lacks the frequency resources of the inter-sector shared band while using the current frequency resources of the inter-sector shared band, the multi-sector communication system performs a DCA procedure to allocate the sector common band to the user and have the inter-sector shared band returned from the user.

Referring to FIG. 92, the multi-sector communication system defines the sector common band from among the sector dedicated band, allocates the same to a user who is currently using the inter-sector shared band, and has the inter-sector shared band in use returned from the user. In this case, the inter-sector shared band used by the user is fully returned according to the first DCA scheme. Accordingly, when the user moves from inter-sector boundary region to the cell central region, the multi-sector communication system immediately performs a DCA procedure to define the sector common band in the sector dedicated band, allocate the same to the user, and have the inter-sector shared band in use returned from the user. Or, when the user stays in the cell central region for a predetermined period of time or lacks the frequency resources of the inter-sector shared band while using the current frequency resources of the inter-sector shared band, the multi-sector communication system performs a DCA procedure to define the sector common band in the sector dedicated band, allocate the same to the user, and have the inter-sector shared band returned from the user.

Referring to FIG. 93, the multi-sector communication system defines the sector common band from among the sector dedicated band, allocates the same to a user who is currently using the inter-sector shared band, and has the inter-sector shared band in use returned from the user. In this case, the inter-sector shared band used by the user is partially returned according to the first DCA scheme. Accordingly, when the user moves from inter-sector boundary region to the cell central region, the multi-sector communication system immediately performs a DCA procedure to define the sector common band in the sector dedicated band, allocate the same to the user, and have the inter-sector shared band in use returned from the user. Or, when the user stays in the cell central region for a predetermined period of time or lacks the frequency resources of the inter-sector shared band while using the current frequency resources of the inter-sector shared band, the multi-sector communication system performs a DCA procedure to define the sector common band in the sector dedicated band, allocate the same to the user, and have the inter-sector shared band returned from the user.

Referring to FIG. 94, the multi-sector communication system allocates the sector common band to a user who is currently using the inter-sector shared band defined from among the sector dedicated band, and has the frequency resources in use returned as the sector dedicated band. Accordingly, when the user moves from inter-sector boundary region to the cell central region, the multi-sector communication system immediately performs a DCA procedure to allocate the sector common band to the user and have the inter-sector shared band defined from among the sector dedicated band in use returned from the user. Or, when the user stays in the cell central region for a predetermined period of time or lacks the frequency resources of the sector dedicated band while continuing to use the frequency resources of the inter-sector shared band defined from among the sector dedicated band, the multi-sector communication system performs a DCA procedure to allocate the sector common band to the user and have the inter-sector shared band defined from among the sector dedicated band returned from the user.

Referring to FIG. 95, the multi-sector communication system defines the sector common band from among the sector dedicated band, and allocates the same to a user who is currently using the inter-sector shared band defined from among the sector dedicated band. Also, the multi-sector communication system redefines the frequency resources of the inter-sector shared band defined from among the sector dedicated band currently used by the user, as the sector common band, so that the user continues to use the frequency resources. Accordingly, when the user moves from the inter-sector boundary region to the cell central region, the multi-sector communication system immediately performs a DCA procedure to allow the user to continue to use the frequency resources of the inter-sector shared band defined from among the sector dedicated band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users. Also, when the user stays in the cell central region for a predetermined period of time or lacks the frequency resources of the sector dedicated band while continuing to use the frequency resources of the inter-sector shared band defined from among the sector dedicated band upon movement from inter-sector boundary region to the cell central region, the multi-sector communication system performs a DCA procedure to allow the user to continue to use the frequency resources of the inter-sector shared band defined from among the sector dedicated band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Although not shown, the multi-sector communication system defines different frequency resources from the frequency resources of the inter-sector shared band defined from among the sector dedicated band currently used by the user, as the sector common band, so that the user uses the same. In this case, the frequency resources in use are returned as the sector dedicated band either fully, according to the first DCA scheme, or partially, according to the second DCA scheme. Accordingly, when the user moves from inter-sector boundary region to the cell central region, the multi-sector communication system immediately performs a DCA procedure to define an empty band in common to all the sectors, as the sector common band, allocate the same to the user who is using the inter-sector shared band defined from among the sector dedicated band, and have the inter-sector shared band defined from among the sector dedicated band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user. Also, when the user stays in the cell central region for a predetermined period of time or lacks the frequency resources of the sector dedicated band while continuing to use the frequency resources of the inter-sector shared band defined from among the sector dedicated band upon movement from inter-sector boundary region to the cell central region, the multi-sector communication system performs a DCA procedure to define an empty band in common to all the sectors, as the sector common band, allocate the same to the user who is using the inter-sector shared band defined from among the sector dedicated band, and have the inter-sector shared band defined from among the sector dedicated band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user.

Referring to FIG. 96, the multi-sector communication system defines the sector common band and allocates the same to a user who is currently using the inter-sector shared band in the inter-sector shared band. Also, the multi-sector communication system redefines the frequency resources of the inter-sector shared band currently used by the user, as the sector common band, so that the user continues to use the frequency resources. Accordingly, when the user moves from inter-sector boundary region to the cell central region, the multi-sector communication system immediately performs a DCA procedure to allow the user to continue to use the frequency resources of the inter-sector shared band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users. Also, when the user stays in the cell central region for a predetermined period of time or lacks the frequency resources of the inter-sector shared band while using the current frequency resources of the inter-sector shared band upon movement from the inter-sector boundary region to the cell central region, the multi-sector communication system performs a DCA procedure to allow the user to continue to use the frequency resources of the inter-sector shared band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Although not shown, the multi-sector communication system defines different frequency resources from the frequency resources of the inter-sector shared band currently used by the user, as the sector common band, so that the user uses the same. In this case, the frequency resources in use are returned as the inter-sector shared band either fully, according to the first DCA scheme, or partially, according to the second DCA scheme. Accordingly, when the user moves from the inter-sector boundary region to the cell central region, the multi-sector communication system immediately performs a DCA procedure to define an empty band in common to all the sectors, as the sector common band, allocate the same to the user that is using the inter-sector shared band, and have the inter-sector shared band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user. Also, when the user stays in the cell central region for a predetermined period of time or lacks the frequency resources of the inter-sector shared band while using the current frequency resources of the inter-sector shared band upon movement from the inter-sector boundary region to the cell central region, the multi-sector communication system performs a DCA procedure to define as empty band in common to all the sectors, as the sector common band, allocate the same to the user that is using the inter-sector shared band, and have the inter-sector shared band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user.

Referring to FIG. 97, the multi-sector communication system allocates the sector common band to a user who is currently using the inter-sector shared band defined from among the sector common band. Also, the frequency resources of the inter-sector shared band defined from among the sector common band currently used by the user are redefined as the sector common band, so that the user continues to use the frequency resources. Accordingly, when the user moves from the inter-sector boundary region to the cell central region, the multi-sector communication system immediately performs a DCA procedure to allow the user to continue to use the frequency resources of the inter-sector shared band defined from among the sector common band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users. Also, when a user stays in the cell central region for a predetermined period of time and lacks the frequency resources of the sector common band while continuing to use the frequency resources of the inter-sector shared band defined from among the sector common band upon movement from the inter-sector boundary region to the cell central region, the multi-sector communication system performs a DCA procedure to allow the user to continue to use the frequency resources of the inter-sector shared band defined from among the sector common band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Although not shown, the multi-sector communication system may define frequency resources different from the frequency resources of the inter-sector shared band defined from among the sector common band currently used by the user, as the sector common band. In this case, the frequency resources in use are returned as the sector common band either fully, according to the first DCA scheme, or partially, according to the second DCA scheme. Accordingly, when the user moves from the inter-sector boundary region to the cell central region, the multi-sector communication system immediately performs a DCA procedure to define an empty band in common to all the sectors, as the sector common band, allocate the same to the user that is using the inter-sector shared band defined from among the sector common band, and have the inter-sector shared band defined from among the sector common band returned from the user. If there is no empty band in common to all sectors, the multi-sector communication system allocates another frequency band to a user located in the sector central region or the inter-sector boundary region to prepare the empty band in common to all the sectors, defines the frequency resources as the sector common band, and allocates the same to the user. Also, when a user stays in the cell central region for a predetermined period of time or lacks the frequency resources of the sector common band while continuing to use the frequency resources of the inter-sector shared band defined from among the sector common band upon movement from the inter-sector boundary region to the cell central region, the multi-sector communication system performs a DCA procedure to define an empty band in common to all the sectors, as the sector common band, allocate the same to the user that is using the inter-sector shared band defined from among the sector common band, and have the inter-sector shared band defined from among the sector common band returned from the user. If there is no empty band in common to all the sectors, the multi-sector communication system allocates another frequency band to a user located in the sector central region or the inter-sector boundary region to prepare the empty band in common to all the sectors, defines the frequency resource as the sector common band, and allocates the same to the user. An example in which DCA is performed when a user moves from a cell central region to a inter-sector boundary region will now be described.

FIGS. 98 to 103 illustrates an example in which DCA is performed when a user moves from a cell central region to a inter-sector boundary region in a multi-sector communication system according to an exemplary embodiment of the present invention.

Referring to FIG. 98, the multi-sector communication system allocates a inter-sector shared band to a user who is currently using the sector common band and has the sector common band returned from the user. Accordingly, when the user moves from the cell central region to the inter-sector boundary region, the multi-sector communication system immediately performs a DCA procedure to allocate the inter-sector shared band to the user, and have the sector common band in use returned from the user. Or, when a user stays in the inter-sector boundary region for a predetermined period of time or lacks the frequency resources of the sector common band while continuing to use the frequency resources of the sector common band, the multi-sector communication system performs a DCA procedure to allocate the inter-sector shared band to the user and have the sector common band returned from the user.

Referring to FIG. 99, the multi-sector communication system defines the inter-sector shared band from among the sector dedicated band, allocates the same to a user who is currently using the sector common band, and has the sector common band returned from the user. Accordingly, when the user moves from the cell central region to the inter-sector boundary region, the multi-sector communication system immediately performs a DCA procedure to define the inter-sector shared band in the sector dedicated band, allocate the same to the user, and have the sector common band in use returned from the user. Or, when a user stays in the inter-sector boundary region for a predetermined period of time or lacks the frequency resources of the sector common band while continuing to use the frequency resources of the sector common band, the multi-sector communication system performs a DCA procedure to define the inter-sector shared band in the sector dedicated band, allocate the same to the user, and have the sector common band in use returned from the user.

Referring to FIG. 100, the multi-sector communication system allocates the inter-sector shared band to a user who is currently using the sector common band defined from among the sector dedicated band, and has the frequency resources in use returned as the sector dedicated band. Accordingly, when the user moves from the cell central region to the inter-sector boundary region, the multi-sector communication system immediately performs a DCA procedure to define the inter-sector shared band, allocate the same to the user, and have the sector common band defined from among the sector dedicated band returned from the user. Or, when a user stays in the inter-sector boundary region for a predetermined period of time or lacks the frequency resources of the sector dedicated band while continuing to use the frequency resources of the sector common band defined from among the sector dedicated band, the multi-sector communication system performs a DCA procedure to allocate the inter-sector shared band to the user and have the sector common band defined from among the sector dedicated band in use returned from the user.

Referring to FIG. 101, the multi-sector communication system defines the inter-sector shared band from among the sector dedicated band and allocates the same to a user who is currently using the sector common band defined from among the sector dedicated band. Also, the multi-sector communication system redefines the frequency resources of the sector common band defined from among the sector dedicated band currently used by the user, as the inter-sector shared band, so that the user continues to use the frequency resources. Accordingly, when the user moves from the cell central region to the inter-sector boundary region, the multi-sector communication system immediately performs a DCA procedure to redefine frequency resources of the sector common band defined from among the sector dedicated band that is used by user, as the inter-sector shared band in two sectors adjacent to the user, so that the user continues to use the frequency resources. Or, when a user stays in the inter-sector boundary region for a predetermined period of time or lacks the frequency resources of the sector dedicated band while continuing to use the frequency resources of the sector common band defined from among the sector dedicated band, the multi-sector communication system performs a DCA procedure to redefine frequency resources of the sector common band defined from among the sector dedicated band, as the inter-sector shared band in two sectors adjacent to the user, so that the user continues to use the frequency resources.

Although not shown, the multi-sector communication system defines the inter-sector shared band from among the sector dedicated band and allocates the same to a user who is currently using the sector common band defined from among the sector dedicated band. Also, the multi-sector communication system defines different frequency resources from the frequency resources of the sector common band defined from among the sector dedicated band currently used by the user, as the inter-sector shared band, so that the user uses the same. In this case, the frequency resources in use are returned as the sector dedicated band. Accordingly, when the user moves from the cell central region to the inter-sector boundary region, the multi-sector communication system immediately performs a DCA procedure to define a band in the sector dedicated empty band in common to two sectors adjacent to the user, as the inter-sector shared band, allocate the same to the user who is using the sector common band defined from among the sector dedicated band, and have the sector common band defined from among the sector dedicated band in use returned from the user. If there is no empty band in common to the two sectors adjacent to the user, the multi-sector communication system allocates another frequency band to a user located in the sector central region to prepare the empty band in common to the two sectors adjacent to the user, defines the band as the inter-sector shared band, and allocates the same to the user. Also, when a user stays in the inter-sector boundary region for a predetermined period of time or lacks the frequency resource of the sector dedicated band while continuing to use the frequency resources of the sector common band defined from among the sector dedicated band upon movement from the cell central region to the inter-sector boundary region, the multi-sector communication system performs a DCA procedure to define a band in the sector dedicated empty band in common to two sectors adjacent to the user, as the inter-sector shared band, allocate the same to the user who is using the sector common band defined from among the sector dedicated band, and have the sector common band defined from among the sector dedicated band in use returned from the user. If there is no empty band in common to the two sectors adjacent to the user, the multi-sector communication system allocates another frequency band to a user located in the sector central region to prepare the empty band in common to the two sectors adjacent to the user, defines the band as the inter-sector shared band, and allocates the same to the user.

Referring to FIG. 102, the multi-sector communication system allocates the inter-sector shared band to a user that is currently using a sector common band defined from among the inter-sector shared band. Also, the multi-sector communication system redefines the sector common band defined from among the inter-sector shared band that is currently used by the user, as the inter-sector shared band, so that the user continues to use the frequency resources. Accordingly, when the user moves from the cell central region to the inter-sector boundary region, the multi-sector communication system immediately performs a DCA procedure to redefine the sector common band defined from among the frequency resources of the inter-sector shared band that is being used by the user, as the inter-sector shared band, in two sectors adjacent to the user, so that the user continues to use the frequency resources. Or, when a user stays in the inter-sector boundary region for a predetermined period of time or lacks the frequency resources of the inter-sector shared band while continuing to use frequency resources of the current sector common band defined from among the inter-sector shared band, the multi-sector communication system performs a DCA procedure to redefine the sector common band defined from among the frequency resources of the inter-sector shared band that is being used by the user, as the inter-sector shared band, in two sectors adjacent to the user so that the user continues to use the frequency resources.

Although not shown, the multi-sector communication system allocates the inter-sector shared band to a user that is currently using a sector common band defined from among the inter-sector shared band. Also, the multi-sector communication system defines different frequency resources from the frequency resources of the sector common band defined from among the inter-sector shared band that is currently used by the user, as the inter-sector shared band, so that the user uses the same. In this case, the frequency resources in use are returned as the inter-sector shared band. Accordingly, when the user moves from the cell central region to the inter-sector boundary region, the multi-sector communication system immediately performs a DCA procedure to allocate a band in the inter-sector boundary region shared empty band in common to two sectors adjacent to the user to the user, to a user who is using the sector common band defined from among the inter-sector shared band, and have the sector common band defined from among the inter-sector shared band returned from the user. If there is no empty band in common to the two sectors adjacent to the user, the multi-sector communication system allocates another frequency band to a user located in the sector central region to prepare the empty band in common to the two sectors adjacent to the user, defines the band as the inter-sector shared band, and allocates the same to the user. Also, when a user stays in the inter-sector boundary region for a predetermined period of time or lacks the frequency resources of the inter-sector shared band while continuing to use frequency resources of the current sector common band defined from among the inter-sector shared band upon movement from the cell central region to the inter-sector boundary region, the multi-sector communication system performs a DCA procedure to allocate a band in the inter-sector boundary region shared empty band in common to two sectors adjacent to the user, to the user a sector common band defined from among the inter-sector shared band, and have the sector common band defined from among the inter-sector shared band returned from the user. If there is no empty band in common to the two sectors adjacent to the user, the multi-sector communication system allocates another frequency band to a user located in the sector central region to prepare the empty band in common to the two sectors adjacent to the user, defines the band as the inter-sector shared band, and allocates the same to the user.

Referring to FIG. 103, the multi-sector communication system defines the inter-sector shared band from among the sector common band and allocates the same to a user who is currently using the sector common band. Also, the multi-sector communication system redefines the frequency resources of sector common band currently used by the user, as the inter-sector shared band, so that the user continues to use the frequency resources. Accordingly, when the user moves from the cell central region to the inter-sector boundary region, the multi-sector communication system immediately performs a DCA procedure to redefine the frequency resource of the sector common band used by the user, as the inter-sector shared band, in two sectors adjacent to the user so that the user continues to use the frequency resources. Or, when a user stays in the inter-sector boundary region for a predetermined period of time or lacks the frequency resources of the sector common band while continuing to use the frequency resources of the sector common band, the multi-sector communication system performs a DCA procedure to redefine frequency resource of the sector common band used by the user, as the inter-sector shared band in two sectors adjacent to the user, so that the user continues to use the frequency resources.

Although not shown, the multi-sector communication system defines the inter-sector shared band from among the sector common band, and allocates the same to a user who is currently using the sector common band. Also, the multi-sector communication system defines different frequency resources from the frequency resources of sector common band currently used by the user, as the inter-sector shared band. In this case, the frequency resources in use are returned as the sector common band. Accordingly, when the user moves from the cell central region to the inter-sector boundary region, the multi-sector communication system immediately performs a DCA procedure to allocate a band in the sector common empty band in common to two sectors adjacent to the user, to the user who is using the sector common band, and have the sector common band in use returned from the user. If there is no empty band in common to the two sectors adjacent to the user, the multi-sector communication system allocates another frequency band to a user located in the sector central region to prepare the empty band in common to the two sectors adjacent to the user, defines the band as the inter-sector shared band, and allocates the same to the user. Also, when a user stays in the inter-sector boundary region for a predetermined period of time or lacks the frequency resources of the sector common band while continuing to use the frequency resources of the sector common band upon movement from the cell central region to the inter-sector boundary region, the multi-sector communication system performs a DCA procedure to allocate a band in the sector common empty band in common to two sectors adjacent to the user to the user, to the user who is using the sector common band, and has the sector common band in use returned from the user. If there is no empty band in common to the two sectors adjacent to the user, the multi-sector communication system allocates another frequency band to a user located in the sector central region to prepare the empty band in common to the two sectors adjacent to the user, defines the band as the inter-sector shared band, and allocates the same to the user. An example in which DCA is performed when a user moves from a sector central region to a cell central region will now be described.

FIGS. 104 to 110 illustrates an example in which DCA is performed when a user moves from a sector central region to a cell central region in a multi-sector communication system according to an exemplary embodiment of the present invention.

Referring to FIG. 104, the multi-sector communication system allocates the sector common band to a user who is currently using the sector dedicated band, and has the sector dedicated band returned from the user. Accordingly, when a user moves from a sector central region to a cell central region, the multi-sector communication system immediately performs a DCA procedure to allocate the sector common band to the user and have the sector dedicated band in use returned from the user.

Referring to FIG. 105, the multi-sector communication system defines the sector common band from among the inter-sector shared band, allocates the same to a user who is currently using the sector dedicated band, and has the sector dedicated band returned from the user. Accordingly, when a user moves from a sector central region to a cell central region, the multi-sector communication system immediately performs a DCA procedure to define the sector common band in the inter-sector shared band, allocate the same to the user, and have the sector dedicated band returned from the user.

Referring to FIG. 106, the multi-sector communication system allocates the sector common band to a user who is currently using the sector dedicated band defined from among the inter-sector shared band, and has the frequency resources in use returned as the inter-sector shared band through full return or partial return. Accordingly, when a user moves from a sector central region to a cell central region, the multi-sector communication system immediately performs a DCA procedure to allocate the sector common band to the user and have the sector dedicated band defined from among the inter-sector shared band returned from the user.

Referring to FIG. 107, the multi-sector communication system defines the sector common band from among the sector dedicated band, and allocates the same to a user who is currently using the sector dedicated band. Also, the multi-sector communication system redefines the frequency resources of the sector dedicated band currently used by the user, as the sector common band, so that the user continues to use the frequency resources. Accordingly, when a user moves from a sector central region to a cell central region, the multi-sector communication system immediately performs a DCA procedure to allow the user to continue to use the frequency resources of the dedicated band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Although not shown, the multi-sector communication system defines the sector common band from among the sector dedicated band, and allocates the same to a user who is currently using the sector dedicated band. Also, the multi-sector communication system defines different frequency resources from the frequency resources of the sector dedicated band currently used by the user, as the sector common band. In this case, the frequency resources in use are returned as the sector dedicated band from the user. Accordingly, when a user moves from a sector central region to a cell central region, the multi-sector communication system immediately performs a DCA procedure to define an empty band in common to all the sectors, as the sector common band, allocate the same to the user who is using the sector dedicated band, and have the sector dedicated band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user.

Referring to FIG. 108, the multi-sector communication system defines the sector common band from among the inter-sector shared band and allocates the same to a user who is currently using the sector dedicated band defined from among the inter-sector shared band. Also, the multi-sector communication system redefines the frequency resources of the sector dedicated band defined from among the inter-sector shared band currently used by the user, as the sector common band, so that the user continues to use the frequency resources. Accordingly, when a user moves from a sector central region to a cell central region, the multi-sector communication system immediately performs a DCA procedure to allow the user to continue to use the frequency resources of the dedicated band defined from among the inter-sector shared band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Although not shown, the multi-sector communication system defines the sector common band from among the inter-sector shared band and allocates the same to a user who is currently using the sector dedicated band defined from among the inter-sector shared band. Also, the multi-sector communication system defines different frequency resources from the frequency resources of the sector dedicated band defined from among the inter-sector shared band currently used by the user, as the sector common band, so that the user uses the same. In this case, the frequency resources in use are returned as the inter-sector shared band. Accordingly, when a user moves from a sector central region to a cell central region, the multi-sector communication system immediately performs a DCA procedure to define an empty band in common to all the sectors, as the sector common band, allocate the same to the user who is using the sector dedicated band defined from among the inter-sector shared band, and have the sector dedicated band defined from among the inter-sector shared band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user.

Referring to FIG. 109, the multi-sector communication system defines the sector common band and allocates the same to a user who is currently using the sector dedicated band defined from among the sector common band. Also, the multi-sector communication system redefines the frequency resources of the sector dedicated band defined from among the sector common band currently used by the user, as the sector common band, so that the user continues to use the frequency resources. In this case, the multi-sector communication system allows the sector dedicated band defined from among the sector common band allocated to the user to be reused as the sector dedicated band in other sectors. Accordingly, when a user moves from a sector central region to a cell central region, the multi-sector communication system immediately performs a DCA procedure to allow the user to continue to use the frequency resources of the sector dedicated band defined from among the sector common band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Referring to FIG. 110, the multi-sector communication system defines the sector common band and allocates the same to a user who is currently using the sector dedicated band defined from among the sector common band. Also, the multi-sector communication system redefines the frequency resources of the sector dedicated band defined from among the sector common band currently used by the user, as the sector common band, so that the user continues to use the frequency resources. In this case, the multi-sector communication system allows the sector dedicated band defined from among the sector common band allocated to the user to be reused as a inter-sector shared band for a inter-sector boundary region not adjacent to the sector where the user is located. Accordingly, when a user moves from a sector central region to a cell central region, the multi-sector communication system immediately performs a DCA procedure to allow the user to continue to use the frequency resources of the sector dedicated band defined from among the sector common band and allow the same to be redefined as the sector common band in all the sectors. When the frequency resources used by the user are occupied by other users in remaining sectors that are not yet connected with the user, the multi-sector communication system redefines the frequency resources as the sector common band to be used by the user after allocating another band to the users.

Although not shown, the multi-sector communication system defines the sector common band and allocates the same to a user who is currently using the sector dedicated band defined from among the sector common band. Also, the multi-sector communication system redefines different frequency resources from the frequency resources of the sector dedicated band defined from among the sector common band currently used by the user, as the sector common band, so that the user uses the same. In this case, the frequency resources in use are returned as the sector common band. Accordingly, when a user moves from a sector central region to a cell central region, the multi-sector communication system immediately performs a DCA procedure to define an empty band in common to all the sectors, as the sector common band, allocate the same to the user who is using the sector dedicated band defined from among the sector common band, and have the sector dedicated band defined from among the sector common band returned from the user. If there is no empty band in common to all the sectors, the multi-sector communication system allocates another frequency band to a user located in the sector central region or the inter-sector boundary region to prepare the empty band in common to all the sectors, defines the frequency resources as the sector common band, and allocates the same to the user. An example in which DCA is performed when a user moves from a cell central region to a sector central region will be described.

FIGS. 111 to 117 illustrates an example in which DCA is performed when a user moves from a cell central region to a sector central region in a multi-sector communication system according to an exemplary embodiment of the present invention.

Referring to FIG. 111, the multi-sector communication system allocates a sector dedicated band to a user who is currently using the sector common band and has the sector common band in use returned from the user. Accordingly, when the user moves from the cell central region to the sector central region, the multi-sector communication system immediately performs a DCA procedure to the user sector dedicated band to have the sector common band returned from the user. Or, when the user stays in the sector central region for a predetermined period of time or lacks the frequency resources of the sector common band while continuing to use the frequency resources of the sector common band, the multi-sector communication system performs a DCA procedure to allocate the sector dedicated band to the user and have the sector common band in use returned from the user.

Referring to FIG. 112, the multi-sector communication system defines the sector dedicated band from among the inter-sector shared band, allocates the same to a user who is currently using the sector common band, and has the sector common band in use returned from the user. Accordingly, when the user moves from the cell central region to the sector central region, the multi-sector communication system immediately performs a DCA procedure to define the sector dedicated band in the inter-sector shared band, allocate the same to the user, and have the sector common band in use returned from the user. Or, when the user stays in the sector central region for a predetermined period of time or lacks the frequency resources of the sector common band while continuing to use the frequency resources of the sector common band, the multi-sector communication system performs a DCA procedure to define the sector dedicated band in the inter-sector shared band, allocate the same to the user, and have the sector common band in use returned from the user.

Referring to FIG. 113, the multi-sector communication system allocates a sector dedicated band to a user that is currently using a sector common band defined from among the inter-sector shared band, and has the frequency resources in use returned as the inter-sector shared band. Accordingly, when the user moves from the cell central region to the sector central region, the multi-sector communication system immediately performs a DCA procedure to allocate the sector dedicated band to the user and have the sector common band defined from among the inter-sector shared band in use returned from the user. Or, when the user stays in the sector central region for a predetermined period of time or lacks the frequency resources of the inter-sector shared band while continuing to use the frequency resources of the current sector common band defined from among the inter-sector shared band, the multi-sector communication system performs a DCA procedure to allocate the sector dedicated band to the user and have the sector common band defined from among the inter-sector shared band in use returned from the user.

Referring to FIG. 114, the multi-sector communication system allocates the sector dedicated band to a user who is currently using the sector common band defined from among the sector dedicated band. Also, the frequency resources of the sector common band defined from among the sector dedicated band currently used by the user are redefined as the sector dedicated band so that the user continues to use the frequency resources. Accordingly, when the user moves from the cell central region to the sector central region, the multi-sector communication system immediately performs a DCA procedure to redefine frequency resources of the sector common band defined from among the sector dedicated band, as the sector dedicated band, in the sector where the user is located so that the user continues to use the frequency resources. Or, when the user stays in the sector central region for a predetermined period of time or lacks the frequency resources of the sector dedicated band while continuing to use the frequency resources of the sector common band defined from among the sector dedicated band, the multi-sector communication system performs a DCA procedure to redefine frequency resources of the sector common band defined from among the sector dedicated band, as the sector dedicated band, in the sector where the user is located, so that the user continues to use the frequency resources.

Although not shown, the multi-sector communication system allocates the sector dedicated band to a user who is currently using the sector common band defined from among the sector dedicated band. Also, the multi-sector communication system defines different frequency resources from the frequency resources of the sector common band defined from among the sector dedicated band currently used by the user, as the sector dedicated band, so that the user uses the same. In this case, the multi-sector communication system has the frequency resources in use returned as the sector dedicated band. Accordingly, when the user moves from the cell central region to the sector central region, the multi-sector communication system immediately performs a DCA procedure to allocate empty frequency resources in the sector dedicated band to the user in the sector where the user is located and have the sector common band defined from among the sector dedicated band returned from the user. Or, when the user stays in the sector central region for a predetermined period of time or lacks the frequency resources of the sector dedicated band while continuing to use the frequency resources of the sector common band defined from among the sector dedicated band, the multi-sector communication system performs a DCA procedure to allocate empty frequency resources in the sector dedicated band to the user in the sector where the user is located, and have the sector common band defined from among the sector dedicated band in use returned from the user.

Referring to FIG. 115, the multi-sector communication system defines the sector dedicated band from among the inter-sector shared band and allocates the same to a user that is currently using a sector common band defined from among the inter-sector shared band. Also, the multi-sector communication system redefines frequency resources of the sector common band defined from among the inter-sector shared band that is currently used by the user, as the sector dedicated band, so that the user continues to use the frequency resources. Accordingly, when the user moves from the cell central region to the sector central region, the multi-sector communication system immediately performs a DCA procedure to redefine the sector common band defined from among the frequency resources of the inter-sector shared band that is being used by the user, as the sector dedicated band, in the sector where the user is located so that the user continues to use the frequency resources. When the user stays in the sector central region for a predetermined period of time or lacks the frequency resources of the inter-sector shared band while continuing to use the frequency resources of the current sector common band defined from among the inter-sector shared band, the multi-sector communication system performs a DCA procedure to redefine the sector common band defined from among the frequency resources of the inter-sector shared band that is being used by the user, as the sector dedicated band, in the sector where the user is located, so that the user continues to use the frequency resources.

Although not shown, the multi-sector communication system defines the sector dedicated band from among the inter-sector shared band and allocates the same to a user that is currently using a sector common band defined from among the inter-sector shared band. Also, the multi-sector communication system defines different frequency resources from the frequency resources of the sector common band defined from among the inter-sector shared band that is currently used by the user, as the sector dedicated band, so that the user uses the same. In this case, the frequency resources in use are returned as the inter-sector shared band. Accordingly, when the user moves from the cell central region to the sector central region, the multi-sector communication system immediately performs a DCA procedure to allocate empty frequency resources in the inter-sector shared band to the user in the sector where the user is located and have the sector common band defined from among the inter-sector shared band in use returned from the user. Or, when the user stays in the sector central region for a predetermined period of time or lacks the frequency resources of the inter-sector shared band while continuing to use frequency resources of the current sector common band defined from among the inter-sector shared band, the multi-sector communication system performs a DCA procedure to allocate empty frequency resources in the inter-sector shared band to the user in the sector where the user is located and have the sector common band defined from among the inter-sector shared band returned from the user.

Referring to FIG. 116, the multi-sector communication system defines the sector dedicated band from among the sector common band and allocates the same to a user who is currently using the sector common band. Also, the multi-sector communication system redefines the frequency resources of sector common band currently used by the user, as the sector dedicated band, so that the user continues to use the frequency resources. In this case, the multi-sector communication system allows the sector dedicated band defined from among the sector common band allocated to the user to be reused as the sector dedicated band in other sectors. Accordingly, when the user moves from the cell central region to the sector central region, the multi-sector communication system immediately performs a DCA procedure to redefine frequency resources of the sector common band, as the sector dedicated band, in the sector where the user is located so that the user continues to use the frequency resources. Or, when the user stays in the sector central region for a predetermined period of time or lacks the frequency resources of the sector common band while continuing to use the frequency resources of the sector common band, the multi-sector communication system performs a DCA procedure to redefine the frequency resources of the sector common band, as the sector dedicated band, in the sector where the user is located, so that the user continues to use the frequency resources.

Referring to FIG. 117, the multi-sector communication system defines the sector dedicated band from among the sector common band and allocates the same to a user who is currently using the sector common band. Also, the multi-sector communication system redefines the frequency resources of the sector common band currently used by the user, as the sector dedicated band, so that the user continues to use the frequency resources. In this case, the multi-sector communication system allows the sector dedicated band defined from among the sector common band allocated to the user to be reused as a inter-sector shared band for a inter-sector boundary region not adjacent to the sector where the user is located. Accordingly, when the user moves from the cell central region to the sector central region, the multi-sector communication system immediately performs a DCA procedure to redefine the frequency resources of the sector common band, as the sector dedicated band, in the sector where the user is located so that the user continues to use the frequency resources. Or, when the user stays in the sector central region for a predetermined period of time or lacks the frequency resources of the sector common band while continuing to use the frequency resources of the sector common band, the multi-sector communication system performs a DCA procedure to redefine the frequency resources of the sector common band, as the sector dedicated band, in the sector where the user is located, so that the user continues to use the frequency resources.

Although not shown, the multi-sector communication system defines the sector dedicated band from among the sector common band and allocates the same to a user who is currently using the sector common band. Also, the multi-sector communication system defines different frequency resources from the frequency resources of the sector common band currently used by the user as the sector dedicated band so that the user uses the same. In this case, the multi-sector communication system has frequency resources in use returned, as the sector common band, from the user. Accordingly, when the user moves from the cell central region to the sector central region, the multi-sector communication system immediately performs a DCA procedure to allocate empty frequency resources in the sector common band to the user in the sector where the user is located and have the sector common band returned from the user. Or, when the user stays in the sector central region for a predetermined period of time or lacks the frequency resources of the sector common band while continuing to use the frequency resources of the sector common band, the multi-sector communication system performs a DCA procedure to allocate empty frequency resources in the sector common band to the user in the sector where the user is located and have the sector common band in use returned from the user.

When a load rate of the sector region exceeds a band set in each sector region while a user is using the divided total frequency resources in the defined sector region, the multi-sector communication system uses an empty band. More specifically, when the load rate exceeds the set sector dedicated band due to an increase in the number of users in the sector central region, the multi-sector communication system defines and uses an empty band in the inter-sector shared band or the sector common band as the sector dedicated band. When the empty band in the inter-sector shared band is used, the multi-sector communication system defines empty frequency resources in the inter-sector shared band for the sector where the user is located, as the sector dedicated band for the sector central region and allocates the same to the user. Also, when the empty band of the sector common band is used, the multi-sector communication system defines the empty frequency resources in the sector common band as the sector dedicated band for the sector central region allocates the same to the user.

If a load rate of the inter-sector shared band is exceeded due to an increase in users in the inter-sector boundary region, the multi-sector communication system defines an empty band in the sector dedicated band or the sector common band, as the inter-sector shared band. In this case, when the empty band in the sector dedicated band is used, the multi-sector communication system defines empty frequency resources in common to the sector dedicated bands for two sectors adjacent to the inter-sector boundary region where the user is located, as the inter-sector shared band for the inter-sector boundary region, and allocates the same to the user. Here, if there are no empty frequency resources in common to the sector dedicated bands for two sectors adjacent to the inter-sector boundary region, the multi-sector communication system allocates another frequency band to a user located in the sector central region to prepare an empty band in common to the sector dedicated bands for the two sectors adjacent to the inter-sector boundary region, defines the empty band as the inter-sector shared band for the inter-sector boundary region, and allocates the same to the user. Also, when the empty band of the sector common band is used, the multi-sector communication system defines the empty frequency resources in the sector common band as the inter-sector shared band for the inter-sector boundary region, and allocates the same to the user.

If a load rate of the sector common region shared band is exceeded due to an increase in users in the cell central region, the multi-sector communication system defines an empty band in the sector dedicated band or the sector common band, as the sector common band. In this case, when the empty band in the sector dedicated band is used, the multi-sector communication system defines empty frequency resources in common to the sector dedicated bands for all sectors, as the sector common band for the cell central region, and allocates the same to the user. Here, if there are no empty frequency resources in common to the sector dedicated bands for all the sectors, the multi-sector communication system allocates another frequency band to a user located in the cell central region to prepare an empty band in common to the sector dedicated bands for all the sectors, defines the empty band as the sector common band for the cell central region, and allocates the same to the user. Also, when the empty band of the inter-sector shared band is used, the multi-sector communication system defines the empty frequency resources in all the inter-sector shared bands for all the sectors as the sector common band for the cell central region, and allocates the same to the user. If there are no empty frequency resources in common to the inter-sector shared bands for all the sectors, the multi-sector communication system allocates another frequency band to a user located in the inter-sector boundary region to prepare the empty band in common to the inter-sector shared bands for all the sectors, defines the empty band as the sector common band for the cell central region, and allocates the same to the user.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for using resources in a communication system, Comprising dividing a communication area into at least one of at least one central region in which a communication node serves exclusively, at least one boundary region in which service coverages of at least two communication nodes are overlapped and the at least two communication nodes server simultaneously, and at least one common region in which at least two communication nodes serve simultaneously; and allocating resources to at least one user terminal located in one of the at least one central region, the at least one boundary region, and the at least one common region, at last one dividing resources available to the communication system and allocating the divided resources as at least one resource for the at least one central region, at least one resource for the at least one boundary region, and at least one resource for the at least one common region; dividing the resources available to the communication system and allocating the divided resources as at least one resource for the at least one central region and at least one resource for the at least one boundary region;

dividing the resources available to the communication system and allocating the divided resources as at least one resource for the at least one central region and at least one resource for the at least one common region; dividing the resources available to the communication system and allocating the divided resources as at least one resource for the at least one boundary region and at least one resource for the at least one common region; dividing the resources available to the communication system and allocating the divided resources as at least one resource for the at least one central region; allocating the resources available to the communication system as resources for the at least one central region;

dividing the resources available to the communication system and allocating the divided resources as at least one resource for the at least one boundary region;

allocating the resources available to the communication system as resources for the at least one boundary region; dividing the resources available to the communication system and allocating the divided resources as at least one resource for the at least one common region allocating the resources available to the communication system as resources for the at least one common region, and allocating none of the resources available to the communication system as after the first predetermined time elapses; and wherein the allowing of the user terminal to hold the resources in use for the user terminal for a first predetermined time and allocating resources to the user terminal after the first predetermined time elapses comprises allowing the user terminal to hold the resources for a new region to the user terminal after the second predetermined time elapses, when the user terminal moves to the new region before the first predetermined time elapses.

2. The method of claim 1, wherein the division of resources available to the communication system and the allocation of the divided resources as at least one of resources for the at least one central region, resources for the at least one boundary region, and resources for the at least one common region comprises at least one of allocating at least one of the resources for the at least one central region to at least one of the at least one boundary region, the at least one common region, and at least one another central region, for resource reuse; allocating at least one of the resources for the at least one boundary region to at least one of the at least one central region, the at least one common region, and at least one another boundary region, for resource reuse;

and allocating at least one of the resources for the at least one common region to at least one of the at least one central region, the at least one boundary region, and at least one another common region, for resource reuse.

3. The method of claim 2, wherein each of the steps (1) to (4) comprises returning the resources in use for the user terminal by only a part of the communication nodes.

4. The method of claim 1, wherein the at least two communication nodes serve simultaneously include providing no service to one user terminal by at least one of the at least two communication nodes.

5. A method for using resources in a communication system, comprising:

determining a communication node set including one communication node, for serving one user terminal simultaneously; and allocating in common at least one identical resource to the user terminal by at least one communication node included in the communication node set, wherein the resource returning and new resource allocation comprises at least one of, (1) returning the resources by all the communication nodes included in the communication node set and allocating in common the at least one identical resource to the user terminal by at least one of the communication nodes included in the new communication node set;

(2) allocating in common the identical resources as resources in use for the user terminal to the user terminal, so that the user terminal continues to use the resources, by at least one of new communication nodes different from the communication nodes included in the communication node set, among the communication nodes included in the new communication node set, if the new communication nodes can serve the user terminal I the resources in use for the user terminal; and (3) allowing the user terminal to hold the resources in use for the user terminal without returning, the resources in use for the user terminal or allocating new resources by any of the communication nodes included in the communication node set, and wherein each of the steps(1), (2) and (3) comprises allowing the user terminal to hold the resources in use for the user terminal for a first predetermined time by the communication nodes included in the communication node set and allocating in common the at least one new identical resource to the user terminal by at least one of the communication nodes included in the new communication node set, when the first predetermined time elapses, and wherein the allowing of the user terminal to hold the resources in use for the user terminal for a first predetermined time by the communication nodes included in the communication node set and allocating in common the at least one new identical resource to the user terminal by the communication nodes included in the new communication node set is changed to a new communication node set including at least one communication node included in the communication node set before the first predetermined time elapses, allowing the user terminal to hold the resources in use for the user terminal for a second predetermined time, and allocating in common the at least one new identical resource to the user terminal by at least one of the communication nodes included in the new communication node set, when the second predetermined time elapses.

6. The method of claim 5, wherein the communication node set includes at least one of at least one communication, node that is not engaged in service for the user terminal, at least one communication node having a service coverage that is not adjacent to a service coverage of at least one communication node except for the at least one communication node among the communication nodes included in the communication, node set, at least one communication node having a service coverage that is overlapped with a service coverage of at least one communication node except for the at least one communication node among the communication nodes included in the communication node set.

7. The method of claim 5, wherein the common allocation comprises, when a new communication node set is created due to deletion of at least one communication node from the communication node set and/or insertion of at least one new communication node into the communication node set, returning resources by commutation nodes included, in the communication node set and allocating in common at least one new identical resources for any of the at least one central region, the at least one boundary region, and the at least one common region, wherein the allocation of resources to at least one user terminal located in one of the at least one central region, the at least one boundary region, and the at least one common region comprises at least one of if a user terminal is located in one of the at least one central region, the at least one boundary region, and the at least one common region, (1) allocating available resources among the resources for the corresponding region in which the user is located, to the user terminal;

(2) changing use of available resources among the resources for the regions except for the corresponding region, in which the user terminal is located as resources for the corresponding region in which the user terminal is located and allocating the resources to the user terminal;

(3) designating resources that were not allocated to any of the regions as resources for the corresponding region in which the user terminal is located and allocating the resources to the user terminal;

(4) changing use of resources in use for the user terminal as resources for the corresponding region in which the user terminal is located and allocating the resources to the user terminal so that the riser terminal holds the resources; and (5) allocating the resources in use for the user terminal to the user terminal without changing use of the resources in use for the terminal, so that the user terminal holds the resources, wherein each of the steps (1) to (5) comprises allowing the user terminal to hold the resources in use for the user terminal for a first predetermined time and allocating the new resources to the user terminal resource to the user terminal by communication nodes included in the new communication node set.

8. The method of claim 7, wherein, the resource returning and new resource allocation comprises one of:

returning the resources by all file communication nodes included in the communication node set;

returning the resources by only a part of the communication nodes included in the communication node set; and holding the resources without returning by any of the communication nodes included in the communication node set.

* * * * *

UNITED STATES PATENT AND TRADEMARK OFFICE
CERTIFICATE OF CORRECTION

| | |
|---|---|
| PATENT NO. | : 8,023,529 B2 |
| APPLICATION NO. | : 12/449836 |
| DATED | : September 20, 2011 |
| INVENTOR(S) | : Seong-Keun Oh et al. |

It is certified that error appears in the above-identified patent and that said Letters Patent is hereby corrected as shown below:

Column 55, Claim 1, Line 54 should read as follows:
--...comprising: dividing...--

Column 55, Claim 1, Line 58 should read as follows:
--...nodes serve...--

Column 55, Claim 1, Line 63 should read as follows:
--...common region, and...--

Column 55, Claim 1, Line 64 should read as follows:
--...at least one of: dividing...--

Column 56, Claim 1, Lines 28-29 should read as follows:
--...common region; allocating...--

Column 56, Claim 1, Line 30 should read as follows:
--...common region; and...--

Column 56, Claim 1, Lines 32-33 should read as follows:
Remove the phase, "after the first predetermined time elapses; and" which is found at Column 56, Line 32-33, and replace it with the following text:

--...resources for any of the at least one central region, the at least one boundary region, and the at least one common region,
   wherein the allocation of resources to at least one user terminal located in one of the at least one central region, the at least one boundary region, and the at least one common region comprises at least one of: if a user terminal is located in one of the at least one central region, the at least one boundary region, and the at least one common region, Signed and Sealed this
Fourteenth Day of February, 2012

David J. Kappos
*Director of the United States Patent and Trademark Office*

CERTIFICATE OF CORRECTION (continued)
U.S. Pat. No. 8,023,529 B2

(1) allocating available resources among the resources for the corresponding region in which the user is located, to the user terminal;
    (2) changing use of available resources among the resources for the regions except for the corresponding region in which the user terminal is located as resources for the corresponding region in which the user terminal is located and allocating the resources to the user terminal;
    (3) designating resources that were not allocated to any of the regions as resources for the corresponding region in which the user terminal is located and allocating the resources to the user terminal;
    (4) changing use of resources in use for the user terminal as resources for the corresponding region in which the user terminal is located and allocating the resources to the user terminal so that the user terminal holds the resources; and
    (5) allocating the resources in use for the user terminal to the user terminal without changing use of the resources in use for the terminal so that the user terminal holds the resources,
wherein each of the steps (1) to (5) comprises allowing the user terminal to hold the resources in use for the user terminal for a first predetermined time and allocating the new resources to the user terminal after the first predetermined time elapses,--

Column 56, Claim 1, Line 35 should read as follows:
--...and allocating the new resources to...--

Column 56, Claim 1, Lines 37-38 should read as follows:
Insert a phrase at the end of Line 37 and beginning of Line 38 so it reads as follows:
--...to hold the resources in use for the user terminal for a second predetermined time and allocating resources for a new region to the user...--

Column 56, Claim 2, Line 47 should read as follows:
--...one of: allocating...--

Column 57, Claim 5, Line 6 should read as follows:
At the start of Line 6, insert the following text before the text currently on Line 6:
--...wherein the common allocation comprises, when a new communication node set is created due to deletion of at least one communication node from the communication node set and/or insertion of at least one new communication node into the communication node set, returning resources by communication nodes included in the communication node set and allocating in common at least one new identical resource to the user terminal by communication nodes included in the new communication node set,...--

Column 57, Claim 5, Lines 20-21 should read as follows:
--...user terminal in the resources...--

Column 57, Claim 5, Line 23 should read as follows:
--...without returning the resources...--

CERTIFICATE OF CORRECTION (continued)
U.S. Pat. No. 8,023,529 B2

Column 57, Claim 5, Line 33 should read as follows:
--...node set when the...--

Column 57, Claim 5, Line 41 should read as follows:
At the beginning of Line 41, between the words "set" and "is", insert text so that the beginning of Line 41 reads as follows:
--...set when the first predetermined time elapses comprises, when the communication node set is changed...--

Column 57, Claim 6, Lines 52-53 should read as follows:
--...least one communication node that is not...--

Columns 57-58, Claim 6, Lines 57-1 should read as follows:
--...in the communication node set, at...--

Column 58, Claim 7 (in its entirety), Lines 6-47 should read as follows:
Delete Claim 7, in its entirety (lines 6-47) from the patent Column 58, Claim 8, Line 48 should read as follows:
--Claim 8 should be changed to Claim 7--

Column 58, Claim 8, Line 48 should read as follows:
--...method of Claim 5, wherein...--

Column 58, Claim 8, Line 50 should read as follows:
--...resources by all the communication...--